INVENTOR.
Robert B. Trousdale
BY T. L. Bowes
Att'y

INVENTOR.
Robert B. Trousdale
BY T. L. Bowes
Att'y

Feb. 3, 1959 R. B. TROUSDALE 2,872,518

PARTY LINE TELEPHONE SYSTEM

Filed Nov. 23, 1951 32 Sheets-Sheet 3

INVENTOR.
Robert B. Trousdale
BY
T. L. Bowes
Att'y

INVENTOR.
Robert B. Trousdale
BY J. L. Bowes
Att'y

Feb. 3, 1959 R. B. TROUSDALE 2,872,518

PARTY LINE TELEPHONE SYSTEM

Filed Nov. 23, 1951 32 Sheets-Sheet 5

INVENTOR.
Robert B. Trousdale
BY J. L. Bowes
Att'y

INVENTOR.
Robert B. Trousdale
BY T. L. Bowes
Att'y

INVENTOR.
Robert B. Trousdale
BY J. L. Bowen
Att'y

Feb. 3, 1959 R. B. TROUSDALE 2,872,518

PARTY LINE TELEPHONE SYSTEM

Filed Nov. 23, 1951

32 Sheets-Sheet 8

INVENTOR.
Robert B. Trousdale
BY
J. L. Bowes
Att'y

Link Coupling Circuits-24

INVENTOR.
Robert B. Trousdale
BY T. L. Bowes
Att'y

PARTY LINE TELEPHONE SYSTEM

Filed Nov. 23, 1951

INVENTOR.
Robert B. Trousdale
BY J. L. Bowes
Att'y

INVENTOR.
Robert B. Trousdale
BY J. L. Bowes
Att'y

INVENTOR.
Robert B. Trousdale
BY
T. L. Bowes
Att'y

INVENTOR.
Robert B. Trousdale
BY
T. L. Bowes
Att'y

INVENTOR.
Robert B. Trousdale
BY J. L. Bowes
Attorney

Feb. 3, 1959 R. B. TROUSDALE 2,872,518

PARTY LINE TELEPHONE SYSTEM

Filed Nov. 23, 1951 32 Sheets-Sheet 15

Code Forming Circuit-27a

INVENTOR.
Robert B. Trousdale
BY J. L. Bowes
Attorney

Feb. 3, 1959 R. B. TROUSDALE 2,872,518

PARTY LINE TELEPHONE SYSTEM

Filed Nov. 23, 1951 32 Sheets-Sheet 16

INVENTOR.
Robert B. Trousdale
BY T. L. Bowes
Att'y

INVENTOR.
Robert B. Trousdale
BY T. L. Bowes
Att'y

Feb. 3, 1959 R. B. TROUSDALE 2,872,518

PARTY LINE TELEPHONE SYSTEM

Filed Nov. 23, 1951 32 Sheets-Sheet 18

INVENTOR.
Robert B. Trousdale
BY T. L. Bowes
Att'y

INVENTOR.
Robert B. Trousdale
BY
J. L. Bowes
Att'y

INVENTOR.
Robert B. Trousdale
BY
T. L. Bowes
Attorney

Feb. 3, 1959 R. B. TROUSDALE 2,872,518

PARTY LINE TELEPHONE SYSTEM

Filed Nov. 23, 1951 32 Sheets-Sheet 21

INVENTOR.
Robert B. Trousdale
BY T. L. Bowes
Att'y

INVENTOR.
Robert B. Trousdale
BY T. L. Bowes
Att'y

INVENTOR.
Robert B. Trousdale
BY T. L. Bowes
Att'y

INVENTOR.
Robert B. Trousdale
BY J. L. Bowes
Att'y

Feb. 3, 1959 R. B. TROUSDALE 2,872,518

PARTY LINE TELEPHONE SYSTEM

Filed Nov. 23, 1951 32 Sheets-Sheet 25

INVENTOR.
Robert B. Trousdale
BY T. L. Bowes
Att'y

INVENTOR.
Robert B. Trousdale
BY
T. L. Bowes
Att'y

Feb. 3, 1959 R. B. TROUSDALE 2,872,518

PARTY LINE TELEPHONE SYSTEM

Filed Nov. 23, 1951 32 Sheets-Sheet 27

INVENTOR.
Robert B. Trousdale
BY T. L. Bowes
Att'y

Feb. 3, 1959 R. B. TROUSDALE 2,872,518

PARTY LINE TELEPHONE SYSTEM

Filed Nov. 23, 1951 32 Sheets-Sheet 28

INVENTOR.
Robert B. Trousdale
BY
T. L. Bowes
Att'y

INVENTOR.
Robert B. Trousdale
BY J. L. Bowes
Att'y

Feb. 3, 1959 R. B. TROUSDALE 2,872,518

PARTY LINE TELEPHONE SYSTEM

Filed Nov. 23, 1951 32 Sheets-Sheet 30

INVENTOR.
Robert B. Trousdale
BY T. L. Bowes
Att'y

INVENTOR.
Robert B. Trousdale
BY T. L. Bowes
Att'y

INVENTOR.
Robert B. Trousdale
BY T. L. Bowes
Att'y

United States Patent Office 2,872,518
Patented Feb. 3, 1959

2,872,518

PARTY LINE TELEPHONE SYSTEM

Robert B. Trousdale, Rochester, N. Y., assignor, by mesne assignments, to General Dynamics Corporation, a corporation of Delaware Application November 23, 1951, Serial No. 257,712

69 Claims. (Cl. 179—8.5)

The present invention relates to improved methods and apparatus for selectively setting up signal transmission connections between the lines of a signalling system, and more particularly to improved methods and apparatus for setting up two-way communication connections on a party line basis between the lines of an automatic telephone system. Specifically, the present invention is directed to certain improvements in a fully automatic telephone system of the improved form disclosed and claimed in a copending application of Robert B. Trousdale and Frank A. Morris, Serial No. 134,974, filed on December 24, 1949, now Patent 2,773,964, issued December 11, 1956, and assigned to the same assignee as the present invention.

Many types of automatic switching apparatus have been proposed and developed for transmitting signals between the lines of telephone, telegraph, and other communication systems. In the main, the apparatus proposed and developed for this purpose utilizes electromechanical devices embodying moving mechanical parts, such, for example, as relays, stepping switches, and the like, to perform the line selecting, line interconnecting and ancillary functions required in selectively interconnecting any two lines of a large group of lines. While apparatus of this type and embodying switching devices of various forms has been developed to provide thoroughly reliable service, it is inherently subject to several limitations, including that of insufficient operating speed. To overcome these limitations various proposals have been made for utilizing electronic facilities, such, for example, as cathode ray tubes, for the purpose of transmitting signals between the lines of a signalling system on a selective basis. However, most if not all of these proposals are limited to arrangements for providing one-way signal transmission between two lines and include no provisions whatever for performing the ancillary control and supervisory functions, such, for example, as line busying, called line selection, called line busy testing and called station ringing, which are required in interconnecting the lines of an automatic telephone system. Furthermore, no provision is made in the arrangements heretofore proposed for providing party line service and the attendant ringing of a plurality of substations associated with the called line in accordance with the party line ringing signal assigned to the called substation.

It is an object of the present invention, therefore, to provide new and improved methods and apparatus for selectively setting up two-way connections between any pair of private or party lines of a signalling system.

It is another object of the present invention to provide an improved automatic telephone system capable of providing all of the services of electromechanical switch-type systems, including party line service, but which consists exclusively of electron conducting devices such, for example, as electron tubes, gas tubes, crystal rectifiers, and the like, together with interconnecting circuit components therefor.

It is a further object of the present invention to provide an improved electronic telephone system which is fully automatic in operation and embodies improved methods and apparatus for transmitting signals in both directions and on either a private or party line basis between different pairs of connected lines of the system.

It is still another object of the present invention to provide an improved automatic telephone system adapted for party line service wherein all of the electronic line selecting and signal transmission units or links of the system are common to all lines of the system.

In accordance with another object of the present invention improved facilities are provided in the system for self-allotting the electronic line selecting and signal transmission links to successive calling lines of the system whereby a plurality of calls may be handled by the system at the same time.

According to a further object of the present invention improved and exceedingly simple electronic facilities are provided in the system for testing each called line to determine the idle or busy condition thereof incident to the selection thereof and wherein means are provided for preventing the busy test operation from being initiated prematurely or performed erroneously to give a false busy indication.

It is another object of the present invention to provide an improved electronic telephone system of the fully automatic type which includes numerical switching stages each comprising electronic facilities directively controllable over any calling line of the system to select a desired called line of the system and to effect ringing of the called line in accordance with a desired party line substation connected thereto.

It is still another object of the present invention to provide an improved electronic telephone system which is fully automatic in operation and includes electronic facilities for transmitting all of the usual supervisory signals over the calling and called ends of a connection as a connection is progressively set up, and wherein dialing of the called line may be accomplished in a uniform, positive, and reliable manner at speeds up to approximately 40 pulses per second.

It is a further object of the present invention to provide an improved electronic telephone system which is fully automatic and wherein a ringback tone signal is employed for the dual purpose of informing the calling subscriber that the called line is being rung and of effecting ringing of the called line.

It is a still further object of the invention to provide an improved electronic telephone system which is fully automatic and is adapted for party line service and wherein a ringback tone signal is employed for the dual purpose of informing the calling subscriber that the called line is being rung and the nature of the ring, and effecting ringing of all substations associated with the called line during the ringing intervals of said ringback tone signal.

More specifically it is an object of the present invention to provide an automatic telephone system which is adapted for party line service and which embodies electronic facilities for transmitting the usual start impulsing or dial tone signal over each calling line of the system when a line selecting link is operatively associated with the line, testing each called line to determine the idle or busy condition thereof incident to the selection thereof, returning a busy signal to the calling line if the called line tests busy, transmitting a ringing signal over the called line during the ringing intervals of the party line ringing signal assigned to the called substation, and a ringback tone signal over the calling line during these intervals if the called line tests idle, and terminating the ringing and ringback signals in response to answering of the call on the called line.

According to a further object of the present invention an improved electronic telephone system is provided which is fully automatic in operation and adapted for party line service and which includes electronic facilities for effecting transmission of ringing information from the calling to the called end of a connection on either a marginal or a non-marginal basis, thereby to ring the substations associated with the called line during the ringing intervals of the party line ringing code assigned to a desired called substation.

According to a still further object of the present invention there is provided an improved electronic telephone system which is fully automatic in operation and is adapted for party line service wherein separate paths for the transmission of supervisory and intelligence signals are provided between the calling and called lines of the system.

It is another object of the present invention to provide an automatic telephone system of the character described wherein ringing of the called line is delayed after determination of the idle condition thereof until the beginning of a party line code ringing cycle thereby to prevent erroneous party line ringing of the called line.

It is still another object of the present invention to provide an improved electronic telephone system of the fully automatic type which is adapted for party line service and includes electronic facilities for transmitting all of the usual supervisory signals, including a party line code ringing signal, over the calling and called ends of a connection as the connection is progressively set up, and wherein means are provided for preventing bell tinkling at the called end of a connection at the start of a party line ringing code cycle.

According to a still further object of the invention an improved electronic telephone system which is fully automatic in operation and is adapted for party line service is provided which compares favorably in first cost with electromechanical systems of the same capacity, requires a minimum of special circuit components in the construction thereof and yet is capable of providing reliable service with a minimum amount of maintenance.

The invention both as to its organization and method of operation together with further objects and advantages thereof will best be understood by reference to the following specification taken in connection with the accompanying drawings in which:

Figs. 1, 2, 3, and 4 when arranged in the manner shown in Fig. 22A diagrammatically illustrate an automatic telephone system characterized by the features of the present invention;

Figs. 2A and 2B when laid end to end in the order named diagrammatically illustrate the components of one of the finder-connector links embodied in the system shown in Figs. 1 to 4, inclusive;

Figs. 5 to 21, inclusive, when arranged in the manner shown in Fig. 22 illustrate certain details of the system shown in Figs. 1 to 4, inclusive;

Figs. 23, 24, 25 and 26 when laid side by side in the order named graphically illustrate the time relationships between circuits and the pulses developed by and utilized in the various components of the system;

Figs. 27A and 27B illustrate alternative embodiments of a portion of the system shown in Fig. 20; and Figs. 28 to 30, inclusive, are graphs illustrating the operating characteristics of certain components of the system.

In general the electronic telephone system herein disclosed is capable of serving 100 lines, each of which lines may have associated therewith a number of party line substations up to a maximum of ten such party line substations for each line. More specifically, the system is capable of providing two-way communication between any two lines of a 100 line group and on either a private or party line basis, and includes entirely novel facilities for performing the functions of—

(1) Self-allotment of individual finder-connector links to successive calling lines coupled with automatic line busying as each link is taken into use to handle a call.

(2) Dial tone transmission to the calling substation when a finder-connector link is assigned to the calling line.

(3) Dial controlled impulsing (3 digits) to effect selection on a decimal basis of any called line in the 100 line group and to effect selection on a decimal basis of the party line ringing signal assigned to any party line substation connected to the called line.

(4) Automatic dial tone cutoff in response to initiation of the dialing operation.

(5) Busy testing the called line incident to the selection thereof and the transmission of a busy tone signal to the calling substation in the event the called line tests busy.

(6) Simultaneous ringing of all of the substations connected to the called line in accordance with the party line ringing signal assigned to the called party line substation in the event the called line tests idle, and the transmission of a corresponding ringback tone signal to the calling substation during the ringing intervals.

(7) Automatic ringing cutoff and ringback tone signal cutoff when the called subscriber answers.

(8) Guarding each called line against intrusion as the result of an incoming call thereto in response to assignment of a finder-connector link to the calling line, and guarding of a called line against intrusion as a result of a subsequently initiated call thereto after it has been selected as a called line.

(9) Automatic release of the link occupied with the call incident to the release of the connection at the calling substation.

All of the above functions are accomplished on a fully automatic basis without the use of any relays, stepping switches, or other equivalent mechanical devices having moving parts. With the exception of the line circuits all equipment provided in the sysem to perform the described functions is common to the lines of the system, whether private or party, thus minimizing duplication of system components.

Basically the present improved system utilizes a system of multiplexing, namely pulse sampling effectively at an ultrasonic rate of the control and intelligence signals produced at each substation of the system, to provide signal channel separation. Specifically, each line of the system is assigned a particular pulse time position in each of repetitive pulse frames each comprising one hundred pulse time positions. Intelligence and control signals developed on any one line of the system are sampled only in the particular pulse time position assigned to the particular line and the samples are carried through the signal transmitting components of the system as far as the connector stage on multiplexer signal pulses occurring in this particular time position. In the connector stage the control and intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is depenednt upon time coincidence of these signal pulses with particular tens pulses of successive pulse frames as well as coincidence of these pulses with particular pulse time positions within successive pulse frames.

In order to provide for party line ringing of all of the substations associated with any one of the lines of the system in accordance with different party line ringing signals which are assigned to these substations on a decimal basis, a party line ringing signal cycle having a duration of approximately 7½ seconds is established during which ten different party line ringing codes are produced and may be selected in the connector on a third or party line digit basis to effect ringing of all of the substations associated with the called line in accordance with the particular party line code ring assigned to the particular called substation.

GENERAL DESCRIPTION OF THE SYSTEM

Referring now to the drawings and more particularly to Figs. 1, 2, 3 and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13 and 14, a talking distributor 15 of which only one is required in the system, a ringing control distributor **15*a* of which only one is required in the system, and the common equipment indicated generally at 17 in Fig. 4 of the drawings. Each of the finder-connector links is comprised of a finder and a connector, the illustrated links respectively comprising finders 12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may easily be accomplished by connecting appropriate terminals of additional links to the indicated multiple points.

As shown, the line circuits 10 and 16 respectively terminate two two-conductor lines which are respectively identified by the designations 23 and 32. The lines 23 and 32 may be used for either private or party line service. In the illustrated embodiment the line 23 is shown as a private line and accordingly extends only to the single substation A having the directory number designation No. 231. On the other hand the line 32 is shown as a party line and extends to a plurality of parallel connected substations, such as the substations B, C, and D having respectively assigned thereto the directory number designations No. 322, No. 323, and No. 324. Each line circuit performs the functions of repeating intelligence or control signals from its associated substation or substations to a corresponding one of the gate circuits in the multiplexer 11, repeating intelligence signals derived from a particular gate circuit of the distributor 15 to its associated substation or substations, and of responding to party line ringing control signals derived from one of the connectors **12*b*, 13*b* or 14*b* by way of the ringing control distributor 15*a* to transmit ringing current to the associated substation or substations on a call incoming thereto. To perform these functions, the line circuit 10 is connected by way of the conductors 53*a* and 53*b* to one of the gate circuits provided in the multiplexer 11, and is connected by way of the conductors 44*a* and 44*b* forming the illustrated cable 44 to one each of the gate circuits provided in the ringing control distributor 15*a* and the talking distributor 15. The line circuit 10 is also connected to certain components of the common equipment 17 in the manner described below. Similarly, the line circuit 16 is connected by way of the conductor 54*a* to one of the gate circuits in the talking distributor 15, by way of the conductor 54*b* to one of the gate circuits in the ringing control distributor 15*a* and by way of the conductors 45*a* and 45*b*, which form the illustrated cable 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and the distributors 15 and 15*a* and on a common basis to certain components of the common equipment 17**.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders **12*a*, 13*a* and 14*a* and also to the multiplexer input terminals of each of the connectors 12*b*, 13*b* and 14*b*. In reverse manner, the talking distributor 15 performs the function of repeating intelligence signals derived from the connectors 12*b*, 13*b* and 14*b* in pulse time positions corresponding to particular calling and called lines to the line circuits respectively terminating the lines and the ringing control distributor 15*a* performs the function of repeating party line ringing control signals derived from the connectors 12*b*, 13*b* and 14*b* in pulse time positions corresponding to particular called lines to the line circuits terminating these lines. The ringing control distributor 15*a* does not perform any intelligence transmission functions but instead functions solely as a ringing signal control unit. To these ends, the input terminals of the talking distributor 15 are connected by way of the common conductor 51 to the output terminals of each of the connectors 12*b*, 13*b* and 14*b*, and the input terminals of the ringing control distributor 15*a* are connected by way of the common conductor 51*a* to another set of output terminals of each of the connectors. In performing the described functions, the multiplexer 11 and the distributors 15 and 15*a* are controlled by certain components of the common equipment 17** in the manner hereinafter explained.

The finders of the various links, such, for example, as the finder **12*a*, do not perform any intelligence transmission functions. On the contrary, they function strictly as control units. Specifically, the finder 12*a* is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12** is definitely associated with a calling line to handle the call initiated on the line. This is accomplished through operation of the finder 12a to impress operating anode potential upon a plurality of the tubes in the connector 12b over the +B switch conductor 12c. When operatively associated with a particular calling line, the finder 12a also performs the function of guarding the calling line against intrusion on an incoming call to the line. This is accomplished through operation of the finder 12a to feed busy pulses occurring in the particular pulse time position assigned to the calling line with which the finder is operatively associated over the common busy pulse out conductor 52a to the link coupling circuits 24 in the common equipment 17. From the link coupling circuits 24 the busy pulses are fed to the common busy pulse in conductor 52b which is multipled to each of the finders and connectors of the system. The finder 12a further performs the function of supplying an allotting signal to the finder 13a of the next succeeding link 13 when the finder 12a is taken into use so as to provide a self-allotting system for the finder-connector links of the system.

To perform the above functions in the manner fully explained below, the finder 12a comprises (see Figs. 2A, 5 and 6) a pulse input circuit 200, a +B switching circuit 201, a pulse combining circuit 202, tens and units coincidence tube circuits 203 and 204, a finder pulse forming circuit 205 and a self-allotting circuit 206. It will be noted that the finder 12a and connector 12b are connected on an individual link basis by only two conductors, namely the +B switch conductor 12c and the finder gate pulse conductor 12d. The finder 13a and connector 13b of the link 13 are similarly connected on an individual link basis by means of the finder gate and +B switch conductors 13d and 13c which respectively correspond to the conductors 12d and 12c of the link 12. Similarly, the finder gate and +B switch conductors 14d and 14c are provided to connect the finder 14a and connector 14b of the link 14.

Each of the connectors 12b, 13b, and 14b performs a plurality of different functions. Thus the connector 12b, for example, is controlled by finder gate pulses delivered thereto over the conductor 12d to accept and respond to signal bearing multiplexer pulses occurring in the pulse time position corresponding to the calling line with which the link is associated. It also responds to the application of operating anode potential to the conductor 12c and to the finder gate pulses appearing on the conductor 12d to feed a dial tone signal to the talking distributor 15 on connector signal pulses occurring in the pulse time position assigned to the calling line with which it is operatively associated, thereby to return the usual dial tone signal to the calling subscriber. The connector 12b is also adapted for party line ringing and responds to dial pulses (a tens digit, a units digit, and a third digit called the part line or code ringing digit) originating at the calling line with which the link 12 is operatively associated to select the particular pulse time position assigned to the called line and the particular party line ringing signal assigned to the called substation associated with the called line. Incident to the selection of this time position, the connector 12b conditions itself to accept signal carrying pulses from the multiplexer 11 which occur in the pulse time position corresponding to the selected called line, to store the intelligence carried by these pulses, and to transmit the intelligence to the distributor 15 on connector signal pulses occurring in the pulse time position corresponding to the calling line with which the link 12 is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line. In addition, the connector 12b performs the auxiliary functions of terminating dial tone transmission to the calling substation when the first line selecting impulse is dialed into the connector; feeding busy pulses occurring in the pulse time position assigned to the called line over the common busy pulse out conductor 52a to the link coupling circuits 24 in the common equipment 17, and from the link coupling circuits 24 over the common busy pulse in conductor 52b to the other links of the system, thereby to guard the called line against seizure through another link; testing the pulse time position assigned to the called line to determine the idle or busy condition of that line; transmitting busy tone carrying pulses to the talking distributor 15 in the pulse time position assigned to the calling line in the event the called line tests busy; transmitting a party line ringing signal in accordance with the identity of the called substation associated with the called line by way of the ringing control distributor 15a to the line circuit terminating the called line in the event the called line tests idle, concurrently transmitting pulses which are modulated with a corresponding ringback tone signal to the talking distributor 15 in the pulse time position assigned to the calling line, thereby to signal the calling subscriber that the called substations associated with the called line are being rung; and terminating the party line ringing signal and concurrently terminating ringback tone signal transmission to the calling substation in response to answering of the call at the called party line substation. The connector 12b is also arranged to release in response to the release of a connection involving the link 12 at the calling substation.

To perform the above-mentioned functions in the manner fully explained below, the connector 12b, as diagrammatically illustrated in Fig. 2B and as shown in detail in Figs. 8, 9, 10, 11, 14, 15, 16 and 17, is provided with a calling line in gate circuit 207 which responds to finder gate pulses transmitted to the connector over the conductor 12d to repeat signal bearing pulses delivered thereto from the multiplexer 11 in the pulse time position assigned to the calling line, and a calling line reconstructor circuit 208 having the function of detecting or reconstructing and storing the intelligence carried by signal bearing pulses transmitted to the connector from the multiplexer 11 in the pulse time position assigned to the calling line. The connector 12b further comprises a called line out gate circuit 224 for gating to the talking distributor 15 connector signal pulses carrying the intelligence reconstructed by the circuit 208 in the time position assigned to a particular called line. In addition, the connector 12b includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12d to gate to the talking distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12b of the present invention is adapted for party line service and additionally comprises a plurality of components for responding to three digits of dial pulses repeated to the connector on multiplexer pulses occurring in the pulse time position assigned to the calling line, the third digit corresponding to the particular party line ringing signal assigned to the called party line substation. In general, the dial pulse responsive equipment of the connector 12b comprises a dial impulse integrator circuit 209 which receives dial impulses from the reconstructor circuit 208, tens, units and party inverter circuits 260, 261 and 262, respectively, to which pulses are repeated by the dial impulse integrator circuit 209, the units and party inverter circuits 261 and 262 also acting as start gate circuits for the units and party digit channels, respectively; tens, units and party digit registers 211, 215 and 265 which are respectively controlled in accordance with the numerical values of the tens, units and party digits repeated to the circuits 260, 261 and 262 from the integrator circuit 209; tens, units and party register pulsers 210, 214 and 263 which are respectively interposed between the inverter circuit and the digit register of the tens, units and party digit channels, and tens, units and party sequence timing circuits 212, 216 and 264 which in effect function as the digit counting components of the connector, i. e., initiate certain operations at the ends of the first, second and third digits dialed into the connector.

The connector 12*b* further comprises a connector pulse forming circuit 217 which is controlled in accordance with the settings imparted to the tens and units digit registers 211 and 215 at the end of a dialing operation to produce connector pulses which are employed to control the circuits 222, 223 and 224 in the transmission of intelligence and control signal information from the connector to the talking distributor 15 in the pulse time position assigned to the called line. The busy test facilities of the connector comprise a busy test circuit 218 jointly controlled by the connector pulse forming circuit 217 and busy pulses transmitted to the connector over the common busy pulse in conductor 52*b*, a busy lock circuit 219 and a busy gate circuit 220. In addition, the connector 12*b* comprises supervisory tone gate circuits 225 having the function of gating dial and busy tones to the calling line and including a ringback tone gate circuit having the function of gating a particular party line ringback tone signal selected by the party digit register 265 in accordance with the identity of the called substation associated with the called line to the calling line, a code start circuit 268 which performs the function of delaying the transmission of the selected party line ringback tone signal through the ringback tone gate circuit until the start of a party line ringing cycle, a called line ringing out gate circuit 270 which is controlled by the ringback tone gate circuit and gates a ringing control signal to the ringing control distributor 15*a* over the conductor 51*a*, said ringing control signal comprising connector pulses which occur in the pulse time position assigned to the called line and are produced only during the ringing intervals of the party line ringing signal corresponding to the identity of the called substation associated with the called line, and a ring trip circuit 221 which is assigned the function of terminating ringing control signal transmission to the ringing distributor 15*a* and ringback tone signal transmission to the talking distributor 15 when a call answering operation is performed at the called substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network in the manner more fully explained below. As controlled by the phase shifter and pulse former network 19, the units pulse ring circuit 20 functions sequentially to develop the units pulses which define the pulse time positions of the pulse frames, appear on the conductors within the cables 31 and 30, respectively, and are fed by way of these conductors to the various intelligence transmitting and control components of the system. More specifically, the cable 30 comprises ten units pulse conductors 30*a*, 30*b*–30*j* over which negative units pulses are sequentially transmitted in the order named to the units coincidence tube circuits 204 of the finders 12*a*, 13*a* and 14*a* and the units digit registers 215 of the connectors 12*b*, 13*b* and 14*b*.

In time coincidence with the described negative units pulses, the ring circuit 20 produces positive units pulses on the ten units pulse conductors 31*a*, 31*b*–31*j* forming the cable 31, which are transmitted to the gate circuits of the talking distributor 15 and also to the pulse gate circuits of a channel pulse commutator 22. The positive units pulses developed upon the two conductors 31*a* and 31*f* are also employed to control a supervisory carrier supply circuit 26. Furthermore, the positive units pulses developed on the conductors 31*a*, 31*b*–31*j* are transmitted to the one hundred line circuits of the system in accordance with the units digit of the directory number designation assigned to the line associated with each of the line circuits to control, in conjunction with the ringing control distributor 15*a*, the transmission of ringing current to each of the lines of the system in the manner fully described below. Thus, the line circuit 10, which serves the line 23, is supplied with positive units pulses occuring in the third units pulse time position over the conductor 31*c*. These same units pulses are supplied over the conductor 31*c* to the nine other line circuits of the system associated with the lines in the units digit group No. 3. Likewise, the line circuit 16, which is associated with the line 32 is supplied with positive units pulses occurring in the second units pulse time position over the conductor 31*b*. These same units pulses are supplied over the conductor 31*b* to the nine other line circuits of the system associated with the lines in the units digit group No. 2. The positive and negative units pulses are sequentially developed on the units leads 31 and 30, respectively, at a frequency rate of 100 kilocycles and each tenth positive units pulse, i. e., each pulse appearing on the units pulse conductor 31*j*, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32*a*, 32*b*–32*j* forming the cable 32 are impressed upon the gate circuits of the multiplexer 11, the tens pulse gate circuits of the talking distributor 15 and the pulse gate circuits of the ringing control distributor 15*a* in the manner more fully explained below. The negative tens pulses as produced by the ring circuit 21 in time coincidence with the positive tens pulses and as sequentially impressed on the tens pulse conductors 33*a*, 33*b*–33*j* forming the cable 33 are impressed on the tens coincidence tube circuits 203 of the finders 12*a*, 13*a* and 14*a* and the tens digit registers 211 embodied in the connectors 12*b*, 13*b* and 14*b*, all in the manner more fully explained below.

As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the cable 34, which are fed to the gate circuits of the multiplexer 11. These channel pulses occur at the same frequency as the units pulses, but are much narrower in width, For example, the channel pulses appearing on the conductor 34a are much narrower than the units pulses appearing on the positive units pulse lead 31a and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12b, 13b and 14b.

As indicated above, the line circuits 10, 16, etc., individually terminating the lines of the system, perform the function of transmitting ringing current to their respective associated substations. Ringing current transmission from any line circuit terminating a called idle line to the substations associated therewith is effected in accordance with the identity of the called substation as determined by the party line ringing signal corresponding to the third digit of the directory number designation assigned to the particular called substation and under the control of a ringback tone generator 29c, a code forming circuit 27a, a code modulator circuit 27 and a ringing supply circuit 60, which components are embodied in the common equipment 17, in the manner fully described below. The code forming circuit 27a operates independently of the other components of the common equipment 17 to develop ten party line ringing signals which are coded in different dot-dash arrangements and which are all completed during each one of successive ringing cycles. The code forming circuit also performs the function of developing a code start pulse coincident with the start of each ringing cycle which is multiplied over the conductor 5 to all of the connectors 12b, 13b, 14b, etc. of the system. The ringback tone generator 29c performs the function of developing a continuous, audible ringback tone signal which is supplied over the conductor 27b to the code modulator circuit 27. The code modulator circuit 27 performs the function of separately gating the continuous ringback tone signal developed by the generator 29c in accordance with each of the code signals developed by the code forming circuit 27 to provide ten different ringback tone signals which are interrupted in accordance with the code signals developed by the circuit 27a and are supplied to the party digit registers of each of the connectors 12b, 13b and 14b over the conductors 48a, 48b–48j forming the illustrated cable 48. The ringing supply circuit 60 includes a combined bias voltage and 20 cycle ringing current source which is connected to each of the line circuits 10, 16, etc., over the common multiple conductors 61a and 61b forming the illustrated cable 61. The common equipment also includes a busy tone generator 29a and a dial tone generator 29b which are respectively connected by way of the multiple conductors 46 and 47 to the supervisory tone gate circuits 225 of each of the connectors 12b, 13b and 14b.

The common equipment 17 further comprises the link coupling circuits 24 which include a busy pulse drive channel for repeating busy pulses supplied thereto over the common busy pulse out conductor 52a to the busy pulse in conductor 52b which is multiplied to the finders and connectors of all the links of the system, and a supervisory carrier drive channel for repeating the 100 kc. supervisory carrier supplied thereto over the conductor 37 from the supervisory carrier supply circuit 26 to the self-allotting circuit 206 of the finder 12a over the conductor 36a to permit the finder 12a to handle the first incoming call.

In order to render the mode of operation of the system more readily understandable, a pulse chart has been illustrated in Figs. 23 to 26, inclusive, to show the relative widths of the pulses developed by the common equipment components 19, 20, 21 and 22 during two successive pulse frames, as well as the time or phase relationship between the pulses. As there shown, the units pulse ring drive pulses 95a, appearing on the conductor 40 are produced by the phase shifter and pulse former circuit 19 along the zero potential reference line 95 at a frequency rate of one megacycle and are of positive polarity. Similarly, the channel pulse commutator drive pulses 96a appearing on the conductors 41 and 35 are produced by the phase shifter and pulse former network 19 along the zero potential reference line 96 at the same frequency of one megacycle and are of positive polarity. It will be noted that both the units pulse ring drive pulses 95a and the commutator drive pulses 96a are very narrow, i. e., persist for very short time intervals, and that the pulses 96a are so displaced in time relative to the pulses 95a that each commutator drive pulse 96a occurs approximately at the middle of the period separating the preceding and succeeding units pulse ring drive pulses 95a. The positive units pulses appearing respectively on the units pulse conductors 31a, 31b–31j and the negative units pulses coincidentally appearing on the units pulse conductors 30a, 30b–30j are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors a, b–j, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods 62a, 62b, 62c, etc., along the potential reference line 62, are separated by a time interval equaling the sum of nine units pulse time positions and during which units pulses are produced successively along each of the nine other zero potential reference lines.

The negative tens pulses successively produced by the tens pulse ring circuit 21 on the tens pulse conductors 33a, 33b–33j and the positive tens pulses coincidentally produced on the tens pulse conductors 32a, 32b–32j are illustrated as appearing along the ten zero potential reference lines 72 to 81, inclusive. Here also, the positive tens pulses are shown in solid lines, whereas the coincidentally produced negative tens pulses are shown in dash lines. It will be noted that each tens pulse persists for a time interval exactly equaling the time required to produce ten units pulses. Thus the positive and negative tens pulse period 72a persists for the duration of the interval in which the ten units pulses 62a–71a are successively produced by the units pulse ring circuit 20. It will also be noted that the starting point of each tens pulse period 72a, 73a, 74a, etc., is exactly coincident with the starting points of the positive and negative units pulses 62a, 62b, 62c, etc., appearing along the zero potential reference line 62 and impressed upon the units pulse conductors 30a and 31a, respectively, by the units pulse ring circuit 20. Further, each tens pulse period terminates at the exact instant of termination of the positive and negative units pulses 71a, 71b, 71c, etc., appearing along the zero potential reference line 71 and produced by the units pulse ring circuit 20 on the conductors 30j and 31j, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31$j$ to step or trigger the tens pulse ring 21 on a periodic basis.

The channel pulses which are successively produced on the ten channel pulse conductors 34$a$, 34$b$–34$j$ by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96$a$ appearing along the zero potential reference line 96. Like the positive and negative units pulses, the channel pulses are produced at the fundamental frequency rate of one megacycle, but due to the action of the commutator 22 in diverting these pulses successively to the conductors 34$a$, 34$b$–34$j$ recur only on each of these conductors at a rate of one hundred kilocycles. Thus the channel pulses 82$a$, 82$b$, 82$c$, etc., appearing along the reference line 82 and impressed on the conductor 34$a$ are spaced apart timewise by like intervals each of which exactly equals the sum of ten units pulse time periods. During this spacing interval, nine additional channel pulses are successively produced along the reference lines 83, 84–91 to appear on the conductors 34$b$, 34$c$–34$j$. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95$a$, to open the gating circuits of the channel pulse commutator 22 in the manner more fully explained below. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 23 to 26, inclusive, in mind, it will readily be understood that each pulse frame is divided into one hundred readily identifiable pulse time positions. Thus the first ten pulse time positions of each pulse frame, which are respectively assigned to the lines of the system having the directory number designations 11, 12–10, are defined by the first tens pulse period 72$a$ of the frame within which the ten units pulse periods 62$a$, 63$a$, 64$a$–71$a$ occur. Similarly, the second ten pulse time positions, which are respectively assigned to the lines of the system having the directory number designations 21, 22, 23–20, are defined by the second tens pulse period 73$a$ during which the ten units pulse periods 62$b$, 63$b$, 64$b$–71$b$ occur. Again, the third ten pulse time positions, which are respectively assigned to the lines of the system having the directory number designations 31, 32, 33–30, are marked out by the third tens pulse time period 74$a$ during which the ten units pulse periods 62$c$, 63$c$, 64$c$–71$c$ occur. Thus it will be understood that the pulse time position of each pulse frame which is assigned to the illustrated line 23 occurs during the second tens pulse interval 73$a$ of each pulse frame and is coincident with the units pulse period 64$b$ of each pulse frame. It will also be apparent that the corresponding signal pulse 84$b$ occurs well within the limits of this pulse time position. Similarly, the pulse time position assigned to the illustrated line 32 occurs during the third tens pulse time interval 74$a$ of each pulse frame and is coincident with the second units pulse period 63$c$ of each pulse frame. Here again, each channel pulse 83$c$ corresponding to the line 32 occurs well within the limits of the particular pulse time position assigned to the line 32 in each pulse frame.

In order further to render the mode of operation of the party line ringing system of the present invention more readily understandable, a code ringing chart has been illustrated in Figs. 28 and 29 to show the time and phase relationship of the signals developed by the code forming circuit 27$a$ and the code modulator circuit 27 in the common equipment 17 during one code ringing cycle. As there shown, code forming ring drive pulses 110 of positive polarity are developed in the code forming circuit 27$a$ along the zero potential reference line 111 at a frequency rate of approximately one pulse every half second. The ring drive pulses 110 are delivered at intervals representing one code unit, there being in the illustrated embodiment fifteen successive code unit intervals in each code cycle. In this connection it will be understood that the code forming ring drive pulses 110 are not in synchronism with, and in fact are completely independent of, the time position system pulses shown in Figs. 23 to 26, inclusive, which latter pulses are controlled by the master oscillator 18. The code forming ring drive pulses 110 occur at the relatively low frequency of one such pulse for each one-half second and are used to control only the intervals during which the called substation is rung.

The code forming circuit 27$a$ is provided with a series of fifteen pulse forming stages which individually develop the negative code forming pulses 120, 121–134, inclusive, which are successively produced during the fifteen code unit intervals constituting one code cycle. Thus, the pulses 120, which are produced by the first pulse forming stage in the code forming circuit 27$a$ occur at the rate of one such pulse for each code cycle and appear in the first code unit interval of each code cycle. Likewise, the code forming pulses 121 are produced by the second pulse forming stage in the circuit 27$a$ and occur during the second code unit interval of each code cycle. In an entirely similar manner the code forming pulses 122–134 are produced in the remaining code unit intervals of each code cycle.

In order to provide ten coded party line ringing signals having different dot-dash code sequences, certain ones of the code forming pulses 120–134, inclusive, are combined in various combinations to provide ten coded ringing signals which have been assigned the code ringing numbers 1 to 10, inclusive, shown in Fig. 29. Thus, the code forming pulses 130, 131, and 132 are combined to provide the code #1 ringing signal which comprises a single long ringing pulse 140. The code forming pulses 131 and 133 are combined to form the code #2 ringing signal which comprises the short ringing pulses 141 and 142 which are separated by an "off" interval 143 of the same duration. The code forming pulses 130, 132, and 134 are combined to form the code #3 ringing signal which comprises the three successive short ringing pulses 145, 146, and 147. In an entirely similar manner certain ones of the code forming pulses 120–134, inclusive, shown in Fig. 28, are combined to provide the remaining codes #4 to #10, inclusive, shown in Fig. 29. Thus, code #4 comprises a series of four short ringing pulses, code #5 comprises a long ringing pulse followed by a short ringing pulse, code #6 comprises a long ringing pulse followed by two short ringing pulses, code #7 consists of two successive long ringing pulses, code #8 consists of a short ringing pulse followed by a long ringing pulse, code #9 consists of a short ringing pulse followed by two successive long ringing pulses, and code #10 consists of two short ringing pulses followed by a single long ringing pulse.

It will be noted that all of the codes numbers 1 to 10, inclusive, are completed within one code cycle which preferably has a duration of approximately 7½ seconds and the code ringing signal of each of these codes is repeated every 7½ seconds. Thus, the code #1 ringing signal comprises a single long ringing interval which lasts for approximately 1½ seconds and is repeated every 7½ seconds. Likewise, the code #2 ringing signal consists of two short ringing intervals of ½ second each which are spaced apart by a silent interval of ½ second and are repeated every 7½ seconds.

The coded party line ringing signals developed by the code forming circuit *27a* in the manner described generally above are supplied to the code modulator circuit 27 in the common equipment 17. This circuit includes a plurality of gate circuits individually responsive to different ones of said ringing signals and operative to transmit therethrough a ringback tone signal during the ringing intervals of the particular party line ringing signal. Thus, the code modulator 27 responds to the code #3 ringing signal by producing three short pulses 150 of ringback tone voltage (Fig. 29) during the ringing intervals of code #3. In this connection it will be understood that each of the pulses 150 has a duration of approximately one-half second and the ringback tone signal is in the audible range so that each of the pulses 150 includes a great many cycles of the ringback tone signal. The circuit 27 also responds to the code #9 ringing signal by producing the interrupted ringback tone signal comprising the pulses 152 (Fig. 29) which correspond to the one short and two long ringing intervals of this ringing signal. In an entirely similar manner the other eight coded ringing signals are converted into corresponding interrupted ringback tone signals and are supplied over the multiple conductor cable 48 to the connectors of the system.

With the above general description of the code ringing chart illustrated in Figs. 28 and 29 in mind, it will readily be understood that each code cycle is divided into fifteen successive code ringing intervals which are combined in the manner shown to provide ten separate and distinct code ringing signals which are used to provide distinctive party line ringing signals suitable for identifying to the called subscriber each of the party line substations, up to a maximum of ten, associated with one of the lines of the system. Thus, substation B associated with the line 32 and assigned the directory number designation 322 is identified by code #2 to distinguish this substation from the remaining party line substations, such as the substations C and D, associated with the line 32. When the substation B is called, all of the substations B, C, and D are rung in unison in accordance with the code #2 ringing signal which consists of two short ringing intervals which are repeated every seven and one-half seconds so that the party line subscribers at these substations may determine which one of the substations associated with the line 32 is being called. However, it will be understood that certain ones of the lines of the system may be adapted for private service in which case the private line will, of course, have only one substation associated therewith. Thus, in the illustrated embodiment the line 23 is adapted for private service and has associated therewith only the one substation A to which is assigned the directory number designation 231. The interrupted ringback tone signal corresponding to the particular code ringing signal assigned to the called substation associated with the called line is selected in the party digit register of the connector of the system operatively associated with the called line on a decimal basis in the same manner as the first and second digits in the directory designation thereof are selected, as will be described in detail hereinafter.

*Operation of the system as a whole*

Briefly to consider the general mode of operation of the system, it may be assumed that the party line substation B is called from the substation A during a period when the finder-connector link 12 is idle. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor **53*b* to the gating circuit of the multiplexer 11 which individually corresponds to the line 23. The multiplexer 11 responds to this change in magnitude of the controlling bias potential supplied thereto from the line circuit 10 by opening the gate corresponding to the line 23. Accordingly, only the signal pulses 84*b* occurring during the pulse time positions 64*b* of successive pulse frames, are permitted to pass over the common conductor 50 to the pulse input circuits 200 of the finders 12*a*, 13*a*, and 14*a* and the in gate circuits 207 and 223 of the connectors 12*b*, 13*b*, and 14*b* in parallel. At this point the pulses transmitted from the multiplexer 11 over the common conductor in the pulse time position 64*b* may be regarded as multiplexer pulses 84*b*. The finder-connector links of the system are arranged in a predetermined sequence and are allotted one at a time to successive calling lines of the system by means of the self-allotting circuits 206 contained in each of the finders 12*a*, 13*a*, and 14*a*. Initially, only the link 12 is conditioned by means of the self-allotting circuit 206 in the finder 12*a* to handle a call placed on a calling line of the system. However, when the link 12 is taken into use, the self-allotting circuit 206 in the finder 12*a* diverts a supervisory carrier signal to the finder 13*a* of the link 13 to condition this link to handle the next suceeding call. Accordingly, only the link 12 is conditioned to handle the first call and the connector 12*b* of this link is as yet inoperative so that only the finder 12*a* initially responds to the multiplexer pulses 84*b* delivered thereto from the multiplexer 11 over the conductor 50 in the described pulse time position 64*b***.

In the finder **12*a* the multiplexer pulses 84*b* are repeated by the pulse input circuit 200 to effect substantially immediate operation of the B switching circuit 201 embodied in this finder, whereby operating anode potentials are delivered to the tubes of the circuits 209, 210, 211, 212, 214, 215, 216, 218, 219, 263, 264 and 265 of the connector 12*b* over the +B switch conductor 12*c* with the result that the connector 12*b* is conditioned for operation, i. e., conditioned to respond to signal carrying multiplexer pulses delivered thereto from the multiplexer 11 over the conductor 50. Operation of the +B switching circuit in the finder 12*a* also has the effect of conditioning the tens and units coincidence tube circuits 203 and 204 of this finder for operation under the joint control of the multiplexer pulses 84*b* repeated by the input circuit 200, the negative tens pulses developed by the tens pulse ring circuit 21 and the negative units pulses developed by the units pulse ring circuit 20**.

In responding to the tens and units pulses impressed thereon coincidentally with the multiplexer pulses **84*b*, the tens and units coincidence tube circuits 203 and 204 of the finder 12*a* cooperate with the finder pulse forming circuit 205 and the combining circuit 202 of this finder to produce finder gate pulses which are transmitted over the conductor 12*d* to the circuits 207, 208 and 226 of the connector 12*b* and have the effect of initially limiting the response of the connector only to multiplexer pulses 84*b* appearing in the pulse time position 64*b*. The combining circuit 202 of the finder 12*a* also gates busy pulses in the pulse time position 64*b* which are fed over the common busy pulse out conductor 52*a* to the link coupling circuits 24 wherein the busy pulses are amplified and supplied over the common busy pulse in conductor 52*b* to all of the finders and connectors of the system to prevent these finders from responding to multiplexer pulses occurring in this time position. Thus, the line 23 is guarded against intrusion on an incoming call. In addition, the pulses gated by the circuit 202 to the conductor 12*d* are impressed upon the pulse input circuit 200, thereby to render the finder 12*a* responsive only to multiplexer pulses 84*b* appearing in the pulse time position 64*b***.

Operation of the +B switching circuit in the finder 12a has the further effect of causing the self-allotting circuit 206 of the finder 12a to divert the supervisory carrier control signal, normally supplied thereto over the conductor 36a, to the self-allotting circuit in the finder 13a of the next succeeding link 13 over the conductor 36b to condition the link 13 to handle the next incoming call. In an entirely similar manner, operation of the +B switching circuit in the finder 13a of the link 13 when this link is operatively associated with the next calling line has the effect of diverting the supervisory carrier control signal to the finder of the next succeeding finder-connector link 14 so that as one link is taken into use the seized link automatically allots the next succeeding link in the sequence to handle the next incoming call. After the finder 12a has operated to perform the described functions, continued holding of the finder 12a is dependent upon continued acceptance and transmission of multiplexer pulses 84b by the pulse input circuit 200, which of course means that the finder will remain associated with the calling line 23 only so long as a calling condition persists on this line.

As indicated above, when the +B switching circuit 201 of the finder 12a operates to apply operating anode potential to the conductor 12c, the circuits 209, 210, 211, 212, 214, 215, 216, 218, 219, 263, 264, and 265 of the connector 12b are conditioned for operation. Immediately anode potential is applied to the dial tone gating tube of the network 225, this network functions to transmit a dial tone signal, derived from the dial tone generator 29b over the conductor 47, to the calling line out gate circuit 226 over the conductor 244. This circuit in responding to the dial tone signal and also to the finder gate pulses delivered thereto over the conductor 12d and the commutator drive pulses 96a delivered thereto over the conductor 35, functions to repeat over the channel conductor 51 to the talking distributor 15 connector signal impulses modulated in accordance with the dial tone signal in the pulse time position 64b assigned to the calling line. The talking distributor 15 responds to the connector signal pulses thus transmitted thereto by repeating the same through the gate circuit thereof associated with the line circuit 10, reconstructing the dial tone and transmitting the reconstructed dial tone over the conductor 44a to the line circuit 10. In the line circuit 10, the dial tone signal is transmitted over the line 23 to signal the calling subscriber that the dialing operation may be initiated.

Two digits of dial impulses must be dialed into the connector 12b in order to effect selection in the connector of the pulse time position 63c assigned to the line circuit 16 associated with the called line 32 and a third successive digit, called a party line digit, must be dialed into the connector 12b in order to effect selection on a decimal basis of the particular party line ringing signal assigned to the called substation B having the directory number designation 322. More specifically, the directory number digits 3, 2 and 2 must be dialed successively into the connector 12b to effect selection of the pulse time position 63c and the code #2 party line ringing signal assigned to the called substation B. During the open circuit period of each dial impulse, the control bias supplied by the line circuit 10 to the gate circuit of the multiplexer 11 which corresponds to the calling line 23 is returned to its on hook value to interrupt the transmission of multiplexer pulses 84b over the conductor 50 to the pulse input circuit 200 of the finder 12a and to the in gate circuits 223 and 207 of the connector 12b. At this point, it is noted that the +B switching circuit has a fundamentally new time delay feature incorporated therein which prevents this circuit from removing operating anode potential from the conductor 12c during the open circuit periods of dial impulses, hook switch flashing and the like. Thus, premature release of the link 12 during dialing is positively prevented through the action of the +B switching circuit 201 to maintain operating anode potential upon the conductor 12c during the open circuit periods of each dial impulse. With the +B switching circuit 201 operating to supply anode potentials to the tubes of the coincidence tube circuits 203 and 204 of the finder 12a, finder gating pulses continue to be transmitted over the conductor 12d to the circuits 207, 208, and 226 of the connector 12b. Thus, these circuits are held in condition to respond to intelligence and control signals delivered thereto from the multiplexer 11 on multiplexer pulses 84b impressed upon the conductor 50 in the pulse time position 64b.

During the make period of each impulse dialed at the calling substation A, multiplexer signal pulse transmission from the multiplexer 11 to the finder 12a and the connector 12b in the pulse time position 64b is resumed. As controlled by the finder gating pulses delivered to the circuits 207 and 208 from the circuit 202 over the conductor 12d, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens, units and party inverter circuits 260, 261 and 262 over the conductor 227. Pending operation of the tens sequence timing circuit 212, the units inverter circuit 261, which also performs the function of a units digit start gate, and the party inverter circuit 262, which also performs the function of a party digit start gate, are held non-responsive to the three impulses transmitted thereto by the dial impulse integrator circuit 209 during dialing of the first digit 3 at the calling substation. However, the tens register pulser 210 responds to these three impulses repeated thereto by the tens inverter circuit 260 over the conductor 231 by developing three coincident register drive pulses of uniform amplitude and duration which are supplied to the tens digit register circuit 211 and the tens sequence timing circuit 212 over the conductor 230. In responding to the three register drive pulses thus transmitted thereto, the tens digit register 211 is driven to a setting wherein tens pulses appearing on the negative tens pulse conductor 33c in the third tens pulse time position 74a of each pulse frame may be transmitted through the third tens gate of this register and over the conductor 232 to the connector pulse forming circuit 217. Transmission of the three register drive pulses individually corresponding to the three break periods of the first digit dialed at the calling substation over the conductor 230 to the tens sequence timing circuit 212 has the effect of conditioning this circuit to block the tens register pulser 210 from developing register drive pulses during dialing of the second and third digits and to render the units inverter circuit 261 operative to repeat the pulses delivered thereto by the dial impulse integrator circuit 209 during dialing of the second digit at the calling substation. Immediately the first register drive pulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, tranmission of the dial tone signal to the calling substation A is arrested.

During the interdigit pause which separates dialing of the first and second digits at the calling substantion, the tens sequence timing circuits 212 assumes a stable operating condition wherein a controlling potential is impressed upon the conductor 234 to bias the tens register pulser 210 against developing further register drive pulses in response to impulses transmitted thereto through the tens inverter circuit 260 from the dial impulse integrator circuit 209. The above-described control potential is also supplied over the conductor 234 to the units inverter circuit 261 to render this circuit operative to repeat impulses delivered thereto from the dial impulse integrator circuit 209 to the units register pulser 214 and the units sequence timing circuit 216 over the conductor 238.

During dialing of the second digit 2 at the calling substation A, the dial impulse integrator circuit 209 responds by transmitting two impulses to each of the inverter circuits 260, 261, and 262. As noted above, however, the party inverter circuit 262 is still held non-responsive to these impulses and the tens register pulser 210 is now blocked against responding to these impulses. Thus, only the units inverter circuit 261 repeats the two impulses to the units register pulser 214 over the conductor 238 and the latter circuit responds to these impulses by developing corresponding register drive pulses of uniform amplitude and duration which are supplied to the units digit register 215 and the units sequence timing circuit 216 over the conductor 236. As a consequence, the units digit register 215 is operated or driven to open the second units gate circuit therein, thereby to establish a path for the transmission of units pulses appearing in the time positions 63*a*, 63*b*, 63*c*, etc., to the connector pulse forming circuit 217 over the conductor 245. The two pulses repeated to the units sequence timing circuit 216 over the conductor 236 serve to condition this circuit for operation at the end of the second digit.

During the interdigit pause which separates dialing of the second and third digits at the calling substation, the units sequence timing circuit 216 assumes a stable operating condition wherein a controlling potential is impressed upon the conductor 235 to bias the units register pulser 214 against development of register drive pulses in response to further impulses repeated thereto through the units inverter circuit 261 from the dial impulse integrator circuit 209. This controlling potential is also supplied over the conductor 235 to the party inverter circuit 262 to render this circuit operative to repeat impulses delivered thereto from the dial impulse integrator circuit 209 to the party register pulser 263 and the party sequence timing circuit 264 over the conductor 237.

During dialing of the third digit 2 at the calling substation A, the dial impulse integrator circuit 209 responds by transmitting two impulses to each of the inverter circuits 260, 261 and 262. As noted above, however, the tens and units register pulsers 210 and 214 are now prevented from responding to these impulses. Thus, only the party inverter circuit 262 repeats the two impulses to the party register pulser 263 over the conductor 237 and the latter circuit responds to these impulses by developing corresponding register drive pulses which are supplied over the conductor 240 to the party digit register 265 and the party sequence timing circuit 264. As a consequence, the party digit register is operated or driven to open the second party gate circuit therein, thereby to establish a path for the transmisison of the interrupted ringback tone signal, corresponding to the code #2 party line ringing signal assigned to the called substation B, over the conductor 275 to the ringback tone gate tube to the network 225.

At the end of the third digit dialed into the connector 12*b* the party sequence timing circuit 264 operates to change the potential level on the conductor 242 to a value such that the party register pulser 263 is prevented from responding to further pulses. Concurrently, the change in potential level on the conductor 242 has the effect of rendering the busy test circuit 218 operative to determine the idle or busy condition of the called line 32 by testing the pulse time position 63*c* assigned to this line.

The potential applied to the conductor 242 also has the effect of rendering the connector pulse forming circuit 217 operative to mix the tens and units pulses respectively transmitted thereto from the registers 211 and 215 over the conductors 232 and 245 to produce a resultant connector pulse which appears with different amplitudes on the conductors 239 and 239*a*. More specifically, the tens pulses 74*a* appearing on the negative tens pulse conductor 33*c* and gated by the tens digit register 211 are transmitted to the connector pulse forming circuit 217 over the conductor 232 where they are mixed with the negative units pulses appearing in the time position 63*c* which are gated by the units register 215 and transmitted to the circuit 217 over the conductor 245. Mixing of these pulses in the circuit 217 results in the production of a resultant connector pulse which occurs during each pulse frame in the pulse time position 63*c* assigned to the called line. These pulses are transmitted over the conductor 239 to the connector components 220, 222, 223, and 224 and over the conductor 239*a* to the connector component 218.

Effectively, the busy test circuit 218 and the busy lock circuit 219 cooperate to perform the busy test operation in the connector 12*b*. More specifically, if the called line is busy, i. e., occupied with a call, busy pulses are present on the common busy pulse in conductor 52*b* in the pulse time position 63*c* assigned to the called line. The manner in which such busy pulses are repeated to the conductor 52*b* from another link occupied with the call involving the called line 32 will be apparent from the foregoing explanation. These busy pulses are impressed upon the busy test circuit 218 coincidentally with the connector pulses developed by the connector pulse forming circuit 217 and impressed upon the busy test circuit 218 over the conductor 239*a*. Coincidence between the connector pulses and the busy pulses has the effect of preventing the busy test circuit from operating. Thus, the busy condition of the called line is indicated.

In the event the called line is busy, the busy lock circuit 219 as controlled over the conductors 242 and 246 and through the resistor 247 from the party sequence timing circuit 264 measures a predetermined time interval, i. e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone generator 29*a* by way of the conductor 46, the busy gate circuit in the network 225, the conductor 244, the calling line out gate circuit 226, the channel conductor 51, the talking distributor 15 and the line circuit 10 to the calling line 23. Thus, the calling subscriber is advised of the busy condition of the called line.

Assuming that the called line 32 is idle at the time the pulse time position 63*c* assigned thereto is selected in the connector in the manner explained above, such busy pulses as may be present on the common busy pulse in conductor 52*b* do not occur coincidentally with the connector pulses generated by the connector pulse forming circuit 217 in the pulse time position 63*c* assigned to the called line. When coincidence between the connector pulses and the busy pulses is lacking, the busy test circuit operates immediately the first connector pulse is impressed thereon from the connector pulse forming circuit 217 over the conductor 239*a*. In operating, the circuit 218 impresses a positive potential upon the cut-through conductor 251 which is applied to the busy lock circuit 219 to prevent the latter circuit from operating at the end of the busy test interval. The positive potential applied to the cut-through conductor 251 in the busy test circuit 218 when this circuit operates is also applied to the called line out gate circuit 224 to condition the latter circuit to repeat connector signal pulses in the time position 63c to the talking distributor 15, and is applied to the busy gate circuit 220 so that connector pulses are released to the common busy pulse out conductor 52a. The positive potential developed on the cut-through conductor 251 is also applied to the called line in gate circuit 223 and the called line reconstructor circuit 222, thereby to condition these circuits to accept signals derived from the called line. This feature of making operation of the circuits 223 and 222 dependent upon operation of the busy test circuit to indicate that the called line is idle, is necessary in order to prevent the calling subscriber from listening in on a conversation being held over the called line when the called line is busy.

When the called line out gate 224 is conditioned for operation through application of the described positive potential to the cut-through conductor 251, it responds to the connector pulses impressed upon the connector pulse conductor 239 by the connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position 63c assigned to the called line 32, whereby very narrow connector signal pulses are released over the conductor 51 to the talking distributor 15 which are well within the limits of the pulse time position 63c assigned to the called line. However, it will be understood that until ringing of the called line is effected under the control of the ringing distributor 15a, the above described connector signal pulses supplied to the talking distributor 15 in the pulse time position 63c are ineffective to establish talking communication with any of the substations associated with the called line.

The positive potential applied to the cut-through conductor 251 is also impressed upon the ring trip circuit 221 to enable this circuit to terminate ringing at the proper time and is applied to the code start circuit 268. When the positive potential on the cut-through conductor 251 is impressed upon the code start circuit 268 this circuit is rendered operative to develop a control potential in response to the next occurring code start pulse transmitted thereto from the code forming circuit 27a over the conductor 5 which control potential is impressed upon the ringback tone gate tube of the network 225 by way of the conductor 241. When this control potential is impressed upon the ringback tone gate circuit of the network 225 this circuit is rendered operative to gate the interrupted ring back tone signal corresponding to a code #2 party line ringing signal selected by the party digit register 265 to the calling line out gate circuit 226 over the conductor 244. The interrupted ring back tone signal is modulated on the signal pulses developed by the calling line out gate circuit 226 and thus transmitted by way of the conductor 51 to the talking distributor 15 wherein the interrupted ringback tone is reconstructed and supplied to the line circuit 10. In the line circuit 10, the ringback tone signal is transmitted over the calling line 23 to the calling substation A. Thus, the calling subscriber is informed that all of the party line substations, including the called substation B, associated with the called line 32 are being rung during the ringing intervals of the code #2 party line ringing signal assigned to the called substation B. This feature of making operation of the ring back tone gate circuit dependent upon operation of the code start circuit 268 to develop a control potential is necessary in order to prevent the ringback tone gate circuit from opening in the middle of a ring cycle and gating only a portion of a given ringing signal which would result in an erroneous party line ring.

The ringback tone signal which is interrupted or keyed in accordance with the ringing intervals of the code #2 ringing signal assigned to the called substation B, and which is gated by the ringback tone gate circuit in the manner described above, is concurrently used to control the ringing operation at the line circuit 16 and the transmission of ringing current over the called line 32. Thus, the interrupted ring back tone signal gated by the ringback tone gate circuit is rectified to reproduce the code #2 party line ringing signal originally developed in the code forming circuit 27a and consisting of two short ringing pulses. These ringing pulses are supplied to the called line ringing out gate circuit 270 over the conductor 269. Also, the narrow connector sampling pulses produced in the pulse time position 63c assigned to the called line by the called line out gate circuit 224 in the manner described above, are supplied to the called line ringing out gate circuit 270 over the conductor 271. The called line ringing out gate circuit 270 responds to the ringing pulses impressed upon the conductor 269 by the ringback tone gate circuit of the network 225 by gating connector sampling pulses occurring in the pulse time position 63c assigned to the called line and transmitted to the circuit 270 from the called line out gate circuit 224 over the conductor 271 to the ringing distributor channel conductor 51a during the ringing intervals of the code #2 party line ringing signal. So long as the positive potential applied to the cut-through conductor 251 in the busy test circuit 218 is fed to the code starting circuit 268, the called line ringing out gate circuit 270 is operative to release connector sampling pulses appearing in the pulse time position 63c to the ringing distributor 15a but only during the ringing intervals of the code #2 party line ringing signal assigned to the called substation B. In this connection it will be understood that the ringing distributor 15a functions strictly as a control unit in controlling the ringing facilities at the line circuit of the system and has no intelligence transmission or other supervisory signal transmission function.

In the ringing distributor 15a the connector sampling pulses, which appear on the conductor 51a during the ringing intervals of the selected party line ringing signal, are gated by the gate circuit corresponding to the tens group which includes the called line 32 and are supplied over the common conductor 54b to the line circuit 16 serving the called line 32. Thus, the ringing distributor 15a serves to distribute on a tens digit basis the ringing pulse modulated connector sampling pulses to the ten line circuits serving the ten lines of the system having the same tens digit directory designation.

In the line circuit 16 the connector sampling pulses distributed thereto by the ringing distributor 15a in the manner described above, are gated or distributed on a unit digit basis by impressing these pulses upon a line ringing circuit to which there is also supplied positive units pulses derived from the units pulse ring 20 over the conductor 31b and occurring in the units pulse time position assigned to the called line 32, i. e., the second units pulse time position in each tens pulse period. Upon coincidence of the connector sampling pulses appearing on the conductor 54b and the units pulses appearing on the conductor 31b the line ringing circuit in the line circuit 16 has the effect of activating the ringing control facilities of the line circuit 16 with the result that ringing current is transmitted over the called line 32 and the ringers at each of the party line substations, B, C, and D are rung in unison during the ringing intervals of the code #2 party line ringing signal assigned to the called substation B. As stated above, this ringing signal consists of two short ringing intervals of one-half second duration each which are repeated every seven and one-half seconds.

Ringing of all the called party line substations persists until the call is answered at the called party line substation B or until the call is abandoned at the calling substation A. Assuming that the call is answered, the line circuit 16 functions to change the magnitude of the control potential supplied over the conductor 45b to the multiplexer 11 with the result that the gate circuit assigned to the line circuit 16 in the multiplexer 11 is opened to permit multiplexer pulses 83*c* occurring in the pulse time position 63*c* of each pulse frame to be transmitted through the multiplexer 11 and over the conductor 50 to the multiplexer input terminals of each of the finders and connectors of the system.

The multiplexer pulses 83*c* are impressed upon the calling and called line in gate circuits 207 and 223 in the connector 12*b*. In the calling line in gate circuit 207, the repeated multiplexer pulses 83*c* are not in coincidence with the finder gate pulses impressed upon the circuit 207 over the conductor 12*d* and hence are not repeated to the reconstructor circuit 208. However, in the called line in gate circuit 223 the multiplexer pulses 83*c* occur in time coincidence with the connector pulses impressed upon the circuit 223 over the connector pulse conductor 239 from the connector pulse forming circuit 217. As a consequence, the call answering signal carried thereby is gated to the reconstructor circuit 222 where it is detected to produce a potential on the conductor 252 which has the effect of tripping the ring trip circuit 221. In operating, the ring trip circuit 221 functions substantially to decrease the potential on the ring trip conductor 253 which has the effect of closing the ringback tone gate circuit of the network 225, with the result that transmission of the interrupted or coded ringback tone signal to the calling substation is arrested. When the ringback tone gate circuit of the network 225 is closed, rectified ringing pulses are no longer transmitted to the called line ringing out gate circuit 270 over the conductor 269 with the result that all transmission of connector signal pulses occurring in the pulse time position 63*c* over the conductor 51*a* to the ringing control distributor 15*a* is terminated. Since the ringing control facilities of the line circuit 16 depend for their operation upon the presence of ringing pulse modulated connector signal pulses in time coincidence with the units pulses appearing on the conductor 31*b*, cessation of the ringing pulse modulated connector signal pulses terminates the transmission of ringing current to the called line 32. Thus, the ringing operation is arrested.

Following the described operations in the connector 12*b*, a two-way talking or communication circuit is fully established between the calling substation A and the party line called substation B. Thus, voice or other signals developed at the substation A and transmitted over the line 23 to the line circuit 10 serve to vary directly the bias voltage impressed upon the gate circuit of the multiplexer 11 over the conductor 53*a* in accordance with the instantaneous amplitude of such signals. As a consequence, the multiplexer pulses 84*b* released by the multiplexer 11 over the conductor 50 to the finders and connectors of the system in the pulse time position 64*b* are modulated in accordance with the voice or other signals developed at the calling substation A. These signal modulated multiplexer pulses cannot be accepted by any finder of the system other than the finder 12*a* or any connector of the system other than the connector 12*b* because of the busy pulses fed to the busy pulse out conductor 52*a* from the circuit 202. In the finder 12*a*, the multiplexer pulses 84*b* maintain the +B switching circuit 201 operated to hold the link 12 associated with the line circuit 10. The signal modulated multiplexer pulses 84*b* are also transmitted through the calling line in gate circuit 207 and over the conductor 255 to the calling line reconstructor circuit 208 where they occur in time coincidence with the finder gating pulses impressed upon the reconstructor circuit over the conductor 12*d* in the pulse time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63*c* assigned to the called line. These modulated signal pulses are transmitted to the talking distributor 15 over the conductor 51 wherein the signal components of the connector signal pulses are detected and released by the distributor 15 to the line circuit 16. In the line circuit 16, the detected signals are transmitted over the line 32 to the called substation B where they are audibly reproduced by the receiver of the telephone instrument provided at this substation.

Voice signals developed at the called party line substation B and transmitted over the line 32 to the line circuit 16 cause the bias potential delivered over the conductor 45*a* to the gate circuit of the multiplexer 11 which corresponds to the line circuit 16 to vary in exact accordance therewith. As a consequence, the voice signals are modulated upon the multiplexer pulses 83*c* occurring within the pulse time position 63*c* and released through the gate circuit of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy pulse out conductor 52*b* in the time position 64*b* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling and called line in gate circuits 207 and 223 and are repeated by the circuit 223 over the conductor 254 to the called line reconstructor circuit 222. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83*c*. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12*d*. The voice signal modulated pulses developed in the calling line out gate circuit 226 are supplied to the talking distributor 15 over the conductor 51 wherein the signal components thereof are detected and released to the line circuit 10. In the line circuit 10, the detected signals are transmitted over the line 23 to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation. However, it will be understood that each of the calling and called lines may have several party line substations associated therewith which are connected in parallel thereto so that the two-way talking circuits between the calling and called lines may be shared by a number, up to a maximum of ten, party line subscribers.

In describing the manner in which the system components 10, 11, 12*a*, 12*b*, 15, and 16 are partially or wholly released upon termination of the call, it may be assumed first that the called party at the party line substation B is the first to hang up. In such case, the bias potential delivered from the line circuit 16 over the conductor 45*b* to the gating circuit of the multiplexer 11 individually assigned to the line circuit 16 is restored to its normal value when the called line loop circuit is opened, with the result that multiplexer pulses 83*c* appearing in the pulse time position 63*c* are no longer transmitted over the conductor 50 to the finders and connectors of the system. Such termination of multiplexer pulse transmission in the time position 63*c* to the finders and connectors of the system has no effect other than inactivation of the connector components 223 and 222 and the removal of modulation components from the connector signal pulses transmitted by way of circuit 226 and the talking distributor 15 to the line circuit 10. In other words, busy pulses in the time position 63*c* assigned to the called line continue to be fed to the busy pulse out conductor 52*b* from the busy gate circuit 220 of the connector 12*b*, thereby to prevent substations associated with the called line 32 from originating a call or accepting an incoming call. This, of course, means that if the substation at any one of the substations associated with the called line picks up his receiver or hand set before the connection is released at the calling substation A, a two-way talking circuit between the calling and called lines is reestablished.

When the calling line subscriber disconncets by replacing the receiver or hand set at the substation A on its supporting hook or cradle, the loop circuit extending by way of the line 23 to the line circuit 10 is opened, with the result that the bias potential applied over the conductor 53*b* to that gate circuit of the multiplexer 11 which individually corresponds to the line circuit 10 is restored to its normal value. As a consequence, this gate circuit is biased to terminate the transmission of multiplexer pulses 84*b* occurring in the pulse time position 64*b* over the conductor 50 to the various finders and connectors of the system. When the transmission of multiplexer pulses 84*b* to the pulse input circuit 200 of the finder 12*a* is thus terminated, this circuit is rendered inactive to repeat pulses to the finder circuits, 201, 203, and 204. After a predetermined time interval, measured by the overall time constant of the +B switching circuit 201, this circuit responds to cessation of multiplexer pulse transmission thereto by removing the operating anode potential from the conductor 12*c*. As a consequence, the tens and units coincidence tube circuits 203 and 204 of the finder 12*a* are restored to normal to interrupt the production of finder gate and busy pulses in the pulse time position 64*b* by the finder pulse forming circuit 205. Thus, the application of pulses to the combining circuit 202 and hence to the busy pulse out conductor 52*a* in the pulse time position 64*b* assigned to the calling line 23 is arrested. Removal of the operating anode potential from the conductor 12*c* has the effect of rendering the self-allotting circuit 206 of the finder 12*a* operative to reassociate the link 12 with another calling line to handle another call. Cessation of busy pulse transmission to the busy pulse out conductor 52*a* in the pulse time position 64*b* has the effect of marking the calling line 23 as idle to permit initiation of a second call on this line or seizure of the line on a call incoming thereto.

Removal of operating anode potential from the conductor 12*c* also has the effect of restoring the component circuits 209, 210, 211, 212, 214, 215, 216, 218, 219, 263, 264, and 265 of the connector 12*b* to normal, thereby to condition the connector 12*b* to handle another call. Incident to normalizing of the connector pulse forming circuit 217, connector pulse production on the conductor 239 in the pulse time position 63*c* assigned to the called line 32 is terminated to arrest the application of busy pulses to the common busy pulse out conductor 52*a* by the busy gate circuit 220 in this pulse time position. Thus, the called line is unguarded to free the same for use in initiating another call or accepting a call incoming thereto. It will be noted that normalizing of the identified circuits of the connector 12*b* has the effect of restoring all components of this connector to the condition which prevailed at the time the link 12 was taken into use to handle the call just described.

As will be evident from the immediately preceding explanation, the key component involved in effecting release of the link 12 is the +B switching circuit 201 embodied in the finder 12*a*. So long as multiplexer pulses are repeated to this circuit by the pulse input circuit 200 in the time position assigned to the calling line, the circuit positively prevents release of the link 12 and holds both the calling and called lines out of service, i. e., prevents use of the same in initiating outgoing calls or accepting incoming calls. However, when multiplexer pulse transmission by way of the pulse input circuit 200 to the +B switching circuit 201 is arrested for a period of time greater than approximately one-fourth of a second, this switching circuit immediately effects release of the link regardless of the extent of progress of the call and regardless of whether or not the connection has been released at the called substation. Thus, normalizing of the +B switching circuit 201 will effect release of the link 12 upon abandonment of the call which the link is assigned to handle at any point in the process of setting up the desired connection, as for example, call abandonment before dialing is started, call abandonment after dialing is partially completed or call abandonment after dialing is completed and before the call is answered at the called substation. It will also be apparent that if the calling subscriber is the first to release the connection, i. e., hang up, the link 12 is immediately released under the control of the +B switching circuit 201 embodied in the finder 12*a*. However, in such case, the line circuit 16 associated with the called line 32 immediately assumes a setting indicating that the line 32 is calling, with the result that the link 12 is reassigned to the called line under the control of the self-allotting circuit 206 of the finder 12*a* and the usual dial tone signal is returned to the called subscriber. This signal has the effect of indicating to the called subscriber that the connection has been released at the calling substation and that he should hang up.

DETAILED DESCRIPTION OF THE SYSTEM

Figure 1:
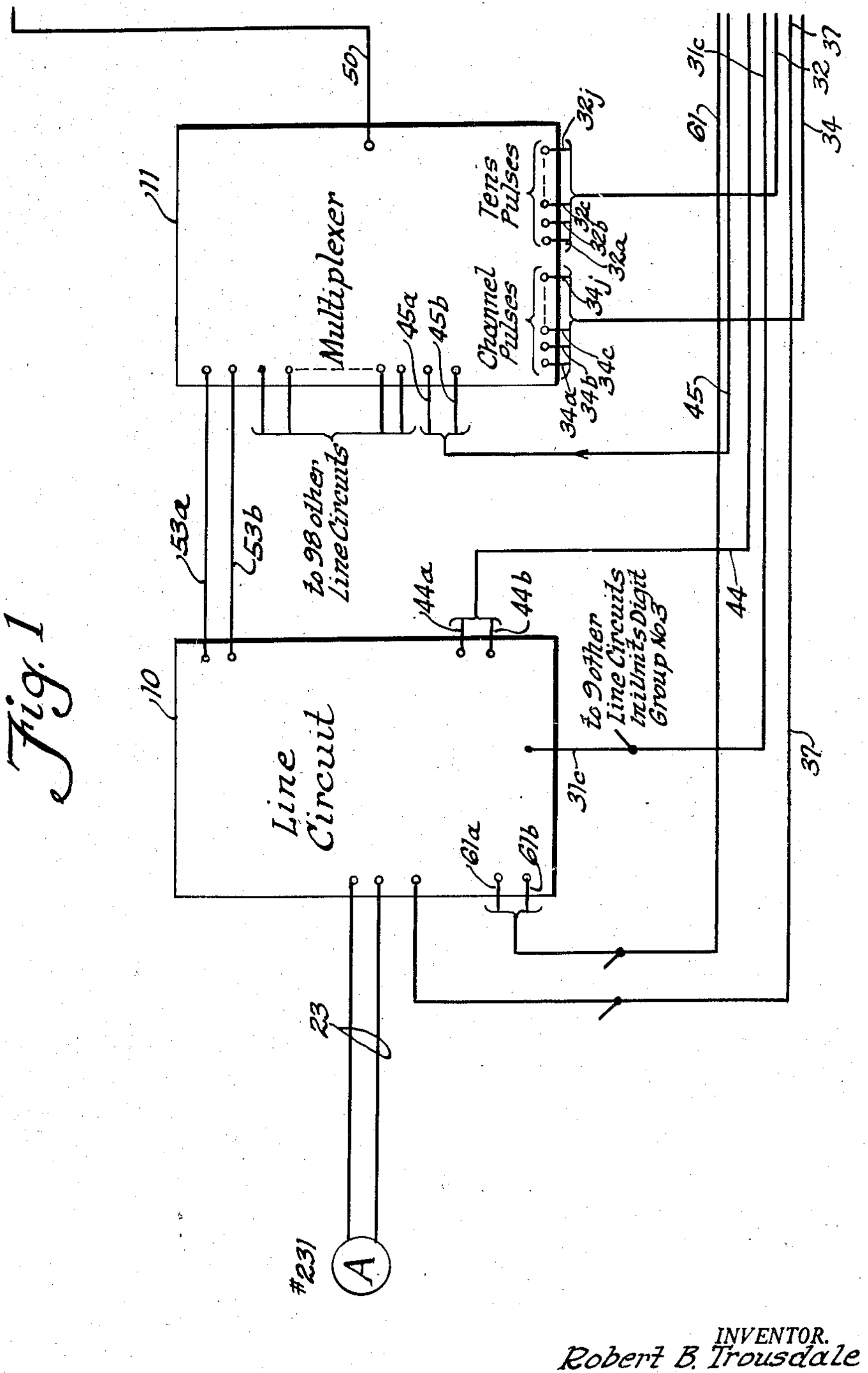

In considering the detailed circuitry of the system components briefly described above, operation of these components will be analyzed in so far as possible in terms of functions which they perform in establishing the above-described connection between the substation A and the substation B in response to the call initiated at the substation A. Before considering the details of the system components, however, it is pointed out generally that corresponding reference characters have been used throughout the drawings to identify corresponding circuit elements of the system. It is also pointed out that all pulse carrying conductors, such, for example, as the signal pulse transmission conductors 50 and 51 are in the form of coaxial cables or transmission lines having low pulse attenuating properties at the pulse frequencies employed. In certain instances, the coaxial cables provided to connect two or more components of the system have been illustrated, but it should also be remembered that all of the other illustrated pulse carrying conductors are of the proper type. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuits, namely functions which will be readily understood by those skilled in the art, have not been identified in the drawings or referred to in the following description of the system components.

As used in this specification the terms electronic and electronic means refer to and are intended to define means comprising electron conducting devices, such, for example, as electron tubes, gas tubes, crystal rectifiers, and the like, together with interconnecting circuit components therefor, and to exclude all electromechanical devices embodying moving mechanical parts such, for example, as relays, stepping switches, and the like.

Also, in order to reduce the complexity of this specification those system compoennts whihc are identical to the corresponding system components of the copending application of Robert B. Trousdale and Frank A. Morris, Serial No. 134,974, filed December 24, 1949, will be only briefly described in this specification, reference being had to the above-identified copending application for a complete and detailed description of these system components. However, in order to facilitate an understanding of all of the system components in the party line ringing system of the present invention these components will be discussed in such detail as is necessary to bring out the functions of these units in the present invention.

*Master oscillator 18*

This circuit is identical to the corresponding system component of the above-identified copending application, Serial No. 134,974, and is designed to provide a stable signal output voltage of approximately three volts at a frequency of one megacycle across the output terminals thereof. Preferably, the oscillator 18 is crystal controlled and is provided with relatively low impedance cathode follower output stages for driving a coaxial cable extending to the phase shift and pulse forming circuit 19.

*Phase shift and pulse forming circuit 19*

This circuit is identical to the corresponding system component described in detail in the copending application, Serial No. 134,974, identified above and is provided for the purpose of generating the extremely narrow pulses 95*a* and 96*a* (Figs. 23 to 26, inclusive) which are used in sampling the intelligence and control signals in the manner generally described above. Also, the circuit 19 performs the function of driving the units pulse ring circuit 20 and the commutator drive circuit 25 and is arranged to operate from the master oscillator 18 as previously explained. The circuit 19 responds to the sine wave signal delivered thereto from the master oscillator 18 by developing two sets of output pulses on the output conductors 40 and 41 which may be phase shifted with respect to each other over a full 360° phase shift range. This permits placement of the signal sampling pulses within the limits of corresponding units pulses of longer duration in the manner generally explained above.

*Commutator drive circuit 25*

This circuit is identical to the corresponding system component of the copending application, Serial No. 134,974, identified above and is provided for the purpose of amplifying the positive pulses appearing on the commutator drive pulse conductor 41 and to act as an impedance matching network. As previously pointed out, the pulses 96*a* produced at the output terminals of this circuit are delivered over the conductor 35 to the channel pulse commutator 22 and to each of the connectors 12*b*, 13*b*, and 14*b* of the system. The pulse power requirements of these parallel connected components are fairly severe, which in part necessitate provision of the circuit 25 to amplify the pulses on the conductor 41 sufficiently to satisfy the pulse load requirements of the system.

*Ring circuits 20 and 21*

The units pulse ring circuit 20 and the tens pulse ring circuit 21 are identical to the corresponding system components of the copending application, Serial No. 134,974, identified above. The units pulse ring circuit 20 is provided for the purpose of converting the ring drive pulses 95*a* developed on the ring drive pulse conductor 40 by the circuit 19 into positive and negative units pulses of a finite and greater width than the channel pulses 96*a*, and of diverting or commutating the negative units pulses thus developed successively to the negative units pulse conductors 30*a*, 30*b*–30*j*, and the positive units pulses successively to the positive unit pulse conductors 31*a*, 31*b*–31*j*. In a similar manner the tens pulse ring circuit 21 is provided for the purpose of producing negative tens pulses successively on the conductors 33*a*, 33*b*–33*j*, and positive tens pulses successively on the conductors 32, 32*b*–32*j*. However, the driving pulses for the tens pulse ring circuit 21 are derived from the tenth units pulse forming stage of the units pulse ring circuit 20.

*Channel pulse commutator 22*

This circuit is identical to the corresponding system component described in detail in the copending application, Serial No. 134,974, identified above and is provided for the purpose of sequentially commutating the pulses developed on the conductor 35 over the conductors 34*a*, 34*b*–34*j* to the multiplexer 11.

*Busy tone generator 29a*

This generator is identical to the corresponding system component described in detail in the copending application, Serial No. 134,974, identified above and is provided for the purpose of supplying a signal voltage which is utilized in signalling calling subscribers when the lines to which calls are routed are tested and found busy.

*Dial tone generator 29b*

This generator is identical to the corresponding system component described in detail in the copending application, Serial No. 134,974, identified above and is provided for the purpose of producing a signal voltage which is employed to signal calling subscribers that dialing operations may be initiated. The circuitry of this generator is uniquely arranged to produce a wobbly dial tone signal, i. e., a 180 cycle signal modulated at 15 cycles which accurately simulates dial tone signals of similar character commonly in use at the present time.

*Ringback tone generator 29c*

This generator is substantially identical to the corresponding system component described in detail in the copending application, Serial No. 134,974, identified above and is provided for the purpose of generating a low frequency signal voltage which is used to signal a calling substation that a called substation is being rung. More particularly, this generator is designed to produce a signal voltage having a frequency of approximately 200 cycles per second to which is added a lower frequency component of approximately 20 cycles per second. However, the output of the ringback tone generator 29*c* of the present invention is supplied over the conductor 27*b* to the code modulator circuit 27, whereas in the copending application identified above the output of the ringback tone generator 29*c* is supplied to a ringing keying circuit to provide the conventional ringing sequence of one second on and four seconds off. In the system of the present invention the continuous wave output of the ringback tone generator 29*c* is gated in the modulator circuit 27 in the manner described generally above to provide ringing pulse signals corresponding to the ten different party line ringing codes which are set up by the code forming circuit 27*a*.

*Supervisory carrier supply circuit 26*

This circuit is identical in many respects to the corresponding system component described in detail in the copending application, Serial No. 134,974, identified above and is provided to produce a sine wave signal voltage which is in synchronism with the master oscillator 18 and has a frequency of approximately 100 kilocycles which is supplied to the various line circuits of the system over the common multiple conductor 37 for call forwarding operations in the manner described more fully below. However, unlike the corresponding component of the above referred to copending application, the sine wave signal voltage of the circuit 26 is supplied to the link coupling circuits 24 of the present invention and repeated therethrough to the finders 12*a*, 13*a*, 14*a* of the system to permit a self-allotment of the finder-connector links of the system in a manner more fully described below. Also, unlike the corresponding component of the copending application, the supervisory carrier supply circuit 26 of the present invention is, in one embodiment, not employed to perform a ringing control operation in the line circuits of the system as will be described in more detail hereinafter.

*Ringing supply circuit 60*

This circuit is identical to the corresponding system component described in detail in the above-identified copending application, Serial No. 134,974, and is provided for the purpose of producing a ringing current source having any desired frequency, such, for example, as 20 cycles per second, which is superimposed upon a unidirectional potential of a magnitude equal to or greater than the peak amplitude of the alternating ringing current, this ringing signal being multiplied to the various line circuits of the system over the conductors 61*a* and 61*b*, there being provided an additional isolated bias potential between the conductors 61*a* and 61*b*. The manner in which the above-described ringing signal is employed at a called line is explained more fully below.

*Link coupling circuits 24*

Figure 7:
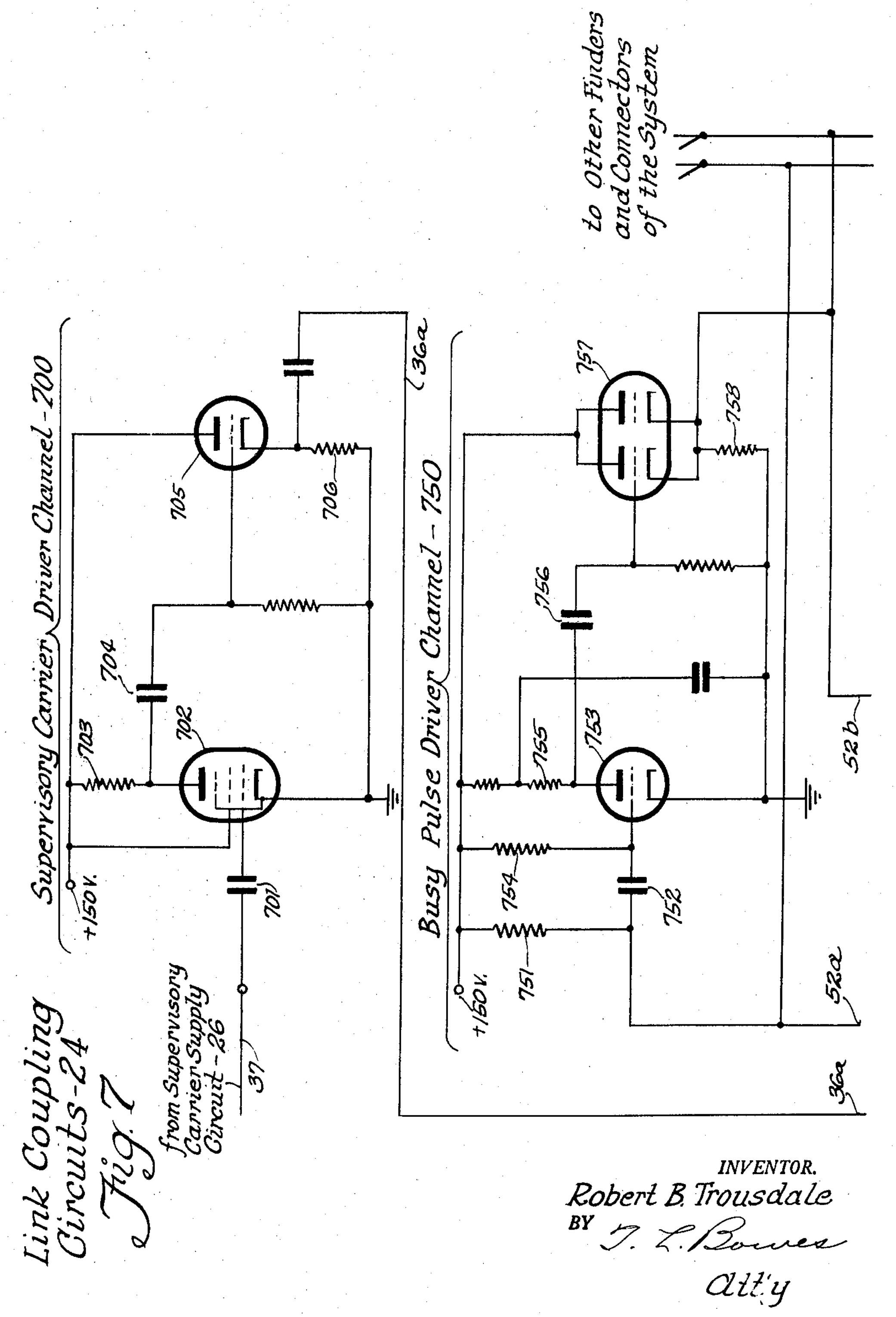

As described briefly in connection with the general description of the system, the link coupling circuits 24, which are shown in detail in Fig. 7 of the drawings, function to provide low impedance output circuits which may be suitably multipled to all of the finders and connectors of the system. More particularly, the circuits 24 include a supervisory carrier driver channel indicated generally at 700 and a busy pulse driver channel indicated generally at 750. The supervisory carrier driver channel 700 receives a supervisory carrier sine wave having a frequency of 100 kilocycles from the supervisory carrier supply circuit 26 over the conductor 37, amplifies the supervisory carrier to a suitable voltage level and supplies the amplified supervisory carrier from a low impedance driving circuit over the conductor 36*a* to the self-allotting circuit 206 of the first finder 12*a* of the system. In the finder 12*a* the suprevisory carrier voltage is utilized to self-allot the finder 12*a* to the first incoming call of the system and after the +B switching circuit 201 thereof is operated the supervisory carrier voltage is diverted over the conductor 36*b* to the next finder 13*a* of the system to permit a similar self-allotment of this finder to the next incoming call of the system.

The supervisory carrier voltage from the circuit 26 is supplied over the conductor 37 and through the coupling condenser 701 to the first control grid of an amplifier tube 702, preferably of the commercial type 6A1C5, the cathode of the tube 702 being connected to ground. The supervisory carrier voltage is amplified in the tube 702 and is repeated across the anode resistor 703 thereof at a suitable voltage level for application to the self-alloting circuits of the finders of the system. The amplified supervisory carrier voltage is coupled through the condenser 704 to the control grid of a cathode follower tube 705, preferably of the commercial type 6C4, and is repeated in like phase across the cathode resistor 706 of the tube 705. Inasmuch as the cathode follower 705 has a relatively low output impedance, as will be well understood by those skilled in the art, the voltage produced across the resistor 706 is suitable for application to one or more of the finders of the system without diminution of the amplitude level thereof. In this connection it will be understood that when several calls are being simultaneously handled by the system, the supervisory carrier voltage is diverted through several of the self-allotting circuits of these finders so that a substantial load is placed upon the supervisory carrier voltage source.

As discussed briefly in the general description of the system, the transmission of line busy conditions in the system of the present invention is accomplished by impressing busy pulses upon the common busy pulse out conductor 52*a* and supplying these busy pulses over the common busy pulse in conductor 52*b* to all of the finders and connectors of the system. As outlined generally above, when a finder such as the finder 12*a*, is seized by a calling one of the lines of the system, a busy pulse appearing in the pulse time position of the calling line is impressed upon the common busy pulse out conductor 52*a*. The conductor 52*a* is multiplied to all of the other finders of the system and all of the connectors of the system. Consequently, the load conditions on the busy pulse out conductor 52*a* are extremely severe when so many separate units are multipled to this common conductor and considerable power is needed to produce busy pulses of sufficient height properly to actuate the busy test circuits in the connectors of the system.

In a similar manner, the busy pulses produced in the pulse time positions of calling or called lines are multipled to all of the finders and connectors of the system over the busy pulse in conductor 52*b*. The load conditions on the busy pulse in conductor 52*b* are likewise quite severe due to the fact that as many as twenty units may be multipled to this conductor so that considerable power is required to produce pulses of sufficient height thereon.

Accordingly, there is provided in the link coupling circuits 24 a busy pulse driver channel 750 which repeats the busy pulses supplied thereto across a sufficiently low output impedance to drive all of the finders and connectors of the system. More specifically, the busy pulse gate tubes of all of the finders and connectors of the system are provided with a common anode resistor 751 so that busy pulses produced in the pulse time positions of the calling and called lines of the system are all produced across the common anode resistor 751. These busy pulses are repeated through the condenser 752 to the control grid of a triode amplifier tube 753, preferably of the commercial 6J6 type, the control grid of the tube 753 being connected through the grid leak resistor 754 to the positive supply potential. The busy pulses produced across the common anode resistor 751 are of negative polarity and are inverted in the tube 753 so as to appear across the anode resistor 755 thereof as positive pulses of suitable amplitude for actuating the busy circuits of all of the finders and connectors of the system. The positive busy pulses are coupled through the condenser 756 to the control grid of a double triode cathode follower output stage 757. In the illustrated embodiment the cathode follower output tube 757 is of the double triode variety, preferably of the commercial type 6J6, the control grids, cathodes, and anodes of the two sections of this tube being parallel to provide a low output impedance across the cathode output resistor 758 thereof. Accordingly, the positive busy pulses are repeated across the output resistor 758 and a suitable low impedance source is provided for supplying the busy pulses over the busy pulse in conductor 52*b* to all of the finders and connectors of the system.

With the above-described arrangement the busy pulse transmission of the system is segregated into a busy pulse in channel and a busy pulse out channel so that the relatively weak busy pulses produced by the finders and connectors of the system may be amplified and repeated across a relatively low impedance source which is suitable for driving all of the required circuits in the finders and connectors of the system. By segregating the transmission of busy pulses on a busy pulse in and busy pulse out basis as described above, it is possible to provide relatively large amplitude busy pulses in a simple and economical manner. Because the busy pulses do not carry modulation they do not require the same accuracy of wave form as do the other pulses of the system, and a lower grade transmission system may be employed with the result that an ordinary open conductor may be employed in most instances for the transmission of busy pulses throughout the system.

*Code forming circuit 27a*

Figure 12:
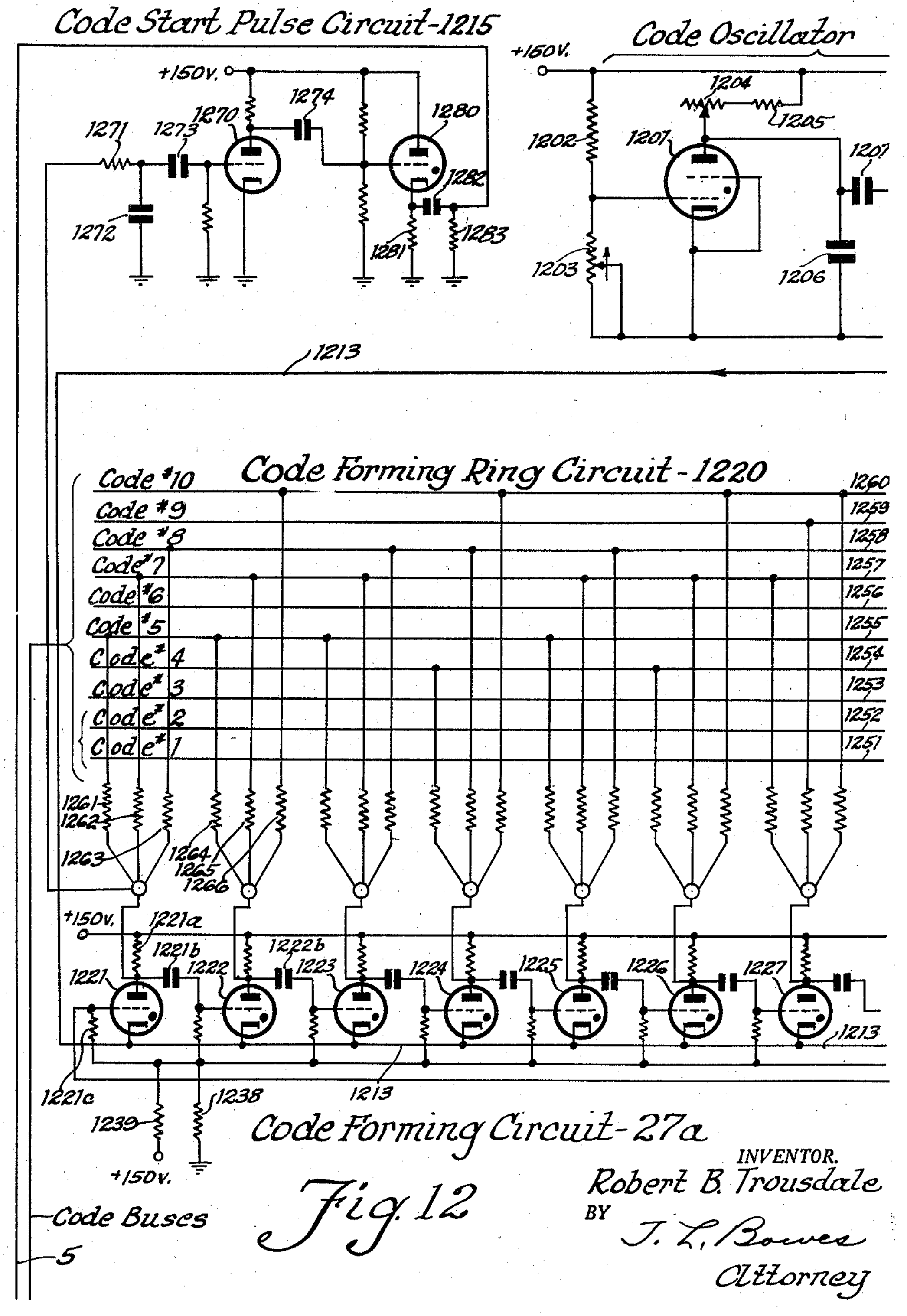
Figures 13, 13A:
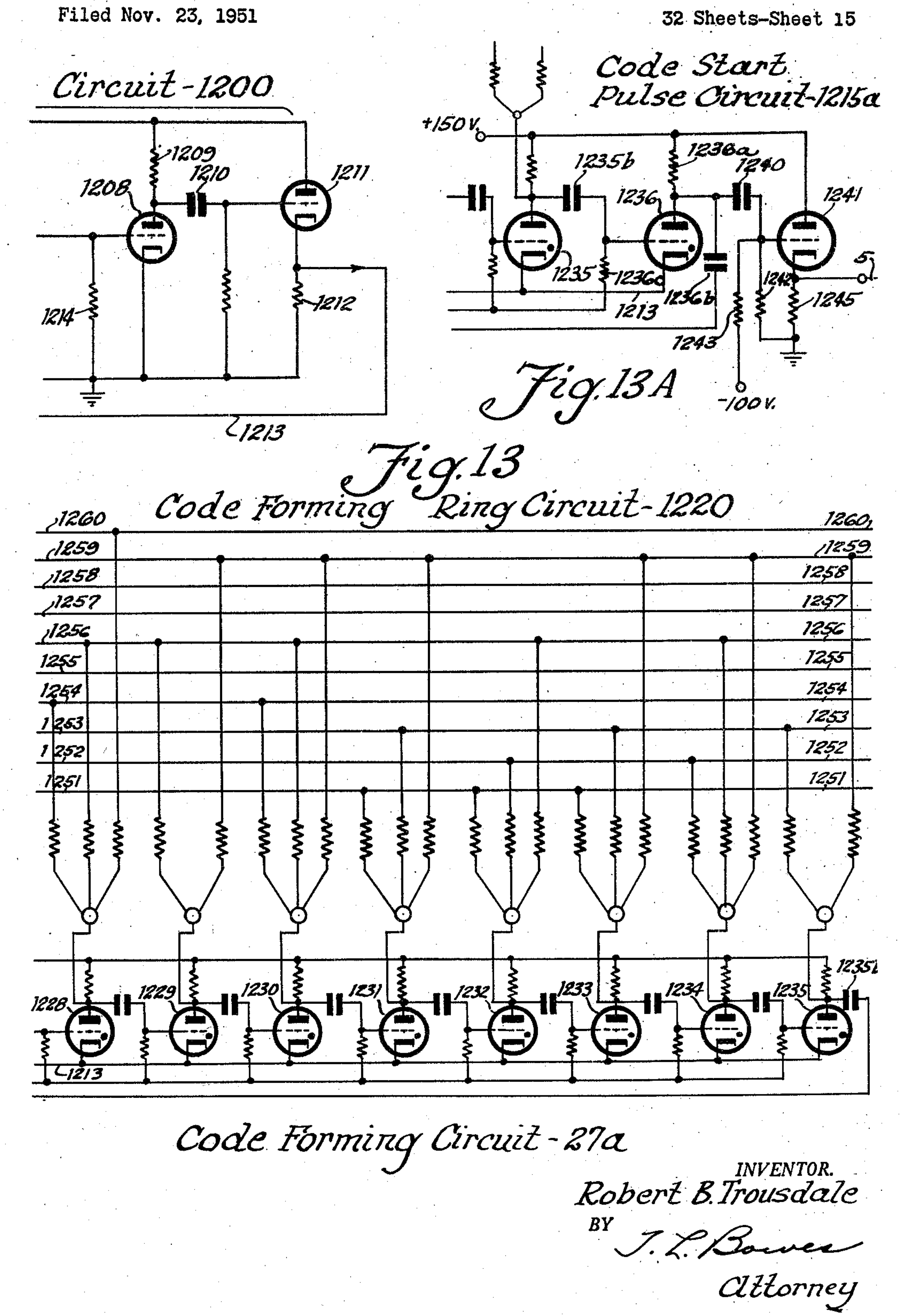
Figure 29:
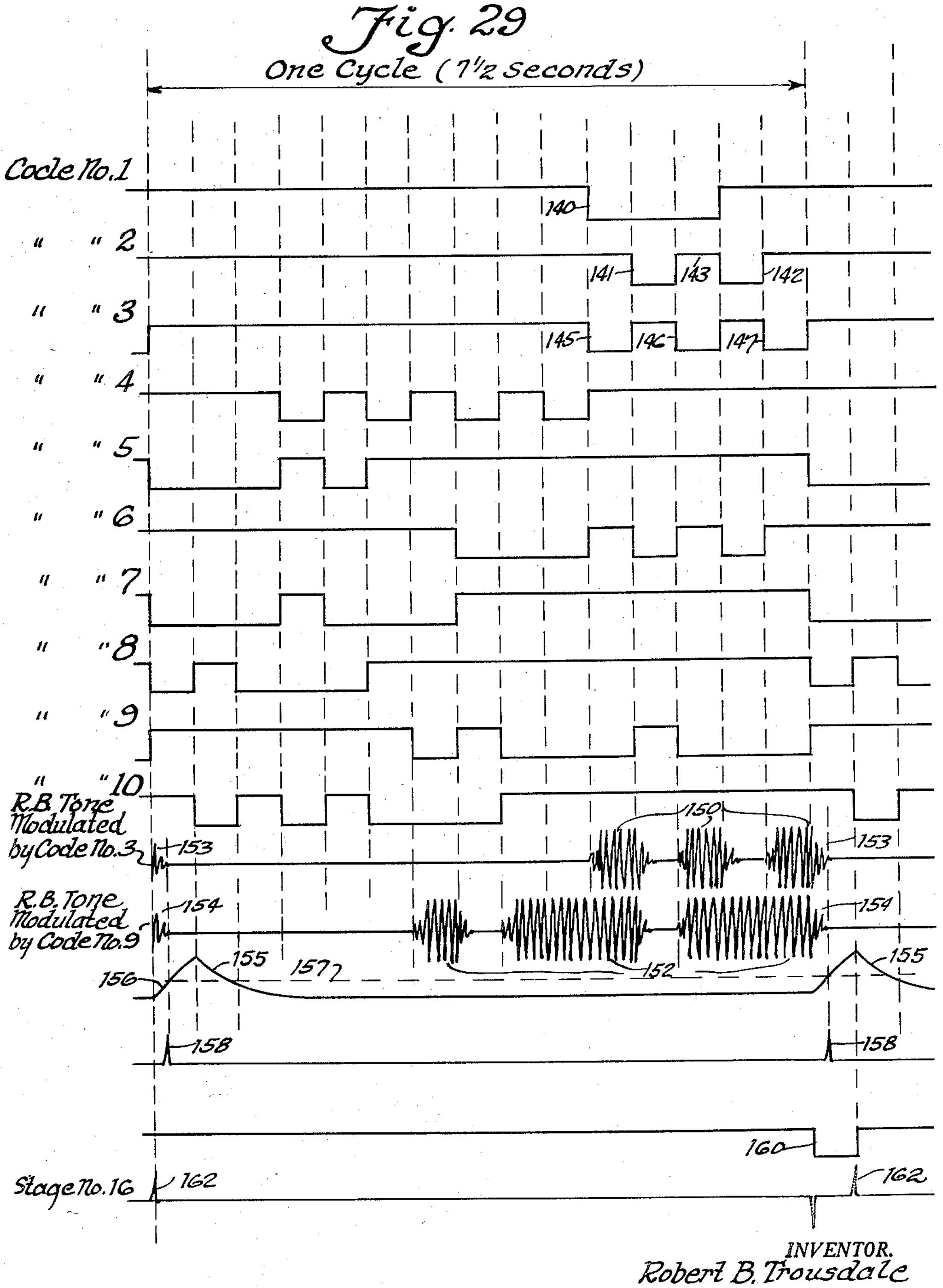

As pointed out briefly in the general description of the system, this circuit, the details of which are illustrated in Figs. 12 and 13 of the drawings, is provided for the general purpose of developing coded party line ringing signals corresponding to the codes numbered 1 to 10, inclusive, illustrated in Fig. 29, which are used to control the application of ringing current to the called party line substations associated with the called line. All of the party line ringing signals consist of coded ringing pulses which are repeatedly produced during repetitive code ringing cycles, each ringing cycle having a duration in the order of 7½ seconds for the illustrated ringing pulse combinations.

As described generally heretofore, the coded ringing pulses produced by the code forming circuit **27*a* are employed to modulate or key the continuous wave ringback tone from the ringback tone generator 29*c* and the interrupted ringback tone signals thus formed are supplied to all of the connectors of the system over the multiple conductor cable 48**. The particular interrupted ringback tone signal corresponding to the party line ringing signal assigned to the called party line substation is selected in the connector associated with the call and is used to control the intervals during which the called substations are rung. Preferably, each code ringing cycle is made up of a series of fifteen successive code unit intervals, each code unit interval corresponding either to a space between ringing pulses or to a short ringing pulse interval. A series of three successive code unit intervals constitute a long ringing pulse interval. By different combinations of the fifteen code unit intervals of the ringing cycle, a series of ten uniquely coded party line ringing signals are produced and are assigned on a decimal basis to party line substations in accordance with the third digit of the directory designations of these substations.

Considering now in more detail the code forming circuit **27*a*, this circuit comprises a code oscillator circuit 1200, a code start pulse circuit 1215, and a code forming ring circuit 1220. The code oscillator circuit 1200 is provided for the purpose of producing the code forming ring drive pulses 110 shown in Fig. 28 and includes an oscillator tube 1201, preferably of the gaseous discharge commercial type 2D21, an amplifier tube 1208, preferably of the commercial type 6AQ6, and a cathode follower output tube 1211 preferably of the commercial type 6C4. The oscillator tube 1201 is connected as a free running relaxation oscillator having a relaxation frequency of approximately two cycles per second. To this end, the first control grid of the gas tube 1201 is biased positively by means of the resistor 1202 and the potentiometer 1203 which are connected in series from the positive supply potential to ground, the first control grid of the tube 1201 being connected to the junction point of the components 1202 and 1203. A timing condenser 1206 is connected from the anode of the tube 1201 to ground and anode potential for this tube is supplied through the potentiometer 1204 and the resistor 1205. The condenser 1206 is charged through the resistor 1205 and the potentiometer 1204 from the positive supply potential so as to increase the anode potential of the tube 1201 to a point at which this tube conducts. When the tube 1201 conducts, the condenser 1206 is rapidly discharged to a point at which the potential across the tube 1201 is insufficient to sustain conduction therethrough, at which time the tube 1201 is cut off and the condenser 1206 again charges toward the positive supply potential. The relaxation period of the oscillator 1201 may be adjusted by variation of the potentiometer 1204 so that a sawtooth wave having a frequency of approximately two cycles per second is produced across the condenser 1206. The sawtooth wave is differentiated in the circuit including the condenser 1207 and the grid leak resistor 1214 to provide sharp negative pulses having a repetition rate of two cycles per second, which pulses are impressed upon the control grid of the amplifier tube 1208. These sharp negative pulses are amplified and inverted in the tube 1208 and are coupled through the condenser 1210 to the cathode follower output stage 1211 wherein they are repeated across the output resistor 1212 thereof. Accordingly, there is produced on the code forming ring drive conductor 1213 sharp positive pulses which have a frequency of two cycles per second and are supplied to the code forming ring circuit 1220**.

Figure 28:
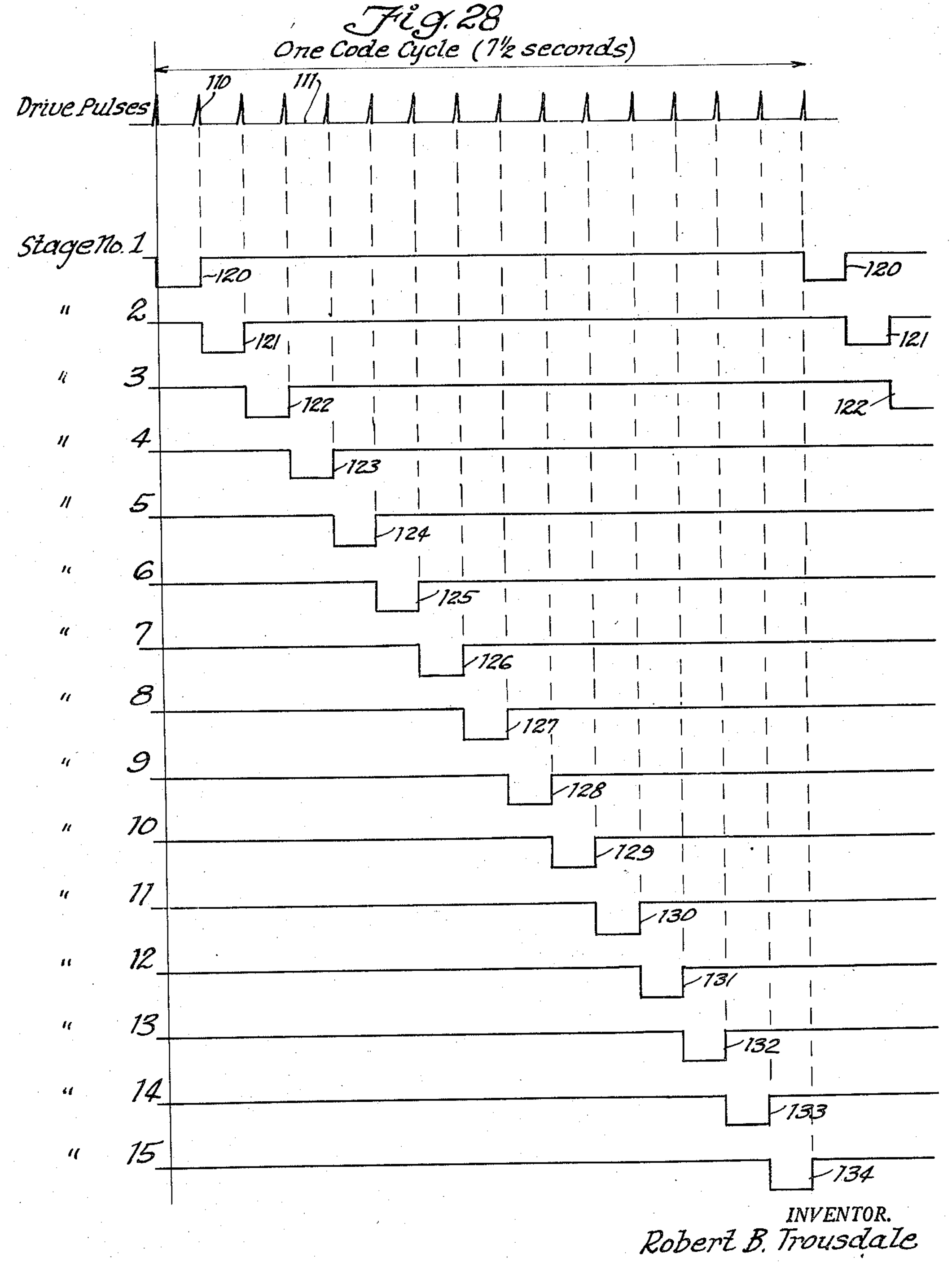

The code forming ring circuit 1220 comprises the fifteen pulse forming tubes 1221, 1222, 1223, to 1235, inclusive, which are preferably of the cold cathode gaseous discharge commercial type 5823, which are connected in an endless series to provide a ring circuit, the tubes 1221–1235, inclusive, individually developing the code forming pulses 120 to 134, inclusive, illustrated in Fig. 28 and discussed generally heretofore. More specifically, the cathodes of the pulse forming tubes 1221–1235, inclusive, are connected to the common code forming ring drive conductor 1213 so that the cathodes of these tubes are all simultaneously pulsed positively at the rate of two cycles per second by means of the positive drive pulses impressed upon this conductor.

The anode circuit of each of the tubes 1221–1235, inclusive, is coupled to the control grid of the next succeeding tube so that these tubes are successively switched from a non-conductive to a conductive state and back to a non-conductive state in accordance with the code forming ring drive pulses 110 (Fig. 28). Thus, the anode of the first pulse forming tube 1221 is connected through the anode resistor **1221*a* thereof to the positive supply potential and is also coupled through the condenser 1221*b* to the control grid of the next succeeding tube 1222. The control grid of the first tube 1221 is connected through the grid leak resistor 1221*c* to a predetermined positive potential by means of the common voltage divider network including the resistors 1238 and 1239 which are connected between the positive supply potential and ground. The anode of the second pulse forming tube 1222 is likewise coupled through the condenser 1222*b* to the control grid of the next succeeding tube 1223, the anode of the last tube 1235 of the ring being coupled through the condenser 1235*b* to the control grid of the first tube 1221**.

The outputs of the pulse forming tubes 1221 to 1235, inclusive, are connected in predetermined combinations to a plurality of code buses 1251, 1252, 1253 to 1260, inclusive, through appropriate mixing resistors. Thus, the output of the first pulse forming tube 1221 is coupled through the mixing resistor 1261 to the code bus 1255, through the mixing resistor 1262 to the code bus 1257 and through the mixing resistor 1263 to the code bus 1258. Likewise, the output of the second pulse forming tube 1222 is connected through the mixing resistor 1264 to the code bus 1255, through the mixing resistor 1265 to the code bus 1257, and through the mixing resistor 1266 to the code bus 1260. There is thus produced on each of the code buses 1251 to 1260, inclusive, code pulse combinations in accordance with the pulse forming tubes connected thereto.

Considering now the operation of the code forming ring circuit 1220, the cathode of each of the tubes 1221 to 1235, inclusive, is pulsed positively by the code forming ring drive pulses 110 so that during these pulses all of the pulse forming tubes are extinguished. However, when a conducting pulse forming tube is rendered non-conductive the termination of space current flow therethrough produces a pulse at the anode thereof which is supplied to the next succeeding pulse forming tube to turn on this tube for the duration of one code unit interval. Thus, considering the tube 1221 and assuming that this tube is normally non-conductive, when the preceding tube 1235 in the ring is rendered non-conductive by a code forming ring drive pulse 110 the positive pulse produced at the anode thereof is coupled through the condenser 1235*b* to the control grid of the tube 1221 to render this tube conductive. Accordingly, a flow of anode current is produced in the resistor 1221*a* so that the anode potential of the tube 1221 is decreased until the next succeeding code forming ring drive pulse. Upon occurrence of the next succeeding code forming ring drive pulse the cathode of the tube 1221 is driven positively so that this tube is extinguished and the anode potential thereof again becomes equal to the positive supply potential. When the tube 1221 is rendered non-conductive a positive pulse is produced at the anode thereof which is coupled through the condenser 1221*b* to the control grid of the tube 1222 thereby rendering this tube conductive. The anode potential of the tube 1222 is thereby decreased for the duration of the next succeeding code unit interval, after which interval the tube 1222 is rendered non-conductive by the succeeding code forming ring drive pulse. Accordingly, the pulse forming tubes are successively rendered conductive for the duration of one code unit interval by the application of the pulses 110 to the common code forming ring drive conductor 1213, and the negative code forming pulses 120 to 134, inclusive (Fig. 28) are respectively produced at the anodes of the tubes 1221 to 1235, inclusive. In this connection it will be understood that the mixing resistors such as the resistors 1261 to 1266, inclusive, which are used to connect the pulse forming tubes 1221 to 1235, inclusive, to the code buses 1251 to 1260, inclusive, have sufficient resistance value effectively to isolate the anode circuits of each of the pulse forming tubes from their respective code buses.

In accordance with an important feature of the present code forming ring circuit the connection of the pulse forming tubes 1221 to 1235, inclusive, to the code buses are so arranged that each of the pulse forming tubes is connected to a maximum of three of the code buses. With this arrangement the maximum load on any one pulse forming stage is limited and the wave form of each of the code forming pulses 120–134, inclusive, is preserved. The sequencing of the numbered codes 1 to 10, inclusive (Fig. 29), has the further advantage of providing a common code start point, namely, the start of the first code unit interval. With a common code start point one complete code cycle is sufficient to repeat any one of the numbered codes 1 to 10, inclusive, within a predetermined relatively short time cycle, and a common code start point is available for controlling the connectors of the system so that the party line registers of these connectors do not initiate the ringing operation in the middle of a particular ringing cycle. It will further be noted that the code pulse arrangement shown in Fig. 29 provides a series of ten distinguishable codes within a 7½ second code cycle, while at the same time providing a common code start point so that all of the codes are completed in the same code cycle.

In order to produce a code start pulse which may be supplied to the connectors of the system to control the initiation of the party line ringing operation of the system, there is provided the code start pulse circuit 1215 shown in detail in Fig. 12. The code start pulse circuit 1215 comprises an amplifier tube 1270, preferably of the commercial type 6C4, and a gaseous discharge pulsing tube 1280, preferably of the commercial type 5823. The negative code forming pulse 120 (Fig. 28) which is produced at the anode of the first pulse forming tube 1221 in the manner described above, is integrated in an integration circuit including the series resistor 1271 and the shunt condenser 1272 and is coupled through the condenser 1273 to the control grid of the amplifier tube 1270. In the tube 1270 the integrated pulse wave is amplified and inverted and is coupled through the condenser 1274 as a positively increasing wave to the control grid of the pulsing tube 1280. When the control grid of the tube 1280 reaches a sufficiently positive potential, this tube fires so as to produce a flow of current through the cathode resistor 1281 thereof, thereby producing a positive pulse across the resistor 1281 a predetermined time after the start of the first code unit interval established by the pulse forming tube 1221. The code start pulse thus formed across the resistor 1281 is coupled through the condenser 1282 to the code start conductor 5 which is multiplied to all of the connectors 12*b*, 13*b*, and 14*b* of the system. After the tube 1280 fires, the condenser 1282 is charged through the resistor 1283 and the tube 1280 to such a potential that the potential remaining across the tube 1280 is insufficient to sustain ionization and the tube 1280 is extinguished. The resistor 1281 is sufficiently large that the current therethrough is also insufficient to sustain ionization so that the tube 1280 is extinguished a predetermined interval after firing thereof and code start pulses of uniform amplitude and duration are produced across the resistor 1283.

From the foregoing description of the code start pulse circuit 1215 it will be evident that the code start pulses produced on the conductor 5 are delayed with respect to the initial or leading edge of the code forming pulses 120 produced by the code forming ring circuit 1220. Such a delay of the code start pulse is necessary to prevent a short false ring at the end of the last code unit interval of the code cycle which falls over into the first code unit interval of the next code cycle and produces false ringing at the substations.

In order more clearly to understand the operation of the code start pulse circuit 1215 in preventing a false ring at the start of each code cycle, reference may be had to Fig. 29 wherein the interrupted ringback tone pulses 150 and 152, which respectively correspond to the party line codes numbers 3 and 9, are illustrated. From Fig. 29 it is evident that the last one of the pulses 150 has a trailing edge portion 153 which persists after the end of the last code unit interval and extends into the first code unit interval of the next code cycle. The last one of the pulses 152 of the code #9 signal also has a similar trailing edge portion 154. The trailing edge portions 153 and 154 which hang over into the next cycle will tend to cause short duration false rings, since the ringback tone gate circuit in the connector is unblocked coincident with a code start pulse which, if not delayed in the manner described above, occurs at the start of the code cycle. However, the above-described delay provided in the code start pulse circuit 1215 delays the code start pulse by an amount sufficient to prevent the connector from responding to the trailing edge portions 153 and 154 so that false rings at the start of the first code cycle are avoided. The code forming pulse 120 is integrated in the circuit including the resistor 1271 and the condenser 1272 and is amplified and inverted in the tube 1270 so as to appear as the integrated pulse 155 (Fig. 29) at the anode of the amplifier tube 1270. It will be evident from Fig. 29 that the pulse 155 includes a gradually increasing leading edge portion 156. The gas tube 1280 in adjusted so that it does not fire until the incoming pulse 155 exceeds the level indicated by the dotted line 157 so that the leading edge portion of the integrated pulse 155 must increase to the clipping level 157 before the tube 1280 fires. When the tube 1280 fires, the code start pulses 158 are produced across the resistor 1283 thereof and are repeated over the multiple code start conductor 5 to all the connectors of the system. In this connection it will be understood that the trailing edge portions 153 and 154 and the integrated pulse 155 are enlarged in Fig. 29 to provide a clear illustration of the sloping leading edge portion 156 of the pulse 155 and the pulse ring overhang. In actual practice the amount by which the code start pulse 158 is delayed from the start of the first code unit interval is relatively short so that there is no noticeable shortening of the first useable code unit interval.

In Fig. 13A there is shown an alternative code start pulse circuit indicated by the numeral **1215*a*. Essentially, the alternative code start pulse circuit 1215*a* comprises an additional pulse forming stage, i. e., a 16th pulse forming stage in the code forming ring circuit 1220, this 16th stage being used for the sole purpose of providing a code start pulse which is applied to the code start conductor 5. More specifically, in the code start circuit 1215*a* the output pulse from the fifteenth pulse forming tube 1235 is coupled through the condenser 1235*b* to the control grid of a sixteenth pulse forming tube 1236, preferably of the commercial type 5823. The cathode of the tube 1236 is connected to the common code forming ring drive conductor 1213, the control grid of the tube 1236 is connected through the resistor 1236*c* to the common bias resistor 1238, and the anode of the tube 1236 is connected through the anode resistor 1236*a* to the positive supply potential. The anode of the tube 1236 is coupled through the condenser 1236*b* to the control grid of the first pulse forming tube 1221 to provide an endless chain of sixteen pulse forming stages. The output from the 16th pulse forming tube 1236 is coupled through the condenser 1240 to the control grid of a cathode follower output tube 1241, preferably of the commercial type 664, this control grid being connected through the resistor 1242 to ground and through the resistor 1243 to a source of negative bias potential. The control grid of the tube 1241 is normally operated beyond anode current cutoff and the condenser 1240 and resistor 1242 comprise a differentiation circuit so that there is produced a positive pulse at the end of the 16th code unit interval established by the tube 1236. The positive pulse thus produced at the end of the 16th code unit interval is repeated across the cathode resistor 1245 of the tube 1241 and supplied to the common code start conductor 5**.

In order more clearly to understand the operation of the alternating code start pulse circuit **1215*a*, there is shown in Fig. 29 the sixteenth code forming pulse 160 which is produced after the fifteen usable code unit intervals and isolates the trailing edge portions 153 and 154 produced during code numbers 3 and 9 from the start of the code cycle. In this connection it will be understood that the pulse 160 is not used for the formation of any codes but merely isolates the start of the code cycle from trailing edge portions 153 and 154 of the pulses produced during code numbers 3 and 9. The pulse 160 is differentiated in the control grid circuit of the tube 1241 so as to provide the positive code start pulses 162, coincident with the trailing edge of the pulses 160, which are supplied over the common code start conductor 5** to the connectors of the system.

*Code modulator circuit 27*

Figure 18:
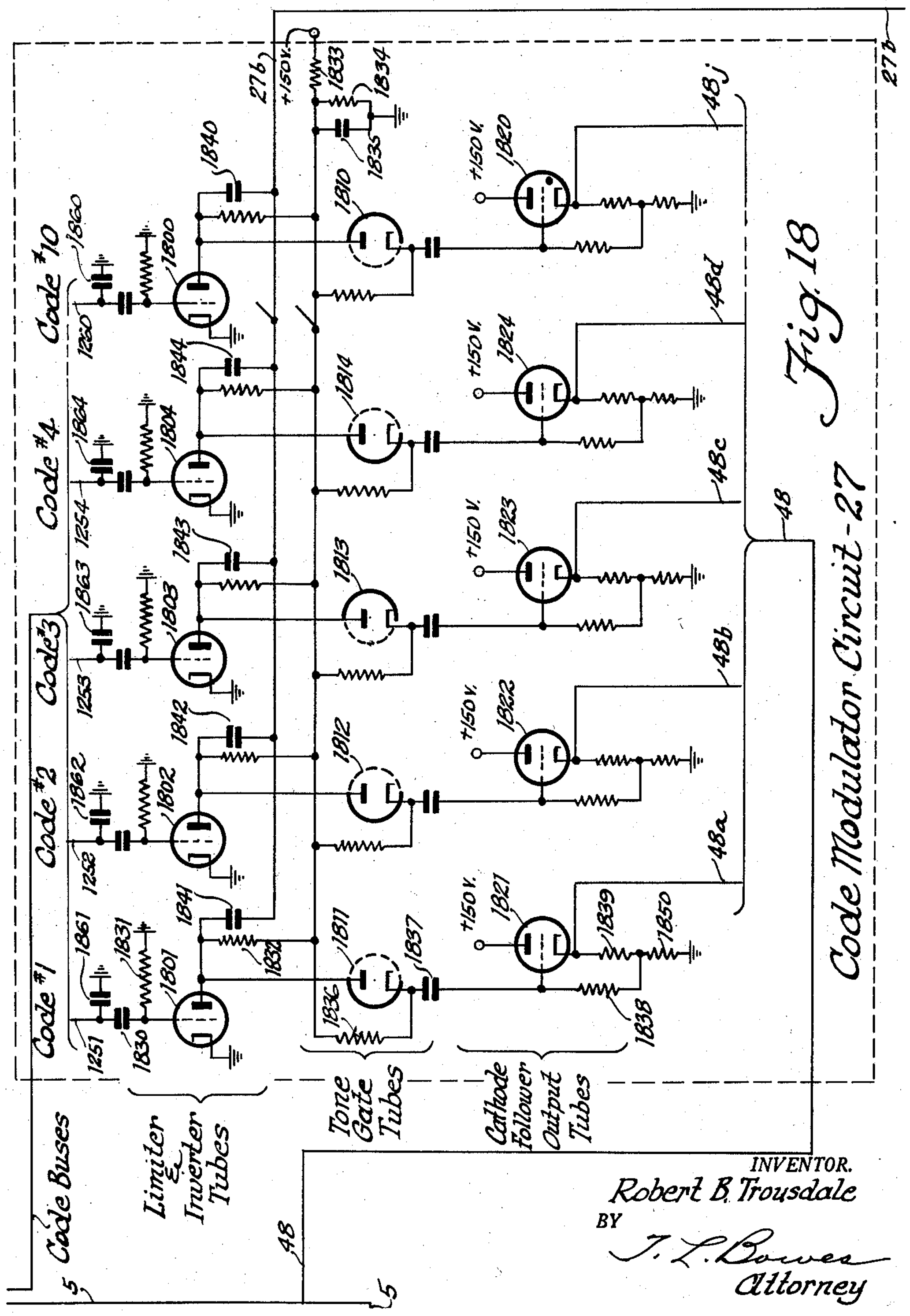

As discussed briefly in connection with the general description of the system, this circuit, which is shown in detail in Fig. 18 of the drawings, is provided for the purpose of producing interrupted ringback tone signals which individually correspond to the coded party line ringing signals produced by the code forming circuit **27*a*. More specifically, the code modulator circuit 27 includes a horizontal string of ten limiter and inverter tubes of which the first four and last tubes 1801, 1802, 1803, 1804 and 1800 are shown, a corresponding horizontal string of tone gate tubes 1811, 1812, 1813, 1814—1810, and a corresponding horizontal string of cathode follower output tubes 1821, 1822, 1823, 1824—1820. The continuous wave output of the ringback tone generator 29*c* is connected over the conductor 27*b* and through the coupling condensers 1841, 1842, 1843, 1844—1840 to the anodes of the tubes 1801—1800, inclusive. The tubes 1801 to 1800, inclusive, are preferably of the commercial type 6AQ6, the tubes 1811 to 1810 are preferably of the commercial type 6AL5, and the tubes 1821 to 1820**, inclusive, are preferably of the commercial type 6C4.

Considering now the operation of the code modulator circuit 27 in producing interrupted ringback tone signals, the ten party line ringing signals, numbered 1 to 10, inclusive, are supplied over their respective code buses 1251–1260, inclusive, to the control grids of the limiter and inverter tubes 1801–1800, inclusive. Considering, for example, the operation of the modulator circuit 27 in producing interrupted ringback tone signals which correspond to the party line ringing pulses of code #1, these ringing pulses are supplied over the code bus 1251 and through the condenser 1830 to the control grid of the first limiter and inverter tube 1801, this control grid being connected through the resistor 1831 to ground potential. The cathode of the tube 1801 is connected to ground and the anode thereof is connected through the resistor 1832 and the common anode dropping resistor 1833 to the positive supply potential. In order to reduce the anode supply potential for the tubes 1801–1800, inclusive, a voltage divider resistor 1834 is connected from the junction of the resistors 1832 and 1833 to ground and a by-pass condenser 1835 is connected across the resistor 1834.

The anode of the tube 1801 is connected to the anode of the tone gate tube 1811, the cathode of this tube being connected through the resistor 1836 to the junction point of the resistors 1832, 1833, and 1834. The cathode of the tone gate tube 1811 is also coupled through the condenser 1837 to the control grid of the cathode follower output tube 1821, this control grid being connected through the resistor 1838 to the junction point of the cathode resistors 1839 and 1850, which are connected from the cathode of the tube 1821 to ground potential.

The tube 1801 is normally conductive so that the anode potential therof is normally at a relatively low level. When the anode of the tube 1801 is at its normally reduced level the tone gate tube 1811 is biased against conduction by the voltage produced across the anode resistor 1832. However, during the long ringing interval 140 (Fig. 29) which comprises the single ringing pulse of the party line ringing code #1, the control grid of the tube 1801 is driven negatively so as to render this tube non-conductive. When the tube 1801 is rendered non-conductive, anode current flow through the resistor 1832 thereof ceases and the anode potential of the tube 1801 rises to the anode supply potential produced across the resistor 1834. Accordingly, the anode and cathode of the tone gate tube 1811 are brought to the same potential so that the continuous ringback tone is transmitted through the tone gate tube 1811 for the duration of the long ringing interval 140 which constitutes code #1. At the end of the long ringing interval 140, the tube 1801 again conducts so that the anode potential thereof is reduced and the tone gate tube is biased non-conductive so as to terminate transmission therethrough of the ringback tone from the generator **29*c*. Accordingly, there is produced at the cathode of the tone gate tube 1811** a pulse of ringback tone which persists for the duration of the long ringing interval of the ringing pulse 140. This interrupted ringback tone signal consisting of a single pulse of ringback tone is coupled through the condenser 1837 to the control grid of the cathode follower output tube 1821 and is repeated across the cathode resistors 1839 and 1850 thereof in like phase. The pulse of ringback tone produced at the cathode of the output tube 1821 is multipled over the conductor 48*a* to all of the connectors of the system to provide an interrupted ringback tone signal which may be selected by any of the party digit registers of the connectors of the system when a party line substation having a third digit directory number designation of 1 is called.

In an entirely similar manner the short ringing intervals 141 and 142 (Fig. 29) which are separated by the short interval 143, are coupled over the code bus 1252 to the limiter and inverter tube 1802 thereby to render the tube 1802 non-conductive for the duration of the successive short ringing intervals 141 and 142. During these intervals the tone gate tube 1812 is rendered conductive so as to transmit ringback tone, which is coupled from the conductor 27*b* through the condenser 1842 to the anode of the tube 1802 and through the tone gate tube 1812 during these intervals. There is thus produced at the cathode of the output tube 1822 pulses of ringback tone corresponding to the ringing intervals 141 and 142 of the code #2 ringing signal which are multipled over the conductor 48*b* to all of the connectors of the system. In an entirely similar manner the remaining codes numbers 3 to 10, inclusive, are employed to develop corresponding coded pulses of ringback tone which are supplied from the output tubes 1823 to 1820, inclusive, to all of the connectors of the system.

In accordance with an important feature of the code modulator circuit 27, there is provided an integrating condenser associated with each of the code buses 1251 to 1260, inclusive, which performs the function of suppressing switching transients or spikes which may be produced in the code forming ring circuit 1220 of the code forming circuit 27*a*. More specifically, there is provided the integrating condensers 1861, 1862—1860, which are connected from the code buses 1251, 1252—1260 to ground potential. The condenser 1861 forms with the mixing resistors connected to the code bus 1251 in the code forming circuit 27*a* an integrating circuit which reduces the switching transients which are produced when a plurality of the code forming pulses 120–134, inclusive, are combined in the manner described in detail in connection with the code forming circuit 27*a*. Thus, considering the formation of code #1, when the pulses 130, 131, and 132 are added to form the long ringing interval 140 which constitutes code #1, it is evident that switching transients will occur at the leading and trailing edges of these pulses when they are impressed upon the common code bus 1251. However, the condenser 1861 reduces the amplitude of these switching transients so that they do not interfere during the code ringing interval. In this connection it will be understood that the negative pulses which constitute the party line ringing codes #1 to #10, inclusive, are of sufficient amplitude to drive the control grids of the limiter and inverter tubes 1801–1800, inclusive, well beyond cut-off so that the remaining portions of the switching transients produced during the ringing code intervals are effectively suppressed and are not repeated in the anode circuits of these tubes.

*Substations A and B*

Figure 20:
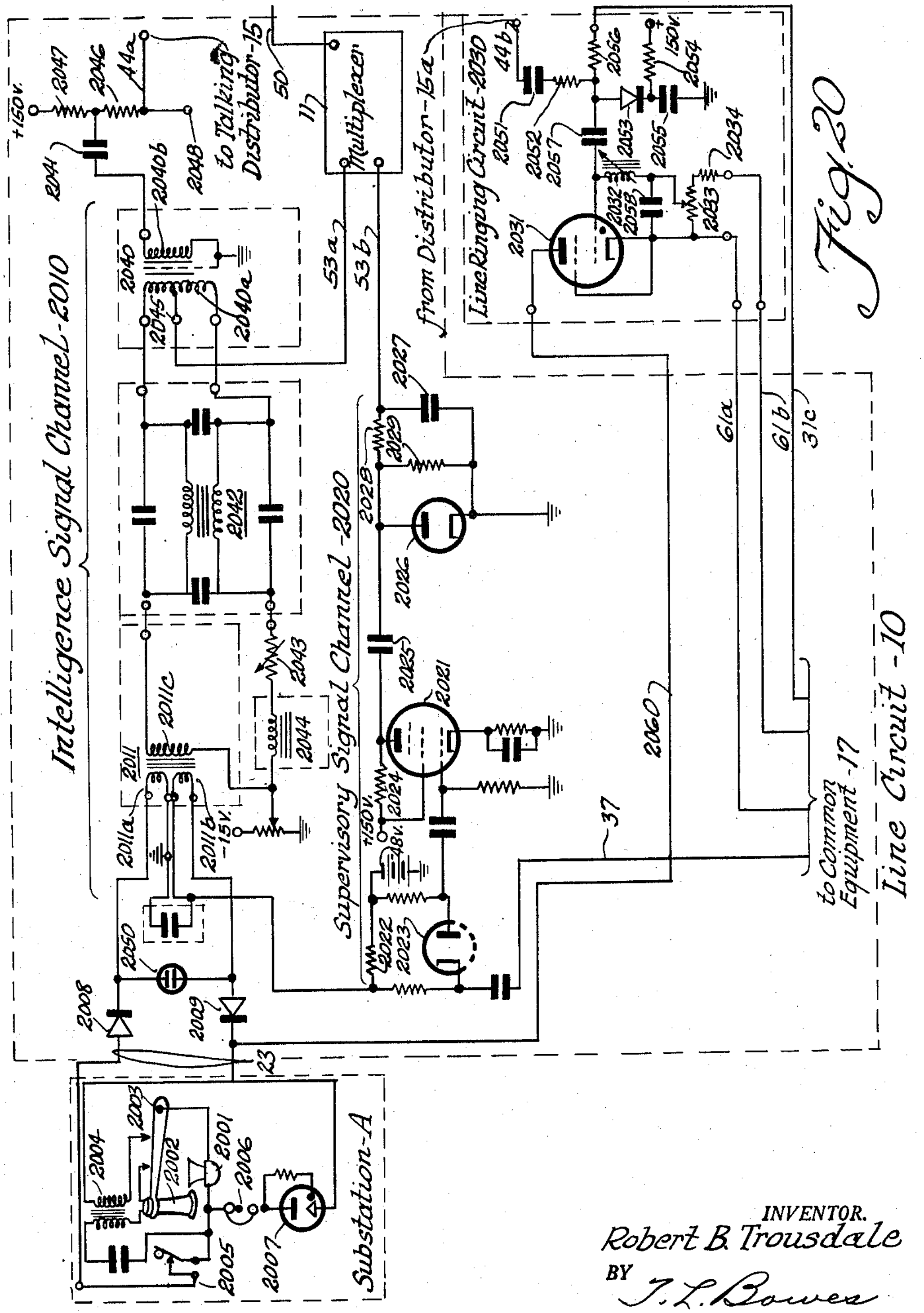

The substations respectively terminating the various lines of the system, including party line substations as well as private line substations, are identical in arrangement. Accordingly, only the details of the private line substation A terminating the private line 23 have been illustrated in Fig. 20 of the drawings, the other substations of the system such as the party line substations B, C, and D, which terminate the party line 32 being identical thereto. Any desired substation arrangement adapted for use in conventional automatic telephone systems may be employed in the present system with but slight modification. The illustrated circuit of the substation A comprises the usual transmitter 2001, receiver 2002, hook or cradle switch 2003, coupling transformer 2004, calling or impulsing device 2005, and ringer 2006 interconnected to form a conventional substation circuit. In addition, the circuit is equipped with a neon or other gas-filled tube 2007 which is employed to bridge the ringer 2006 across the conductors of the line 23 in series with the impulsing contacts of the calling device 2005. This tube has a voltage breakdown of approximately 70 volts.

Operation of the substation equipment as provided at the substation A is entirely conventional and will be readily apparent to those skilled in the art. Accordingly, a detailed description thereof is not included herein. However, insofar as is required to explain the mode of operation of the line circuit 10 terminating the line 23, the operation of the substation A is explained below in the following detailed description of the line circuit 10.

*Line circuits 10 and 16*

Figure 21:
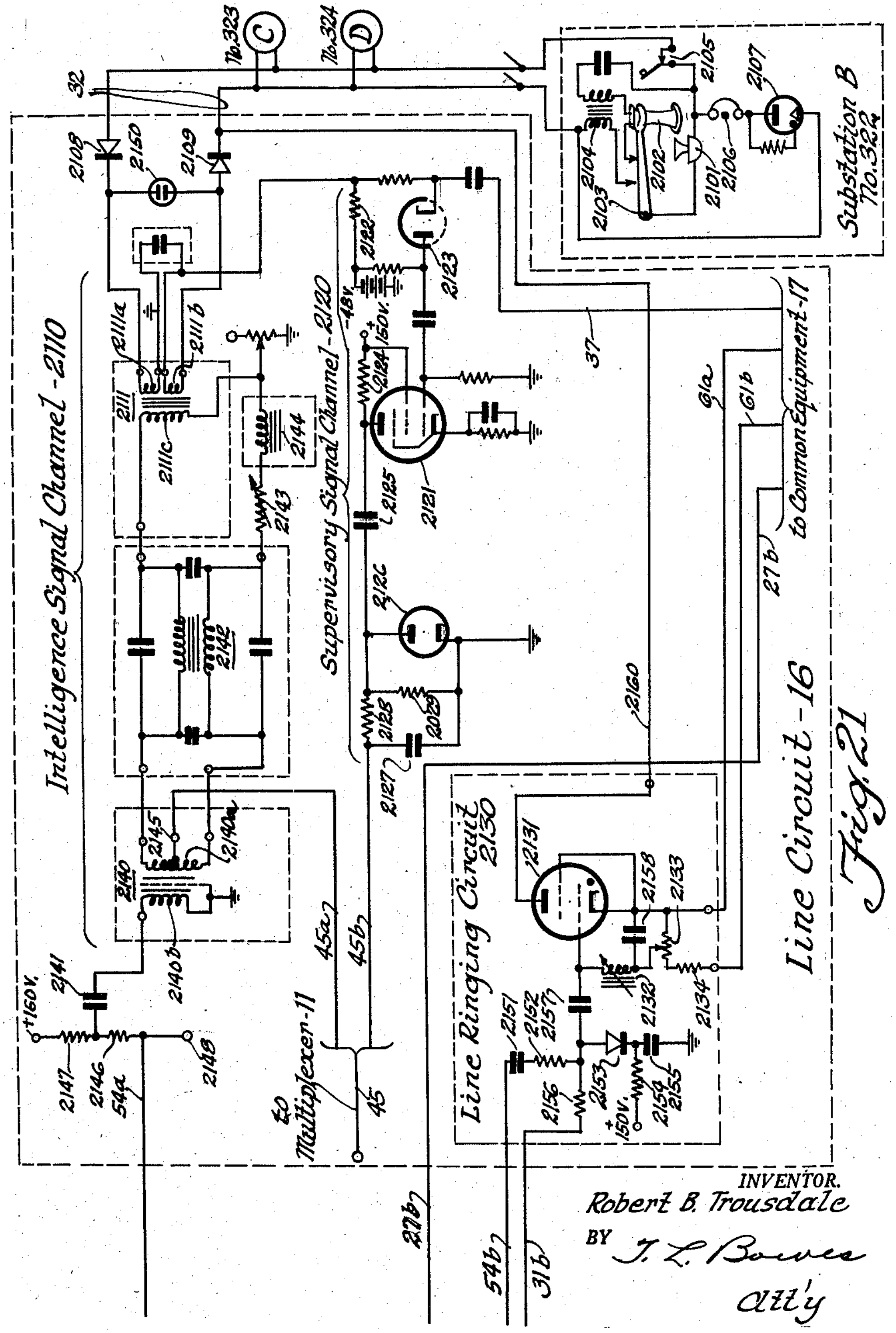
Figure 22:
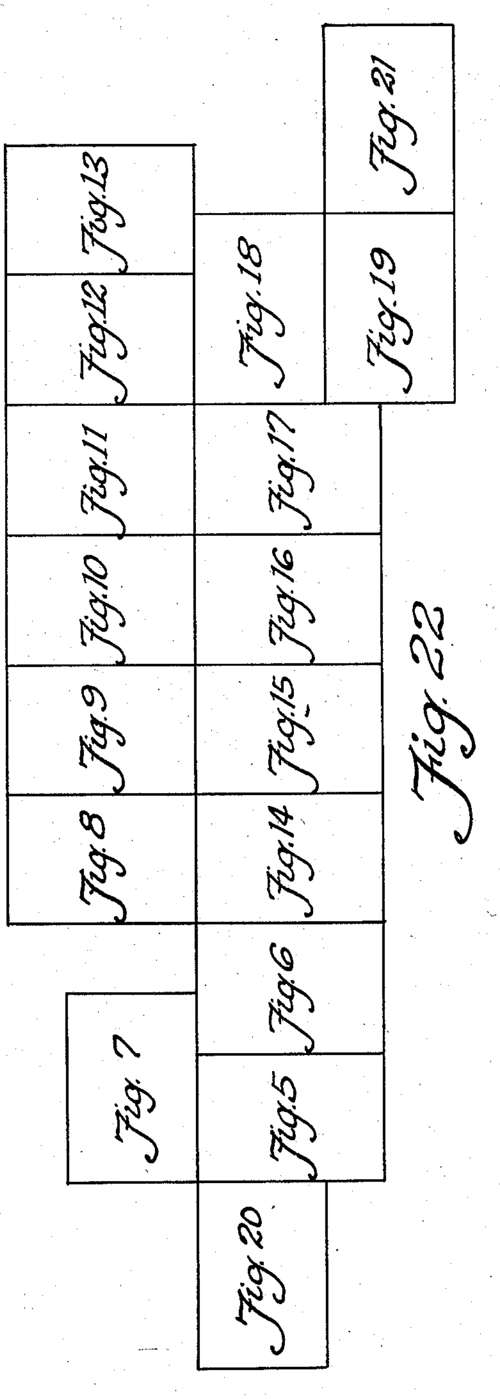
Figure 22A:
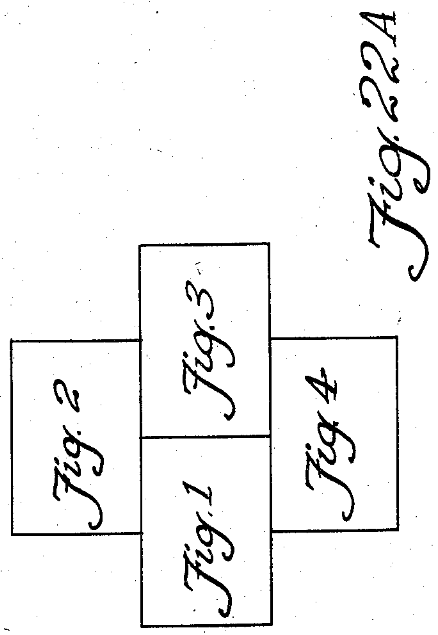
Figure 23:
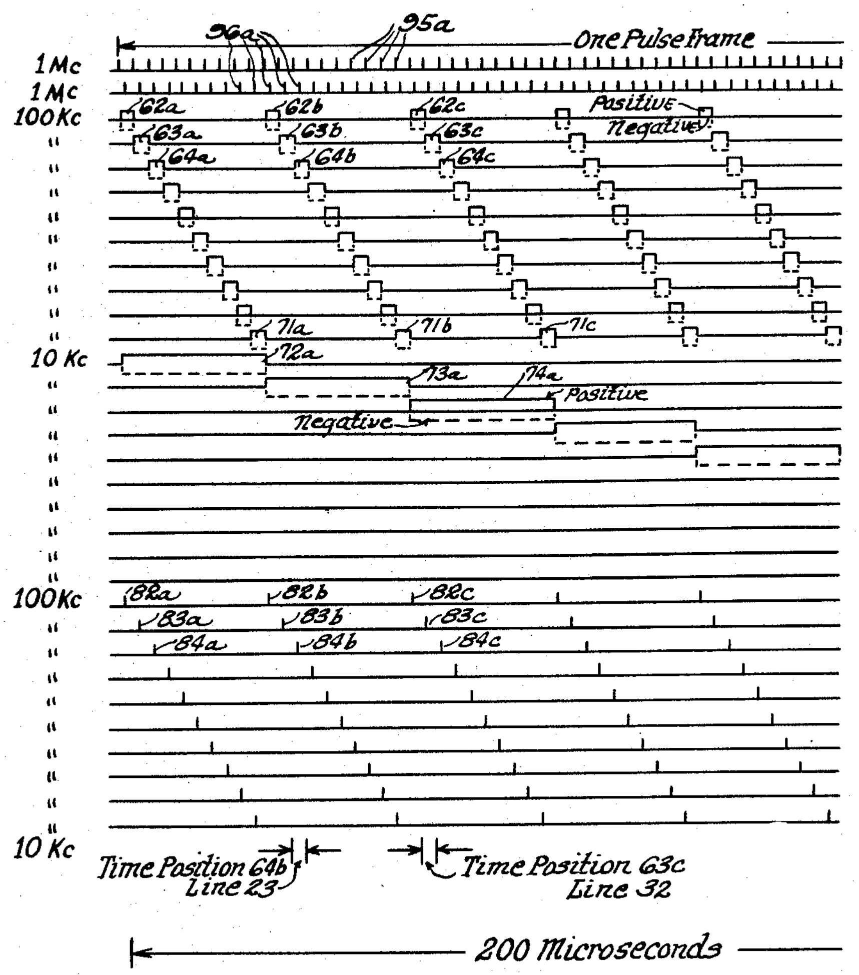
Figure 24:
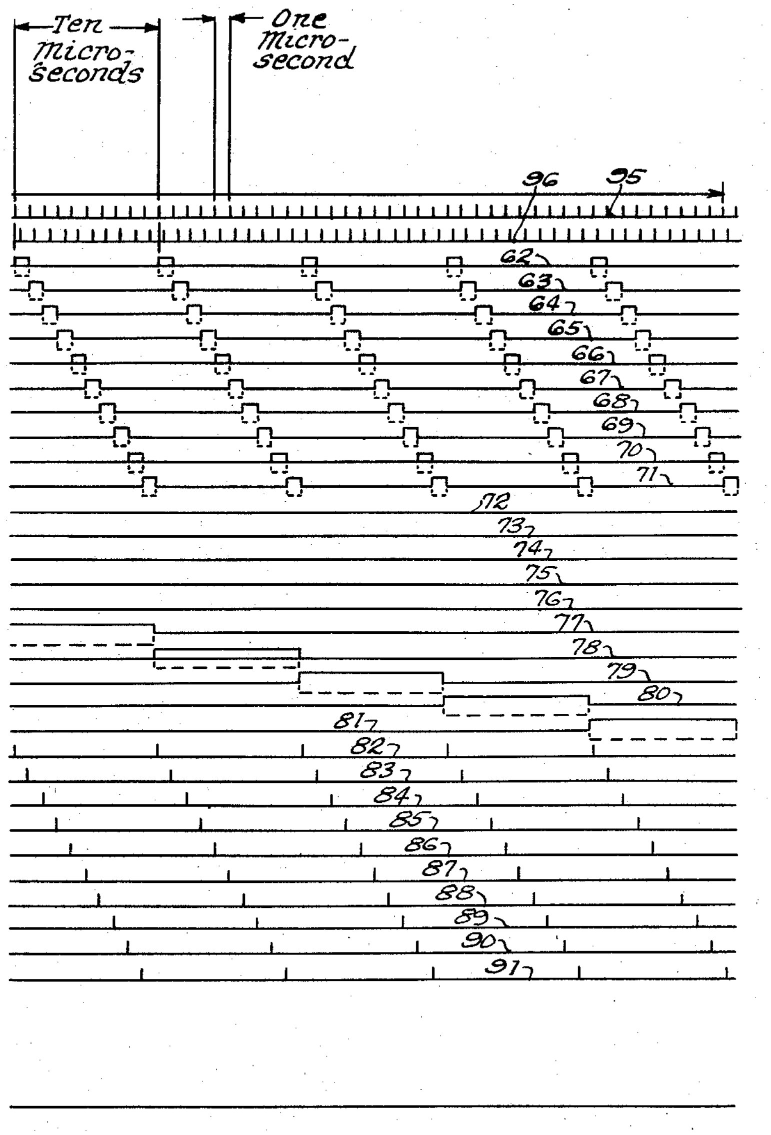
Figure 25:
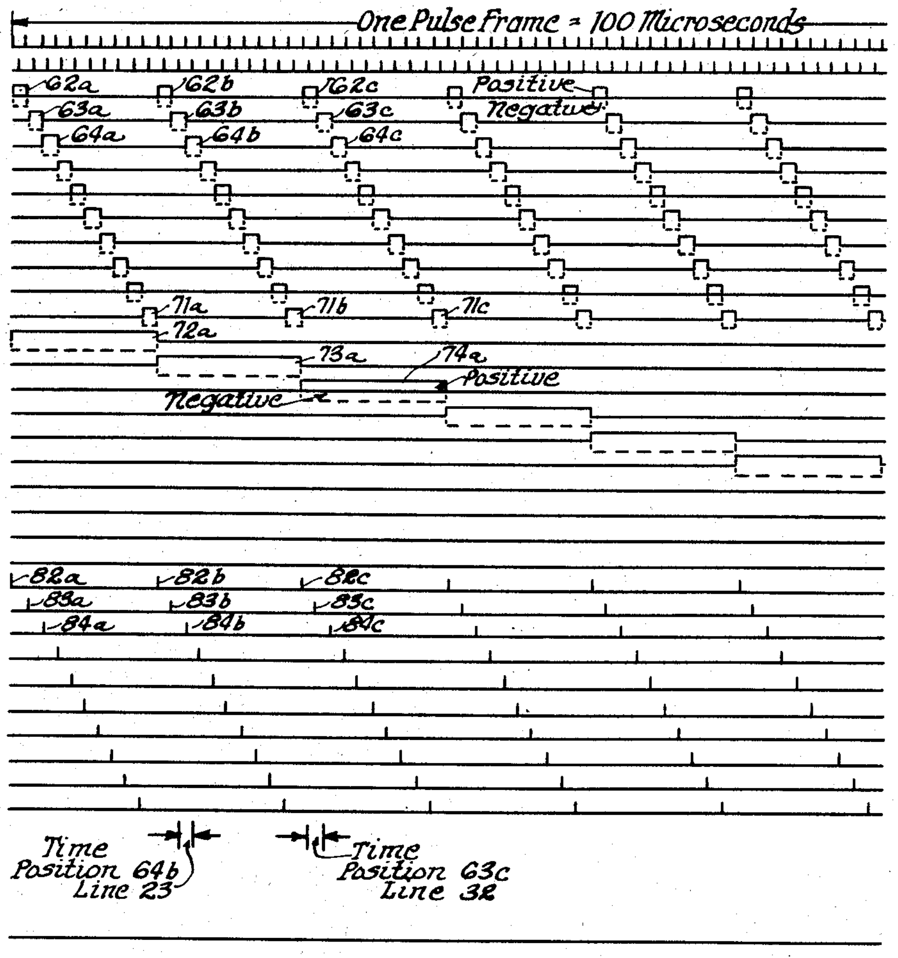
Figure 26:
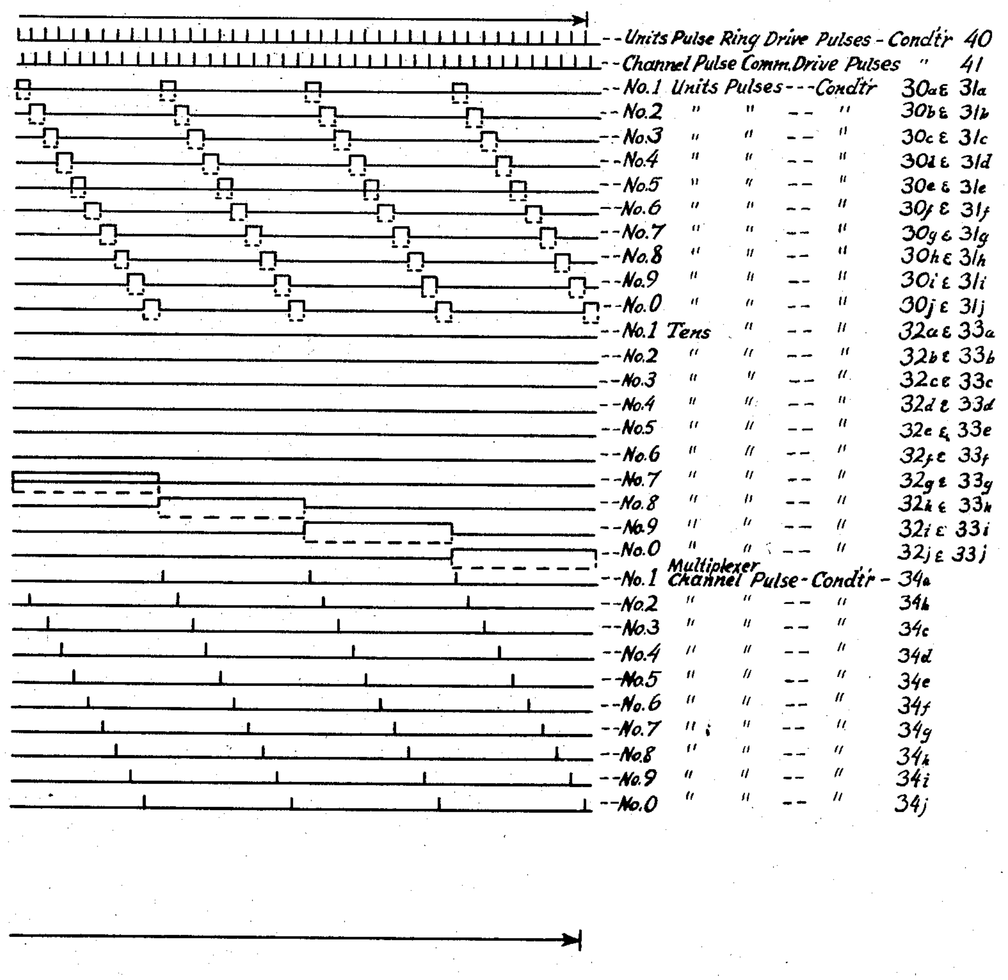

As previously indicated, the two identified line circuits are respectively utilized to terminate the private line 23 and the party line 32 at the exchange end of the system. These two line circuits, as well as the line circuits terminating the other lines of the system, are identical in circuitry and mode of operation. Accordingly, corresponding components of the two line circuits have been identified by reference numbers having the same tens and units digits but differing in the hundreds and thousands digits to identify the figures of the drawings in which the individual components thereof are to be found. Since the two line circuits 10 and 16 are identical in every respect, the following description will be confined to the line circuit 10 illustrated in Fig. 20 of the drawings. It will be understood, however, that this description accurately applies to the line circuit 16 as shown in Fig. 21 of the drawings as well.

From the foregoing general description of the system it will be recalled that each line circuit performs the functions of repeating intelligence and control signals from its associated substation to a corresponding one of the gate circuits in the multiplexer 11, repeating intelligence signals derived from a particular gate circuit of the talking distributor 15 to its associated substation or substations, and of responding to coded party line ringing signals derived from one of the connectors of the system by way of the ringing control distributor 15*a* to transmit ringing current to the associated substation or substations on a call incoming thereto. Briefly considered, the line circuit 10 comprises an intelligence signal channel 2010, a supervisory signal channel 2020, and a line ringing circuit 2030. The intelligence signal channel 2010 is utilized in transmitting intelligence signals which are produced at the substation A and supplied over the line 23 to the line circuit 10 to the corresponding gate circuit of the multiplexer 11 over the conductor 53*a* in such manner that these signals are not coupled to the talking distributor 15. Furthermore, the intelligence signal channel 2010 is utilized in transmitting intelligence signals from the talking distributor 15 to the line 23 and over this line to the substation A in such manner that the signals are not revertively transmitted back to the multiplexer 11.

The supervisory signal channel 2020, which includes a pentode control amplifier 2021 of the commercial 6AK5 type, functions to convert the 100 kilocycle supervisory carrier voltage developed by the supervisory carrier supply circuit 26 into a bias voltage of constant amplitude which is supplied over the conductor 53*b* to the multiplexer 11 and is utilized normally to bias to a non-conductive state that particulate gate tube of the multiplexer 11 which individually corresponds to the line 23. Control signals developed at the substation A and transmitted to the line circuit 10 over the line 23 are impressed upon the supervisory signal channel 2020 and this channel functions to remove and reapply the above described bias potential on the conductor 53*b* in accordance with these control signals.

In the party line ringing system of the present invention the intelligence signal channel 2010 and the supervisory signal channel 2020 may be of any desired circuit configuration suitable for producing the above-described functions. In the illustrated embodiment these channels are substantially identical to the corresponding system components described in detail in my copending application, Serial No. 205,641, which was filed January 12, 1951, and is assigned to the same assignee as the present invention. While signal channels of the type described in detail in copending application, Serial No. 205,641, are desirable from the standpoint of uniform operation with lines of varying length having varying loop resistance and hence the illustrated signal channels in Fig. 20 constitute a preferred embodiment of these system components, it will be understood that other corresponding system components may be employed. For example, the corresponding system components shown in copending application, Serial No. 134,974, which was filed on December 24, 1949, referred to heretofore, may be employed. However, in the system shown and described in copending application, Serial No. 134,974, the intelligence and control signals are supplied over the same conductor to the multiplexer 11. Accordingly it is necessary to employ, in each instance, a type of multiplexer which is designed to operate with the type of line circuit which is chosen.

The line ringing circuit 2030 is provided for the purpose of controlling the application of ringing current to the ringer 2006 provided at the substation A on calls incoming to the line 23. The circuit 2030 includes a four electrode ringing control tube 2031 which is preferably of the gas-filled commercial type 2D21, and is effective to transmit ringing current derived from the conductor 61*a* over the line 23 to activate the ringer 2006 provided at the substation A. The individual circuit elements of the line circuit 10, not specifically referred to above, will be described below in explaining the functions which they perform in handling calls involving the line 23.

From the foregoing general description of the system it will be recalled that the interrupted ringback tone signal corresponding to the party line ringing signal assigned to the called party line substation is selected in the party line register of the seized connector and is used to control the ringing operation at the called line. More particularly, the interrupted ringback tone signal is rectified to provide ringing pulses which occur during the ringing intervals of the selected ringing signal. These ringing pulses are used to control the transmission of connector sampling pulses produced in the pulse time position assigned to the called line over the conductor 51*a* to the ringing control distributor 15*a*. These connector sampling pulses are distributed on a tens digit basis in the distributor 15*a* and are supplied to the ten line circuits having the same tens digit directory designation. Thus, for example, connector sampling pulses which appear on the conductor 51*a* in the time position 64*b* assigned to the line 23 during the ringing intervals of the code #1 party line ringing signal are gated by the distributor 15*a* to the conductor 44*b* and are transmitted to the line ringing circuit 2030 of the line circuit 10. In the line ringing circuit 2030 the connector sampling pulses gated by the ringing distributor 15*a* are separated on a units digit basis by comparing these pulses with positive units pulses derived from the units pulse ring 20 over the conductor 31*c* and occurring in the third units pulse time position in each tens pulse period. Coincidence of the connector sampling pulses and the units pulses appearing on the conductor 31*c* has the effect of firing the ringing control tube 2031 with the result that ringing current is transmitted over the line 23 to energize the ringer 2006 at the substation A. Since the connector sampling pulses are gated to the conductor 51*a* only during the ringing interval or intervals of the selected party line ringing signal, the above described coincidence between these pulses and the units pulses appearing on the conductor 31*c* occurs only during the ringing intervals so that the ringer 2006 is rung only during the ringing intervals of the selected party line ringing signal.

Briefly to consider the quiescent state of the line circuit 10, i. e., the condition thereof which prevails when the line 23 is not occupied with a call, it is pointed out that the ringing control tube 2031 is held in a non-conductive state so that the ringing current produced on the conductor 61*a* by the ringing supply circuit 60 is prevented from reaching the ringer 2006 of the substation A over the line 23. As far as the supervisory signal channel 2020 is concerned, it will be noted that when the substation A is not in use the contacts of the hook or cradle switch 2003 are opened so that a loop circuit including the conductors of the line 23 is not completed between the substation A and the line circuit 10. As a consequence, no current is permitted to flow from the −48 volt current source through the resistor 2022 so that the signal gate rectifier 2023 is normally conductive and passes the 100 kilocycle supervisory carrier voltage developed by the carrier supply circuit 26 to the control grid of the control amplifier 2021. The 100 kilocycle supervisory carrier voltage is repeated across the anode resistor 2024 of the tube 2021 and is coupled through the condenser 2025 to the rectifier network, including the rectifier 2026 and the condenser 2027. Thus the 100 kilocycle supervisory carrier voltage is normally passed by the rectifier 2023, is amplified in the tube 2021, and rectified to provide a negative bias potential across the condenser 2027 which is supplied over the conductor 53*b* to the particular gate tube of the multiplexer 11 associated with the line circuit 10. It will be apparent, therefore, that so long as the line 23 is not occupied with a call, a negative bias potential is supplied to the multiplexer gate tube associated with the line circuit 10 to render this gate tube normally inoperative and all components of the line circuit 10 are rendered inactive as signal transmission components.

Operation of the line circuit 10 to handle a call originating at the substation A may well be described in the terms of the call from the substation A to the substation B considered above in the general description of the system. While reference may be had to my copending application, Serial No. 205,641, for a complete and detailed description of the intelligence signal channel 2010 and the supervisory signal channel 2020, these system components will be described in sufficient detail hereinafter to facilitate an understanding of the functioning of these components in the party line ringing system of the present invention. Specifically, when the receiver 2002 or hand set at the substation A is removed from its supporting hook or cradle, the contacts of the hook or cradle switch 2003 are closed to complete a calling loop circuit between this substation and the line circuit 10. This loop circuit extends from the grounded positive terminal of the 48-volt source by way of the transformer winding 2011*a*, the selenium rectifier 2008, the upper side of the line 23, the impulsing contacts of the calling device 2005, the transmitter 2001, the contacts of the hook or cradle switch 2003, the right winding of the transformer 2004, the lower side of the line 23, the selenium rectifier 2009, the transformer winding 2011*b*, and the resistor 2022 to the negative terminal of the 48-volt source. Current flow over this loop circuit is in the correct direction to bias the rectifiers 2008 and 2009 to the linear forward portions of the operating characteristics thereof and these rectifiers are rendered effective to pass alternating signal voltages superimposed upon the unblocking bias voltages impressed thereacross so long as the signal voltages do not exceed in amplitude the magnitude of the unblocking bias voltage. When the described loop circuit is completed to cause current flow through the resistor 2022 in the described direction, the potential of the cathode of the gating rectifier 2023 is raised above the anode potential thereof, this potential being substantially greater than the peak value of the 100-kilocycle supervisory carrier voltage supplied to the cathode of the rectifier 2023 over the conductor 37 so that the rectifier 2023 is blocked when the line circuit 10 is taken into use and is ineffective to pass 100 kilocycle signal voltage to the amplifier 2021. As a result, the bias control potential produced across the condenser 2027 in the manner described above is reduced as the charge on the plates of this condenser leaks off through the associated resistors 2028 and 2029. Accordingly, the bias control potential on the conductor **53*b* is reduced substantially to ground potential when the line circuit 10 is taken into use and the gate tube of the multiplexer 11 which is associated with the line circuit 10, is rendered operative to transmit channel pulses therethrough. More specifically, when the bias control potential on the conductor 53*b* is decreased, multiplexer pulses 84*b* occurring in the time position 64*b* assigned to the calling line 23 are impressed upon the multiplexer output conductor 50 to effect seizure of an idle one of the links 12, 13, and 14 in the manner described above. Assuming that the link 12 is assigned to handle the call, the finder and connector units of this link are conditioned for operation with the result that signal pulses modulated with the dial tone signal derived from the dial tone generator 29*b* are transmitted from the calling line out gate circuit 226 of the connector 12*b* and through the gate circuits of the talking distributor 15 which individually correspond to the line 23. After traversing these gate circuits the dial tone modulated pulses are detected to reconstruct the dial tone which is amplified in the talking distributor 15 and impressed upon the primary winding 2040*b* of the hybrid coil 2040 through the coupling condenser 2041. From the secondary side of the hybrid coil 2040 the dial tone signal is transmitted through the low pass filter indicated generally at 2042, the coupling transformer 2011, and the rectifiers 2008 and 2009 to the line 23. The signal is then transmitted over the line 23 to the substation A where it is reproduced by the receiver 2002 to inform the calling subscriber that the dialing operation may be started. The hybrid system comprising the hybrid coil 2040 and the balancing network including the resistor 2043 and the coil 2044 prevents the dial tone signal from being revertively applied to the corresponding gate circuit of the multiplexer 11** as described in detail in the above identified copending application, Serial No. 134,474.

Upon receiving the dial tone, the calling subscriber may actuate the calling device 2005 in accordance with the directory number designation of the desired substation. Since it is assumed that the party line substation B having the directory designation 322, which is associated with the line 32, is being called from the substation A, the digits 3, 2, and 2, of course, will be successively dialed at the substation A. Operation of the calling device 2005 has the effect of pulsing the voltage across the resistor 2022 to correspondingly pulse the bias potential produced across the condenser 2027. More specifically, during the open circuit or break period of each dial impulse the voltage across the resistor 2022 drops substantially to zero with the result that the condenser 2027 is negatively charged to increase the bias potential on the control grid of the multiplexer gate tube to its normal pulse blocking value. On the other hand, during the closed circuit or make period of each dial impulse the voltage drop across the resistor 2022 is restored to the off hook value with the result that the condenser 2027 is discharged to reduce the bias on the multiplexer gate tube control grid thereby permitting channel pulse transmission therethrough. It will be noted from the foregoing description that the dial impulses are repeated by the line circuit 10 over the separate bias control conductor **53*b* to the multiplexer 11 thereby effectively separating the intelligence and supervisory control functions of the line circuit 10** as described in detail in my copending application, Serial No. 205,641, referred to above.

As will be evident from the preceding explanation, if the called line 32 is tested in the connector **12*b* and found busy, signal pulses modulated with the busy signal are developed in the connector 12*b* and released to the line circuit 10 by way of the talking distributor 15. On the other hand, if the called line tests idle in the connector 12*b* such that the party line ringing operation is initiated, signal pulses modulated in accordance with the selected interrupted ringback tone signal corresponding to the party line ringing signal assigned to the party line substation 322, namely the code #2 ringing signal, (Fig. 29) are detected and amplified in the talking distributor 15 and transmitted over the conductor 44*a* to the line circuit 10 and over the line 23 to excite the receiver 2002** at the calling substation in the exact manner explained above with reference to the dial tone signal.

Assuming that the call is answered at the called substation B, a two-way communication channel is established between the calling and called substations. Thus, voice signals originating at the substation A and transmitted over the line 23 to the line circuit 10 traverse the two primary windings **2011*a* and 2011*b* causing a voltage to be developed across the secondary winding 2011*c* of this transformer. A portion of the signal voltage developed across the secondary winding 2011*c* is coupled through the filter network 2042 to the primary of the hybrid coil 2040 and from the center tap 2045 of this winding over the conductor 53*a* to the multiplexer gate tube corresponding to the line circuit 10. The signal voltage thus impressed upon the conductor 53*a* serves to modulate the channel pulses gated by the multiplexer 11 in the time position 64*b*** assigned to the calling line in the manner more fully explained hereinafter.

As regards voice signals originating at the called substation B, it will be understood from the preceding general explanation that such signals are repeated through the multiplexer 11 and the connector **12*b* to the talking distributor 15. In the talking distributor 15 the signals carried by these pulses are detected or reconstructed and amplified and are supplied over the conductor 44*a* to the line circuit 10 and through the intelligence signal channel 2010 of this circuit to the line 23** in a manner identical to that described above in connection with the dial tone and ringback tone signals.

In considering the operation of the line ringing circuit 2030 of the line circuit 10 on a call routed to this line circuit and the associated line 23 from another line of the system, it is pointed out above that normally the control tube 2031 is biased against current conduction so that ringing current produced on the conductor **61*a* is not transmitted over the line 23 to the ringer 2006 at the substation A. More specifically, the first control grid of the control tube 2031 is connected through a variable inductance 2032 to the arm of a potentiometer 2033 and the potentiometer 2033 is connected in series with the resistor 2034 between the conductors 61*a* and 61*b*. It will be recalled from the preceding general description that an ungrounded negative bias potential is produced between the conductors 61*a* and 61*b* in the ringing supply circuit 60. Accordingly, variation of the arm of the potentiometer 2033 is effective to vary the negative bias potential at which the first control grid of the tube 2031** is operated and this potentiometer may be adjusted so that the tube 2031 is normally non-conductive.

As described generally heretofore, the line ringing circuit 2030 responds to coincidence of the connector sampling pulses produced on the conductor 44*b* with units pulses appearing on the conductor 31*c* by transmitting ringing current over the line 23 to the substation A. Thus, the ringing distributor 15*a* and the line ringing circuit 2030 together function to select the pulse time position of the called line for purposes of controlling the application of ringing current thereto. More specifically, the interrupted connector sampling pulses which are supplied over the conductor 44*b* are coupled through the condenser 2051 and through the resistor 2052 to the cathode of a units gate device 2053. In the illustrated embodiment the units gate device 2053 consists of a diode rectifier of the crystal type and the anode of the rectifier 2053 is connected through the resistor 2054 to the positive supply potential and through the condenser 2055 to ground potential. The positive units pulses produced by the units pulse ring 20 in the units pulse time position assigned to the line 23 are supplied over the conductor 31*c* and through the resistor 2056 to the cathode of the units gate rectifier 2053. The cathode of the rectifier 2053 is coupled through the condenser 2057 to the first control grid of the control tube 2031, the cathode of this tube being directly connected to the ringing current conductor 61*a*. The anode of the tube 2031 is connected over the conductor 2060 to the lower side of the line 23. Normally the units gate rectifier 2053 is fully conductive due to the flow of current therethrough from the positive supply potential over a path which includes the resistor 2054, the rectifier 2053, the resistor 2056, and the source impedance at the units pulse ring 20. Accordingly, transmission of the connector sampling pulses to the control grid of the tube 2031 is prevented due to the fact that the units gate rectifier 2053, when conducting, effectively short circuits the first control grid circuit of this tube. However, for the duration of the positive units pulse impressed upon the conductor 31*c* the cathode of the units gate rectifier 2053 is raised by an amount sufficient to render this rectifier non-conductive and during this interval the first control grid circuit of the tube 2031 is unblocked so as to receive connector sampling pulses which occur during the units pulse time position assigned to the line 23. In this connection, it will be understood that the positive units pulses themselves are ineffective to fire the tube 2031 due to the fact that the first control grid of this tube is biased sufficiently negative to prevent the tube 2031 from being fired by pulses of this amplitude. However, when the connector sampling pulses coincide with these positive units pulses, the control grid of the tube 2031 is driven sufficiently positive during each such coincidence to fire the tube 2031 and ringing current transmission to the called substation A is initiated immediately the tube 2031 is fired.

As previously pointed out, the ringing voltage produced by the ringing supply circuit 60 comprises a 20 cycle alternating voltage which is superimposed upon a unidirectional potential of approximately 80 volts. The circuit traversed by the ringing current extends from the conductor 61*a* through the ionized space current path of the tube 2031, the lower conductor of the line 23, the gas-filled tube 2007, the windings of the ringer 2006, the impulsing contacts of the device 2005, the upper conductor of the line 23, the rectifier 2008, and the winding 2011*a* of the transformer 2011 to the grounded terminal of the current source in the ringing supply circuit 60. After the two tubes 2007 and 2008 are fired, ringing current traversely of the above traced circuit produces a voltage drop across the tube 2008 of approximately 8 volts and a voltage drop across the tube 2007 of approximately 60 volts. The balance of the available voltage which varies from zero to approximately minus 170 volts peak appears across the remaining components of the circuit traversed by the ringing current. Accordingly, most of the available 80 volts of the direct current component of the ringing voltage is dissipated across the tubes 2007 and 2008 and the cathode of the tube 2031 is driven positive relative to the anode of this tube during a portion of each alternate half cycle of the 20 cycle component of the ringing voltage. Hence, but for the continued excitation of the first control grid of the tube 2031 by the coincident-connector sampling pulses and units pulses in the manner described above, this tube would be extinguished at some point during one-half of each cycle of the ringing voltage. During the silent or off periods of each code ringing cycle, connector sampling pulses are removed from the conductor 44*b*, and the tube 2031 is deionized during the first cycle of the ringing voltage next following interruption of these pulses at which time the cathode of the tube 2031 is driven positive relative to the tube anode. However, ringing current transmission over the line 23 is obviously resumed at the start of each ringing interval of each code cycle in response to the reapplication of connector sampling pulses to the conductor 44*b*.

In accordance with an important feature of the line ringing circuit 2030, the condenser 2057 and the inductance 2032 comprise a series resonant circuit which is tuned to approximately 100 kilocycles and is shock excited by the coincident connector sampling pulses and units pulses impressed upon the condenser 2057 during periods when the units gate tube 2053 is non-conductive. When the series resonant circuit comprising the condenser 2057 and the inductance 2032 is shock excited in the manner described above, an oscillatory current is set up therein which produces a sufficiently large amplitude wave train across the inductance 2032 to fire the ringing control tube 2031.

When a call is answered at the substation A through removal of the receiver 2002 or hand set from its supporting hook or cradle, the supervisory signal channel 2020 functions in the manner explained above to reduce the voltage across the condenser 2027 which results in the transmission of multiplexer pulses occurring in the time position 64*b* assigned to the line 23 through the multiplexer 11 to the connector occupied with the call. The connector, and more particularly the called line in gate circuit 223 and the called line reconstructor circuit 222 embodied therein, respond to these multiplexer pulses by operating the ring trip circuit 221 to terminate the transmission of connector sampling pulses over the conductor 51*a* to the ringing distributor 15*a*. When the transmission of connector sampling pulses is terminated, the ringing control tube 2031 remains de-ionized to terminate the ringing operation in a manner which will be fully apparent from the preceding explanation.

The manner in which the line circuit 10 functions to transmit voice signals in both directions between the substation A and a calling substation on calls incoming to the line 23 is exactly the same as explained above with reference to the call originating at the substation A and routed to the substation B. In this connection it is emphasized that the substation ringing operation of the present invention provides for the transmission of ringing information over a separate path from the intelligence communication path. Specifically, the connector associated with the call produces connector sampling pulses occurring in the time position assigned to the called line which are supplied over a separate path which includes the ringing distributor 15*a* and the units gate rectifier in the line circuit associated with the called line. Since the above-described ringing information path is not employed to transmit intelligence or other supervisory signals the linearity of reproduction and cross-talk characteristics of this path may be of relatively low quality. Thus, in performing the units gating function for distributing ringing information there is provided the simple crystal rectifier 2053 in the line ringing circuit of each line circuit. In this connection it will be understood that units digit separation is required in each one of the one hundred line circuits of the system and the provision of a simple crystal rectifier gating circuit substantially simplifies the transmission of ringing control information over the above-described separate path. It will further be understood that the transmission of ringing information in the system described thus far is not performed on a marginal basis, that is by over-modulating connector signal pulses during the ringing intervals as is done in the systems described in my copending applications referred to above. Accordingly, with the above-described independent path for the transmission of ringing control information, the full modulation characteristic of the system components may be employed for the transmission of intelligence signals.

It is believed that the manner in which the line circuit 10 is released when the receiver 2002 or hand set at the substation A is replaced upon its supporting hook or cradle to terminate a call will be readily apparent from the preceding explanation. Briefly summarized, however, it is repeated that the system is arranged for calling party release of the finder-connector links embodied in the system. Accordingly, if the link 12, for example, is occupied with a call originated at the substation A, the condenser 2027 is rapidly charged in a negative direction by the 100 kilocycle supervisory voltage passed by the signal gate rectifier 2023 and supplied from the amplifier tube 2021 to the rectifier 2026 when the calling subscriber at the substation A hangs up to terminate the call. When the condenser 2027 is charged negatively the corresponding gate tube of the multiplexer 11 is biased to interrupt the transmission of multiplexer pulses to the finder 12*a* of the link occupied with the call. As a consequence, the link is released in the manner previously explained so that even though the called subscriber attempts to hang on to the connection, signal pulses cannot be transmitted to the talking distributor 15. In a similar manner, the supervisory signal channel 2020 functions to charge the condenser 2027 negatively on a call incoming to the line 23 when the called subscriber at the substation A hangs up to terminate the call. Here also the corresponding gate tube of the multiplexer 11 is biased against multiplexer pulse transmission over the conductor 50 to the link occupied with the call when the condenser 2027 is charged. It will thus be understood that regardless of whether a call originates at the substation A or is routed to this substation from another substation of the system, the gate circuit of the multiplexer 11 is automatically blocked against multiplexer pulse transmission over the multiplexer output conductor 50 in the time position 64*b* assigned to the line 23 when the subscriber at the substation A hangs up to terminate the call.

Figure 27A:
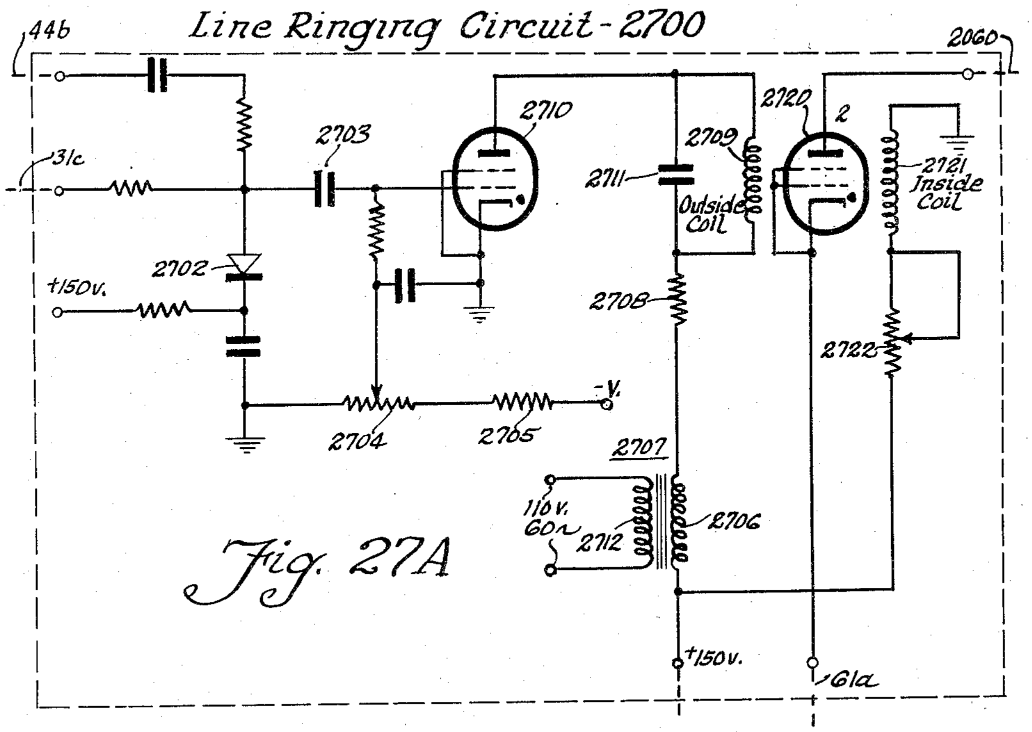

As pointed out briefly in connection with the general description of the system, the intelligence and supervisory signal channels of the line circuit of the present invention are of the so-called universal type and may be employed with a wide variety of line ringing circuits. Thus, the intelligence signal channel 2010 and the supervisory signal channel 2020 shown in detail in Fig. 20 of the drawings which are illustrated in connection with a line ringing circuit 2030 of the pulse coincidence type, may equally well be employed with other types of line ringing circuits. For example, these channels may be employed with a line ringing circuit of the type shown in detail in Fig. 27*a* of the drawings. Referring to this figure the line ringing circuit 2700 shown therein includes a gaseous discharge control tube 2710, preferably of the commercial type 5696, and a ringing control tube 2720 also of the gaseous discharge type and preferably of the commercial type 2D21. The control tube 2710 is fired in a manner substantially identical to the ringing control tube 2031 described in detail in connection with Fig. 20 by coincidence of the positive units pulse on the conductor 31*c* and the connector sampling pulses appearing on the conductor 44*b*. When the pulses impressed on the conductors 44*b* and 31*c* coincide the rectifier 2702 is rendered non-conductive so as to permit the transmission of the connector sampling pulses through the condenser 2703 to the first control grid of the control tube 2710. Normally, the control grid of the tube 2710 is connected to the arm of the potentiometer 2704 which is connected in series with the resistor 2705 to a negative supply potential so that the control grid of the tube 2710 is normally operated at a negative potential sufficient to prevent the tube 2710 from firing. However, upon transmission of the positive connector sampling pulses to this control grid in the manner described above, the tube 2710 fires so as to produce a flow of current from the positive supply potential through the secondary winding 2706 of a power transformer 2707, an anode load resistor 2708, and a control coil 2709 to the anode of the tube 2710. A condenser 2711 is connected across the control winding 2709 to filter out the 60 cycle component existing in the series circuit just described. The ringing control tube 2720 is provided with first and second control electrodes which are connected to the cathode thereof and a 20 cycle ringing voltage is impressed upon the cathode of this tube over the conductor 61*a*. The anode of this tube is connected to the conductor 2060 (Fig. 20) so as to transmit ringing current to the line 23 during periods when the tube 2720 is ionized and in the manner described in detail in connection with the line ringing circuit 2030.

In order to prevent the ringing control tube 2720 from normally being ionized, there is provided a biasing winding 2721 which is positioned around the envelope of the tube 2720 and is energized from the positive supply potential through the potentiometer 2722. The biasing winding 2721 effects control of the ionization of the tube 2720 by establishing a magnetic field at right angles to the line between the anode and cathode of this tube so as to raise the firing or striking potential of the tube 2720 in the manner well understood by those skilled in the art. Accordingly, in its quiescent state the ringing control tube 2720 is magnetically controlled by means of the biasing winding 2721 to prevent ionization of this tube and transmission of ringing current to the line associated therewith. However, when ringing information is transmitted by means of the connector sampling pulses appearing on the conductor 44*b* and these pulses coincide with the units pulse time position of the units pulses impressed upon the conductor 31*c*, the control tube 2710 is fired in the manner described above to produce a flow of current through the control winding 2709. The winding 2709 is wound over the biasing winding 2710 which surrounds the tube 2720 and in the opposite direction so that the flux produced in the winding 2709 due to current flow therethrough opposes the flux set up by the biasing coil 2721. Accordingly, when the tube 2710 fires, the magnetic bias produced by the winding 2721 is reduced and the tube 2720 is ionized so as to transmit ringing current over the line associated therewith. In this connection it will be understood that the ringing voltage impressed upon the conductor 61*a* includes a unidirectional component as well as the 20 cycle ringing signal component so that the tube 2720 is extinguished at some point during one-half of each cycle of the ringing voltage in the manner described in detail in connection with the line ringing circuit 2030. Accordingly, if the control tube 2710 is de-ionized so as to terminate the flow of current through the control winding 2709, the biasing winding 2721 again prevents the ringing control tube 2720 from firing, thus terminating the transmission of ringing current over the line 23. The control tube 2710 is also deionized at periodic intervals by means of a superimposed alternating current voltage which is supplied to the primary winding 2712 of the power transformer 2707. In the illustrated embodiment a 110 volt, 60 cycle signal is impressed upon the primary winding 2712 and repeated across the secondary winding 2706 of the transformer 2711 in series with the 150 volt supply potential. During negative half cycles of the alternating voltage produced across the winding 2706 the anode to cathode voltage across the tube 2710 is reduced to a sufficiently low value that the tube 2710 is de-ionized. This tube remains de-ionized except during periods of transmission to the control grid thereof of the above-described connector sampling pulses.

An important feature of the alternative line ringing circuit 2700 resides in the provision of facilities for firing the ringing control tube 2720 independently of the wave form of the ringing voltage produced on the conductor 61*a* and impressed upon the cathode of the tube 2720. In this connection it will be understood that in the line ringing circuit 2030 (Fig. 20) the ringing current is supplied to the cathode of the ringing control tube 2031 so that the grid to cathode voltage changes at the ringing frequency rate. Accordingly, it is necessary with the line ringing circuit 2030 to maintain a reasonably pure ringing signal wave form to prevent higher harmonies and spikes from firing the ringing control tube 2031. However, with the above-described line ringing circuit 2700 the ringing signal produced on the conductor 61*a* may have any desired wave form since the firing of this tube is controlled on a magnetic basis by the relative current flow through the control winding 2709 and the biasing winding 2721.

In accordance with a further feature of the line ringing circuit 2700, the alternating voltage produced across winding 2706, which is used periodically to extinguish the control tube 2710 in the manner described above, is superimposed upon the positive supply potential so that current flows through the tube 2710 during the major portion of the alternating current cycle. With this arrangement the flow of current through the control winding 2709 is relatively large during periods when the tube 2710 is fired and the efficiency of the winding 2709 is substantially increased. In this connection it will be understood that if the increased efficiency of the winding 2709 is not required the tube 2710 may be operated directly from an alternating current supply as will be well understood by those skilled in the art.

Figure 27B:
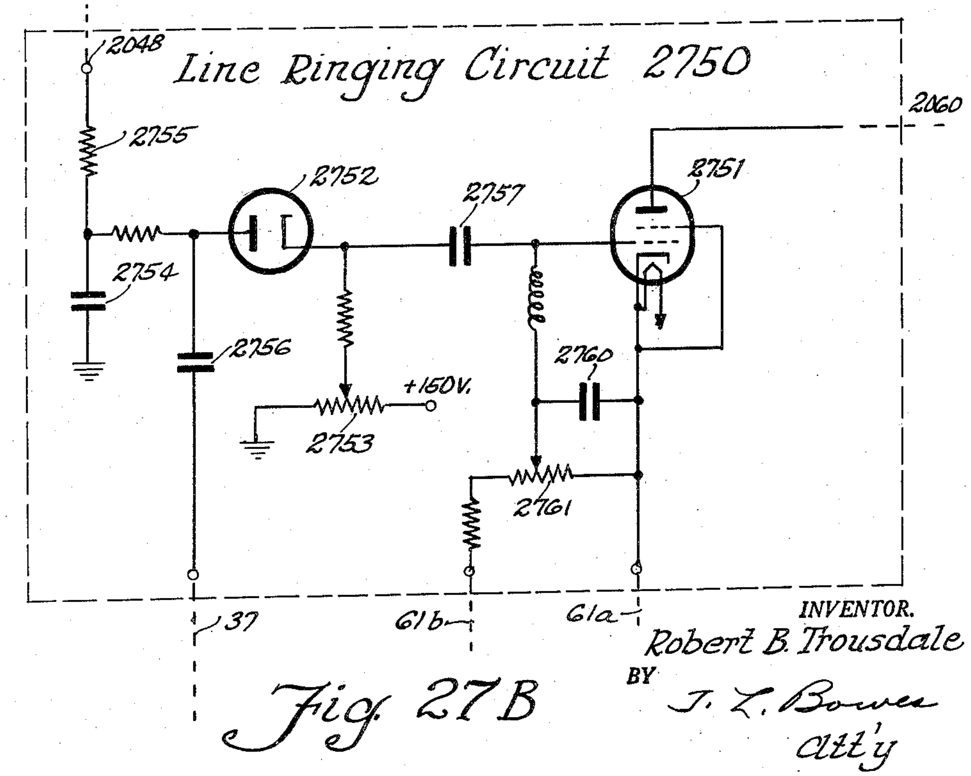

As another illustration of the universal applicability of the intelligence signal channel 2010 and the supervisory signal channel 2020, of the line circuit 10, these channels may be employed with the alternative line ringing circuit 2750 which is shown in detail in Fig. 27*b* of the drawings. Unlike the ringing circuits 2030 and 2700 described above, the line ringing circuit 2750 is of the 100 kilocycle carrier type and is identical in many respects to the corresponding system component shown and described in detail in my copending application, Serial No. 205,641, referred to above. While reference may be had to the above identified application for a complete and detailed description of a line ringing circuit of this type, for the purposes of the present invention it may be stated that a ringing control tube 2751, which is of the gaseous discharge commercial type 2D21, is provided for the purpose of controlling the transmission of ringing current from the conductor 61*a* over the conductor 2060 to the line 23. Also, a bias voltage which is isolated from ground is supplied over the conductor 61*b* normally to bias the first control grid of the control tube 2751 negatively. The line ringing circuit 2750 is adapted to function with an electronic telephone system wherein the transmission of ringing information is effected on a marginal basis on the connector signal pulses supplied to the distributor 15 over the conductor 51. Since the connectors 12*b*, 13*b*, and 14*b* of the party line ringing system of the present invention may be adapted to effect ringing information transmission in a similar manner, as will be described in more detail hereinafter, the line ringing circuit 2750 may be used in the present invention with connectors of the above described type which transmit ringing information on a marginal basis by an increase of approximately 50 percent in the amplitude of the connector signal pulses during ringing intervals. The ringing control tube 2751 is fired under the control of the diode rectifier 2752 which is normally biased against current conduction by connecting the cathode of this rectifier to a positive point on the potentiometer 2753. Accordingly, the 100 kilocycle supervisory carrier voltage impressed upon the conductor 37 is normally blocked by the rectifier 2752 so as to prevent the transmission of the 100 kilocycle voltage to the control grid of the tube 2751.

When the line circuit 10 is seized on a call incoming to the line 23 from another line of the system, pulses having an amplitude approximately 50 percent greater than the maximum amplitude of pulses which may be modulated with any voice, busy tone, dial tone, or ringback tone signal are supplied to the distributor 15 and have the effect of producing a substantial decrease in the voltage drop across the series anode resistors 2046 and 2047 (Fig. 20) which form the anode load circuit for the amplifier tube in the distributor 15 corresponding to the line circuit 10. This increase in potential which is produced at the terminal 2048 in the line circuit 10 is supplied to the line ringing circuit 2750 so that the condenser 2754 is charged to a higher voltage through the series resistor 2755. The increase in voltage across the condenser 2754 results in a polarity reversal of the voltage across the rectifier 2752 so that this rectifier is rendered conductive and the 100 kilocycle supervisory carrier is impressed upon the control grid of the tube 2751 over a path which includes the condenser 2756, the rectifier 2752, and the condenser 2757. The tube 2751 is thus fired by the above-described impression of the 100 kilocycle supervisory carrier on the control grid thereof to effect the transmission of ringing current to the line 23 in a manner identical to that described above in connection with the line ringing circuit 2030 of Fig. 20.

It will be understood that the 100 kilocycle supervisory carrier voltage impressed upon the conductor 37 is a continuous wave and control of the ringing on and off intervals is effected in the connector associated with the call under the control of the particular selected party line ringing signal as will be described in more detail in connection with the improved connector of the present invention.

In accordance with a feature of the intelligence signal channel 2010 of the present invention there is provided the neon tube 2050 which is connected across the primary windings 2011*a* and 2011*b* of the transformer 2011. The neon tube 2050 serves to shunt the transformer 2011 during high voltage transients existing across the line 23. These transients are caused by line interferences or by current surges due to dialing on the line when the line length is relatively short. It was found necessary to provide this shunting action for two reasons. First, the short loop dialing transients may be transmitted through the intelligence signal channel 2010 to the multiplexer 11 with such magnitude as to cause serious pulse distortion of the resultant dial signal envelope of the multiplexer pulses derived from the multiplexer 11 in the time position 64*b* of the calling line 23. Secondly, and more important, transients on the line 23 may back up through the hybrid circuit and appear on the plate of the distributor tube at point 2048. In a line circuit utilizing the line ringing circuit 2750, the above mentioned back up may of sufficient magnitude to operate the gating section of the circuit 2750 and fire the ringing control tube 2751. This results in bell tinkling at the calling subscriber's substation, as well as faulty dial pulse registration, since the ringing signal interferes with the dial pulse waveform derived from the multiplexer.

*Multiplexer 11*

As pointed out in the general description of the system, this circuit is provided for the general purpose of sampling control and intelligence signals developed on calling and called lines of the system in the time positions of each pulse frame individually assigned to the lines from which the signals are respectively derived and for transmitting multiplexer pulses modulated with the sampled control or intelligence signals over the multiplexer output conductor 50 to the finder-connector links 12, 13, and 14 of the system. The multiplexer circuit is capable of sampling signals appearing on each of the 100 lines of the system at a sampling repetition rate of 10 kilocycles.

The multiplexer 11 may be identical to the corresponding system component described in any one of the copending applications, Serial Nos. 134,974 and 205,641, referred to above. However, it will be appreciated from the foregoing general description that a given type of multiplexer is designed to operate with the intelligence and supervisory signal channels of a given type of line circuit. Thus, the type of line circuit disclosed in copending application, Serial No. 134,974, is adapted to supply the intelligence and control signals over the same conductor to the corresponding gate tube of the multiplexer 11, whereas in the copending application, Serial No. 205,641, the intelligence and control signals are supplied over separate paths to separate control grids of the corresponding gate tube in the multiplexer 11. Since the intelligence and supervisory signal channels of the line circuit 10 shown in Fig. 20 of the present invention are of the latter type, it will be understood that a multiplexer of the type shown in copending application, Serial No. 205,641, is to be used with the line circuits shown in Figs. 20 and 21. However, it will be understood that either type of line circuit and multiplexer combination may be employed insofar as the party line ringing system of the present invention is concerned.

*Finder 12a*

Figure 2:
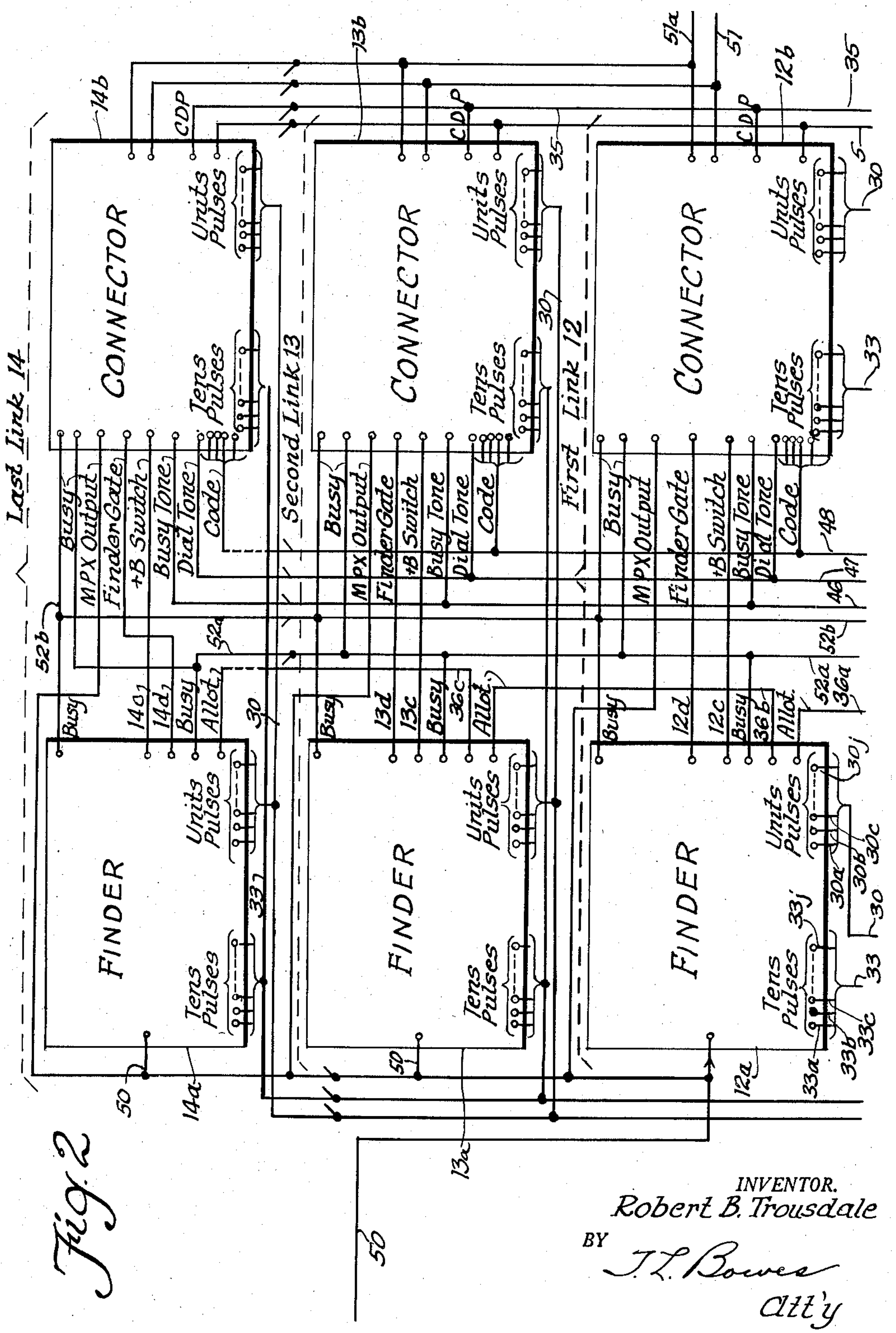
Figure 2A:
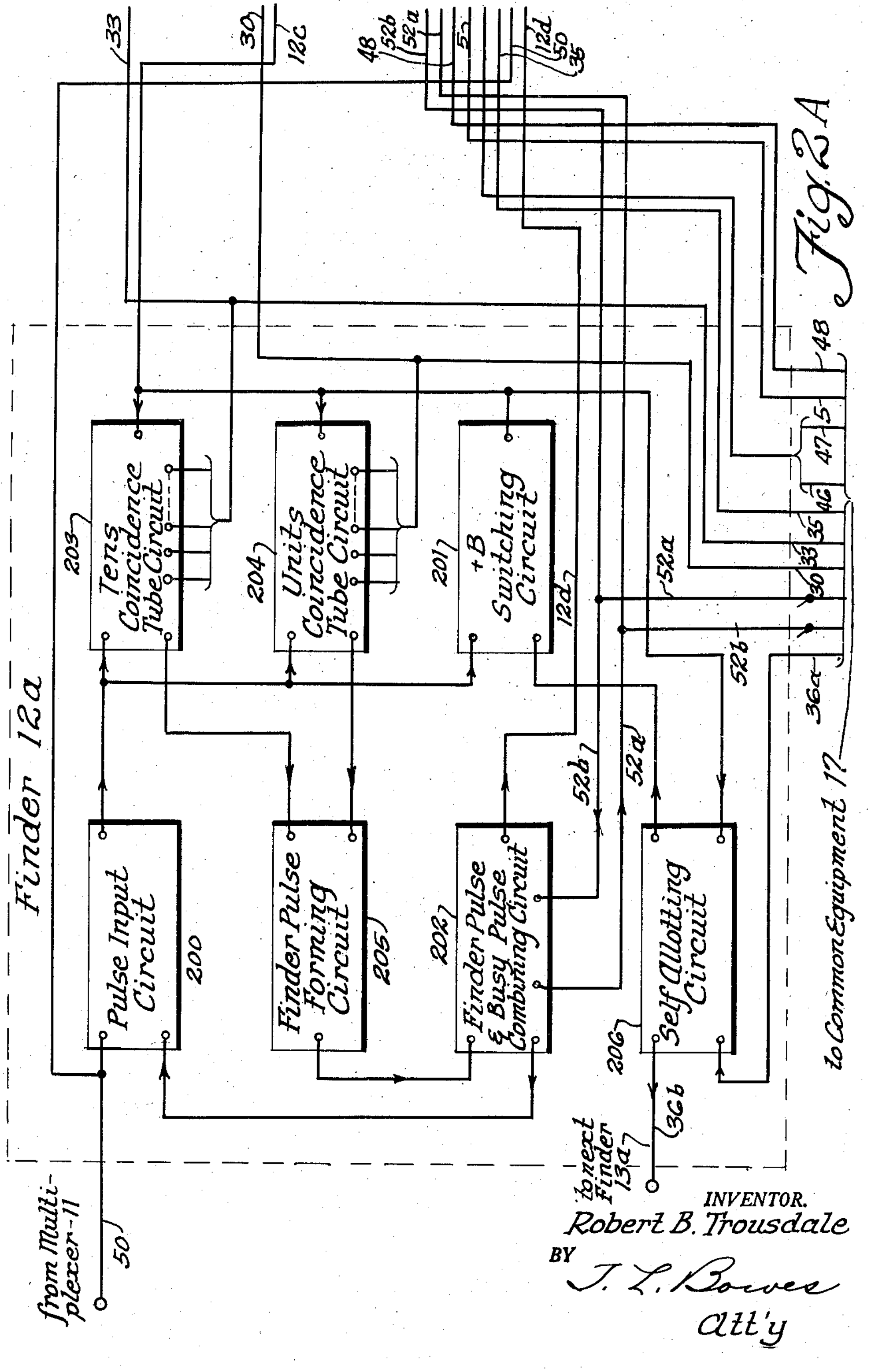

As previously explained in connection with Fig. 2*a* of the drawings, this finder generally comprises a pulse input circuit 200, a +B switching circuit 201, a finder pulse and busy pulse combining circuit 202, a tens coincidence tube circuit 203, a units coincidence tube circuit 204, a finder pulse forming circuit 205, and a self-allotting circuit 206. The functions performed by this circuit and the identified components thereof are also generally explained above with reference to the same figure of the drawings.

Figure 5:
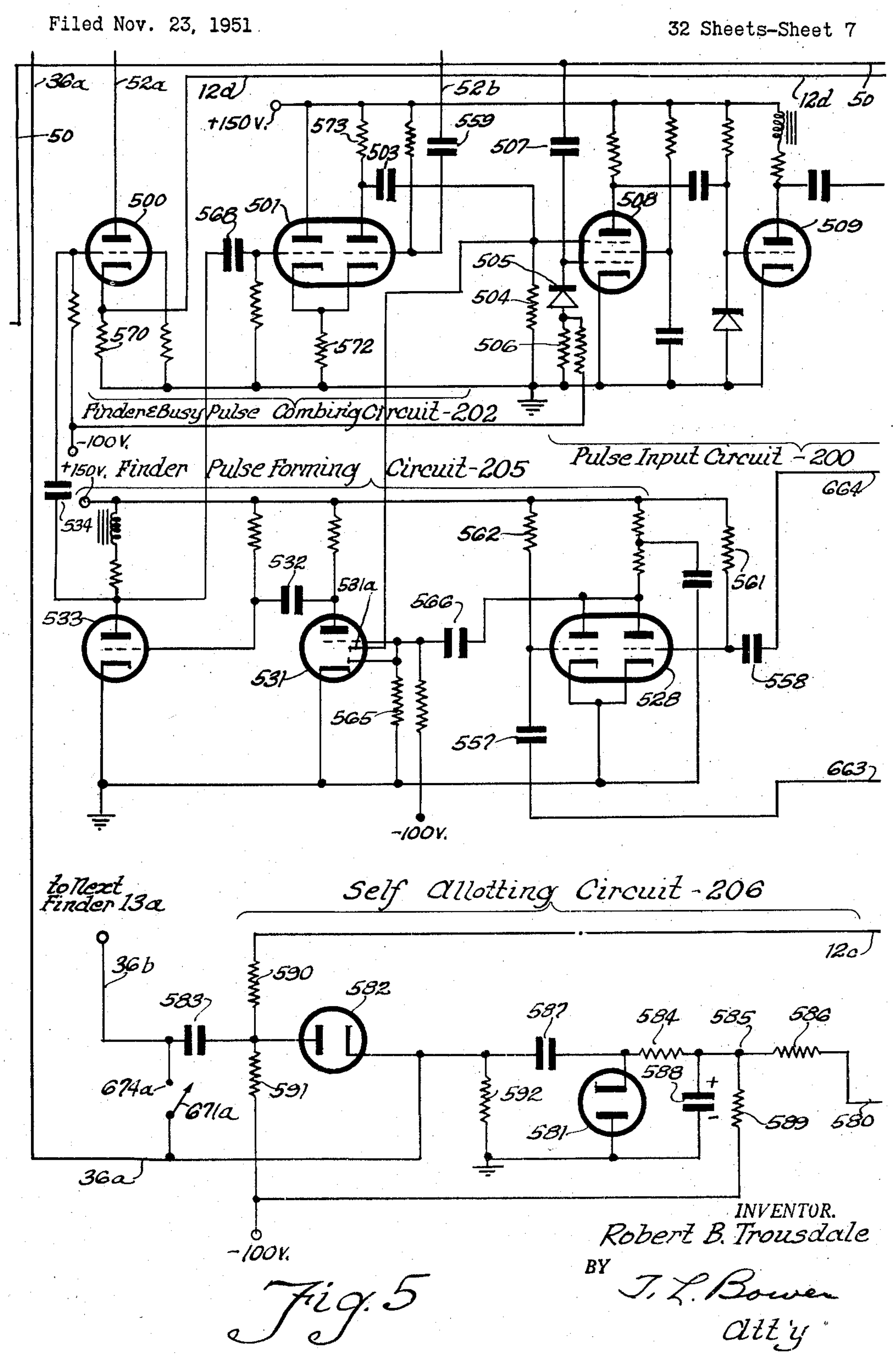
Figure 6:
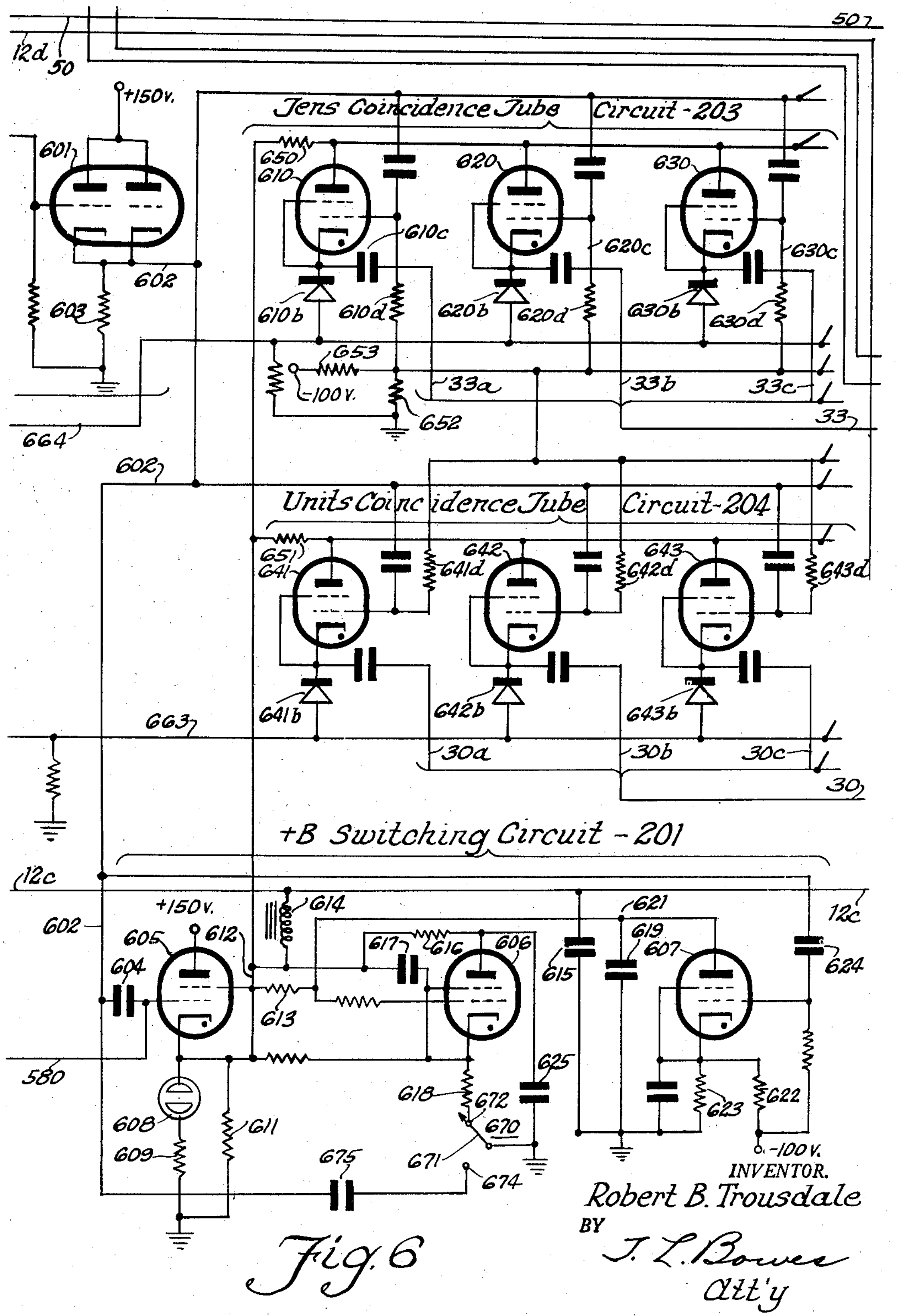

Referring now more particularly to Figs. 5 and 6 of the drawings wherein the detailed circuitry of the finder **12*a* is illustrated, it will be seen that the pulse input circuit 200 comprises a finder control gate tube 508, an inverter tube 509, and a cathode follower tube 601 connected in tandem in the order named and arranged to impress pulses gated therethrough upon a common conductor 602. These pulses are distributed over the conductor 602 to the input terminals of the tens coincidence tube circuit 203, the units coincidence tube circuit 204, and the +B switching circuit 201 in parallel. The self-allotting circuit 206 comprises a bias control tube 581 and an allotter gate tube 582 which are interconnected in the manner shown. This circuit is controlled by the 100 kilocycle supervisory carrier voltage supplied over the conductor 36*a* from the link coupling circuits 24 in the common equipment 17 and produces an enabling bias potential which is supplied over the conductor 580 to the +B switch tube 605. The allotter gate tube 582 is coupled over a path which includes the condenser 583 and the conductor 36*b* to the next succeeding finder 13*a* of the system to divert the 100 kilocycle supervisory carrier voltage to the next succeeding finder 13*a* when the finder 12*a* is taken into use in a manner to be described in more detail hereinafter. The +B switching circuit 201 comprises a +B switch tube 605, a +B switch timing tube 607 and a +B switch extinguishing tube 606 interconnected in the manner illustrated. This circuit is actuated under the joint control of pulses gated thereto from the pulse input circuit 200 over the conductor 602 and an enabling bias potential produced in the self-allotting circuit 206 and supplied over the conductor 580 to the control grid of the +B switch tube 605**.

The tens coincidence tube circuit 203 comprises ten gate control tubes, the first, second, and third of which are indicated at 610, 620, and 630 in horizontal alignment in Fig. 6 of the drawings. These gate control tubes have individually associated therewith ten pulse gating rectifiers including the rectifiers **610*b*, 620*b*, and 630*b* and are arranged to be jointly controlled by pulses delivered thereto from the pulse input circuit 200 over the conductor 602 and negative tens pulses successively transmitted thereto over the negative tens pulse conductors 33*a*, 33*b*, 33*c*, etc., from the tens pulse ring circuit 21. The pulses gated by the tens coincidence tube circuit 203 are impressed upon the finder pulse forming circuit 205 over a path which includes the conductor 664 and the condenser 585. Similarly, the units tube coincidence circuit 204 comprises ten gate control tubes of which the first, second, and third tubes 641, 642, and 643 are illustrated in horizontal alignment in Fig. 6. These tubes have pulse gating crystal rectifiers 641*b*, 642*b*, 643*b*, etc., individually interconnected therewith and are arranged to be jointly controlled by pulses delivered thereto over the conductor 602 from the pulse input circuit 200, and negative units pulses successively transmitted thereto over the units pulse conductors 30*a*, 30*b*, 30*c*, etc., from the units pulse ring circuit 20. Pulses gated by the units coincidence tube circuit 204 are transmitted to the finder pulse forming circuit 205 over a path which includes the conductor 663 and the condenser 557**.

The finder pulse forming circuit 205 comprises a pulse forming tube 528, a pulse clipping tube 531, and a pulse inverter tube 533 connected in tandem in the order named. As shown, the pulse forming circuit 205 is controlled solely by pulses gated thereto from the two coincidence tube circuits 203 and 204. Pulses developed at the output side of this circuit are impressed upon the pulse combining circuit 202 over two paths which respectively comprise the coupling condensers 534 and 568.

The pulse combining circuit 202 comprises a busy pulse and finder gate pulse output tube 500 and a pulse mixer tube 501, both of which tubes are arranged to be controlled by the finder pulse forming circuit 205. The tube 501 is also arranged to respond to busy pulses transmitted thereto over the busy pulse in conductor **52*b* from the link coupling circuits 24. This circuit functions to gate busy pulses over the busy pulse out conductor 52*a*, when the finder 12*a* is operatively associated with a calling line, to the link coupling circuits 24 in the common equipment 17 wherein these busy pulses are repeated across a low impedance source and supplied over the common busy pulse in conductor 52*b* to all of the finders and connectors of the system. The circuit 202 also functions to gate finder gate pulses to the conductor 12*d* when the finder 12*a* is operatively associated with a calling line. Circuit elements not specifically mentioned in the above description of the finder 12*a* are referred to below in describing the functions which they respectively perform in the finder circuit. All gas-filled tubes embodied in the finder 12*a*, namely the ten tubes of the tens coincidence tube circuit 203, the ten tubes of the units coincidence tube circuit 204, and the three tubes of the +B switching circuit 201 are highly sensitive thyratrons, preferably of the RCA commercial type 5696. The three dual triode tubes 501, 601 and 528 embodied in the finder are preferably of the commercial 6J6 type. The triodes 500, 509, and 533 are preferably of the commercial 6C4 type, the pentode 508 is preferably of the 6AS6 type, the pulse clipping triode 531 is preferably of the 6AQ6 type, and the rectifiers 581 and 582** together comprise a double diode rectifier of the commercial 6AL5 type.

In considering the operational details of the finder 12a it is first pointed out that when the finder is idle all tubes embodied in the circuits 203, 204 and 201 are de-ionized. With these circuits thus rendered inactive the pulse forming circuit 205 and pulse combining circuit 202 are likewise maintained in an inactive condition. Moreover, with the +B switching circuit 201 inactive the associated connector 12b is likewise inactive.

In the system of the present invention the finders 12a, 13a, and 14a of the system are arranged in a predetermined numerical order and are successively allotted to successive incoming calls under the control of the self-allotting circuit 206 included in each of the finders. In the illustrated embodiment the finder 12a is the first finder in the series and the finder 12a is normally continuously enabled by means of a 100 kilocycle carrier voltage which is supplied to the self-allotting circuit 206 of this finder over the conductor 36a to permit the finder 12a to respond to the first call placed on the system. However, the other finders of the system are disabled under the control of the self-allotting circuits thereof pending sizure of the finder 12a by the first calling line. When the finder 12a becomes operatively associated with the first calling line the self-allotting circuit 206 thereof operates to divert the 100 kilocycle carrier voltage over the conductor 36b to the self-allotting circuit of the succeeding finder 13a thereby enabling the finder 13a to accept the next call placed on the system. In an entirely similar manner, when the second finder 13a becomes operatively associated with the second call the 100 kilocycle carrier voltage is diverted over the conductor 36c to the next succeeding finder of the system so that successive links are enabled to handle successive calls placed on the system.

Considering now the details of the self-allotting circuit 206 of the finder 12a, the bias control rectifier 581 is normally conductive so as to produce current flow through the series connected resistors 584 and 589 from the negative terminal of the bias potential source. Accordingly, the voltage of the bias potential source is divided between the resistors 584 and 589 so that the junction point 585 thereof is substantially negative with respect to ground. The negative potential at the point 585 is impressed upon the control grid of the +B switch tube 605 over a path which includes the resistor 586 and the conductor 580 to prevent the tube 605 from firing even though gated positive multiplexer pulses are produced on the conductor 602 by the pulse input circuit 200 in a manner to be described in more detail hereinafter. Accordingly, so long as 100 kilocycle carrier voltage is not impressed upon the bias control rectifier 581 in the self-allotting circuit 206, the +B switching circuit 201 is disabled so as to prevent the link from being operatively associated with a calling line of the system. Accordingly, all of the finders except the first finder 12a are continuously disabled by means of the self-allotting circuits included therein. However, in the first finder 12a the 100 kilocycle supervisory carrier voltage is continuously impressed upon the self-allotting circuit 206 thereof over the conductor 36a and is coupled over the condenser 587 to the cathode of the bias rectifier 581. During the negative half cycles of the 100 kilocycle carrier voltage the rectifier 581 rectifies this voltage to produce across the condenser 588 a positive voltage with respect to ground which decreases the negative bias potential impressed upon the control grid of the +B switch tube 605 over the conductor 580 to such a value that the tube 605 is fired in response to positive multiplexer pulses gated to the conductor 602 through the pulse input circuit 200. It will be understood that in the other finders of the system no 100 kilocycle supervisory carrier voltage is supplied to the bias control rectifiers in the self-allotting circuits thereof so that the +B switching circuits of these finders are continuously disabled and these links are prevented from becoming operatively associated with the calling lines of the system.

When gated positive multiplexer pulses are impressed upon the conductor 602 by the pulse circuit 200 in the finder 12a, the +B switch tube 605 in the circuit 201 is fired to provide a +B switch potential on the conductor 12c in a manner to be described in more detail hereinafter. Accordingly, the +B switch potential impressed upon the conductor 12c energizes the controlled components in the connector 12b so that the link 12 becomes operatively associated with the first calling line of the system in the manner described generally above in connection with the general description of the system.

In the self-allotting circuit 206 of the finder 12a the allotter gate tube 582 is normally biased non-conductive to prevent the transmission of the 100 kilocycle carrier voltage from the input conductor 36a to the output conductor 36b associated with the finder 12a. Thus, the cathode of the allotter gate tube 582 is connected through the resistor 592 to ground and the anode thereof is connected to a negative potential on the voltage divider network comprising the resistors 590 and 591 which are connected between the +B switch conductor 12c and the negative bias potential source. Since the potential on the conductor 12c is equal to zero, until the +B switching circuit 201 is operated, it is obvious that the anode of the allotter gate tube 582 is operated at a negative potential with respect to the cathode potential thereof so that the tube 582 is normally blocked. However, when the link 12 becomes operatively associated with the first calling line of the system and the +B switching circuit 201 operates to impress a +B switch potential of approximately 140 volts upon the +B switch conductor 12c, the anode potential of the allotter gate tube 582 is increased sufficiently to permit the tube 582 to conduct. When the allotter gate tube 582 is rendered conductive in the manner described above, the 100 kilocycle carrier voltage which is continuously impressed upon the conductor 36a is diverted to the next succeeding finder 13a over a path which includes the allotter gate tube 582, the condenser 583, and the conductor 36b. In the finder 13a the 100 kilocycle carrier voltage impressed upon the conductor 36b reduces the bias potential normally produced by the self-allotting circuit thereof to permit the +B switching circuit of the finder 13a to respond to gated multiplexer pulses impressed thereon by the pulse input circuit thereof in the time position of the next calling line of the system. From the foregoing description it will be evident that the self-allotting circuits 206 of the successive finders of the system are effectively connected in series by means of the illustrated conductors 36a, 36b, 36c, etc., and the allotter gate tubes thereof are successively unblocked in response to seizure of the link to enable successive ones of the links to handle sucsive incoming calls of the system.

Operational details of the other components of the finder 12a may best be explained with reference to the functions performed by this finder in handling the above-described call originating at the substation A and routed to the substation B. In this regard it will be recalled from the above general description of the system that when the call is initiated on the line 23 serving the substation A, multiplexer pulses appearing in the time position 64b assigned to the calling line 23 and modulated with signals derived from this line are transmitted from the multiplexer 11 over the multiplexer output conductor 50 to each of the finders and connectors of the system. However, as described immediately above, none of the finders of the system except the finder 12a is permitted to respond to such multiplexer pulse transmission over the conductor 50 due to the operation of the self-allotting circuit therein so that only the link 12 is permitted to be operatively associated with the calling line. In this connection it will be understood that unless a 100 kilocycle supervisory carrier voltage is supplied to one of the finders of the system, all finders are rendered inoperative and the system is completely unable to handle calls. However, in the illustrated embodiment the 100 kilocycle supervisory carrier voltage is continuously supplied to the first finder 12*a* so as to permit this finder to handle the first call of the system.

The positive multiplexer pulses occurring on the conductor 50 in the time position 64*b* assigned to the calling line 23 are coupled through the condenser 507 to the first control grid of the gate tube 508. This control grid is normally biased beyond cutoff by means of a negative potential produced across the resistor 506 so that normally no current flows through the tube 508. However, the positive multiplexer pulses appearing on the conductor 50 overcomes the negative bias normally applied to this control grid and are amplified and inverted through the tube 508 to appear as negative pulses at the anode thereof. These negative gated multiplexer pulses are again amplified and inverted in the tube 509 and repeated across the output resistor 603 of the cathode follower tube 601 as gated positive multiplexer pulses which are connected over the conductor 602 to the coincidence tube circuits 203 and 204 and the +B switching circuit 201.

The first positive pulse thus producee on the conductor 602 is impressed upon the control grid of the thyratron +B switch tube 605 through the condenser 604 and has the effect of overcoming the negative bias potential produced on the conductor 580 by the self-allotting circuit 206 in the manner described above. In this connection it will be understood that in the absence of a 100 kilocycle carrier voltage supplied to the self-allotting circuit 206 the bias potential on the conductor 580 is sufficiently negative to present the positive gated multiplexer pulses on the conductor 602 from firing the tube 523. However, in the finder 12*a* the bias potential on the conductor 580 is just sufficiently negative normally to bias the tube 605 non-conductive and the first positive pulse produced on the conductor 602 overcomes this bias and fires the tube 605 to produce current flow through the cathode load resistor 611 thereof. After the tube 605 fires the grid thereof loses control so that thereafter the presence or absence of pulses on the conductor 602 cannot directly affect the ionized condition of the tube. With the tube 605 conducting the voltage of the 150 volt anode current source less the voltage drop through the tube 605 is impressed upon the conductor 612 and is supplied to the tens and units coincidence tubes circuits 203 and 204. This voltage has a magnitude of the order of 140 volts which is impressed across the neon indicator tube 608 and the resistor 609 to fire this tube and thus provide a visual indication that the finder 12*a* is in use. The voltage produced on the conductor 612 is impressed upon the +B switching conductor 12*c* over a path which includes a filter network consisting of a series choke impedance 614 and a shunt condenser 615. Likewise, the potential produced on the conductor 612 is applied to the anodes of the tubes 606 and 607 through the resistors 616 and 613 respectively.

In accordance with a feature of the above-described finder 12*a* of the present invention, the +B switch potential is applied directly to the anodes of the tens and units coincidence tubes over the conductor 612 instead of being connected through the filter including the inductance 614 and the condenser 615 to these tubes. Accordingly, the delay action which results when the +B switch potential is applied through the inductance 614 is substantially eliminated and firing of the coincidence tubes in the circuits 203 and 204 is accelerated. In addition, the above described arrangement for supplying +B switch potential directly to the anodes of the tens and units coincidence tubes provides the additional advantage of improving the regulation of the plate potential for these tubes with the result that the operation of the tens and units coincidence tubes is substantially more uniform. In this connection it will be understood that a great majority of the connector circuits utilize current from the +B switch conductor 12*c*, and during the progress of a call, draw steadily increasing amounts of current. Since this current is diverted through the choke coil 614, which has appreciable D. C. resistance, the regulation of the +B switch potential is relatively poor.

Normally the tubes of the tens coincidence tube circuit 203 are biased to prevent space current flow therethrough by the negative potentials impressed upon the control grids thereof from the bleeder resistors 652 and 653 through the isolating resistors 610*d*, 620*d*, 630*d*, etc., individual thereto. The tubes of the units coincidence tube circuit are similarly biased against space current flow therethrough by the negative potentials impressed upon the respective control grids thereof through the isolating resistors 641*d*, 642*d*, 643*d*, etc. When operating anode potential is supplied to the anodes of the gate control tubes of the circuits 203 and 204 these tubes are conditioned to fire under the joint control of the negative tens and units pulses respectively delivered to these circuits and the pulses gated to these circuits over the conductor 602 from the pulse input circuit 200. Accordingly, the pulses delivered in the time position 64*b* over the conductor 602 to the control grids of the tubes in the circuits 203 and 204 coact with the tens and units gate pulses which are negatively applied to the cathodes of these tubes to fire that tens coincidence tube which corresponds to the tens time position of the calling line in each pulse frame, and that units coincidence tube which corresponds to the units time position of the calling line 23. Accordingly in the illustrated call, the pulses developed on the conductor 602 in the time position 64*b* occur in coincidence only with the second tens pulse of each pulse frame and the third units pulse of each pulse frame so that only the tens coincidence tube 620 is fired in the circuit 203 and only the third units coincidence tube 643 is fired in the circuit 204. Once the tubes 620 and 643 are fired the control grids thereof lose control such that space current flow therethrough continues without interruption so long as the +B switching circuit 201 maintains operating potential upon the anodes thereof. Moreover, once the tube 620 has fired the other tens coincidence tubes are positively prevented from firing due to the voltage drop across the common anode resistor 650 which lowers the anode potential of these tubes to values at which firing of these tubes cannot occur. Similarly, the voltage drop developed across the resistor 651 when the tube 643 fires positively prevents any of the other nine units coincidence tubes in the circuit 204 from firing. In this connection it will be understood that the resistors 650 and 651 positively prevent more than one tube from firing in each of the two coincidence tube circuits 203 and 204 and thus prevent the finder 12*a* from being associated with more than one calling line.

When the tens coincidence tube 620 and the units coincidence tube 643 are rendered conductive in the manner explained above the pulse gating rectifiers 620*b* and 643*b*, respectively controlled thereby are unbiased to permit pulse transmission therethrough over the conductors 664 and 663, respectively, to the pulse forming circuit 205. In this regard it is noted that the negative pulses impressed upon the cathode of the tube 620 through the condenser 620*c* overcome the control grid bias produced across the common grid resistor 652 and drive the cathode of the tube 620 negatively to reduce the bias potential of this tube. When the amplitude of the negative pulses impressed upon the cathode of the tube 620 exceeds the bias potential of this tube the control grid-cathode section of this tube conducts to clamp the tops of these pulses to the control grid bias potential thereby preventing amplitude variations in the tens pulses gated by the rectifier **620*b*. In a similar manner the control grid-cathode portion of the units coincidence tube 643 clamps the negativemost portions of the units pulses impressed upon the cathode of the tube 643** to the bias potential to prevent amplitude variations therein. It will be understood that the above-described clamping action is provided without the necessity of providing separate clamping rectifiers, thus materially decreasing the complexity and cost of the tens and units coincidence tube circuits.

Referring now more particularly to the manner in which the finder pulse forming circuit 205 responds to the tens and units pulses gated thereto from the circuits 203 and 204, it is pointed out that normally both sections of the tube 528 are heavily conductive by virtue of the positive potentials impressed upon the control grids thereof through the grid current limiting resistors 561 and 562 from the positive terminal of the anode current source. The tens and units pulses gated to the control grids of the tube 528 are of sufficient amplitude to cut off space current flow through the respective sections of this tube. As a consequence, space current flow through both halves of the tube 528 is cut off during the short time interval of the units pulse which occurs during the gated tens pulse. Thus, once during each pulse frame a composite pulse consisting of the units pulse occurring in the time position **64*b* and the tens pulse occurring in the tens time position 73*a* is developed at the common anode terminal of both halves of the tube 528. These pulses which are developed at the common anode terminal of the tube 528 are of positive polarity and are impressed upon the control grid of the pulse clipping tube 531 through the condenser 566. Normally, the voltage drop across the resistor 565 is negatively applied to the control grid of the tube 531 to bias this grid beyond cutoff by an amount appreciably greater than the amplitude of either of the unwanted units and tens pulses impressed upon this control grid during each pulse frame. However, that portion of each composite pulse which exceeds in amplitude the bias voltage impressed across the resistor 565 is reproduced in amplified form as a negative pulse at the anode of the tube 531. The pulses thus gated by the tube 531 in the time position 64*b* are impressed upon the control grid of the pulse inverter tube 533 through the coupling condenser 532. These pulses are repeated at the anode of tube 533 as positive pulses occurring in the time position 64*b* assigned to the calling line 23** and are hereinafter referred to as finder pulses.

The finder pulses developed at the anode of the tube 533 in the manner just explained are impressed upon the control grid of the output tube 500 through the coupling condenser 534. In order to provide finder gate pulses which serve to condition the connector associated therewith to respond only to multiplexer pulses appearing on the multiplexer output conductor in the time position assigned to the calling line 23, which finder gate pulses are substantially isolated from the other signals of the system, the cathode circuit of the tube 500 is used solely as a source of such pulses which are transmitted over the conductor **12*d* as finder gate pulses to the connector 12*b*. Thus, the finder pulses which are impressed upon the control grid of the tube 500 are repeated across the cathode resistor 570 of this tube and are supplied over the finder gate conductor 12*d* to the conductor 12*b*. In this connection it will be understood that the finder gate pulses are used to control the response of the connector 12*b* and if extraneous pulses, such as busy pulses or the like, appear on the conductor 12*d* the connector 12*b* will respond falsely and interfere with the desired call. However, with the above-described arrangement wherein the finder gate pulses are produced in the isolated cathode circuit of the tube 500, the transmission of extraneous signals over the conductor 12*d*** is positively prevented.

As described generally in connection with the general description of the system, the transmission of line busy information in the present system is accomplished by providing separate busy pulse in and busy pulse out conductors which are multipled to all of the finders and connectors of the system, and providing a common busy pulse driver channel in the link coupling circuits 24 which is inserted between the busy pulse out conductor and the busy pulse in conductor to provide busy pulses of sufficient amplitude and at a sufficiently low impedance to drive all of the finders and connectors of the system. Accordingly, in the present invention the anode circuit of the output tube 500 is utilized as a busy pulse out circuit and the finder pulses which are repeated at the anode of the tube 500 as negative pulses are transmitted over the busy pulse out conductor **52*a* to the common anode resistor 751 (Fig. 7) in the link coupling circuits 24. In this connection it will be understood that the finder pulses which are supplied to the control grid of the output tube 500 are of the same time duration and in fact correspond exactly to the units pulses corresponding to the particular pulse time position of the calling line. Accordingly, the finder pulses may be utilized as busy pulses, which are repeated to all of the finders and connectors of the system in the manner described in detail above, and may also be used as finder gate pulses which are transmitted over the conductor 12*d* to the connector 12*b* to condition this connector to respond only to multiplexer pulses appearing on the multiplexer output conductor 50** in the time position assigned to the calling line.

Busy pulses which are amplified in the link coupling circuits 24 in the manner described above, are transmitted over the busy pulse in conductor **52*b* and through the coupling condenser 559 to the right hand control grid of the pulse mixer tube 501 along with any other busy pulses applied to this conductor as a result of other lines of the system being busy. In the absence of the facilities described below, the busy pulses thus impressed upon the right control grid 501 in the time position 64*b* would have the effect of biasing the suppressor grid of the finder control gate tube 508 to cutoff, thus preventing the desired multiplexer pulses from being gated by this tube. To prevent this action from occurring the left hand section of the tube 501 is supplied with positive finder pulses which are impressed upon the left control grid of the tube 501 directly from the anode of the tube 533 through the coupling condenser 568. These finder pulses have approximately twice the amplitude of the busy pulses coincidentally impressed upon the right control grid of this tube so that heavy space current flow through the left section of the tube 501 and the common cathode resistor 572 occurs during each finder pulse interval. The increase in anode current flow through the left section of the tube 501 during each finder pulse interval has the effect of increasing the bias on the right section of this tube to such an extent that current flow through the anode resistor 573 and the right section of the tube 501 drops to a very low value. As a consequence, the voltage drop across the resistor 573 is reduced to a very low value permitting charging current to flow from the positive terminal of the anode current source through this resistor, the condenser 503 and the diode section 531*a* of the pulse clipping tube 531 to the grounded terminal of the anode current source. Thus, the condenser 503 is charged to a relatively high voltage level during the finder pulse interval. At the end of each such interval the voltage across the condenser 503 is negatively applied to the suppressor grid of the gate tube 508 in opposition to the voltage drop across the right section of the tube 501 and the cathode load resistor 572. The voltage across the condenser 503 predominates sufficiently to bias the suppressor grid of the tube 508 beyond cutoff. Moreover, the described charging action of the condenser 503** occurs during the time position 64*b* of each pulse frame. Further, the discharge path for this condenser, which includes the resistor 504, has such a long time constant that the condenser 503 is not appreciably discharged between successive charging intervals. As a consequence, the tube 508 is biased beyond cutoff by the voltage across the condenser 503 throughout each pulse frame except the particular interval spanned by the time position 64*b* of each pulse frame. During this interval of each pulse frame the right anode of the tube 501 becomes highly positive to overcome the voltage across the condenser 503 and thus lower the bias on the suppressor grid of the tube 508 so that this tube can conduct.

From the preceding explanation it will be understood that pulses from the multiplexer 11 are permitted to enter the finder 12*a* only during those intervals when finder pulses are developed by the circuit 205 so that the finder control gate tube 508 is responsive only to multiplexer pulses in the time position of the calling line.

Referring now more particularly to the operation of the +B switching circuit 201, it is pointed out above that the +B switching tube 605 is fired under the influence of the pulses gated by the tube 508 in the time position 64*b* immediately the finder 12*a* is taken into use to handle the call initiated at the substation A and that when space current flow through this tube is established in operating anode potential of 140 volts appears at the cathode of this tube. After this tube is fired, deionization thereof is under the control of the two associated tubes 606 and 607. More specifically, the extinguishing tube 606 is provided to deionize the tube 605 when the call is abandoned or terminated, while the +B switch timing tube 607 is provided to prevent undesired deionization of the tube 605 during the open circuit periods of dial impulses dialed through operation of the impulsing contacts 2005 at the calling substation, hook switch flashing intervals, and other periods of short duration when the loop circuit extending from the substation A to the line circuit 10 may be interrupted. Normally, i. e., with the circuit 201 inactive, the condenser 619 is completely discharged through the resistors 613 and 611 so that the terminal 621 thereof is at substantially zero potential. Also, with the circuit 201 inactive, the negative 100 volts of the bias potential source is divided between the two resistors 622 and 623 in the ratio of five volts across the resistor 622 and 95 volts across the resistor 623. Thus the cathode of the tube 607 is normally maintained at a potential which is 95 volts negative with respect to ground.

When the +B switch tube 605 fires in the manner explained above, the condenser 625 is charged to the full value of the voltage across the resistor 611 through the resistor 616, and operating anode potential is supplied to the tube 606. Also, the condenser 617 is charged through the cathode resistor 618 to the full value of the voltage across the resistor 611. Charging of the condenser 617 over this path drives the cathode terminal of the resistor 618 highly positive during the initial portion of the charging interval. Concurrently with charging of the condenser 617, a charging path for the condenser 619 is established from the cathode terminal of the resistor 611 through the timing resistor 613. Initially, the major portion of the charging voltage appears across the resistor 613 and a very small portion thereof appears across the condenser 619. Similarly, the major portion of the charging voltage for the condenser 617 initially appears across the cathode resistor 618 immediately after the tube 605 fires. Thus, during the initial portion of the condenser charging interval, the control grid of the tube 606 is held at ground potential whereas the cathode of the tube is driven highly positive. The grid of the tube 606 is thus effectively biased negative relative to the tube cathode by an amount equal to the voltage drop across the resistor 618. This bias prevents the tube 606 from firing.

As explained above, the grid of the tube 607 is normally biased approximately five volts negative relative to the tube cathode by the voltage across the resistor 622. This bias voltage prevents the tube 607 from firing in the absence of positive pulses on the output conductor 602 of the pulse input circuit 200. However, immediately positive pulses are gated to this conductor by the pulse input circuit 200 they are impressed upon the control grid of the tube 607 through the condenser 624 and serve to drive this control grid positive relative to the tube cathode and fire the tube. It will thus be apparent that the tubes 607 and 605 are fired substantially simultaneously. When the tube 607 is fired, current flows through this tube and the condenser 619 in a circuit which extends from the grounded terminal of the resistor 623 through the condenser 619 and the space current path of the tube 607 to the cathode terminal of the resistor 623. Thus, the voltage across the resistor 623 less the voltage drop through the tube 607 is impressed across the condenser 619 immediately the tube 607 fires. As a consequence, the circuit terminal 621 is driven approximately 80 volts negative with respect to ground. The negative potential thus developed at the terminal 621 is directly impressed upon the control grid of the tube 606 to bias this grid highly negative with respect to the cathode of the tube and thus prevent the tube from firing regardless of the voltage across the cathode resistor 618. When the voltage across the condenser 619 rises to approximately 80 volts negative the current flow through the tube 607 drops to the extinction point and is interrupted. The condenser 619 now starts to charge through the resistor 613 to the positive potential of 140 volts across the resistor 611. The charging rate of the condenser 619 is obviously determined by the time constant of the series circuit comprising this condenser and the resistor 613. When the potential of this terminal is reduced to a value of approximately 60 volts negative the voltage across the tube 607 is increased to a value at which this tube refires. When the tube 607 refires the voltage across the condenser 619 instantly arises to a value of 80 volts to again produce deionization of the tube 607. The described relaxation type of operation of the tube 607 and condenser 619 continues so long as an off hook condition persists at the calling substation A.

During the open circuit or break period of each dial impulse the transmission of multiplexer pulses to the finder 12*a* in the time position 64*b* assigned to the calling line 23 is arrested so that the tube 607 cannot refire after it is first extinguished during the initial portion of the dial impulse break period. Due to the long time constant of the condenser discharging circuit the dial impulse break period is not long enough to charge the condenser to a point at which the negative bias on the control grid of the tube 606 becomes insufficient to prevent this tube from firing. When the dial impulse break period ends to cause resumption of the pulse gating operation of the circuit 200 the tube 607 immediately fires to recharge the condenser 619 and raise the negative potential of the terminal 621 to the negative 80 volt value. During the closed circuit period of each impulse the described relaxation operation of the tube 607 and condenser 619 is resumed and this action continues after the dialing operation is completed and so long as the receiver at the calling substation is held off hook.

When the call is abandoned or terminated, gating of multiplexer pulses to the conductor 602 by the pulse input circuit 200 is interrupted in the manner described above. Accordingly, the condenser 619 is permitted to charge through the resistor 613 from the cathode resistor 611 so that the negative potential of the terminal 621 is decreased to a value such that the tube 606 fires. In firing, the tube 606 incidentally discharges the condenser 625 through the space current path thereof and the resistor 618. Thus a voltage of approximately 130 volts is developed across the resistor 618. This voltage spike is additively combined with the 140 volts across the charged condenser 617 to produce a voltage across the cathode resistor 611 of approximately 270 volts. Thus, the cathode of the tube 605 is driven positive relative to the anode of this tube and space current flow through the tube is interrupted and operating potentials are removed from the conductors 612 and 12*c*. As a consequence the tubes 620 and 643 in the circuits 203 and 204 are deionized, the tube 606 is deionized, and all gas filled tubes of the connector 12*b* are deionized. Following deionization of the identified tubes the connector 12*a* and the conductor 12*b* are fully restored to normal.

In accordance with an important feature of the present invention there is provided facilities for holding the link 12 continuously associated with a particular calling line regardless of whether or not the call is terminated at the calling line. There is also provided facilities for holding the link 12 completely out of service to permit repairs, tube replacements, and the like to be performed on the link without interrupting service to the other links and while maintaining the above-described self-allotment of successive links to successive calling lines of the system. More specifically there is provided in each of the finders, such as the finder 12*a*, a hold switch indicated generally at 670. The hold switch is provided with a first section including the movable arm 671 and the fixed contacts 672 and 674, and a second section including the movable arm 671*a* and the fixed contact 674*a*. When the movable arm 671 of the hold switch 670 is connected to the contact 672, the resistor 618 is connected to ground and the operation of the +B switching circuit 201 is identical to that described above. When it is desired either to hold the link 12 continuously associated with one of the calling lines of the system or to hold the link 12 idle, the movable arm of the switch 671 of the switch 670 is moved to the contact 674 so that the resistor 618 in the cathode circuit of the extinguishing tube 606 is open circuited and the condenser 675 is connected from the output conductor 602 of the pulse input circuit 200 to ground. At the same time the movable arm 671*a*, which is mechanically ganged with the arm 671, is moved to the contact 674*a*. In this position of the hold switch the resistor 618 in the cathode circuit of the extinguishing tube 605 is open circuited so that the finder 12*a* remains continuously connected to a seized calling line even though the calling condition on the calling line is terminated by the subscriber since the extinguishing tube 606 is rendered incapable of firing to extinguish the +B switch tube 605. On the other hand, if the finder 12*a* is not operatively associated with a calling one of the lines when the switch 670 is actuated to connect the contacts 671 and 674 thereof, the finder 12*a* is prevented from seizing a calling line so that servicing of the finder may be accomplished. In this position of the hold switch 670 the condenser 675 by-passes the gated positive multiplexer pulses which are impressed upon the conductor 602 when a call is initiated on a calling line so that these pulses are prevented from appearing at the control grid of the +B switch tube 605 and this tube is thereby prevented from firing. As a result, the finder is held in an idle condition to permit servicing thereof. Concurrently with closure of the switch contacts 671 and 674 the switch contacts 671*a* and 674*a* are closed so as to by-pass the self-allotting circuit 206 in the finder 12*a* and connect the conductors 36*a* and 36*b* directly together. With this arrangement the 100 kilocycle supervisory carrier voltage is automatically diverted to the next succeeding finder 13*a* of the system when the hold switch is thrown to the position in which the link 12 is made idle. Accordingly, the self-allotment of links on the numerical basis in which they are arranged continues in the same manner as described heretofore.

*Connector 12b*

Figure 2B:
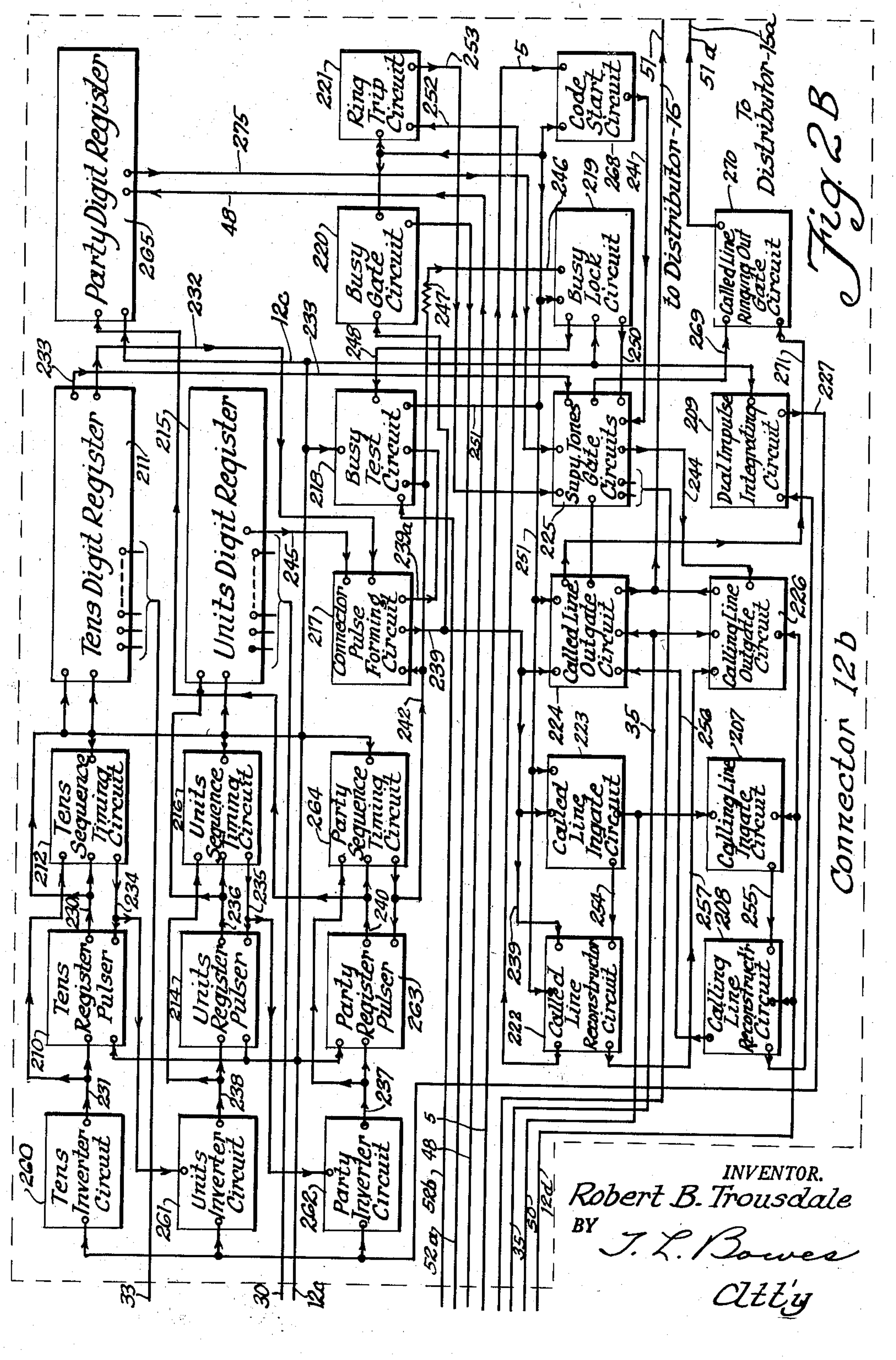
Figure 3:
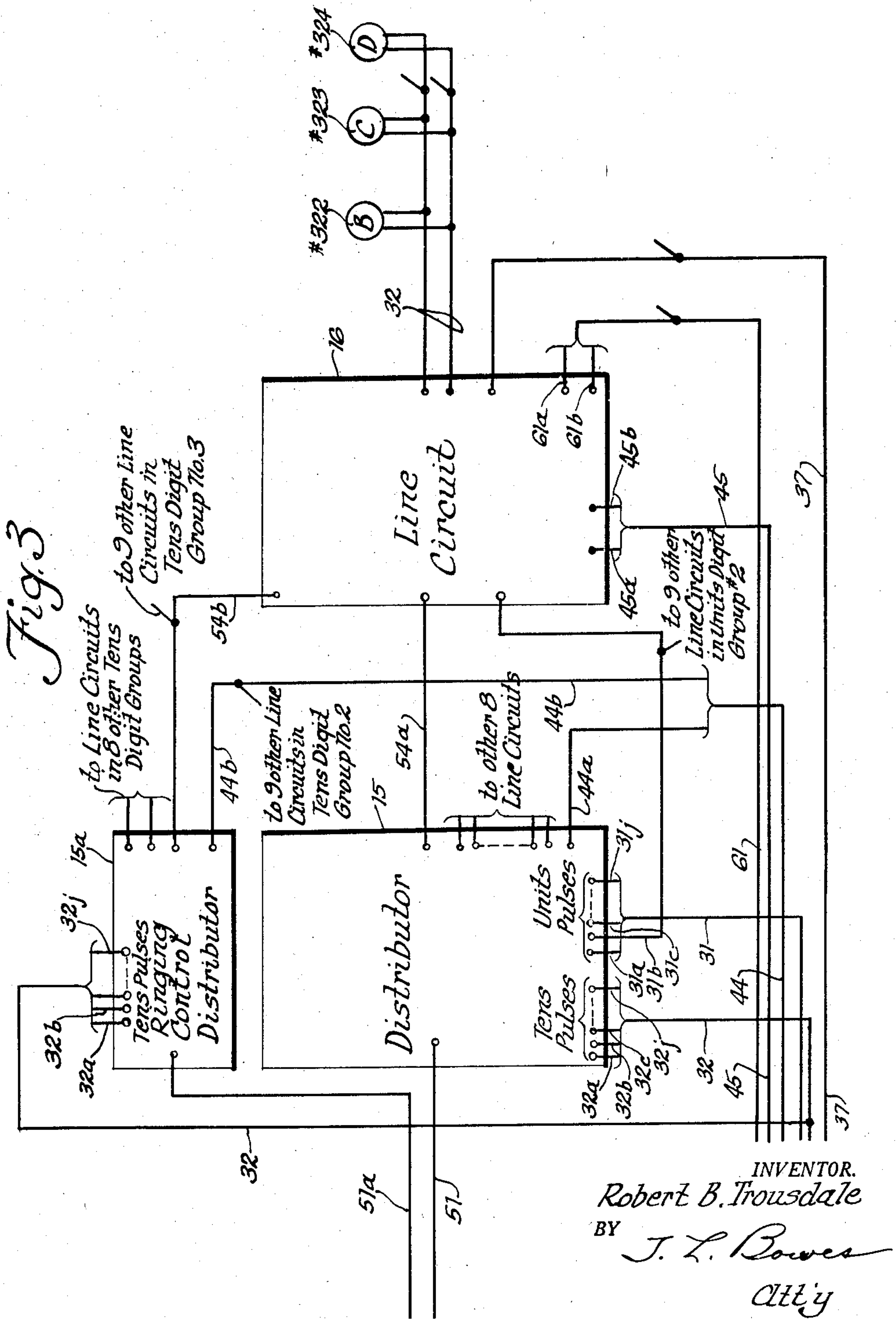
Figure 4:
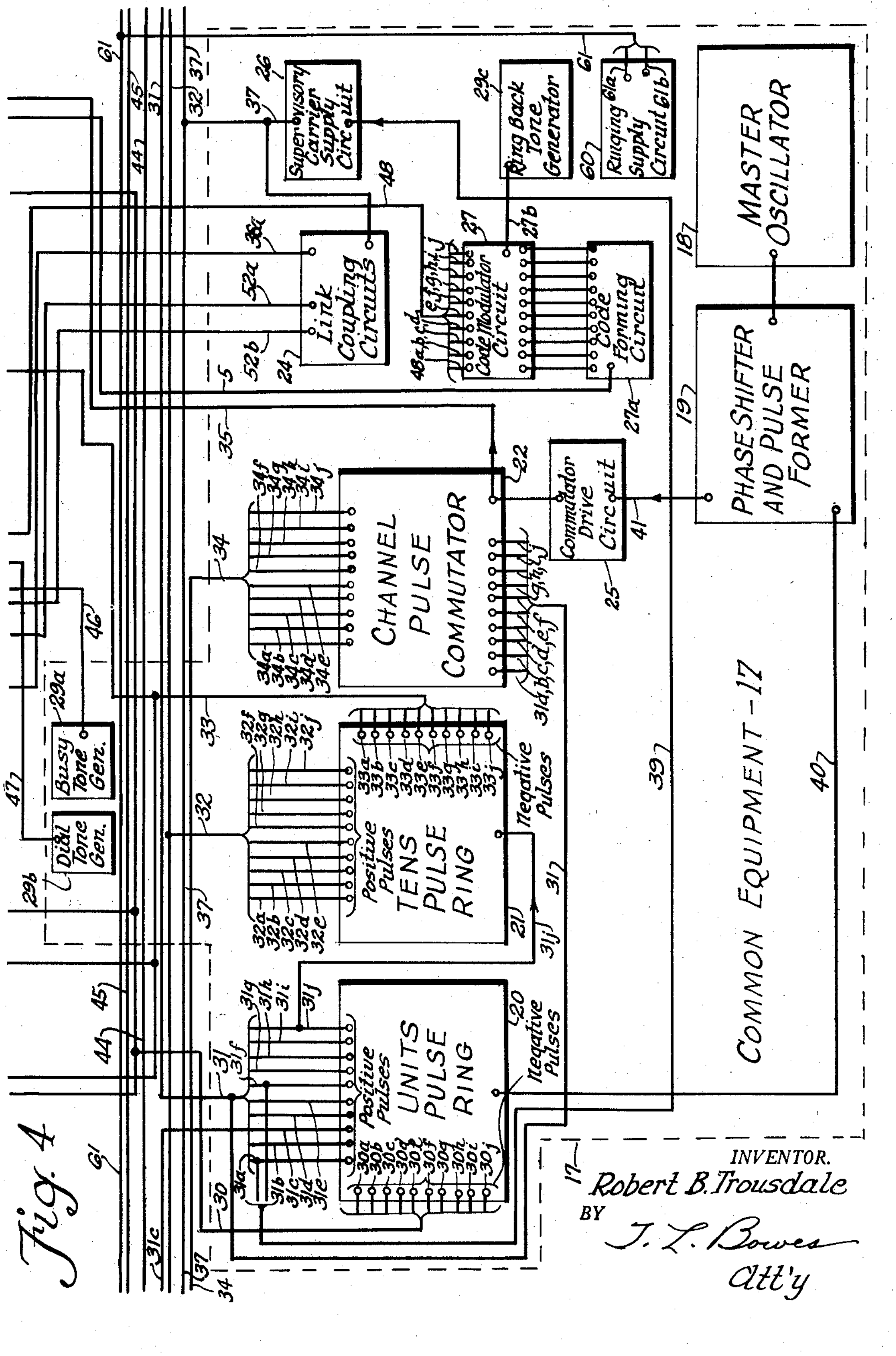

As explained generally in connection with Fig. 2B of the drawings, this connector generally comprises calling and called line in gate circuits 207 and 223, calling and called line out gate circuits 226 and 224, calling and called line reconstructor circuits 208 and 222, a dial impulse integrator circuit 209, tens, units, and party register pulsers 210, 214, and 263, tens, units, and party sequence timing circuits 212, 216, and 264, tens, units, and party inverter circuits 260, 261, and 262, and tens, units, and party digit registers 211, 215, and 265. The connector 12*b* is also diagrammatically illustrated in Fig. 2B of the drawings as comprising a connector pulse forming circuit 217, a busy test circuit 218, a busy gate circuit 220, a ring trip circuit 221, a busy lock circuit 219, supervisory tone gate circuits 225, a code start circuit 268, and a called line ringing out gate circuit 270. The functions performed by the connector and the above identified components thereof are also generally described above with reference to Fig. 2B of the drawings.

Figure 8:
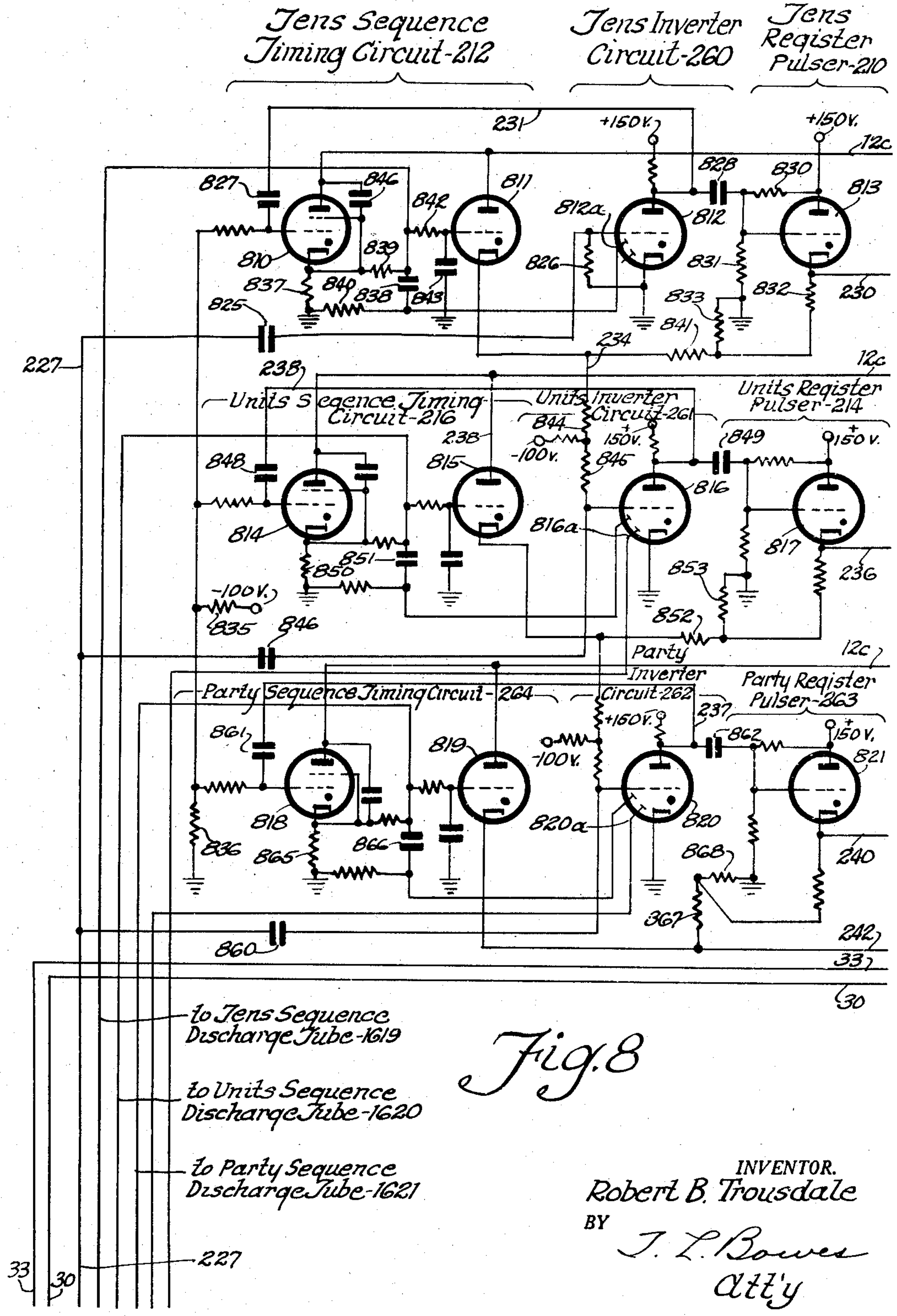
Figure 9:
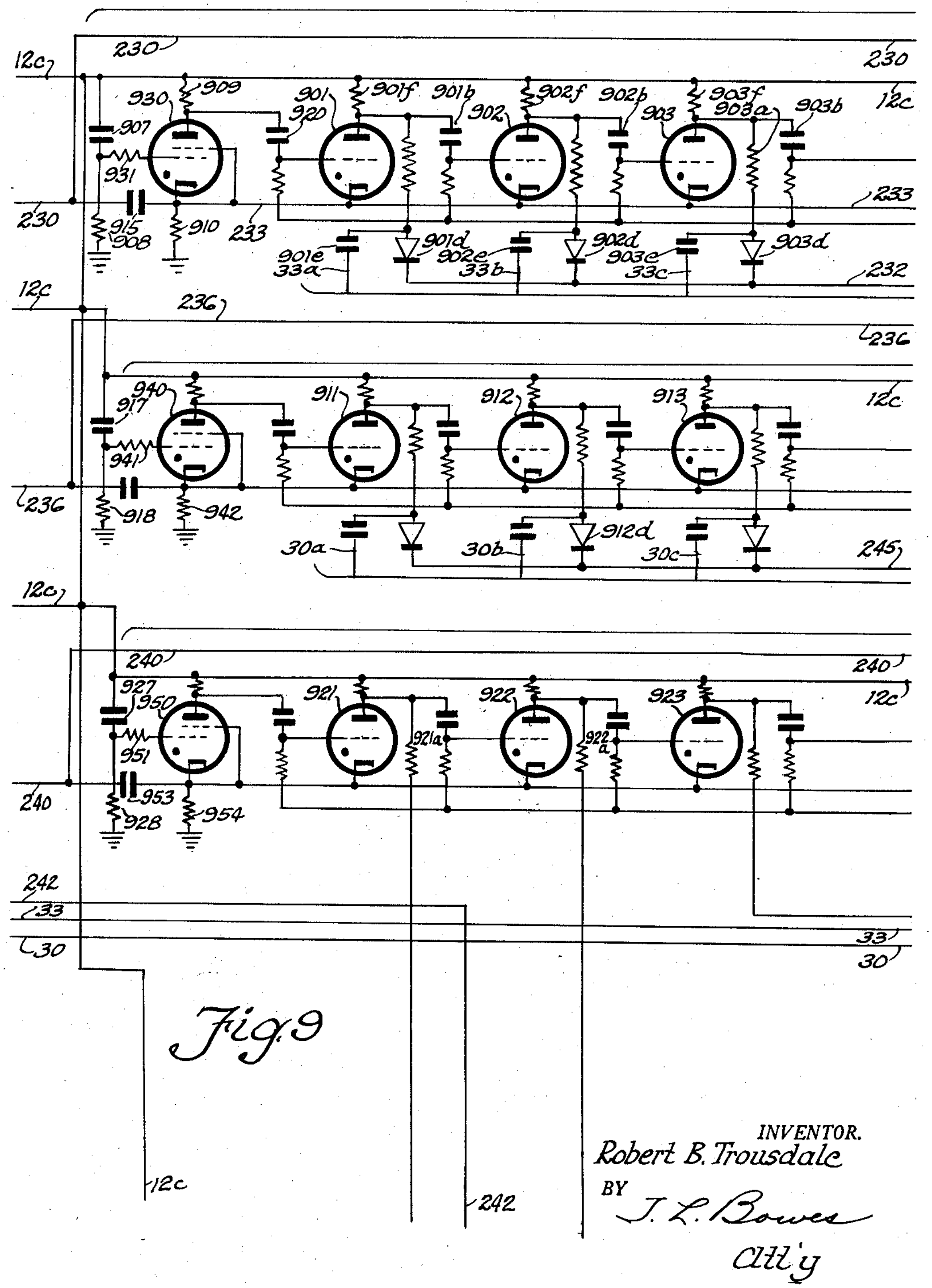
Figure 10:
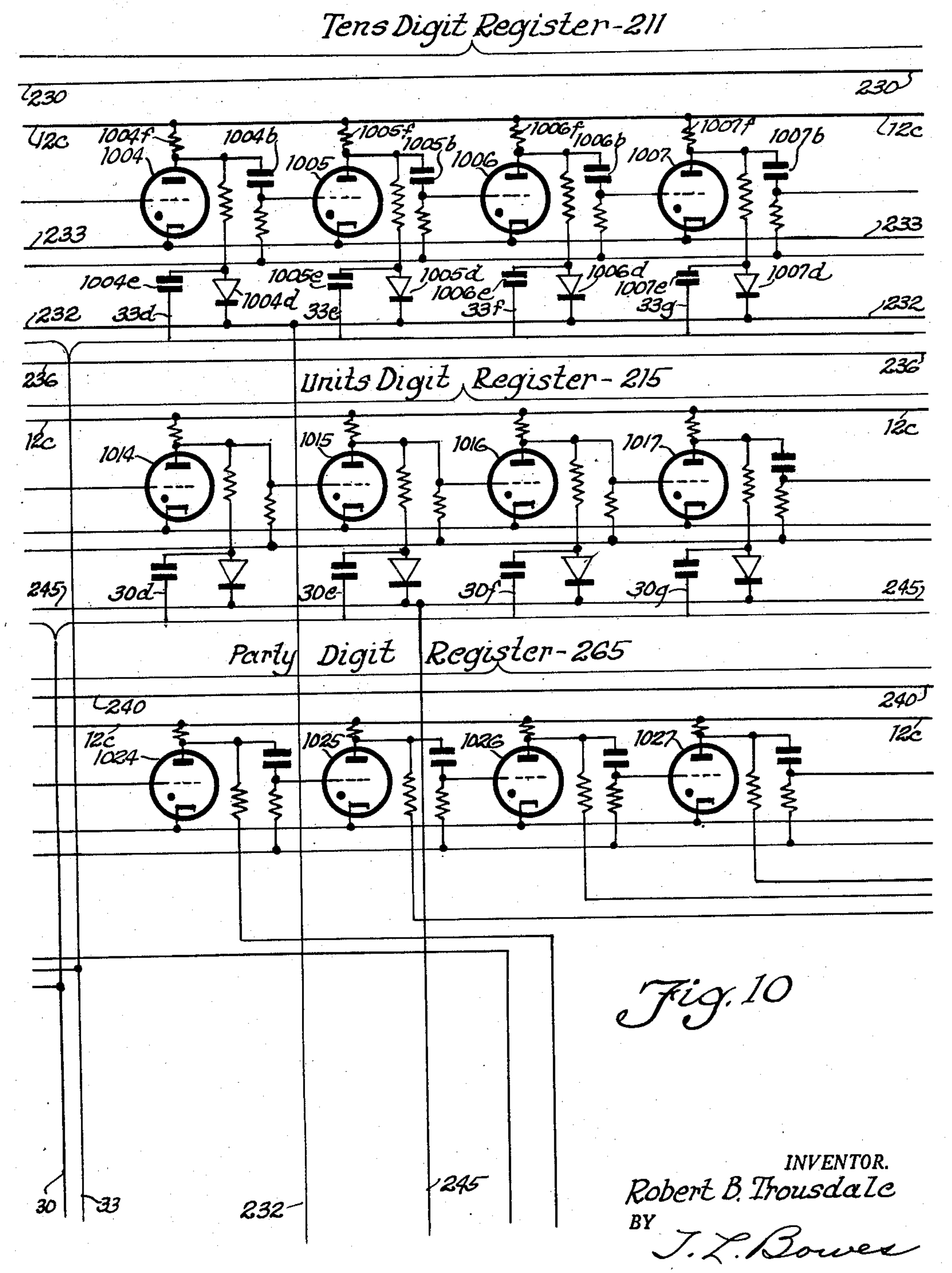
Figure 11:
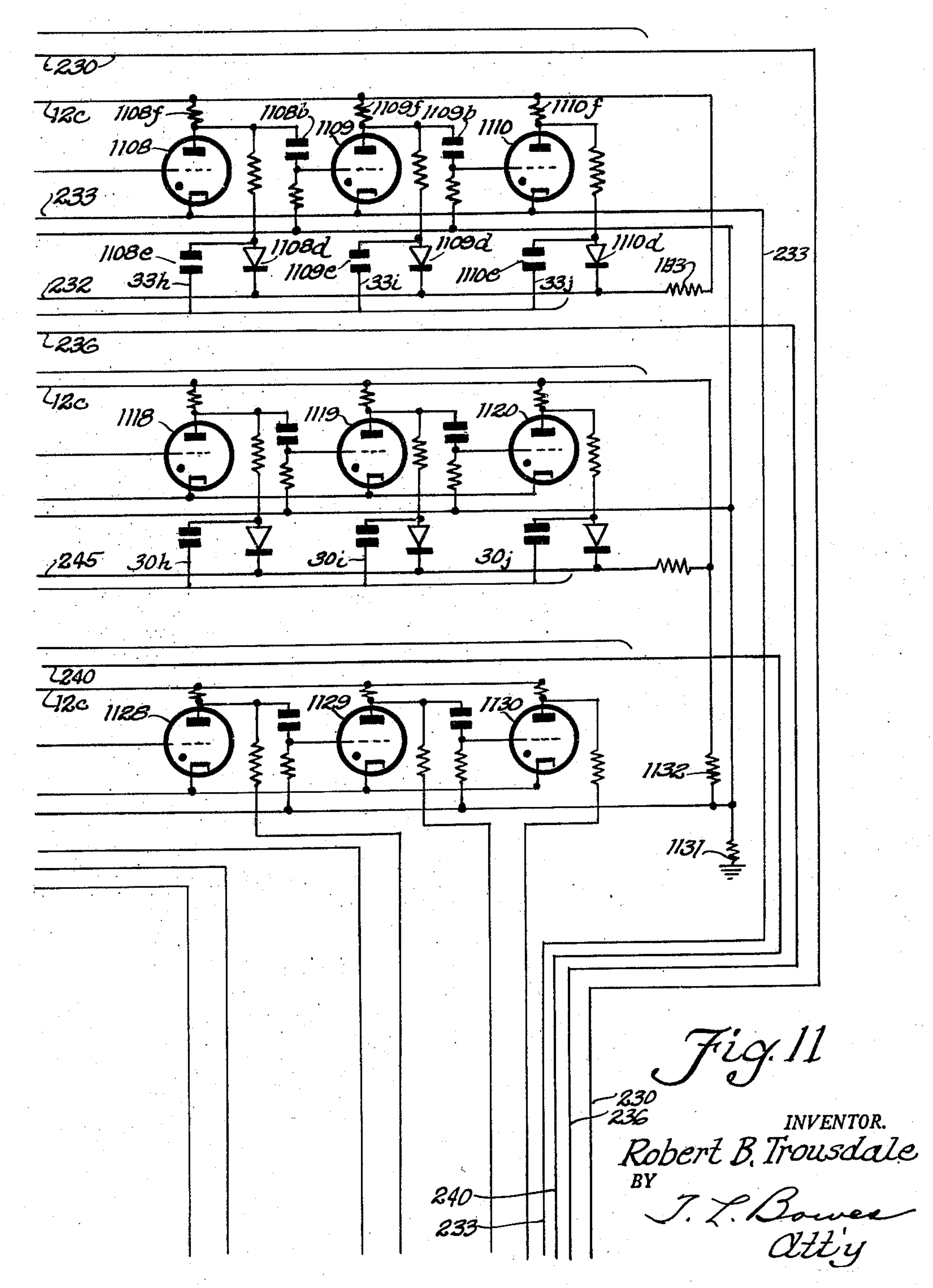
Figure 14:
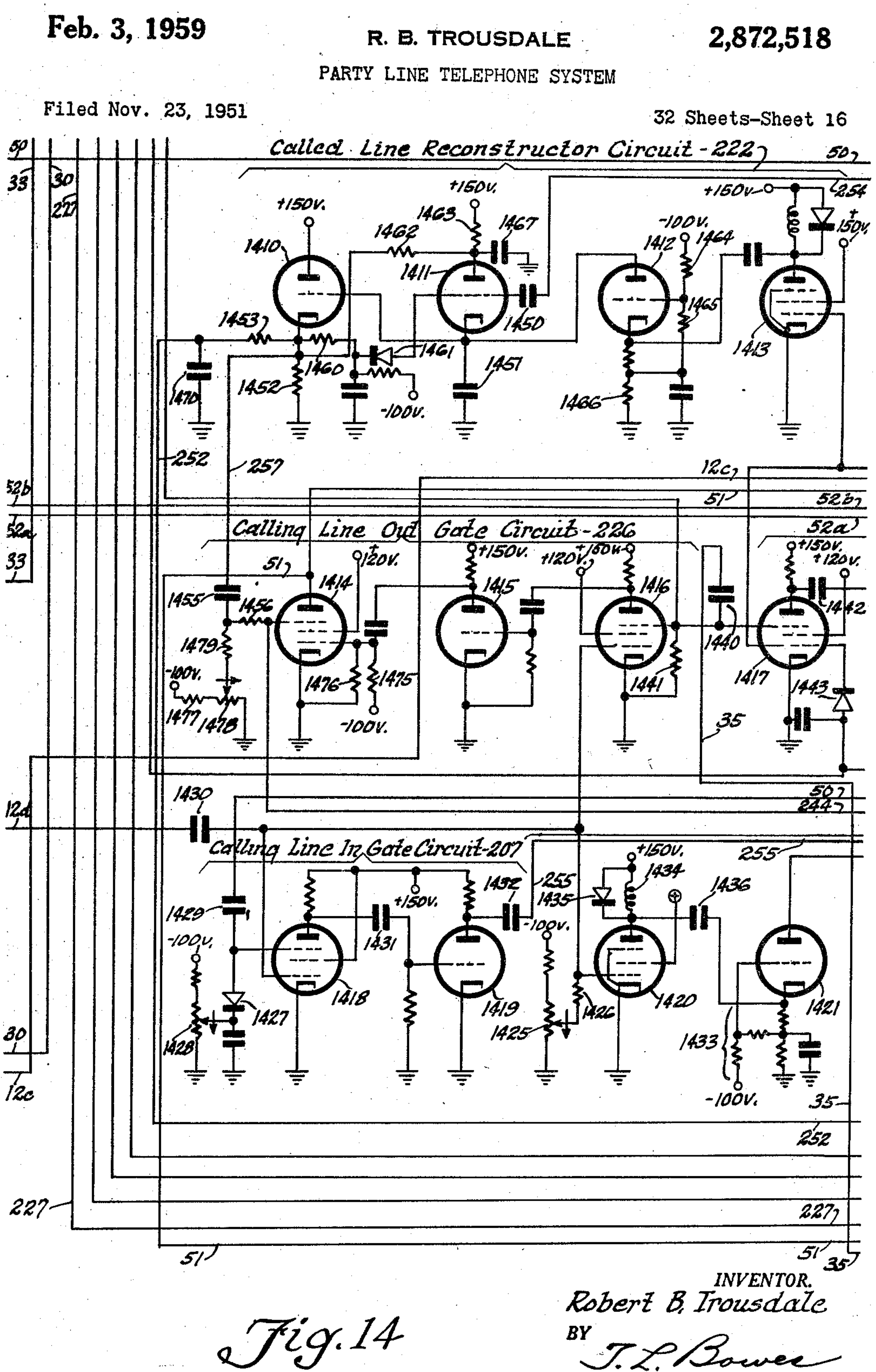
Figure 15:
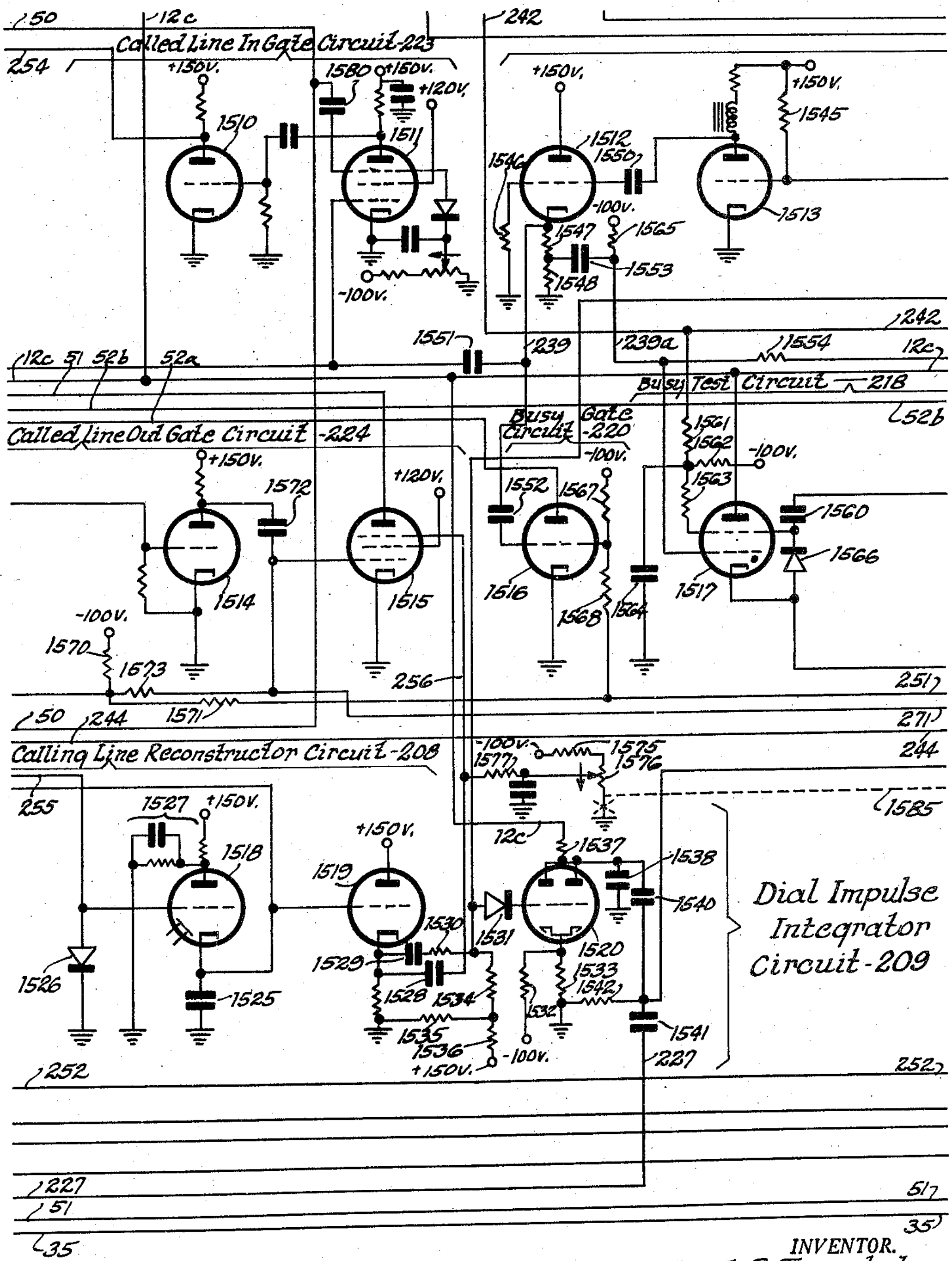
Figure 16:
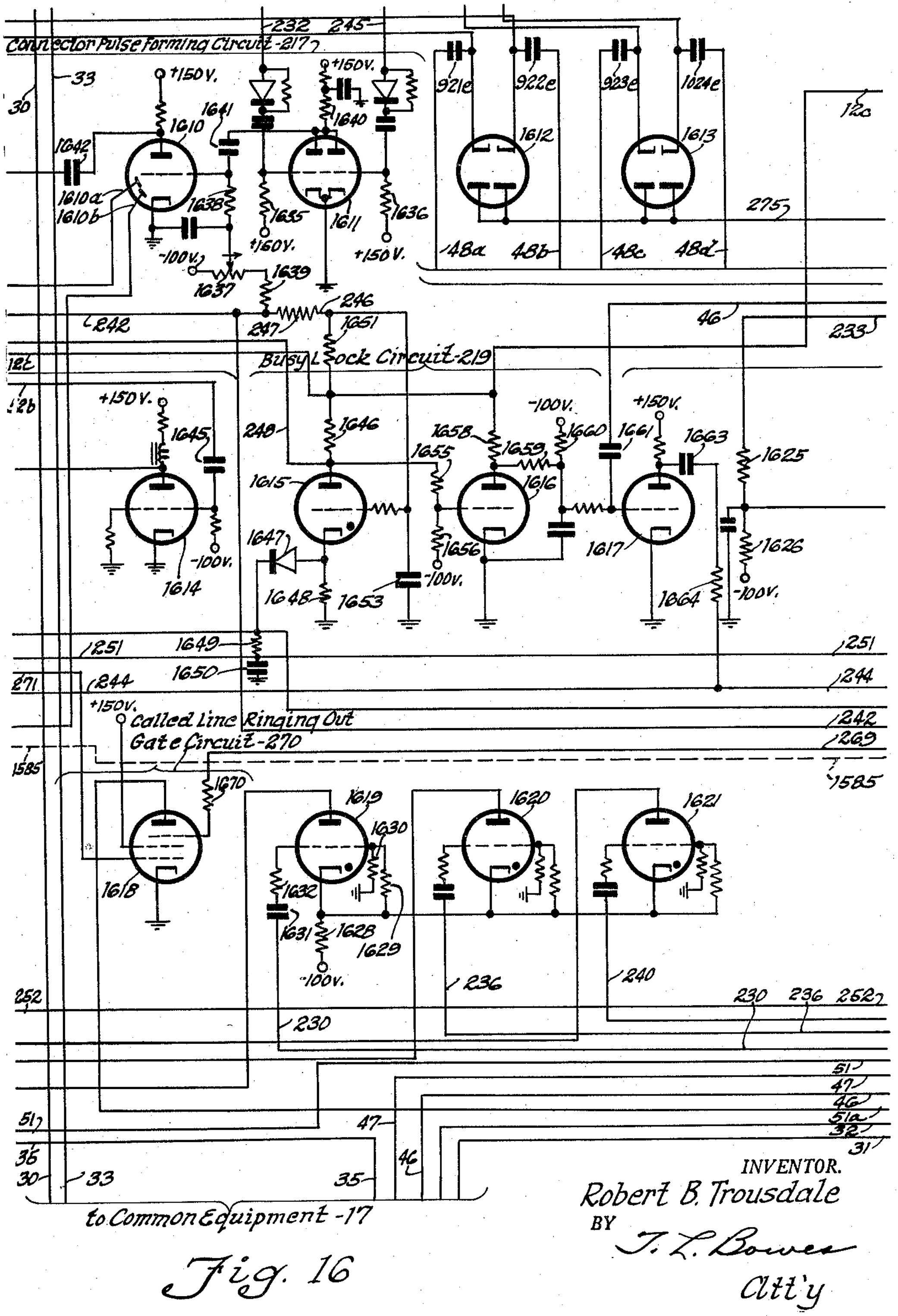
Figure 17:
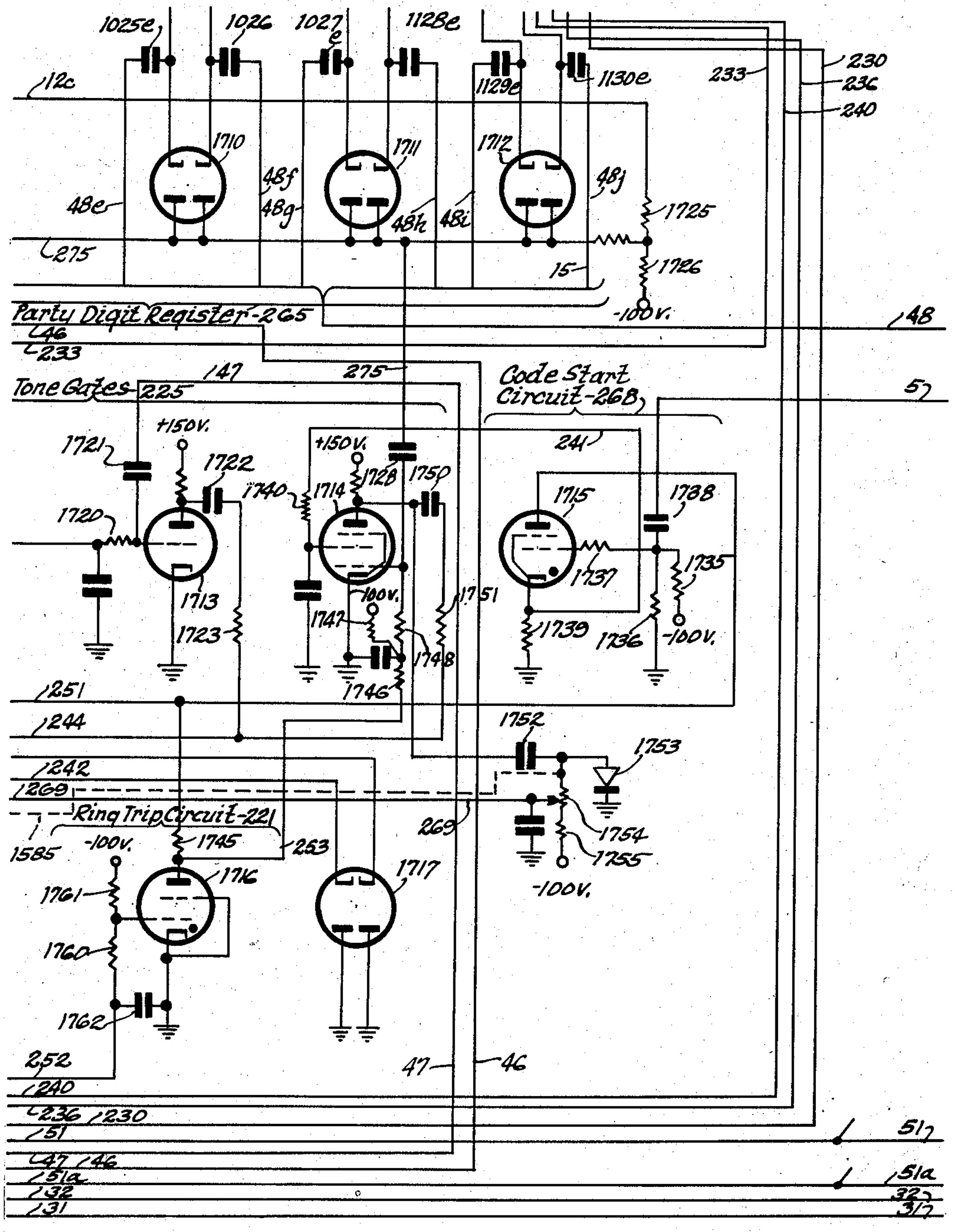

Referring now more particularly to Figs. 8, 9, 10, 11, 14, 15, 16, and 17 of the drawings wherein the circuitry of the connector 12*b* is illustrated, it will be readily understood that the details of this connector may best be understood in terms of the functional significance of the various circuit components thereof. In order to correlate these eight figures with the schematic showing of Fig. 2B, it may be pointed out that the calling line in gate circuit 207 is shown in Fig. 14 as comprising a gate tube 1418 and an inverter tube 1419, the calling line reconstructor circuit 208 is shown in Figs. 14 and 15 as comprising a peaker tube 1420, a condenser discharging tube 1421, a condenser charging tube 1518, and a cathode follower output tube 1519, and the called line out gate circuit 224 is illustrated in Figs. 14 and 15 as including an inverter tube 1514 and two gate tubes 1417 and 1515. Similarly, the called line in gate circuit 223 is shown in Fig. 15 as comprising a gate tube 1511 and an inverter tube 1510, the called line reconstructor circuit 222 is shown in Fig. 14 as comprising a peaker tube 1413, a condenser discharging tube 1412, a condenser charging tube 1411, and a cathode follower output tube 1410, and the calling line out gate circuit 226 is illustrated in Fig.14 as comprising an inverter tube 1415 and two gate tubes 1414 and 1416. The dial impulse integrator circuit 209 is illustrated in Fig. 15 and comprises a dual triode integrator tube 1520. The tens inverter circuit 260 includes the inverter tube 812, the units inverter circuit 261, which also functions as a units start gate circuit, includes the inverter tube 816, and the party inverter circuit 262, which also functions as a party start gate circuit, includes the inverter tube 820. The tens register pulser 210, which also functions as a tens changeover gate circuit, is shown in Fig. 8 as comprising a gaseous discharge-type relaxation oscillator tube 813. This circuit controls the tens digit register 211 which is shown in Figs. 9, 10 and 11 as comprising a priming tube 930 and ten impulse counting tubes 901 to 903, inclusive, 1004 to 1007, inclusive, and 1108 to 1110, inclusive. The units register pulser 214, which also functions as a units changeover circuit, is illustrated in Fig. 8 as comprising the tube 817, and controls the units digit register 215 shown in Figs. 9, 10 and 11 as comprising a priming tube 940 and ten impulse counting tubes 911 to 913, inclusive, 1014 to 1017, inclusive, and 1118 to 1120, inclusive. The party register pulser 263, which also functions as a party changeover gate circuit, is shown in Fig. 8 as comprising the tube 821. This circuit controls the party digit register 265 which is shown in Figs. 9, 10, 11, 16, and 17 as comprising a priming tube 950, ten impulse counting tubes 921 to 923, inclusive, 1024 to 1027, inclusive, and 1128 to 1130, inclusive, and five duo-diode gate tubes 1612, 1613, 1710, 1711, and 1712. The tens, units and party sequence timing circuits 212, 216, and 264 are illustrated in Figs. 8 and 16 of the drawings and are substantially identical. Specifically, the tens sequence timing circuit 212 comprises a start tube 810, a timing tube 811, and a condenser discharge tube 1619. Similarly, the units sequence timing circuit 216 comprises a start tube 814, a timing tube 815, and a condenser discharge tube 1620. Likewise, the party sequence timing circuit 264 comprises a start tube 818, a timing tube 819, and a condenser discharge tube 1621. The connector pulse forming circuit 217 is shown in Figs. 15 and 16 as comprising a double triode pulse combining tube 1611, a clipping tube 1610, an inverter tube 1513, and a cathode follower output tube 1512. The busy test circuit 218 is illustrated in Figs. 15, 16 and 17 as comprising a busy test tube 1517, an inverter tube 1614, and a busy bias clamping tube 1717. The busy gate circuit 220 is illustrated in Fig. 15 as comprising a single gate tube 1516. The ring trip circuit 221 is illustrated in Fig. 17 as comprising a single ring trip tube 1716. The supervisory tone gate circuits 225 are illustrated in Figs. 16 and 17 as comprising a busy tone gate tube 1617, a dial tone gate tube 1713, and a ringback tone gate tube 1714. The code start circuit 268 is illustrated in Fig. 17 as comprising a single control tube 1715. The busy lock circuit 219 is illustrated in Fig. 16 as comprising an inverter tube 1616 and a busy lock tube 1615. Finally, the called line ringing out gate circuit 270 is illustrated in Fig. 16 as comprising a single gate tube 1618.

The manner in which the identified tubes of the connector are interconnected is pointed out more fully below with reference to the operation of the individual circuits. Although the identified tubes may be of any desirable commercial types having the required operating characteristics, it is pointed out that preferably the tubes 812, 816, 820, 1411, 1412, 1421, 1518, and 1610 are commercial type 6AQ6 duo-diode triodes, the tubes 1410, 1510, 1415, 1514, 1419, 1519, 1512, 1513, 1516, 1614, 1616, 1617 and 1713 are commercial type 6C4 triodes, the tubes 1511, 1414, 1416, 1417, 1515, 1418, and 1618 are commercial 6AS6 pentodes, and the tubes 1413, 1420, and 1714 are commercial type 6AK5 pentodes, the tubes 1520 and 1611 are commercial 6J6 type dual triodes, and the tubes 1612, 1613, 1710, 1711, 1712, and 1717 are commercial 6AL5 hot cathode duo-diodes. Preferably, the gas filled thyatrons of the hot cathode type includes in the connector 12*b*, namely, the tubes 810, 814, 818, 930, 940, 950, 1517, 1715, and 1716 are of the RCA commercial 5696 type. The cold cathode gas filled triodes included in the connector 12*b* are preferably of the RCA commercial 5823 type. This group includes the tubes 811, 815, 819, 813, 817, 821, 901 to 903, inclusive, 1004 to 1007, inclusive, 1108 to 1110, inclusive, 911 to 913, inclusive, 1014 to 1017, inclusive, 1118 to 1120, inclusive, 921 to 923, inclusive, 1024 to 1027, inclusive, 1128 to 1130, inclusive, 1615, 1619, 1620, and 1621.

In considering the operation of the connector 12*b*, reference is again made to the above-described call originating at the substation A and routed by way of the link 12 to the called party line substation B. From the description pertaining to this call it will be recalled that when the finder-connector link 12 is idle the finder 12*a* withholds operating anode potential from the conductor 12*c* and also withholds finder gating pulses from the gating conductor 12*d*. Immediately the finder-connector 12*a* is associated with the calling line 23, the +B switching circuit 201 thereof operates to impress a positive potential of 140 volts on the conductor 12*c* and almost immediately thereafter functions to impress finder gating pulses upon the conductor 12*d* in the time position 64*b* assigned to the calling line 23. When operating anode potential is thus suddenly applied to the conductor 12*c*, it is impressed across the series connected condenser 907 and the resistor 908 of the tens digit register 211 with the result that the condenser 907 starts to charge through the resistor 908. Initially, however, the major portion of the available voltage appears across the resistor 908 so that the control grid of the priming tube 930 is driven positive relative to the cathode of this tube. As a consequence, the tube 930 is fired to produce current flow therethrough over a path which includes the resistor 909 and the cathode load resistor 910 of the tube 930. Current flow in this circuit raises the positive potential of the parallel connected cathodes of the counting tubes in the tens digit register 211 to a high value. Concurrently a relatively large voltage drop is produced across the resistor 909 to decrease the positive potential of the tube 901 through the coupling condenser 920. After the tube 930 is fired in the manner just explained the control grid thereof loses control such that space current flow through the tube is rendered independent of the potential on the control grid thereof. In this regard it is noted that after the tube 930 fires, the condenser 907 charges to the full value of the voltage on the conductor 12*c* with the result that the control grid of the tube 930 is reduced substantially to cathode potential. Firing of the tube 930 in the manner just explained prevents the ten impulse counting tubes of the tens digit register 211 from prematurely firing in the manner more fully described below.

In order to prevent the excessive flow of grid current in the priming tube 930 upon the application of voltage to the conductor 12*c* in the manner described above, there is provided, in accordance with the present invention, a limiting resistor 931 which is connected from the junction point between the condenser 907 and the resistor 908 to the first control grid of the priming tube 930. With this arrangement, when voltage is applied to the conductor 12*c* in the manner just explained and the major portion of this voltage is immediately produced across the resistor 908, the control grid of the tube 930 is prevented from drawing excessive current due to the voltage drop in the series grid current limiting resistor 931. In this connection it will be understood that when voltage is applied to the conductor 12*c* the control grid of the tube 930, in the absence of the limiting resistor 931, may draw sufficient current to injure this tube.

In an entirely similar manner the condenser 917 and resistor 918 cooperate to effect ionization of the priming tube 940 embodied in the units digit register 215 when anode potential is impressed upon the conductor 12*c* in the +B switching circuit 201 of the finder 12*a*. Furthermore, the series limiting resistor 941 operates to prevent the flow of excessive control grid current in the priming tube 940 upon the application of voltage to the conductor 12*c*. Likewise, the condenser 927 and the resistor 928 cooperate to effect ionization of the priming tube 950 embodied in the party digit register 265 when anode potential is impressed upon the conductor 12*c* and the series limiting resistor 951 prevents the flow of excessive grid current in the priming tube 950 during this interval.

When a relatively high positive potential is developed on the cathode bus conductor 233 interconnecting the cathodes of the tubes in the tens digit register 211, this potential is impressed upon the control grid of the dial tone gate tube 1713 over a path which includes the conductor 233 and the resistors 1625 and 1720. Normally the tube 1713 is biased beyond cutoff by the negative potential impressed upon the control grid thereof through the resistor 1626 from the negative terminal of the bias potential source. However, the positive potential developed on the conductor 233 when the tube 930 fires overcomes the negative bias normally impressed upon the grid of the tube 1713 and serves to bias this tube to the midpoint of its Class A operating range. Thus, the dial tone gate tube 1713 is rendered operative to amplify the dial tone signal voltage impressed upon the control grid thereof through the condenser 1721 from the dial tone signal conductor 47. The amplified dial tone signal appearing at the anode of the tube 1713 is impressed upon the suppressor grid of the gate tube 1414 in the calling line out gate circuit 226 over a path which includes the condenser 1722, the resistor 1723, and the conductor 244. As explained more fully below, this signal voltage modulates the pulses being gated by the tube 1414 in the time position 64*b* assigned to the calling line 23 with the dial tone signal whereby this signal is delivered to the calling line to signal the calling subscriber that the dialing operation may be started.

Referring now more particularly to the calling line in gate circuit 207, it is pointed out that finder gate pulses produced on the conductor **12*d* in the finder 12*a* control this circuit to gate multiplexer pulses occurring on the multiplexer output conductor 50 in the time position 64*b* assigned to the calling line to the calling line reconstructor circuit 208. Normally the control grid of the gating tube 1418 is biased beyond cutoff by the negative potential impressed thereon from the potentiometer 1425 through the resistor 1426. The suppressor grid of the gating tube 1418 is normally biased to a predetermined value through the back resistance of the clamping crystal rectifier 1427 from the potentiometer 1428. Positive signal modulated multiplexer pulses appearing on the conductor 50 in the multiplexer 11 are impressed upon the suppressor grid of the gating tube 1418 through the condenser 1429. Positive finder gating pulses developed on the conductor 12*d* in the finder 12*a* are impressed upon the control grid of the gating tube 1418 over a path which includes the conductor 12*d* and the condenser 1430. The tube 1418 is rendered conductive only when multiplexer pulses are impressed on the suppressor grid of this tube coincidentally with excitation of the tube control grid by finder gating pulses. Accordingly, the tube 1418 is rendered operative to repeat only those multiplexer pulses which occur in the time position 64*b* assigned to the calling line 23. These pulses appear as negative pulses at the anode of the tube 1418 and are impressed upon the control grid of the inverter tube 1419 through the coupling condenser 1431**.

Since the finder gating pulses impressed upon the control grid of the tube 1418 are of positive polarity the control grid-cathode portion of this tube operates to clamp the tops of the finder gating pulses to ground potential so as to prevent variations in the amplitude of the finder gating pulses from producing corresponding variations in the signal bearing pulses gated by this tube. With this arrangement the control grid-cathode portion of the tube 1418 conducts whenever the peak amplitude of the finder gating pulses exceeds ground potential and thereby prevents variation in the amplitude of these pulses from interfering with signal bearing multiplexer pulses.

In order to prevent variations in the base line potential level of the signal bearing multiplexer pulses gated by the tube 1418 from appearing at the output of this tube, the pulse base line potential level is clamped to the potential level of the suppressor grid of this tube by means of the crystal rectifier 1427 and the condenser 1429. As a consequence, forward cross-talk between adjacent pulses as reproduced at the tube 1418 is substantially eliminated. Also, the clamping rectifier 1427 is so poled as to be non-conducting as far as the multiplexer pulses are concerned.

The signal modulated multiplexer pulses which are gated by the tube 1418 are amplified therein and appear as negative pulses at the anode of this tube. They are repeated to the control grid of the inverter tube 1419 through the coupling condenser 1431, the control grid-cathode portion of this tube acting as a clamping rectifier to clamp the base line of the pulses developed at the anode of the tube 1418 to ground potential level. The control grid-cathode conduction of the inverter tube 1419 is sufficient to provide the above-described base line clamping action without the provision of an additional clamping rectifier. The tube 1419 amplifies and inverts the pulses and repeats the same as positive pulses to the control grid of the charging tube 1518 provided in the calling line reconstructor circuit 208 over a path which includes the coupling condenser 1432 and the conductor 255.

In considering the operational details of the calling line reconstructor circuit 208 it is again pointed out that this circuit functions to store the amplitude of the signal modulated multiplexer pulses as amplified through the tubes 1418 and 1419 for an interval equal to the duration of one pulse frame. In general, this is accomplished by charging the condenser 1525 through the charging tube 1518 in accordance with the amplitude of each pulse repeated to the reconstructor circuit 208 by the calling line in gate circuit 207 and discharging this condenser through the tube 1421 just prior to each such condenser charging operation. In the case under consideration it will be understood that only signal modulated multiplexer pulses occurring in the time position **64*b* assigned to the calling line 23 are gated to the circuit 208 by the calling line in gate circuit 207**.

In considering the details of the reconstructor circuit 208 it is pointed out that normally the control grid of the charging tube 1518 is connected to ground through the crystal rectifier 1526 and the cathode of this tube is operated at the potential which exists across the condenser 1525. The charging tube 1518 is operated at a very low anode voltage by utilizing the bleeder network indicated generally at 1527 to supply anode voltage to this tube. Normal bias for the condenser discharging tube 1421 is supplied from the bleeder circuit 1433, this bias being sufficient normally to cut off space current flow through the tube 1421. Similarly, the peaker tube 1420 is normally biased beyond cutoff by the potential impressed upon the control grid thereof from the potentiometer 1425.

Finder gate pulses impressed upon the conductor **12*d* are supplied to the control grid of the peaker tube 1420 through the condenser 1430 and each such pulse has the effect of causing current conduction through the peaker tube for the duration of the pulse. However, in the anode circuit of this tube there is provided an inductance element 1434 which is shunted by the rectifier 1435 and is tuned to a frequency many times greater than the finder gate pulse frequency by the stray capacitance associated therewith. The inductance element 1434 comprises a resonant circuit which is shock excited into oscillation coincident with the leading edge of each finder gate pulse 145 impressed on the peaker tube 1420. However, the rectifier 1435 only allows the first half cycle of the oscillatory wave train to develop following which it absorbs the energy stored in the inductance element 1434. Accordingly, as each finder gate pulse builds up to full amplitude, a very sharp pulse of negative polarity is developed at the anode of the tube 1420 coincident with the leading edge of the corresponding finder gate pulse. This sharp negative pulse is utilized to effect discharging of the condenser 1525 just before this condenser is recharged to the amplitude of a new signal modulated multiplexer pulse which is gated to the circuit 208 by the calling line in gate circuit 207. Thus, each negative pulse developed at the anode of the tube 1420 is impressed upon the cathode of the discharge tube 1421 through the coupling condenser 1436 and each such pulse has the effect of driving the cathode of the tube 1421 negative and thus effecting current conduction through this tube for the duration of the pulse. The condenser 1525 is thus discharged through the space current path of the tube 1421 for the duration of each pulse impressed upon the cathode of this tube. So long as multiplexer pulses are thus impressed upon the control grid of the charging tube 1518 the condenser 1525 is not fully discharged during any one condenser discharging interval but is only discharged down to a predetermined level which assures that the amplitude of the immediately succeeding multiplexer pulse will be accurately reflected in the charge produced thereby on the condenser 1525. It will thus be apparent that as the amplitude of the signal bearing multiplexer pulses impressed upon the control grid of the tube 1518** varies in accordance with intelligence, voice, or other signals from the calling line 23, the voltage on the condenser is correspondingly varied to detect or reproduce the intelligence component of the multiplexer pulses.

During dialing at the calling substation A, and more particularly during the open circuit or break circuit of each dial impulse, the flow of multiplexer pulses through the calling line in gate circuit 207 to the control grid of the charging tube 1518 is interrupted. However, the flow of finder gate pulses to the control grid of the peaker tube 1420 is not interrupted due to the holding action of the +B switching circuit 201 in the finder 12*a*. As a result the discharge tube 1421 is periodically rendered conductive during the open circuit period of each dial impulse with the result that the condenser 1525 is discharged down to a relatively low level. Thus the circuit 208 is arranged to discriminate between directive dial impulses and supervisory signals on the one hand, and voice or intelligence signals on the other hand.

The bias voltage between the control grid and cathode of the charging tube 1518 is controlled by the voltage across the condenser 1525 as will be evident from an inspection of the circuit. As a consequence, large variations in the average component of the signal input level to the circuit 208 tend to cause the operating bias voltage between the control grid and cathode of the tube 1518 to vary over a relatively wide range. Such variations may be minimized by connecting the anode of the rectifier 1526 to a point on the cathode circuit of the cathode follower output tube 1519 as described in detail in copending application, Serial No. 134,974, referred to heretofore. With such a circuit connection a feedback path is provided between the cathode of the tube 1519 and the control grid of the charging tube 1518. This feedback circuit is regenerative in character and is effective to provide low frequency regeneration suitable for promoting the derivation of dial impulses from the reconstructor output voltage. While a feedback circuit of the character described is suitable for its intended purpose, it has been found that with such a regenerative connection transients are produced which appear on the outgoing signal pulses, particularly during dialing and other low frequency operations. Accordingly, in the reconstructor circuit of the present in vention the anode of the crystal 1526 is directly connected to ground and no feedback circuit is employed between the cathode of the tube 1519 and the control grid of the charging tube 1518. With this arrangement the response of the reconstructor circuit is linear throughout the frequency range of the equipment although the voltage change produced during dialing impulses is substantially reduced when no feedback circuit is employed.

The signal voltages thus reconstructed across the condenser 1525 are positively impressed upon the control grid of the cathode follower tube 1519 to effect reproduction of the reconstructed signal voltage at the cathode terminal of this tube. The signal voltage reproduced at the cathode terminal of the tube 1519 is impressed upon the suppressor grid of the gating tube 1515 in the called line out gate circuit 224 over a path which includes the condenser 1528 and the conductor 256. This same voltage is impressed upon the parallel connected control grids of the dual triode dial pulse integrator tube 1520 over a path which includes the condenser 1529, the resistor 1530, and the crystal rectifier 1531. It will thus be apparent that the signals developed at the calling substation A, including voice, switch directing, and supervisory signals, are repeated positively to the circuits 224 and 209 by the calling line reconstructor circuit 208.

In considering the operation of the dial pulse integrator circuit 209 it is repeated that this circuit performs the function of discriminating between dial impulses and all other signals developed at the output side of the calling line reconstructor circuit 208. Normally, i. e., when the connector 12*b* is not occupied with a call, operating anode potential for the integrator tube 1520 is withheld from this tube in the +B switching circuit 201 of the finder 12*a*. The cathodes of the twin triode sections of the tube 1520 are biased to a negative potential by means of the voltage divider network, including the resistors 1532 and 1533, which are connected from the negative supply potential to ground. Also, the parallel connected control grids of the twin triode sections of the tube 1520 are connected through the rectifier 1531 and the resistor 1534 to a positive point on the divider network including the resistors 1535 and 1536, which is connected from the positive supply potential to ground. Accordingly, when the connector 12*b* is seized in the manner explained above and anode potential is impressed upon the integrator tube 1520, this tube starts to conduct heavily thereby to produce a voltage drop across the anode resistor 1537 of the tube 1520 which prevents the condenser 1538 from charging to any appreciable extent.

During the open circuit or break period of each impulse dialed at the substation A, the voltage at the terminal of the cathode of the tube 1519 is reduced to its on hook value. This relatively low frequency dial impulse change at the cathode of the tube 1519 is impressed upon the control grids of the twin triode sections of the tube 1520 so that space current flow through both sections of this tube is interrupted. As a consequence, the condenser 1538 is charged through the resistor 1537 at a rate determined by the time constant of this resistance capacitance circuit. When the open circuit period of the dial impulse ends, the potential at the cathode of the tube 1519 rises rapidly, as described in detail in connection with the calling line reconstructor circuit 208, thereby reinitiating current conduction through the tube 1520. As a consequence a low resistance discharge path through the tube 1520 is provided for the condenser 1538 and this condenser discharges to its previous low potential level. The described cycle is repeated during each impulse dialed at the calling substation with the result that a series of sawtooth voltage pulses are developed across the condenser 1538. The magnitude of each sawtooth pulse is determined solely by the duration of the open circuit period of the corresponding dial impulse.

As discussed above in connection with the calling line reconstructor circuit 208, the regenerative feedback circuit of the reconstructor 208 has been eliminated in the present circuit arrangement to reduce the amplitude of transient voltages produced during the dialing operation and to linearize the low frequency response of the reconstructor circuit. However, when a regenerative feedback circuit is not employed the voltage change produced at the cathode of the tube 1519 during dialing is substantially reduced and coupling between the reconstructor circuit 208 and the dial impulse integrator circuit 209 on a direct or galvanic basis becomes extremely critical. In accordance with an important feature of the present invention, coupling between the reconstructor circuit 208 and the dial impulse integrator circuit 209 is not made on a pure D. C. basis but instead only the D. C. changes or fluctuations which occur during the dialing operation are transmitted to the dial impulse integrator circuit. With this arrangement the D. C. potential at the cathode of the tube 1519 may vary over a wide range of values without affecting the operation of the dial impulse integrator circuit for the reason that the average or long term D. C. potential at the cathode of the tube 1519 is not transmitted to this circuit. In this connection it will be understood that although the dialing impulse rate is of relatively low frequency, it may be distinguished from a long term D. C. potential, and if the coupling between the reconstructor circuit 208 and the integrator circuit 209 is satisfactory to pass frequencies down to approximately 5 cycles per second the dialing impulses will be satisfactorily transmitted to the circuit 209.

In order to couple only low frequency changes in the potential at the cathode of the tube 1519 to the dial impulse integrator circuit 209, the above described path between these circuits includes the condenser 1529 which effectively blocks the average D. C. potential at the cathode of the tube 1519 so that the average D. C. level of this tube has no effect upon the dial impulse integrator circuit 209. In order to remove variations in the amplitude of the dial impulses produced at the cathode of the tube 1519, which, as described above, may include transient voltage spikes of substantial amplitude as well as audio variations, facilities are provided for clamping the tops of the dialing impulses reproduced at the cathode of the tube 1519 to ground potential. These facilities comprise the coupling condenser 1529, a diode anode 1610*a* of one diode section of the tube 1610 included in the connector pulse forming circuit 217, and the resistor 1534 which is connected to a positive potential, i. e., the junction point between the resistors 1535 and 1536. As will be evident from an inspection of the circuit, the above-described combination of the condenser 1529, the diode section 1610*a* and the resistor 1534 constitute a clamping circuit which prevents any portion of the dial impulse wave form from going positive with respect to ground potential. As a result, the peaks or transient spikes of the dial impulse wave form are positively clamped to ground potential. The series resistor 1530 is provided for the purpose of absorbing the audio variations which may be produced as a result of the above-described clamping action of the diode section 1610*a* of the tube 1610 so that these audio variations are not reflected back to the cathode of the tube 1519. As a result, the audio variations produced during the above-described clamping operation do not distort the stepped audio or reconstructed signal voltage produced at the cathode of the tube 1519 and transmitted through the condenser 1528 to the called line out gate circuit 224 in the manner described above.

In order to remove the undesired transient spikes which are superimposed upon the dialing impulses in the reconstructor circuit 208, the cathodes of the twin triode sections of the tube 1520 are operated at a sufficiently negative potential that the twin triode sections of the tube 1520 draw grid current whenever the input wave form increases to a predetermined potential level which is negative with respect to ground. When grid current starts to flow in the tube 1520 the anode of the crystal rectifier 1531 becomes negative with respect to the cathode thereof so that the rectifier 1531 becomes non-conductive and positively prevents the transmission of signals to the control grids of the tube 1520 during this interval.

Figure 30:
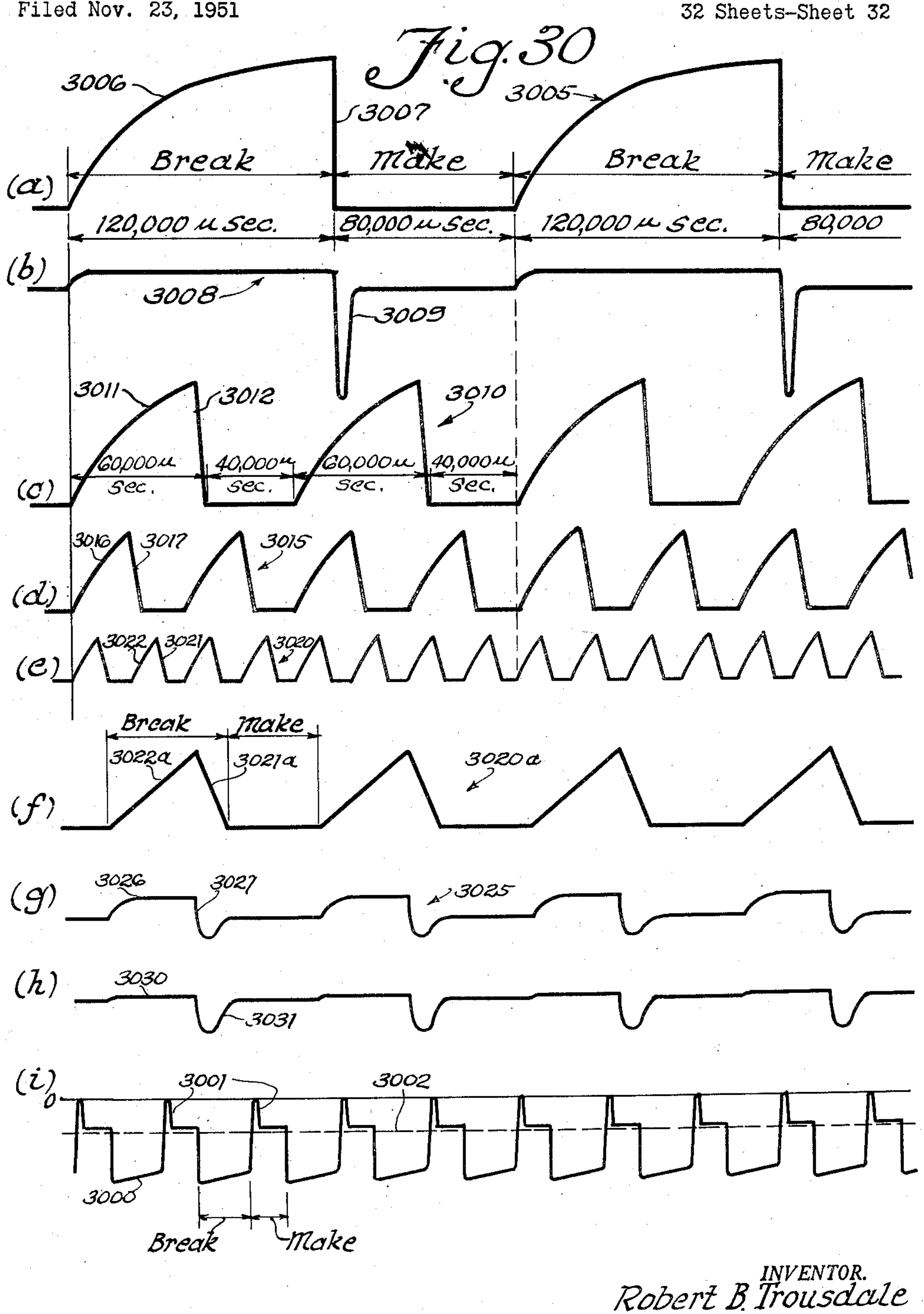

In order more clearly to visualize the above-described coupling arrangement which is used to couple voltage appearing at the cathode of the tube 1519 to the dial pulse integrator tube 1520, there is shown in Fig. 30*i* a typical dial impulse wave form which is produced between the cathode of the rectifier 1531 and ground potential. Referring to this figure, the dial impulse wave form, which is indicated generally at 3000, includes the positive transient spikes 3001 which are produced at the start of the make period of each dial impulse. The peaks of the transient spikes 3001 are positively clamped to ground potential by means of the above-described clamping circuit including the condenser 1529 and the diode portion 1610*a* of the tube 1610. Accordingly, all of the dialing wave form 3000 which is presented to the control grids of the tube 1520 is negative with respect to ground. However, the cathodes of the twin triode sections of this tube are also operated at such a negative potential with respect to ground that the tube 1520 draws grid current during those portions of the dialing wave form 3000 which are positive with respect to the zero bias level of the tube 1520 indicated in Fig. 30*i* as the dotted line 3002. As described heretofore, during the portions of the wave form 3000 which are positive with respect to the clipping level 3002, the crystal rectifier 1531 becomes non-conductive when grid current starts to flow in the tube 1520 with the result that those portions of the dialing wave form 3000 which are positive with respect to the clipping level 3002, including the undesired transient spikes 3001, are effectively absorbed by the rectifier 1531 and are not transmitted to the tube 1520.

The sawtooth voltage pulses developed across the condenser 1538 during the dialing operation at the calling substation A are coupled to the inverter circuits 260, 261 and 262 over a path which includes the condenser 1540, the condenser 1541, and the conductor 227. A resistor 1542 is connected from the junction point between the condensers 1540 and 1541 to ground potential and this junction point is also connected to the diode anode 1610*b* of another diode section of the tube 1610 in the connector pulse forming circuit 217, the common cathode of the tube 1610 being connected to ground so that the diode section of this tube is effectively connected in parallel with the resistor 1542. It will be recalled that sawtooth pulses are generated across the condenser 1538 and the amplitude of the sawtooth wave form decreases as dial speed is increased or percentage break is decreased. Furthermore, the relative slopes of the leading and trailing edges of the sawtooth wave form become more nearly equal as dialing speed is increased. In order to control the tens, units, and party digits registers 211, 215, and 265 in accordance with the dial impulses reproduced by the reconstructor circuit 208, the sawtooth wave form produced across the condenser 1538 is differentiated so as to produce negative pulses occurring during the trailing edge interval of each sawtooth pulse which are coincident with the start of each dial impulse make period. While a simple differentiating circuit is suitable for relatively low dialing speeds, when the dialing speed is increased to 30 or 40 pulses per second the relative slopes of the leading and trailing edges of the sawtooth pulses become so nearly alike that simple differentiation does not yield a predominantly negative pulse but instead produces a wave form which consists of substantially equal amplitude positive and negative pulses so that it is virtually impossible to tell the leading edge from the trailing edge of such a sawtooth pulse. In order to operate with dialing speeds up to approximately 40 pulses per second while providing reliable control of the digit register units 211, 215 and 265, there is provided in accordance with an important feature of the connector of the present invention, a variable differentiating circuit which is used to provide a predominantly negative pulse over a wide range of dialing speeds. More specifically, the condenser 1540, the resistor 1542, and the diode section including the diode anode 1610*b* of the tube 1610, constitute a variable time constant differentiating circuit in which an extremely short time constant is provided during the positive rise of the sawtooth pulse and a greatly increased time constant is provided during the trailing edge of the sawtooth pulse. In order to provide the above-described variable time constant differentiation, the diode section 1610*b* of the tube 1610 which is connected across the resistor 1542, acts as a resistor of extremely low value, in the order of 1000 ohms, during the positive rise of the sawtooth pulse so that the time constant of the circuit is substantially equal to the value of the condenser 1540 and the relatively low space path resistance of the diode. As a result the differentiated amplitude of the positive rise of the sawtooth is greatly diminshed, the condenser 1540 being charged negatively during this interval through the conductive path of the diode section 1610*b*. However, when the peak of the sawtooth wave is reached and the voltage across the condenser 1538 starts to decrease, the potential across the diode is reversed so as to render this diode non-conductive. Immediately the diode section 1610*b* of the tube 1610 is rendered non-conductive, the resistance thereof becomes infinite so that the time constant of the circuit is then equal to the value of the condenser 1540 and the resistor 1542.

There is thus produced across the resistor 1542 during this interval a negative output pulse of relatively large amplitude which is coincident with the start of each dial impulse make period and is suitable for application to the tens, units and party inverter circuits in the manner described hereinafter.

In order to visualize more clearly the operation of the above-described variable differentiation circuit there is shown in Figs. 30*a* to 30*h*, inclusive, certain of the wave forms produced during typical dialing operations at different speeds. Thus, in Fig. 30*a*, there is shown the sawtooth wave form 3005, which is produced across the condenser 1538 when a dialing speed of approximately five impulses per second is employed. Referring to Fig. 30*a* it is evident that the sawtooth wave form 3005 comprises a series of sawtooth pulses having a positively increasing leading edge 3006 during the break interval of each dial impulse period, and a negative trailing edge 3007, of substantially greater slope than the leading edge 3006, which occurs at the start of the make period of each dial impulse period. As illustrated in Fig. 30*a* for a dialing speed of 5 impulses per second, the break period has a duration of approximately 120,000 microseconds whereas the make period has a duration of approximately 80,000 microseconds.

In Fig. 30*c* there is shown a typical sawtooth wave form 3010 which is produced across the condenser 1538 when a dialing speed of approximately ten pulses per second is employed. Referring to this figure, each sawtooth pulse comprises a leading edge 3011 which occurs during the break period of each dial impulse period, and a trailing edge 3012 of substantially increased slope which occurs at the start of the succeeding make period of each dial impulse period. Likewise, in Fig. 30*d*, there is shown a typical sawtooth wave form 3015 which is produced across the condenser 1538 when a dial speed of twenty pulses per second is employed. It is evident that each sawtooth pulse of the wave form 3015 comprises a leading edge 3016 which occurs during the make period of each dial impulse period, and a trailing edge 3017 which occurs at the start of each make period. Finally, in Fig. 30*e*, there is shown a typical wave form 3020 which is produced across the condenser 1538 when a dialing speed of forty pulses per second is employed. It is evident from an inspection of Figs. 30*a*, 30*c*, 30*d*, and 30*e*, that as the dialing speed is increased the amplitude of the sawtooth pulses produced across the condenser 1538 is decreased. Furthermore, it is evident from these figures that the slope of the trailing edge of each sawtooth wave is substantially reduced as dialing speed is increased. Thus the slope of the trailing edge 3007 is greater than the slope of the trailing edge 3012 which is in turn greater than the slope of the trailing edge 3017. Finally, the slope of the trailing edge 3021 of the wave form 3020 is almost equal to the positive slope of the leading edge 3022. In each of the Figs. 30*a*, 30*c*, 30*d*, and 30*e* the same time scale has been used in order to illustrate the comparative amplitudes of the sawtooth wave forms produced across the condenser 1538 as dialing speed is increased.

Considering for the moment the sawtooth wave form 3007 which is produced across the condenser 1538 when a relatively low dialing speed of five pulses per second is employed, it is evident that the leading and trailing edges of each sawtooth pulse are of substantially different slope and if the wave form 3005 is differentiated in a simple differentiating circuit the wave form 3008 (Fig. 30*b*) is produced. It is evident from an inspection of Figs. 30*a* and 30*b* that during the break period the slope of the leading edge 3006 is of relatively small value so as to produce a slight positive increase in the wave form 3008. However, the trailing edge 3007 produces the relatively sharp negative pulse 3009 at the start of each make period which is satisfactory for proper operation of the inverter circuits 260, 261 and 262.

In order to illustrate more clearly the operation of the above-described variable differentiating circuit at the extreme dialing speed shown in Fig. 30*e*, the wave form 3020 of this figure is illustrated on a larger scale in Fig. 30*f* as the wave form **3020*a*. If the wave form 3020*a* is differentiated in a simple differentiating circuit the wave form 3025** shown in Fig. 30*g* is obtained. Referring to this figure, it is evident that simple differentiation of the wave form **3020*a* produces a positive pulse 3026 during the break period of each dial impulse period and a negative pulse 3027 of substantially the same amplitude at the start of each make period. Since the positive and negative pulses 3026 and 3027 are of substantially the same amplitude and the leading edges of these pulses are substantially the same, it is almost impossible to distinguish the leading edge from the trailing edge with the result that the digit register pulsers are improperly controlled at the higher dialing speeds. However, when the variable time constant differentiating circuit described heretofore is employed, the wave form 3030** shown in Fig. 30*h* is produced. Referring to this figure, during the positively increasing slope **3022*a* of the wave form 3020*a*, the diode section 1610*b* of the tube 1610 is conducting so that the time constant of the differentiation circuit is extremely short and substantially no positive voltage is produced during the break period of each dial impulse. However, when the peak of the sawtooth pulse is reached and the negative slope 3021*a* thereof is encountered, the diode section 1610*b* of the tube 1610 is rendered nonconductive so as to increase by a factor of approximately 100 the time constant of the differentiation circuit with the result that a negative control pulse 3031 of substantial amplitude is produced at the start of the make period of each dial impulse. It is thus evident that with the variable time constant differentiating circuit of the present invention the sawtooth wave form produced with different dialing speeds is normalized so as to provide reliable operation of the digit registers controlled thereby. In this connection it will be understood that the variable time constant differentiation circuit is equally effective at the slower dialing speeds so that extremely sharp negative control pulses are supplied over a path which includes the condenser 1541 and the conductor 227 to the inverter circuits 260, 261 and 262**.

In considering the manner in which the control pulses produced by the dial impulse integrator circuit 209 during dialing of the first digit at the calling substation are repeated through the tens inverter circuit 260 to the tens register pulser 210, it will be recalled that these control pulses are also supplied to the units inverter circuit 261 and the party inverter circuit 262. However, pending operation of the tens sequence timing circuit 212 the units inverter circuit 261, which also functions as a units start gate, and the party inverter circuit 262, which also functions as a party start gate, are held non-responsive to the control pulses transmitted thereto by the dial impulse integrator circuit 209 during dialing of the first digit at the calling substation. The control pulses impressed upon the conductor 227 by the circuit 209 are coupled through the condenser 825 to the control grid of the inverter tube 812, this control grid being connected to ground through the resistor 826. The inverter tube 812 is operated at zero bias so that the negative control pulse impressed upon the control grid thereof is effective to decrease space current flow through this tube and is repeated as a positive pulse at the anode thereof. Each such positive control pulse developed at the anode of the tube 812 is repeated to the control grid of the tens sequence start tube 810 over a path which includes the conductor 231 and the condenser 827. Each such positive pulse is also repeated to the control grid of the tens register pulser tube 813 over a path which includes the condenser 828. In this connection it will be understood that the tens inverter tube 812 renders the dial impulses more uniform by grid limiting and clipping so that the dial impulses which are produced at the anode of this tube are substantially equal in wave shape and amplitude. It will thus be understood that during the dialing of any tens digit the tens inverter circuit 260 functions to repeat one positive control pulse to each of the tens sequence timing circuit 212 and the tens register pulser 210 at the start of the make period of each dial impulse in the digit. In the particular call under consideration wherein the tens digit designation of the called line 32 is 3, three short positive control pulses are repeated by the tens inverter circuit 260 to each of the circuits 210 and 212.

In considering the operation of the tens register pulser 210 it will be recalled that this circuit performs the dual function of driving or pulsing the tens digit register 211 in accordance with the positive control pulses supplied thereto from the tens inverter circuit 260 and of preventing the further transmission of pulses to the tens digit register 211 after completion of the tens digit. Thus, the circuit 210 operates as a changeover gate during the inter-digit pause between the first and second digits to terminate the transmission of pulses to the tens digit register 211 after the first digit has been completed. As discussed heretofore in connection with the dial impulse integrator circuit 209, the height of the control pulses developed by the circuit 209 is dependent upon the duration of the dial impulse, which in turn is dependent upon either the dial speed or the percentage break of the dialing mechanism. Although the tens inverter circuit 260 functions to limit the amplitude of relatively large amplitude dial impulses, there still remains come variation in the amplitude of the positive control pulses reproduced at the anode of this tube.

In order to provide reliable and satisfactory operation of the tens digit register 211 over a wide range of dialing speeds the tens register pulser tube 813 is operated as a controlled or triggered relaxation oscillator, the output of which comprises register drive pulses of uniform amplitude and duration which are of large amplitude and are suitable for driving the tens digit register in a completely reliable manner. More specifically, the tube 813 is of the cold cathode type and the control grid or starter electrode thereof is biased somewhat positively with respect to ground by means of the divider network, including the resistors 830 and 831 connected between the +B supply and ground. The cathode of the tube 813 is connected through the resistors 832 and 833 to ground and is also connected through the series path which includes the condenser 915 and the resistor 910 to ground. While the control grid of the tube 813 is biased positively by an amount equal to the voltage drop across the resistor 831 this positive potential is insufficient to cause the tube 813 to fire. However, when a positive control pulse is coupled through the condenser 828 to the control grid of the tube 813 this tube fires so as to produce current flow through the parallel cathode paths of this tube. Mort specifically, current flows through the series connected resistors 832 and 833 and also through the series connected condenser 915 and the resistor 910. Since the charge on the condenser 915 cannot be changed instantaneously, a relatively large potential drop is initially produced across the resistor 910, this potential decreasing as the condenser 915 is charged. Conduction through the tube 813 continues until the condenser 915 is fully charged and there is insufficient current flow therethrough to sustain ionization in the tube 813. When this condition is reached the tube 813 is extinguished and remains extinguished until the next positive control pulse is impressed upon the control grid thereof. In order to insure the extinction of the tube 813 when the condenser 915 is fully charged, it is necessary that the combined resistance of the resistors 832 and 833 be sufficiently large that current flow through these resistors alone is also insufficient to maintain ionization of the tube 813. Accordingly, each control pulse impressed upon the control grid of the tube 813 triggers the relaxation oscillator circuit in which this tube is included to produce large positive register drive pulses of uniform amplitude and duration across the resistor 910. These positive pulses are used to control the counting or registering operation of the tens digit register 211.

In accordance with an important feature of the above-described tens register pulser 210 the relaxation oscillator circuit thereof may be readily and conveniently adjusted so as to provide reliable triggering with a minimum amplitude control pulse impressed upon the control grid of the tube 813 so that this circuit functions properly over a wide range of dialing speeds and control pulse heights. Thus, the values of the resistors 830 and 831 may be chosen so as to bias the control grid of the tube 813 sufficiently positively that a minimum amplitude control pulse will fire this tube. Larger amplitude controll pulses will, of course, produce firing of the tube 813 in the same manner. It is thus possible to assure firing of the tube 813 and the production of uniform, large amplitude register drive pulses across the resistor 910 with a predetermined maximum dialing speed or poorest percentage break in the dialing mechanism. The provision of the above-described relaxation oscillator as a register unit driver has the further advantage of producing relatively short register drive pulses from dialing impulses which may be of relatively great length and are distorted in wave form. Furthermore, by providing the cold cathode register pulser tube 813 the filament power necessary to heat a hot cathode tube is saved. In this connection it will be understood that the register drive pulse duration is determined by the value of the condenser 915 and the resistor 910, these components preferably having a value of .01 microfarad and 22,000 ohms, respectively.

In considering the operation of the tens digit register 211 to register the numerical value of any tens digit dialed at a calling substation, it will be understood from the foregoing explanation that this register is driven by the large positive register drive pulses delivered thereto by the tens register pulser 210. Specifically, the tubes of this register, other than the priming tube 930, are connected to operate as a pulse counting chain wherein the cathodes of all of the tubes 901, 902, 903, etc., are all connected to the common driving conductor 233, the anodes are all returned through suitable anode resistors 901*f*, 902*f*, 903*f*, etc., to the switch +B conductor 12*c*, the anode of each tube is capacitively coupled to the control grid of the next succeeding tube through a suitable coupling condenser 901*b*, 902*b*, 903*b*, etc., and the control grid of each tube is normally biased to a predetermined positive potential by means of the common voltage divider network including the resistor 1131 and the resistor 1132 which are connected in series from the switch +B conductor 12*c* to ground.

As explained above, immediately the connector 12*b* is seized the priming tube 930 is fired to develop a substantial voltage drop across the resistor 910 included in the cathode path of the tube 930 so that the cathodes of the ten counting tubes 901, 902 etc., are raised to a relatively high positive potential such that each counting tube is effectively biased below ignition potential with respect to the tube cathode. During the dialing of the tens digit a large positive register drive pulse is developed across the resistor 910 at the start of the closed circuit or make period of each dial impulse. The first such pulse to appear across the resistor 910 raises the positive potential of the common cathode conductor 233 to a value approximately equal to or greater than the anode potential of the tube 930 to interrupt space current flow through this tube. Furthermore, this pulse prevents any of the ten counting tubes of the register circuit 211 from firing for the duration of the pulse. When space current flow through the priming tube 930 is interrupted the voltage drop across the anode resistor 909 thereof disappears and the control grid potential of the tube 901 rises immediately and starts to decay at a rate determined by the time constant of the coupling circuit consisting of the coupling condenser 920 and the grid resistor of the tube 901. The time constant of this circuit is long enough to hold the grid of the tube 901 considerably above its normal potential level after the described cathode driving pulse has terminated, thereby causing the tube 901 to fire at the end of the pulse produced upon the conductor 233. The resulting space current flow through the tube 901 produces an increased current flow through the resistor 910 which again raises the positive potential level on the common cathode conductor 233. Simultaneously a voltage drop is produced across the anode resistor 901*f* of the tube 901 which lowers the positive potential on the control grid of the second counting tube 902 thereby preventing this tube from firing. It will thus be apparent that when the first pulse appears across the cathode resistor 910 at the end of the open circuit period of the first dial impulse, the priming tube 930 is deionized and the first counting tube 901 is fired to register the first dial impulse. The second impulse of the tens digit dialed at the calling substation results in the appearance of a second large positive register drive pulse at the common cathode conductor 233. This pulse serves to extinguish space current flow through the first counting tube 901 and to bias all of the counting tubes against ionization. The positive pulse thus produced at the anode of the tube 901 is coupled through the condenser 901*b* to the next counting tube 902 to fire this tube after the cathode pulse has ended. Accordingly, when the second pulse on the conductor 233 ends the second counting tube 902 is fired to produce space current flow therethrough which in traversing the anode resistor 902*f* and the resistor 910 prevents ionization of the other counting tubes in the register circuit 211. It will thus be apparent that the second impulse of the first digit dialed at the calling substation has the effect of extinguishing space current flow through the first counting tube 901 and firing the second counting tube 902 to register the two impulses of the digit. The manner in which one or all of the remaining eight counting tubes of the tens digit register 211 are successively fired as additional impulses of a given tens digit are dialed at the calling substation will be fully apparent from the explanation just given. In the particular call under consideration wherein the called line 32 has a tens digit designation of 3, the third counting tube 903 will, of course, be ionized in response to the third impulse of the digit and will remain conductive for the duration of the call. All other counting tubes of the tens digit register 211 remain non-conductive for the duration of the call.

Referring now more particularly to the manner in which the counting tubes of the tens digit register 211 selectively control the gating crystal rectifiers 901*d*, 902*d*, 903*d*, etc., to gate to the connector pulse forming circuit 217 only those tens pulses which occur in the tens pulse time position assigned to a particular called line, it is pointed out that when the link 12 is not in use the cathode terminals of the described rectifiers are all connected to the +B switching conductor 12*c* over paths individual thereto and the anode terminals of these rectifiers are commonly connected to the +B switching conductor 12*c* through the resistor 1133. Thus, the anode and cathode terminals of each gating rectifier are at the same potential. With negative tens of gating pulses sequentially applied to the conductors 33*a*, 33*b*, 33*c*, etc., from the tens pulse ring circuit 21 these pulses are sequentially impressed on the cathode terminal of the gating rectifiers through the coupling condensers 901*e*, 902*e*, 903*e*, etc. As a consequence, each crystal conducts each pulse impressed thereon until the associated coupling condenser is charged to the peak potential of the pulses impressed on the cathode terminal thereof at which time the gating rectifiers are biased against pulse transmission therethrough. Accordingly, the tens pulses sequentially developed on the conductors 33*a*, 33*b*, 33*c*, etc., are prevented from appearing on the pulse output conductor 232 of the register circuit 211. The same condition exists after the finder 12*a* functions in the manner explained above to impress operating anode potential upon the +B switching conductor 12*c* except that the described coupling condensers 901*e*, 902*e*, 903*e*, etc., become charged to the positive level of the potential impressed on the conductor 12*c* plus the peak potential value appearing on the conductors 33*a*, etc.

At the end of the first digit dialed at the calling substation A the counting tube 903 is ionized and the anode potential of this tube is decreased to a value lower than the positive potential on the +B switching conductor 12*c*. Accordingly, the gating rectifier 903*d* is biased conductive to cause current flow therethrough over a path which extends from the conductor 12*c* by way of the resistor 1133, the rectifier 903*d*, the resistor 903*a*, the space current path of the tube 903, and the resistor 910. As a consequence negative tens pulses appearing on the conductor 33*c* in the third tens pulse position are gated by the rectifier 903*d*, appear on the pulse output conductor 232 of the circuit 211, and are impressed upon the connector pulse forming circuit 217.

Referring now to the manner in which dial tone signal transmission to the calling substation is terminated when the dialing operation is started, it is pointed out above that the priming tube 930 of the tens digit register 211 is deionized in response to dialing of the first impulse of the first digit at the calling substation. When current flow through this tube and the resistor 910 is thus arrested the voltage drop across this resistor is substantially decreased to decrease the positive potential level on the common cathode conductor 233.

This potential decrease is thereafter maintained since the magnitude of current flow through any one of the ten cold cathode counting tubes 901, 902, 903, etc., is appreciably lower than the current flow through the hot cathode priming tube 930. When the positive potential level on the conductor 233 is thus reduced the negative bias on the control grid of the dial tone gate tube 1713 rises to a value well beyond the cutoff value of this tube thereby to render the tube non-conductive. As a consequence the tube is blocked against repeating the dial tone signal on the conductor 47 by the dial tone generator 29*b* to the calling line out gate circuit 226. Thus, dial tone transmission to the calling substation is arrested.

Referring now more particularly to the tens sequence timing circuit 212 it will be recalled that this circuit controls the tens register pulser 210 and the units inverter circuit 261 in such manner that the control pulses developed during dialing of the first digit are directed to the tens digit register 211 in the manner just explained, the tens register pulser is rendered inactive at the end of the first digit, and pulses developed during dialing of the second unit are directed to the units register pulser 214. To these ends the control grid potential of the discharge tube 1619 embodied in the tens sequence timing circuit 212 is controlled in accordance with the pulses produced on the conductor 239 by the tens register pulser 210 and the control grid potential of the start tube 810 is coupled to receive positive pulses delivered thereto from the anode of the tens inverter tube 812 in the manner explained above.

Before describing the operation of the timing circuit 212 to perform the indicated functions, it is pointed out that normally the control grid of the tube 1619 is biased negatively by means of a biasing circuit which includes the resistors 1628, 1629, and 1630, so that the tube 1619 is normally deionized. Likewise, the start tube 810 of the timing circuit 212 is deionized under normal conditions, the control grid of this tube being biased to a high negative value by the potential supplied thereto from a voltage divider circuit consisting of the two resistors 835 and 836 which are connected in series between the negative bias supply and ground. The timing tube 811 of the circuit 212 is also normally deionized.

In considering the operation of the timing circuit 212 it will be recalled from the preceding description of the tens inverter circuit 260 that coincident with the first impulse of the first digit dialed at the calling substation a positive control pulse is impressed upon the conductor 231 at the anode of the inverter tube 812. This pulse is impressed upon the control grid of the start tube 810 through the condenser 827 and has the effect of firing this tube following which the control grid of this tube loses control in the usual manner. When current conduction through the tube 810 is thus established the voltage drop through the tube drops to a very low value so that substantially the full voltage of the +B switch conductor 12*c* appears across the cathode resistor 837 of this tube. Specifically, approximately 130 volts of the available 140 volts potential appears across the resistor 837. This voltage is impressed upon the timing condenser 838 through the resistor 839 and the resistor 840 and the anode of the discharge tube 1619 is connected to the upper terminal of the timing condenser 838. Concurrently with firing of the start tube 810 the tens register pulser tube 813 fires so as to produce a positive pulse which is impressed upon the conductor 230 and is supplied to the control grid of the discharge tube 1619 so as to fire this tube. As a consequence the tube 1619 is ionized and this tube charges the condenser 838 negatively. Since the tube 1619 is a gas tube, the control grid thereof loses control once this tube is fired and the timing condenser 838 continues to be charged negatively through the tube 1619 until this condenser is charged up sufficiently to reduce the current through the discharge tube 1619 below the extinction point thereof whereupon the tube 1619 is deionized. When the tube 1619 is deonized the voltage across the resistor 837 is then effective to charge the timing condenser 838 positively. In this connection it will be understood that the start tube 810 stays on continuously once the first positive pulse is applied to the control grid thereof.

The timing condenser 838 is thus charged positively to the voltage across the resistor 837 at a rate determined by the time constant of the circuit consisting of this condenser and the resistors 839 and 840. By suitable proportioning of the capacitance and resistance values of these circuit elements the time constant of the circuit is made long enough so that the potential at the upper terminal of the condenser 838 does not rise to a sufficiently high positive value to effect ionization of the timing tube 811 during the closed circuit period of a dial impulse. Immediately the open circuit period of the second dial impulse starts, the dial impulse integrator circuit 209 impresses a negative control pulse upon the inverter tube 812 which is repeated through this tube and fires the tens register pulser tube 813 so as to produce a large positive pulse on the conductor 230. This positive pulse is supplied to the control grid of the discharge tube 1619, which, it will be remembered, is now deionized, with the result that the discharge tube 1619 is again fired and the condenser 838 is rapidly charged negatively through this tube to a very low voltage. As the condenser 838 is again charged negatively the current decreases through the discharge tube 1619 to a point at which ionization cannot be supported and the tube 1619 goes out. It will thus be understood that during the arrival of the successive impulses of the first digit at the connector 12*b* the discharge tube 1619 is controlled by the tens register pulser 210 to prevent the condenser 838 from charging to a level at which firing of the timing tube 811 can occur.

In the specific call considered in the preceding description, i. e., that initiated at the substation A and intended for the party line substation B, the first digit comprises three impulses with the result that the tube 1619 functions to discharge the condenser 838 three times. However, at the end of the third impulse and during the interdigit pause during the first and second digits which is of substantially greater duration than the closed digit of the dial impulse, the condenser 838 is permitted to charge through the resistors 839 and 840 to substantially the full voltage across the resistor 837. As a result, the control grid potential of the tube 811 is driven positive to a value at which ionization of this tube occurs. Once the tube 811 is thus fired the control grid thereof loses control. It will be understood, therefore, that at the end of the first digit dialed at the calling substation, the tubes 810 and 811 are both ionized and remain conductive for the duration of the call.

When current conduction through the tube 811 is initiated in the manner just explained the resulting current flow through the resistors 841 and 833 has the effect of increasing the positive potential across the resistor 833. Since the resistor 833 is included in the cathode circuit of the tens register pulser tube 813, the cathode of this tube is biased highly positively by the above-described current flow through the resistor 833 to prevent the tube 813 from firing. As a result, further pulses developed by the dial impulse integrator circuit 209 during dialing of the second and third digits at the calling substation are blocked against transmittal through the tens changeover gate circuit to the tens digit register 211.

In order to prevent the tube 813 from misfiring upon the application thereto of the control potential developed at the cathode of the timing tube 811 only a portion of this control potential, i. e., the potential produced across the resistor 833 is employed to bias the tube 813 against further response to control pulses appearing at the control grid thereof. Such an arrangement is necessary because it has been found that the tube 813 will actually strike an arc between the cathode and starter electrode thereof when a sufficiently positive voltage is applied to the cathode, which arc is sufficient to cause ionization of the tube 813 and a false actuation of the tens register 811.

The positive control potential developed at the cathode of the timing tube 811 when this tube fires is impressed upon the control grid of the units inverter tube 816 over a path which includes the conductor 234 and the resistors 844 and 845 to condition the tube 816 to repeat pulses to the units register pulser 214 during the dialing of the second digit at the calling substation. Thus, the tens sequence timing circuit 212 operates during the interdigit pause separating the first and second digits to block the tens register pulser 210 against further response to control pulses developed during dialing of succeeding digits and to condition the units inverter circuits 261 to repeat control pulses to the units register pulser 214 during the second digit.

When the link 12 is seized by an incoming call and the finder 12*a* functions in the manner explained above to impress operating anode potential upon the +B switching conductor **12*c*, switching transients are produced which may prematurely fire one or more of the tubes in the tens sequence timing circuit 212**. In order to insure that the timing tube 811 of the circuit 212 is not prematurely fired upon the application of anode potential to the conductor 12*c*, there is provided the condenser 843 which is connected from the control grid of the tube 811 to ground. When operating anode potential is applied to the conductor 12*c* a positive transient may be coupled to the control grid of the tube 811 through the control grid-anode capacity thereof and such positive transient pulses can actually fire the timing tube 811 and cause changeover before the first digit is dialed thereby giving a false registration of the call. The condenser 843 bypasses the control grid of the timing tube 811 for all transient pulses which occur when operating anode potential is applied to the conductor 12*c* and thus prevents this tube from firing prematurely.

In order to prevent the tens sequence start tube 810 from firing prematurely upon the application of operating anode potential to the conductor 12*c*, there is provided the condenser 846 which is connected from the conductor 12*c* to the cathode of the tube 810. Accordingly, when anode operating potential is applied to the conductor 12*c* and a positive transient pulse is coupled to the control grid of the tube 810 through the control grid-anode capacity of this tube, this positive transient pulse is also coupled through the condenser 846 to the cathode of the tube 810. The cathode of the tube 810 is thus forced to follow the control grid potential of this tube with the end result that the bias on the tube 810 is not reduced by the transient pulse and this tube is not fired upon the application of potential to the conductor 12*c*. In this connection it will be understood that it is impossible to bypass the control grid of the tube 810 directly due to the fact that the normal input signal applied to this control grid comprises the relatively short control pulses produced at the anode of the tens inverter tube 812. However, by the above-described cathode coupling arrangement the condenser 846 forces the cathode to follow the control grid and the tube 810 is positively prevented from firing when the link 12 is seized.

As described heretofore, when the link 12 is seized and operating anode potential is applied to the conductor 12*c* the priming tube 930 is fired to condition the counting tubes of the tens digit register 211 for counting in accordance with the first digit dialed at the calling substation A. When the priming tube 930 fires, a positive pulse is produced across the resistor 910 thereof which is back coupled through the condenser 915 and is impressed upon the conductor 230. The positive pulse thus impressed upon the conductor 230 is coupled through the condenser 1631 and the resistor 1632 to the control grid of the tens sequence discharge tube 1619. In the absence of the resistor 1632 the positive pulse thus impressed on the conductor 230 would cause the tube 1619 to fire prematurely and immediately following application of anode potential to the conductor 12*c*. In order to prevent such premature firing of the tube 1619 the resistor 1632 functions together with the resistor 1630 to limit the voltage impressed upon the control grid of the tube 1619 so that this tube does not fire when the priming tube 930 is initially fired in the manner described above. However, it will be understood that the register drive pulses produced on the conductor 230 upon firing of the tube 813 are of sufficiently greater amplitude to fire the tens sequence discharge tube 1619 in the manner described in detail above.

As discussed generally above, when the call is terminated anode potential is removed from the conductor 12*c* and the tubes 810 and 811 in the tens sequence timing circuit 212 are extinguished. However, the link 12 may be immediately reseized by a waiting line and if the timing condenser 838 of the circuit 212 has not sufficiently discharged during the interval between the release of the link 12 and its reseizure by a waiting line, the timing tube 811 may be fired prematurely and cause changeover before dialing of the first digit occurs. In order to prevent the above described premature firing of the tube 811 upon successive seizures of the link 12 by succeeding calls, the resistor 840 functions to provide a negative blocking potential which biases the control grid of the tube 811 negatively by a sufficient amount to prevent this tube from firing prematurely even though the link 12 is immediately reseized by a waiting line and operating anode potential is immediately reapplied to the conductor 12*c*. During periods when the condenser 838 is charging positively to the voltage across the resistor 837, the diode section 812*a* of the tube 812 is conductive so that the resistor 840 is effectively shunted out by the relatively low resistance of this conductive diode section. However, when the link 12 is released and operating anode potential is removed from the conductor 12*c* the voltage across the resistor 837 disappears and the condenser 838 discharges through the series resistors 840, 837, and 839. Since the voltage across the resistor 840 is now reversed, the diode section 812*a* is rendered nonconductive. There is thus produced across the resistor 840 a negative potential which is impressed upon the control grid of the timing tube 811 through the condenser 838 and the resistor 842 to prevent this tube from firing prematurely in the event that the link 12 is immediately reseized by a waiting line and operating anode potential is immediately reapplied to the conductor 12*c*.

The resistor 842, which is connected in series with the control grid of the tube 811, is provided for the purpose of limiting the grid current which may be drawn by the timing tube 811 when this tube is fired by the positive potential produced across the condenser 838 at the end of the first digit, as described in detail above. Also, the resistor 842 functions as an anode current limiter for the tens sequence discharge tube 1619 in those situations where the discharge tube 1619 accidentally fires after the timing tube 811 is fired. In this connection it will be understood that the control grid of the tube 811 assumes the potential existing in the ionized gas of this tube after it is fired and this control grid cannot be driven negatively without producing tremendous current flow therethrough. However, the resistor 842 prevents the flow of excessive grid current in those instances when the discharge tube is fired after the timing tube fires.

As indicated above, the units inverter circuit 261 performs the function of preventing the control pulses developed by the dial impulse integrator circuit 209 during dialing of the first digit at the calling substation from reaching the control grid of the units register pulser tube 817 as well as repeating positive control pulses to the circuits 214 and 216 during dialing of the second digit. To this end the control grid of the units inverter tube 816 is normally biased sufficiently negatively by means of the negative potential across the series of resistors 844, 841, and 833 to bias the tube 816 against pulse transmission therethrough following seizure of the connector 12*b* and throughout dialing of the first digit at the calling substation. When the timing tube 811 is fired at the end of the first digit in the manner explained above, the positive potential produced across the resistors 841 and 833 decreases the bias potential on the tube 816 so that this tube is operative to transmit pulses therethrough. During dialing of the second digit the negative control pulses produced by the dial impulse integrator circuit 209 are coupled through the condenser 846 to the control grid of the tube 816 and are repeated as positive pulses at the anode of this tube. The resulting positive pulses developed at the anode of the tube 816 are impressed upon the control grid of the units sequence start tube 814 over a path which includes the conductor 238 and the condenser 848. These positive pulses are also coupled through the condenser 849 to the control grid of the units register pulser tube 817. The units register pulser 214 functions in a manner identical to that described above in connection with the tens register pulser 210 to produce large register drive pulses of uniform amplitude and duration across the resistor 942 which are suitable for driving the units digit register 215.

The manner in which the units digit register 215 responds to the drive pulses supplied thereto by the units register pulser 214 is exactly the same as the above-described response of the tens digit register 211 to the drive pulses supplied thereto by the tens register pulser 210. From this explanation it will be understood that the first positive pulse, i. e., that representative of the first dial impulse of the second digit, developed across the resistor 942 has the effect of extinguishing current flow through the priming tube 940 and at the end of this pulse the first counting tube 911 is fired. It will also be understood that if successive pulses, each representative of another dial impulse, are developed across the resistor 942, the counting tubes of the units digit register 215 are ionized in sequence at the rate of one counting tube for each dial impulse. In the particular call under consideration wherein the numerical value of the second digit is 2, the second counting tube 912 remains conductive at the end of the second digit. With this tube conducting the polarities of the potentials respectively impressed upon the anode and cathode terminals of the pulse gating rectifier 912*d* are such that this rectifier is rendered operative to transmit negative units pulses appearing on the units pulse conductor 30*b* over the conductor 245 to the connector pulse forming circuit 217. Since the second counting tube 912 of the units digit register 215 remains conductive for the duration of the call, negative units pulses developed on the conductor 30*b* are likewise gated to the connector pulse forming circuit 217 through the crystal 912*d* for the duration of the call.

Referring now more particularly to the units sequence timing circuit 216, it will be recalled that this circuit is provided for the purpose of blocking the units register driver 214 after the second digit is terminated and of conditioning the party inverter circuit 262 to transmit pulses therethrough to the party register driver 263 during the dialing of the third digit at the calling substation. In general, the circuit 216 operates in the same manner as the tens sequence timing circuit 212. Thus, the discharge tube 1620 is controlled by pulses which are produced at the cathode of the units register pulser tube 817 and supplied over the conductor 236 to the control grid of the tube 1620 so that this tube is fired at the start of the open circuit period of each impulse dialed during the second digit. Due to the action of the units inverter circuit 261 to prevent pulses from reaching the units changeover gate circuit 214 while the first digit is being dialed, no pulses are impressed upon the control grid of the start tube 814 during this digit. However, the first pulse repeated during the second digit is applied to the control tube 814 and has the effect of firing this tube. After the tube 814 fires to produce a positive potential across its cathode load resistor 850, the discharge tube 1620 responds to the pulses impressed thereon from the units register pulser 214 to prevent the timing condenser 851 from charging to a potential which will effect firing of the timing tube 815 until after the digit is ended. However, when the second digit ends to end the transmission of pulses to the control grid of the discharge tube 1620 from the circuit 214, the condenser 851 is charged positively by an amount sufficient to cause the timing tube 815 to fire. When the tube 815 is thus rendered conductive the resultant current flow through the cathode resistors 852 and 853 thereof has the effect of raising the positive potential of the cathode of the tube 817 to a value sufficient to block this tube against further production of driving pulses for the units digit register 215. Furthermore, the positive potential produced across the resistors 852 and 853 when the tube 815 fires raises the control grid potential of the party inverter tube 820 to condition this tube to transmit pulses therethrough during the dialing of the third digit at the calling substation. Thus, the units sequence timing circuit 216 operates during the interdigit pause separating the second and third digits to block the units register pulser 214 against the further production of drive pulses for the units digit register 215 during dialing of the third digit and to condition the party inverter circuit 262 to repeat pulses to the party register pulser 263 during the third digit.

During dialing of the third digit the negative control pulses produced by the dial impulse integrator circuit 209 in the manner described above are coupled through the condenser 860 to the control grid of the party inverter tube 820. Since the bias voltage on this tube is reduced at the end of the second digit by firing of the tube 815, the party inverter tube 820 is operative to repeat pulses developed during dialing of the third digit at the anode thereof. The positive control pulses produced at the anode of the tube 820 during dialing of the third digit are impressed upon the control grid of the party sequence start tube 818 over a path which includes the conductor 237 and the condenser 861. These pulses are also coupled through the condenser 862 to the control grid of the party register pulser tube 821.

Operation of the party register pulser 263 to produce uniform amplitude register drive pulses corresponding to the impulses of the third digit suitable for driving the party digit register 265 is the same as the operation of the tens and units register pulsers 210 and 214 described above. More specifically, the positive control pulses coupled through the condenser 862 to the control grid of the party register pulser tube 821 trigger this tube so that it fires upon the occurrence of each pulse and the resultant current flow through the series connected condenser 953 and the resistor 954 is effective to produce pulses of uniform amplitude and duration across the resistor 954 which are suitable for driving the counting tubes of the party digit register 265. In this connection it will be understood that the pulses produced at the cathode of the party register driver tube 821 are also coupled over the conductor 240 to the control grid of the party sequence discharge tube 1621 to effect firing of this tube in a manner more fully explained below.

In considering the manner in which the party digit register 265 responds to the pulses transmitted thereto by the party register pulser 263, it will be recalled that this register is provided for the purpose of establishing a path for the transmission of interrupted ringback tone signals, corresponding to the particular party line ringing signal assigned to the called party line substation to the ringback tone gate tube 1714 in the network 225. In the tens and units register units 211 and 215 the tens and units pulses may be selectively gated by the use of crystal gating rectifiers since these pulses may thereafter be clipped and limited to remove amplitude modulation therefrom. However, in the party digit register 265 the gated signal consists of pulses of ringback tone of audible frequency. Accordingly, crystal gating rectifiers are unsuitable for the selective gating of interrupted ringback tone signals in the party digit register 265 because of leakage through these rectifiers which would result in undesirable cross talk of the various party line ringing signals. There is thus provided in the register 265 the hot cathode gate tubes 1612, 1613, 1710, 1711, and 1712, each of these tubes comprising two separate diode sections so that these tubes collectively comprise ten separate gating rectifiers for the ten counting tubes of the party digit register 265. Thus, the anode of the first counting tube 921 is connected through the resistor 921*a* to the cathode of the left-hand diode section of the tube 1612, and the anode of the tube 922 is connected through the resistor 922*a* to the cathode of the right-hand diode section of the tube 1612. In a similar manner the remaining counting tubes of the party digit register 265 are connected to the diode sections of the diode gating rectifiers 1613, 1710, 1711, and 1712.

Refering now more particularly to the manner in which the counting tubes of the party digit register 265 selectively control the gating rectifier tubes 1612, 1613, etc., to gate to the ringback tone gate tube 1714 interrupted ringback tone signals which are coded in accordance with the party line ringing code assigned to the particular called party line substation, it is first pointed out that when the link 12 is not in use the anodes of the tubes 1612, 1613, etc., which are connected to the common output conductor 275, are biased highly negatively by means of the voltage divider including the series resistors 1725 and 1726 which are connected between the +B switch conductor 12*c* and the negative supply potential. In this connection it will be remembered that the potential on the conductor 12*c* is zero until the link 12 is seized so that the potential produced on the common anode conductor 275 is of a substantial negative value. The cathode terminals of all of the rectifiers 1612, 1613, etc., are connected to the +B switching conductor 12c over paths individual thereto. Accordingly, the anodes of these rectifiers are biased negatively by an amount equal to the potential drop across the resistor 1725. With code modulated ringback tone signals being applied to the conductors 48a, 48b, 48c–48j, inclusive, from the code modulator circuit 27, these ringback tone signals are impressed upon the cathode terminals of the gating rectifiers 1612, 1613, etc., through the coupling condensers 921e, 922e, 923e, etc. By the above-described biasing arrangement the anodes of the rectifiers 1612, 1613, etc., are biased negatively relative to the cathodes thereof so as to prevent ringback tone leakage through these rectifiers. Thus, with the connector 12b inactive the code modulated ringback tone signals impressed upon the cathodes of the rectifiers 1612, 1613, etc. are prevented from appearing on the output conductor 275 of the register unit 265. When the finder 12a functions in the manner explained above to impress operating anode potential upon the +B switching conductor 12c incident to seizure of the link 12, the potential of the cathodes of the tubes 1612, 1613, etc. is biased positively to the potential of the conductor 12c. However, the anodes of these tubes are not raised to the same positive potential due to the voltage drop across the resistor 1725. As a result the cathodes of the tubes 1612, 1613, etc., remain more positive than the anodes thereof after the link 12 is seized and ringback tone signal transmission therethrough is still prevented.

From the foregoing explanation of the operation of the tens and units digit registers 211 and 215 it will be understood that the first positive register drive pulse developed across the load resistor 954 in the party digit register 265, which is representative of the first dial impulse of the third digit, has the effect of extinguishing current flow through the priming tube 950 and at the end of this pulse the first counting tube 921 is fired. It will also be understood that if successive pulses which are representative of other dial impulses are developed across the resistor 954, the counting tubes of the party digit register 265 are ionized in sequence at the rate of one counting tube for each dial impulse. In the particular call under consideration, i. e., that involving the party line substation B as the called line 32, to which substations is assigned the party line digit of 2, the second counting tube 922 remains conductive at the end of the digit. With this tube conducting the polarities of the potentials respectively impressed upon the anode and cathode terminals of the right hand diode section of the tube 1612 are such that this diode is rendered conductive to transmit the code modulated ringback tone signal appearing on the conductor 48b over the conductor 275 to the control grid of the ringback tone gate tube 1714. The code modulated ringback tone signal corresponding to the number 2 party line ringing signal is passed without rectification through the right hand diode section of the tube 1612 since this signal is superimposed on the D. C. current which flows through this diode section when the tube 922 fires. Accordingly, this ringback tone signal is applied substantially without change to the control grid of the ringback tone gate tube 1714 over a path which includes the conductor 275 and the condenser 1728.

Referring now more particularly to the party sequence timing circuit 264, it will be recalled that this circuit is provided to block the party register pulser 263 against further production of pulses after the third digit is terminated. In the illustrated embodiment, this circuit also performs the function of initiating the line busy test operation, i. e., the operation of testing the time position of the selected called line to determine whether that line is idle or busy. In general, the circuit 264 operates in exactly the same manner as the tens and units timing circuits 212 and 216. Thus, the discharge tube 1621 is controlled by pulses supplied thereto over the conductor 240 from the party register pulser tube 821 so that this tube is fired during the open circuit period of each third digit impulse dialed at the calling substation. Due to the above bias condition imposed upon the party inverter tube 820 while the first and second digits are being dialed at the calling substation, no pulses are impressed upon the control grid of the start tube 818 during these digits. However, the first pulse repeated by the tube 820 during the third digit is applied to the control grid of the start tube 818 and has the effect of firing this tube. After the tube 818 fires to produce a large voltage across its cathode resistor 865, the discharge tube 1621 responds to pulses supplied thereto from the party register pulser tube 821 to prevent the timing condenser 866 from charging to a potential which will effect firing of the timing tube 819 until after the third digit has ended. However, when the third digit ends to end the transmission of pulses to the control grid of the discharge tube 1621, the condenser 866 is charged sufficiently positive to cause the tube 819 to fire thereby producing heavy current flow through the cathode resistors 867 and 868 thereof. The flow of current through the resistor 868 has the effect of raising the cathode potential of the tube 821 so as to bias this tube sufficiently negatively to prevent this tube from responding to further impulses supplied to the control grid thereof. Accordingly, the tube 821 is thereby biased to prevent any further signals of whatever character from producing pulses which would drive the party unit 265 off register. The positive potential developed at the cathode of the timing tube 819 incident to the firing of this tube is impressed upon the busy circuits 217, 218, and 219 over a path which includes the busy start conductor 242. Since the tubes 818 and 819 remain conductive for the duration of the call it will be understood that the positive control potential impressed upon the conductor 242 remains on this conductor until the connector 12b is released.

Referring now more particularly to the connector pulse forming circuit 217, it will be recalled that this circuit is provided to combine the selected tens pulse gated by the tens digit register 211 with one of the units pulses gated by the units digit register 215 to form a single connector pulse which occurs in each time position of the pulse frame assigned to the called line. The connector pulses thus formed are utilized to control the busy test circuit 218, the busy gate circuit 220, the called line in gate circuit 223, the called line reconstructor circuit 222, the called line out gate circuit 224, and the called line ringing out gate circuit 270 in the performance of the functions respectively assigned to these circuits. Operation of the connector pulse forming circuit 217 may best be explained by reference to the particular call considered throughout this specification, namely, the call originating at the substation A and intended for the party line substation B. In this case, and as explained above, the tens digit register 211 is controlled by the first digit dialed at the calling substation to select the third tens pulse 74a of each pulse frame and to gate this pulse over the conductor 232 to the connector pulse forming circuit 217. The units digit register 215 is controlled by the second digit dialed at the calling substation to select the second, twelfth, twenty-second, etc., units pulses 63a, 63b, 63c, etc., of each pulse frame and to gate these pulses over the conductor 245 to the connector pulse forming circuit 217.

Normally both sections of the pulse combining tube 1611 are heavily conductive by virtue of the positive potentials impressed upon the control grids thereof through the current limiting resistors 1635 and 1636. The inverter tube 1513 is also normally heavily conductive by virtue of the positive potential impressed upon the control grid thereof through the current limiting resistor 1545. The clipping tube 1610 is normally biased beyond cutoff by the bias potential impressed upon the control grid of this tube from the potentiometer 1637 through the resistor 1638, This potentiometer is included in a voltage divider circuit which includes the resistor 1639 and the conductor 242. The cathode follower tube 1512 is self-biased by connection of the control grid thereof through the resistor 1546 to ground potential and the cathode thereof through the resistors 1547 and 1548 to ground potential. The clipping tube 1610 is thus normally biased against repeating connetcor pulses to the inverter tube 1513 since the control grid of this tube is highly negative. When, however, the timing tube 819 fires to produce a large positive potential on the conductor 242, the bias level on the control grid of the clipping tube 1610 is reduced to render this tube pulse conductive in the manner more fully explained below.

The pulse combining tube 1611 functions to combine the selected tens pulse with one of the ten selected units pulses of each pulse frame through the use of a common anode circuit including the common anode resistor 1640. Specifically, each negative tens pulse appearing on the conductor 232 has the effect of biasing the left hand section of the tube 1611 beyond cutoff for the duration of the pulse. Similarly, each negative units pulse gated to the conductor 245 has the effect of cutting off space current flow through the right hand section of the tube 1611. By utilizing pulses of sufficient amplitude to drive the right and left hand sections of the tube 1611 beyond cutoff any noise components on the tops of these pulses are clipped off and are not reproduced at the output side of this tube.

All of the pulses developed across the common anode resistor 1640 are impressed upon the control grid of the clipping tube 1610 through the condenser 1641. After the timing tube 819 has fired to decrease the negative bias on the control grid of the tube 1610, this tube is biased beyond cutoff by a value which is sufficient to exceed the amplitude of the tens and units pulses alone. Thus only the units pulse portion of the composite pulse produced during coincidence of the gated tens pulse and one of the gated units pulses has the effect of driving the grid of the tube 1610 into the conductive region of the tube. In other words, the clipping tube 1610 is controlled to draw current only during the units pulse period of each composite pulse developed at the anode of the tube 1611. This pulse period obviously occurs in the time position assigned to the called line, i. e., the time position 63*c* in the particular call under consideration. In this connection it is pointed out that the connector pulse forming circuit 217 is prevented from developing connector pulses until both the tens and units time positions designating the called line are fully selected so that interference in the circuits controlled by the unit 217 is prevented.

The connector pulses produced at the anode of the tube 1610 which are of negative polarity, are impressed upon the control grid of the tube 1513 through the condenser 1642, and are repeated in amplified form as positive pulses at the anode of the tube 1513. The connector pulses produced at the anode of the tube 1513 are coupled to the control grid of the cathode follower output tube 1512 through the condenser 1550 and are repeated in the same polarity across the cathode resistors 1547 and 1548 of this tube. The cathode follower output tube 1512 provides a low impedance output suitable for driving the many circuits to which connector pulses are supplied in the manner described immediately below. Thus, the positive connector pulses produced at the cathode of the tube 1512 are impressed upon the control grid of the called line in gate tube 1511, the control grid of the peaker tube 1413 in the called line reconstructor circuit 222, and the control grid of the called line out gate tube 1417 over a path which includes the conductor 239 and the condenser 1551. The positive connector pulses are also impressed upon the control grid of the busy gate tube 1516 over a path which includes the conductor 239 and the condenser 1552. Likewise, that portion of the positive connector pulses which appears across the lower cathode resistor 1548 is impressed upon the control grid of the busy test tube 1517 over a path which includes the condenser 1553 and the conductor 239*a*.

Referring now more particularly to the busy test circuit 218, it will be recalled that this circuit performs the function of comparing the time position of the connector pulses developed by the connector pulse forming circuit 217 with the time positions of busy pulses which may be present on the busy pulse in conductor 52*b* to determine whether or not the called line is idle or busy. In the event the called line, i. e., the line 32, is idle, coincidence is lacking between the time position 63*c* of the connector pulses produced by the circuit 217 and the time position occupied by any of the busy pulses present on the busy pulse in conductor 52*b*. In such case the circuit 218 functions to prevent the busy lock circuit 219 from operating and also to condition the ringback tone gate tube 1714 to transmit therethrough a code modulated ringback tone signal which is employed to initiate and control the operation of the ringing facilities provided in the line circuit terminating the called line in accordance with the party line ringing signal supplied thereto. On the other hand if the connector pulses developed by the connector pulse forming circuit 217 coincide in time position with busy pulses present on the busy pulse in conductor 52*b*, an indication is provided that the called line is busy. In such event the busy test circuit 218 does not operate but permits the busy lock circuit 219 to operate and lock the connector 12*b* in its line busy setting.

In considering the operation of the busy test circuit 218 it will be noted that busy pulses which are developed on the busy pulse out conductor 52*a* in each of the busy finders and connectors of the system are amplified in the busy pulse driver channel 750 in the link coupling circuits 24 and impressed upon the control grid of the inverter tube 1614 over a path which includes the conductor 52*b* and the coupling condenser 1645. These pulses are amplified and inverted through the tube 1614 and are impressed upon the shield grid of the busy test tube 1517 through the coupling condenser 1560. Normally, operating bias for the shield grid of the tube 1517 is derived from a voltage divider circuit consisting of the two resistors 1561 and 1562 which are connected in series from the conductor 242 to the negative supply potential, the potential at the junction point between these resistors being impressed upon the shield grid of the tube 1517 through the resistor 1563. A condenser 1564 is connected from this junction point to ground.

Prior to firing of the party sequence timing tube 819 in the party sequence timing circuit 264 the potential of the conductor 242 is zero so that a relatively large negative potential is impressed upon the shield grid of the tube 1517 under these conditions. However, when the tube 819 is fired to produce a large positive potential on the conductor 242, the bias voltage of the shield grid of the tube 1517 is reduced substantially to zero. It will be understood, therefore, that after the timing tube 819 is fired the incoming busy pulses impressed upon the shield grid of the tube 1517 serve to drive this grid negative with respect to the cathode potential thereof.

The connector pulses impressed upon the output conductor 239*a* by the circuit 217 are applied to the control grid of the tube 1517 in a positive sense over a path which includes the condenser 1553. Normally this grid is biased to a predetermined negative potential by a voltage divider circuit comprising the series connected resistors 1565, 1554, and 1646, which are bridged between the negative terminal of the bias potential source and the +B switch conductor 12*c*. This negative potential serves to prevent the busy test tube 1517 from firing when the potential on the shield grid of the tube is reduced to zero through ionization of the timing tube 819.

Each positive connector pulse impressed upon the control grid of the tube 1517 has the effect of driving this grid positive relative to the tube cathode so that in the event no busy pulse is coincidentally present on the shield grid of the tube to drive the latter grid negative, the tube fires. Thus, the idle condition of the called line is indicated. However, if busy pulses are delivered to the shield grid of the tube 1517 to drive this grid negative coincidentally with excitation of the tube control grid with a positive connector pulse, the tube 1517 is not fired. Thus, the busy condition of the selected call line is indicated.

In the event the busy test tube 1517 fires, current conduction through the tube is thereafter independent of the potentials impressed upon the two grids thereof so that the tube 1517 will continue to conduct for the duration of the call and until the connector **12*b* is released. Space current flow through the tube 1517 causes the rectifier 1647 to conduct and a large voltage drop to appear across the resistor 1648. This voltage is impressed upon the cut-through conductor 251 through the resistor 1649. A filter condenser 1650 is connected from the cut-through conductor 251 to ground. It will thus be understood that if the called line 32 is idle, the busy test tube 1517 responds to the connector pulses impressed upon the control grid thereof from the connector pulse forming circuit 217 by firing to develop a positive control potential on the cut-through conductor 251. On the other hand, if this called line is busy the application of inverted busy pulses to the shield grid of the tube 1517 in time coincidence with the connector pulses applied to the control grid of this tube prevents the tube 1517** from firing.

In order to stabilize certain important potentials in the busy test circuit 218 and render this circuit insensitive to power supply variations, temperature drift, and resistor tolerances, there is provided a duo-diode busy bias clamping tube 1717, the anode of each diode section of this tube being connected to ground. The cathode of the left hand section of the tube 1717 is connected to the busy test start conductor 242 so that the left hand diode section of the tube 1717 serves to prevent the conductor 242 from going negative with respect to ground potential. In this connection it will be understood that the bleeder networks such as the network including the resistors 1561 and 1562, the network including the resistor 1639 and the potentiometer 1637, and the network including the resistors 247 and 1651, are of such resistance value that the left hand diode section of the tube 1717 normally conducts prior to firing of the party sequence timing tube 819. However, when the tube 819 fires to start the busy test operation the potential produced on the conductor 242 becomes highly positive so as to bias the left hand diode section of the tube 1717 against conduction. The above-described clamping action, whereby the conductor 242 is prevented from becoming negative with respect to ground potential, stabilizes the bias impressed upon the shield grid of the busy test tube 1517 and prevents this grid from becoming highly negative before the conductor 242 is energized. In this connection it will be understood that if the clamping tube 1717 is not provided the potential on the conductor 242 before the tube 819 is fired may be considerably negative and the shield grid bypass condenser 1564 becomes charged to this negative voltage. Accordingly, when the timing tube 819 fires and the potential on the conductor 242 becomes positive, the retention of charge on the condenser 1564 prevents the tube 1517 from firing, even though positive connector pulses are impressed upon the control grid thereof, until the charge on the condenser 1564 has been reduced to a point sufficient to bring the shield grid to approximately ground potential. If the busy test tube 1517 is thus prevented from firing immediately upon the application of potential to the conductor 242 the busy lock tube 1615 may fire before the busy test tube 1517 fires, thus giving a false busy indication. However, with the above-described clamping arrangement whereby the conductor 242 is prevented from drifting negatively with respect to ground prior to the application of positive potential thereto, the condenser 1564 is not charged sufficiently negatively to prevent the busy test tube 1517 from firing immediately upon the application of positive connector pulses to the control grid thereof.

The right hand diode section of the tube 1717 operates to stabilize the potential on the cut-through conductor 251 and prevents this conductor from going negative with respect to ground. More specifically, the cathode of the right hand diode section of the tube 1717 is connected to the cathode of the busy test tube 1517 and the various bleeder networks which are connected to the conductor 251 are of such resistance value that this diode section is normally conductive prior to firing of the busy test tube 1517. Accordingly, the conductor 251 is held substantially at ground potential before the tube 1517 fires. In this connection it will be understood that in the absence of the above-described clamping arrangement the cathode potential of the busy test tube 1517 may drift negatively by a sufficient amount to cause this tube to fire prematurely with the result that the operations controlled by this tube are prematurely initiated. However, with the above-described clamping arrangement the cut-through conductor 251 is held substantially at ground potential and the cathode potential of the busy test tube 1517 is stabilized to prevent premature firing thereof.

Referring now more particularly to the busy lock circuit 219 in its operation to lock the connector in its called line busy setting in the event the busy test tube 1517 is not fired in the manner explained above, it is pointed out that the control grid of the busy lock tube 1615 is normally biased to a potential slightly positive with respect to ground from the voltage divider circuit consisting of the resistor 1651 and the resistor 247 which are connected between the conductor **12*c* and the conductor 242. With the tube 1615 normally deionized the cathode thereof is at ground potential and the small positive bias impressed upon the control grid of this cold cathode gas tube is insufficient to cause the tube to fire. However, when the timing tube 819 is fired in the manner explained above to produce a large positive potential on the conductor 242, the condenser 1653 starts to charge in the direction to increase the positive potential on the control grid of the tube 1615. Preferably the charging rate of this condenser is relatively short so that if the busy lock tube 1615 is not otherwise biased against firing in the manner explained below, the control grid potential of this tube is rapidly increased in a positive sense to the tube ignition value within a few pulse frames after the timing tube 819** is rendered conductive.

Assuming that the called line is busy such that the busy test tube 1517 is prevented from firing in the manner explained above, the rise in potential across the condenser 1653 results in ionization of the busy lock tube 1615 to produce current flow through the anode resistor 1646 and the cathode resistor 1648 thereof. Thus, the positive potential at the anode of the tube 1615 is substantially decreased whereas the positive cathode potential of this tube is greatly increased. Since the resistor 1646 is included in the above-described voltage divider circuit from which the negative bias potential for the control grid of the busy test tube 1517 is derived, it will be understood that when the busy lock tube 1615 is rendered conductive to produce a voltage drop across the resistor 1646, the negative bias potential impressed upon the control grid of the busy test tube is increased to a very high value with the result that this tube is biased against inadvertent firing as the result of the continued application of pulses to the two grids thereof.

Normally, the control grid of the busy lock inverter tube 1616 is biased positively to the anode current saturation value of the tube from a voltage divider circuit which includes the anode resistor 1646 of the busy lock tube 1615 and the two resistors 1655 and 1656, the three identified resistors being connected in series between the +B switching conductor 12*c* and the negative terminal of the bias potential source. The control grid of the busy tone gate tube 1617 is normally biased negatively well beyond cutoff from the potential supplied thereto from the voltage divider circuit consisting of the anode resistor 1658 of the tube 1616, the resistor 1659, and the resistor 1660. With the busy tone gate tube 1617 biased beyond cutoff the busy tone signal voltage produced on the conductor 46 by the busy tone signal generator 29*a* and impressed upon the control grid of the tube 1617 through the condenser 1661 is prevented from reaching the calling line out gate circuit 226.

When the busy lock tube 1615 is fired in the manner explained above the resulting voltage drop produced across the resistor 1646 drives the control grid of the inverter tube negative well beyond cutoff. As a consequence the voltage drop across the resistor 1658 disappears to drive the control grid of the busy tone gate tube 1617 positive into the class A operating region of the tube and thus render this tube conductive. The busy tone signal impressed upon the control grid of the tube 1617 through the condenser 1661 is then reproduced at the anode of this tube and impressed upon the calling line out gate circuit 226 over a path which includes the coupling condenser 1663, the mixing resistor 1664, and the conductor 244. From the calling line out gate circuit the busy tone signal is forwarded through the talking distributor 15 and the line circuit 10 to the calling line for reproduction by the receiver at the calling substation in the manner explained below. Reproduction of this signal serves to inform the calling subscriber that the called line is busy and that the connection should be released.

As explained above, if the called line tests idle the busy test tube 1517 is rendered conductive to produce current flow over a path which includes the rectifier 1647 and the resistor 1648 in the proper direction to drive the cathode of the busy lock tube 1615 highly positive. As a consequence the subsequent rise in positive potential of the control grid of the tube 1615 resulting from charging of the condenser 1653 to the potential level of the conductor 246 is prevented from firing the tube 1615. It will be understood, therefore, that the busy lock tube 1615 is only rendered conductive to perform the functions just described in the event the called line is tested by the busy test tube 1517 and found busy. It will also be understood that the rectifier 1647 is so poled as to prevent the voltage developed across the cathode resistor 1648 when the tube 1615 fires from being applied to the connector cut-through conductor 251 to cause false cut-through operation of the connector.

In considering the details of the busy gate circuit 220 it will be recalled that this circuit is provided to gate connector pulses developed by the connector pulse forming circuit 217 to the busy pulse out conductor 52*a* upon completion of the busy test in the event the time position assigned to the called line indicates that the called line is idle. Gating of the connector pulses through the tube 1516 to the busy pulse out conductor 52*a* provides an indication to all of the other finders and connectors of the system that the called line is busy. As a result, when and if the call is answered at the called substation the called line is marked as busy in all of the finders to prevent an idle finder from associating itself with the called line. Further, any other connector of the system, as for example the connector 13*b*, which may later be directed to route a call to the called line selected by the connector 12*b*, responds to the connector pulses gated by the tube 1516 to the busy pulse out conductor 52*a* by indicating that the called line is busy. The anode of the busy gate tube 1516 is connected over the conductor 52*a* to the resistor 751 in the link coupling circuits 24, which resistor operates as a common anode load resistor for all of the busy pulse out gate tubes of the finders and connectors of the system. The control grid of the tube 1516 is normally biased beyond cutoff by means of the voltage divider network including the resistors 1567 and 1568 which are connected from the negative terminal of the bias potential source to the conductor 251. Connector pulses produced at the cathode of the cathode follower tube 1512 are impressed upon the control grid of the busy gate tube 1516 through the condenser 1552. However, until the busy test tube 1517 fires to apply a positive potential to the cut-through conductor 251 these connector pulses are prevented from being repeated through the tube 1516. It will thus be understood that unless and until the busy tube 1517 fires to produce a positive potential on the conductor 251, connector pulses occurring in the time position assigned to the called line are not gated by the busy gate circuit 220 to the busy pulse out conductor 52*a*. However, if the called line tests idle such that the busy test tube 1517 fires, the potential on the conductor 251 becomes highly positive to permit the tube 1516 to gate connector pulses impressed upon the control grid thereof to the anode terminal of this tube and over the conductor 52*a* to the common anode resistor 751 in the link coupling circuits 24. These connector pulses are amplified in the busy pulse driver channel 750 of the circuits 24 and are supplied over the conductor 52*b* to all of the finders and connectors of the system to mark the called line as busy in the manner explained above.

It will be noted that the above-described release of busy pulses in the time position assigned to the called line are impressed in turn upon the busy tube 1517 over a path including lead 52*b* and the inverter tube 1614. Since tube 1517 is a thyratron, the grids thereof lose control of the space current flow subsequent to cut-through, and therefore the busy test tube 1517 is not disturbed by busy pulses released locally in the connector 12*b* by the busy gate circuit 220.

Referring now more particularly to the called line out gate circuit 224, it will be recalled that this circuit is provided to resample the signal voltage stored in the calling line reconstructor circuit 208 in the time position assigned to the selected called line and to release signal pulses modulated in accordance with the sampled signal voltage to the talking distributor 15 in this time position for distribution to the line circuit terminating the called line. This circuit is also controlled by the busy test circuit 218 to transmit connector sampling pulses occurring in the time position assigned to the selected called line to the called line ringing out gate circuit 270 over the conductor 271. To perform these functions narrow commutator drive pulses positively applied to the commutator drive conductor 35 by the commutator drive circuit 25 are impressed upon the suppressor grid of the gate tube 1417 through the coupling condenser 1440, and positive connector pulses developed on the conductor 239 in the time position assigned to the selected called line are impressed upon the control grid of the gate tube 1417 through the coupling condenser 1551. The commutator drive pulses impressed upon the suppressor grid of the tube 1417 are positively clamped to ground through the action of a diode rectifier consisting of one diode section 816*a* of the units inverter tube 816, this diode dectifier being connected across the suppressor grid resistor 1441. Normally the control grid of the tube 1417 is biased beyond cutoff by a negative potential derived from a voltage divider circuit consisting of the resistors 1570 and 1571 which are connected in series from the cut-through conductor 251 to the negative terminal of the bias potential source, this potential being impressed upon the control grid of the tube 1417 through the crystal rectifier 1443. In this connection it will be recalled that the conductor 251 normally has a substantially zero potential with respect to ground. The control grid of the gate tube 1417 is biased beyond cutoff by a sufficient amount to prevent the positive connector pulses impressed upon the control grid of the gate tube from driving this tube into the conductive region thereof in the absence of a positive potential on the cut-through conductor 251. Accordingly, until the busy test operation is performed no signals are gated by the tube 1417. However, when the busy test operation is completed and the called line is found idle so that a positive potential is applied to the conductor 251 in the manner described above, the bias potential on the control grid of the gate tube 1417 is reduced by a sufficient amount to permit the positive connector pulses impressed upon the control grid of the gate tube 1417 to drive the control grid of this tube into the conductive region thereof, thereby to gate to the output side of the tube the particular commutator drive pulses which are straddled by these connector pulses. There is thus produced at the anode of the tube 1417 a very narrow negative pulse of low amplitude which is coupled through the condenser 1442 to the control grid of the inverter tube 1514.

In order to prevent variations in the amplitude of the connector pulses from influencing the amplitude of the narrow pulses gated by the tube 1417, the connector pulses are positively clamped at the ground potential level through the combined action of the crystal rectifier 1443, the action of the diode section 820*a* of the tube 820, and the diodes effectively formed by the control grid and cathode elements of the tubes 1417, 1413 and 1511. Specifically, these parallel connected diode paths positively prevent the control grids of any one of the three tubes 1413, 1417, and 1511 from being driven positive relative to the respective tube cathodes.

The narrow pulses gated by the tube 1417 are impressed upon the control grid of the amplifier and inverter tube 1514 and appear as positive pulses at the tube anode. These positive pulses are impressed upon the control grid of the gate tube 1515 through the coupling condenser 1572. Normally, the control grid of the tube 1515 is biased substantially beyond cutoff by the above-described potential produced at the junction point between the resistors 1570 and 1571 to prevent the sampling pulses delivered thereto from the tube 1514 from driving this grid into the conductive region of the tube. This negative bias potential is impressed upon the control grid of the tube 1515 through the resistor 1573.

When the busy test tube 1517 fires in the manner explained above to indicate that the called line is idle, the positive potential developed on the conductor 251 decreases the bias potential on the tube 1515 in a manner identical to that described above in connection with the gate tube 1417 so that this bias potential is effectively reduced to zero, i. e., to the ground potential level. After the potential on this control grid is thus reduced each sampling pulse delivered to the control grid of the tube 1514 through the coupling condenser 1572 is rendered effective to vary anode current flow through the tube 1515 in accordance with the amplitude of the pulse. This pulse amplitude is positively clamped to the ground potential level through the action of the combined grid-cathode paths of the two tubes 1515 and 1618. Thus, if the amplitude of the pulses impressed on the control grid of the tube 1515 tend to exceed the ground potential level the condenser 1572 is charged to develop voltage thereacross which subtracts from the amplitude of succeeding sampling pulses. The described arrangement comprising the voltage divider circuit 1570 and 1571 and the diode 820*a* of the tube 820 for controlling the bias on the control grid of the gate tube 1515 and for decreasing the bias level to a pulse gating value when the busy test tube 1517 fires insures that the required bias potential change on the control grid of the tube 1515 will always occur incident to the connector cut-through operation and that the control grid potential will be maintained at the ground level so long as the voltage on the conductor 251 is sufficient to bias the diode rectifier conductive. The arrangement has the additional advantage of allowing for greater resistor tolerances in the biasing network for the control grid of the tubes 1417 and 1515.

The positive sampling pulses impressed upon the control grid of the tube 1515 following the described reduction in the bias potential of this grid to zero have the effect of causing current flow in the tube 1515 when the suppressor grid of this tube is biased to a suitable potential level. The suppressor grid of the tube 1515 is normally biased to a negative potential from the voltage divider circuit including the resistor 1575 and the potentiometer 1576 which are connected from the negative terminal of the bias source to ground and this bias potential is coupled to the suppressor grid of the tube 1515 through the resistor 1577. The bias voltage derived from the potentiometer 1576 has a magnitude sufficient to bias the suppressor grid of the tube 1515 slightly negative relative to the tube cathode thereby to provide for the reproduction of the sampling pulses impressed upon the control grid of this tube at the tube anode.

Signal voltages derived from the calling line 10 and reconstructed at the cathode of the tube 1519 in the calling line reconstructor circuit 208 are impressed upon the suppressor grid of the tube 1515 over a path which includes the condenser 1528 and the conductor 256 and serves to amplitude modulate the sampling pulses developed at the anode of this tube. Thus, sampling pulses occuring in the time position assigned to the called line and modulated in accordance with the signal voltage reconstructed and stored (for one pulse frame) by the calling line reconstructor circuit 208 are transmitted over the talking distributor conductor 51 for distribution to the line circuit terminating the called line. However, it will be understood from the foregoing general description of the system that until ringing of the called party line substation is effected under the control of the ringing distributor 15*a*, the above-described sampling pulses supplied to the talking distributor 15 in the pulse time position 63*c* are ineffective to establish talking communication with the called line.

Referring now more particularly to the operation of the code start circuit 268, it will be recalled that this circuit is provided for the purpose of delaying the transmission of the interrupted ringback tone signal corresponding to the party line ringing signal selected by the party digit register 265 through the ringback tone gate tube 1714 until the start of a code ringing cycle so that the ringing operation is not initiated in the middle of a particular party line code ring and false party line ringing is avoided. Normally, the control grid of the code start tube 1715 is biased negatively by means of the voltage divider network, including the resistors 1735 and 1736 which are connected in series from the negative terminal of the bias potential source to ground and this negative potential is impressed upon the control grid of the tube 1715 through the current limiting resistor 1737. The anode of the code start tube 1715 is connected to the cut-through conductor 251 so that normally anode potential for this tube is withheld. Positive code start pulses which are produced in the manner described above in the code forming circuit 27*a* and occur at the start of each code ringing cycle are impressed upon the control grid of the code start tube 1715 over a path which includes the conductor 5, the coupling condenser 1738, and the limiting resistor 1737. Since anode potential is normally withheld from the tube 1715 these code start pulses are normally ineffective to fire this tube. However, when the busy test operation is completed in the manner described above and the busy test tube 1517 fires to produce a positive potential of 130 volts on the cut-through conductor 251, the code start tube 1715 is conditioned to fire upon the occurrence of the next succeeding code start pulse impressed upon the control grid thereof from the code forming circuit *27a*. Therefore, when a positive potential is impressed upon the cut-through conductor 251 the code start tube 715 fires upon the occurrence of the next succeeding code start pulse to produce a relatively large potential across the cathode resistor 1739 thereof. The potential produced across the resistor 1739 is impressed upon the screen grid of the ringback tone gate tube 1714 over a path which includes the conductor 241 and the resistor 1740 to enable the tube 1714 to gate the selected ringback tone signal derived from the party digit register 265 to the calling line out gate circuit 226. Once the code start tube 1715 is fired by the first code start pulse which occurs after positive potential is applied to the cut-through conductor 251, this tube remains ionized for the duration of the call. However, as explained more fully below, when the call is answered at the calling substation the ring trip circuit 221 operates to close the ringback tone gate tube 1714 and terminate the transmission of interrupted ringback tone signals through this tube. In this connection it will be noted that the code start potential produced across the resistor 1739 is used to control only the screen grid of the ringback tone gate tube 1714. It has been found that the application of this potential to the anode of the tube 1714 to enable this tube produces a positive transient pulse in the anode circuit of the tube 1714 which is sufficient to cause bell tinkling at the substations associated with the called line. However, when the code start potential is applied to the screen grid of the tube 1714, the change in anode potential thereof is in a negative direction and is ineffectual in causing erroneous bell tinkling at the called substation.

Referring now more particularly to the operation of the ringback tone gate tube 1714, it will be recalled that this tube performs the function of gating a ringback tone signal which is coded in accordance with the party line ringing signal selected by the party digit register 265 by way of the calling line out gate circuit 226 to the calling line to inform the calling subscriber that the called line is being rung and to enable him to hear the particullar code ring which is employed. The ringback tone gate tube 1714 also performs the function of controlling the ringing facilities at the called line so that the ringers of all substations associated with the called line are rung in unison during the ringing intervals of the particular selected code ringing signal until the call is answered at the called substation, at which time the tube 1714 functions to terminate the ringing and ringback operations.

Normally the control grid of the ringback tone gate tube 1714 is biased somewhat negatively by means of the voltage divider circuit, including the anode resistor 1745 of the ring trip tube 1716, the resistor 1746, and the resistor 1747, these resistors being connected in series from the cut-through conductor 251 to the negative terminal of the bias potential source. More specifically, the bias potential for the control grid of the tube 1714 is derived from the junction point between the resistors 1746 and 1747 and is impressed upon this control grid through the resistor 1748. The interrupted ringback tone signal which is gated by the selected counting tube in the party digit register 265 to the output conductor 275 thereof is impressed upon the control grid of the ringback tone gate tube 1714 through the coupling condenser 1728. However, operating potential for the screen grid of the tube 1714 is derived from the code start tube 1715 so that the ringback tone gate tube 1714 is prevented from gating this ringback tone signal until the code start tube 1715 fires. As described above, the code start tube 1715 is fired by the first code start pulse which occurs immediately after the conductor 251 is energized, and when this occurs operating potential for the screen grid of the tube 1714 is produced across the resistor 1739 so that the ringback tone gate tube 1714 is rendered effective to gate the selected ringback tone signal.

The ringback tone signal produced at the anode of the ringback tone gate tube 1714 in the manner described above is impressed upon the suppressor grid of the gate tube 1414 in the calling line out gate circuit 226 over a path which includes the condenser 1750, the resistor 1751, and the conductor 244. From the circuit 226 the ringback tone signal is transmitted through the talking distributor 15 to the line circuit 10 associated with the line 23 for reproduction by the receiver provided at the calling substation. Audible reproduction of this signal serves to advise the calling subscriber that the called substation is being rung and to apprise him of the particular party line ringing signal which is employed.

To initiate the ringing operation at the called substation the selected ringback tone signal which is produced at the anode of the tube 1714 in the manner described above is coupled through the condenser 1752 to the cathode of a crystal rectifier 1753, the anode of this rectifier being connected to ground and the cathode thereof being connected through the potentiometer 1754 and the resistor 1755 to the negative terminal of the bias potential source. The ringback tone signal is rectified in the rectifier 1753 to reproduce the party line ringing signal corresponding to the original code signal developed in the code forming circuit *27a* and these code pulses are impressed upon the suppressor grid of the called line ringing out gate tube 1618 over a path which includes the conductor 269 and the resistor 1670.

Referring now more particularly to the operation of the called line ringing out gate tube 1618 to release pulses occurring in the pulse time position assigned to the called line over the ringing distributor conductor *51a* to the ringing distributor *15a* during the ringing intervals of the selected party line ringing signal, it is pointed out that the control grid of this tube is normally biased highly negatively to prevent conduction therethrough. More specifically the control grid of he tube 1618 is connected in parallel with the control grid of the gate tube 1515 in the called line out gate circuit 224 so that the control grid of the tube 1618 is normally operated at the negative bias potential derived from the network including the resistors 1570 and 1571. Accordingly, transmission of signals through the called line ringing out gate tube 1518 is prevented until the busy test operation is completed.

When the busy test tube 1517 fires to produce a positive potential on the conductor 251 the bias potential on the tube 1514 is reduced and the positive sampling pulses produced at the anode of the tube 1514 in the called line out gate circuit 224 in the manner described above are coupled through the condenser 1572 and over the conductor 271 to the control grid of the called line ringing out gate tube 1618. However, transmission of the positive sampling pulses impressed upon the control grid of the tube 1618 through this tube to the conductor *51a* is controlled in accordance with ringing pulses derived from the ringback tone gate tube 1714 in the manner described above. More specifically, ringing pulses which are produced by rectifying the selected ringback tone signal which appears at the anode of the tube 1714 are impressed upon the suppressor grid of the called line ringing out gate tube 1618 over a path which includes the conductor 269 and the resistor 1670. Normally the suppressor grid of the tube 1618 is biased negatively by the voltage appearing at the arm of the potentiometer 1754 by an amount sufficient to prevent current flow through this tube. However, during the ringing pulses the suppressor grid of the tube 1618 is biased positively by an amount sufficient to permit the transmission through this tube of the positive sampling pulses impressed upon the control grid thereof. The positive sampling pulses gated by the tube 1618 during the ringing intervals of the selected party line ringing signal appear as negative pulses at the anode of this tube and are delivered to the ringing distributor 15*a* over the conductor 51*a*. In the ringing distributor 15*a* distribution of the interrupted sampling pulses is made on a tens digit basis and these pulses are supplied to all of the line circuits in the particular selected tens digit group.

As described above in connection with the line circuit 10 in the line circuit of each of the selected tens pulse groups, the interrupted sampling pulses are distributed on a units digit basis and control the code ringing circuit in the corresponding line circuit to initiate and control the ringing operation of all of the party line substations associated with the particular called line. Thus, in the illustrated call wherein the selected code #2 party line ringing signal consists of two short ringing intervals (Fig. 29) the code start pulse 158, which immediately follows the application of positive potential to the conductor 251, has the effect of firing the code start tube 1715 which in turn energizes the ringback tone gate tube 1714 to permit this tube to pass the ringback tone signal corresponding to the code #2 party line ringing signal which is selected in the party digit register 265 and gated by the right-hand section of the gating rectifier 1612 to the common output conductor 275 of the register 265. There is thus produced at the anode of the ringback tone gate tube 1714 the selected ringback tone signal which is rectified in the rectifier 1753 so as to produce ringing pulses which are substantially identical to the pulses 141 and 142 shown in Fig. 29 but which are of inverted polartiy, and these ringing pulses are applied to the suppressor grid of the called line ringing out gate tube 1618. These ringing pulses control the ringing out gate tube 1618 to transmit sampling pulses which occur in the time position assigned to the called line during the ringing intervals thereof and the interrupted sampling pulses are transmitted to the ringing distributor 15*a* over the conductor 51*a*. The ringing distributor 15*a* distributes the interrupted sampling pulses on a tens digit basis to the line circuit 16. In the line circuit 16, coincidence of the sampling pulses and units pulses appearing on the conductor 31*b* in the second units pulse time position in each tens pulse period has the effect of opening the ringing control tube in the line circuit 16 to supply ringing current to the party line substations B, C, and D over the line 32 in a manner identical to that described in detail in connection with the ringing operation at the line circuit 10. Accordingly, the ringers at all of the substations B, C, and D are rung in unison during the ringing intervals 141 and 142 which constitute the code #2 party line ringing signal (Fig. 29). Ringing of the substations B, C, and D continues until the call is answered at the called party line substation B or the call is terminated at the calling substation A.

As explained more fully below, when the call is answered at the called substation B, the ring trip circuit 221 operates to produce a flow of current through the anode resistor 1745 thereof which forms a part of the voltage divider network used to supply bias potential to the control grid of the ringback tone gate tube 1714. The voltage produced across the resistor 1745 thus increases the bias potential on the control grid of the tube 1714 so that this tube is rendered non-conductive. As a result the transmission of the selected ringback tone signal to the calling substation is terminated and the transmission of the selected ringing pulse to the called line ringing out gate circuit 270 is also terminated to terminate the ringing operation at the called substation B.

In considering the operation of the called line in gate circuit 223 it will be recalled that this circuit is provided for the purpose of gating sampling pulses carrying signals derived from the called line to the called line reconstructor circuit 222. To this end the inner control grid of the gate tube 1511 provided in the circuit 223 is excited by connector pulses impressed thereon through the coupling condenser 1551 from the connector pulse forming circuit 217 and the suppressor grid of this tube is excited by signal bearing multiplexer pulses impressed thereon from the multiplexer output conductor 50 through the coupling condenser 1580. The circuit configuration and operation of the called line in gate circuit 223 are identical with those of the calling line in gate circuit 207 described above. From this description it will be understood that signal bearing multiplexer pulses occurring only in the time position assigned to the called line are gated by the tube 1511, inverted and amplified by the inverter tube 1510 and impressed upon the called line reconstructor circuit 222 over a path which includes the conductor 254 and the condenser 1450. All other signal modulated multiplexer pulses present on the multiplexer output conductor 50 are excluded from the called line reconstructor circuit 222 due to lack of coincidence between these pulses and the connector pulses impressed upon the control grid of the gate tube 1511.

Referring now more particularly to the called line reconstructor circuit 222, it is pointed out that the purpose of this circuit is to reconstruct the signals derived from the called line and transmitted thereto on the multiplexer pulses gated by the called line in gate circuit 223, and of storing the signal voltage amplitude of each such multiplexer pulse for the time interval of one pulse frame. The reconstructor circuit 222 is identical in many respects with the calling line reconstructor circuit 208 and the basic features of its operation will be readily understood from the above description of the latter circuit. Thus, connector pulses derived from the connector pulse forming circuit 217 in the time position assigned to the called line and impressed upon the control grid of the peaker tube 1413 are utilized to control the operation of the condenser discharging tube 1412 to discharge the storage condenser 1451 just prior to the application of a succeeding signal bearing multiplexer pulse on the control grid of the charging tube 1411 from the called line in gate circuit 223. The charge on the condenser 1451 is varied in accordance with the amplitude of the signal modulated on the multiplexer pulses gated by the circuit 223 and this voltage is impressed upon the cathode follower tube 1410 and repeated across the cathode resistor 1452 thereof. The voltage developed across the resistor 1452 is impressed upon the control grid of the ring trip tube 1716 over a path which includes the resistor 1453, the conductor 252, and the resistor 1760. This voltage is also impressed upon the suppressor grid of the gate tube 1414 in the calling line out gate circuit 226 over a path which includes the conductor 257, the condenser 1455, and the resistor 1456.

Before the call is answered at the called substation no multiplexer pulses occurring in the time position assigned to the called line are present on the multiplexer output conductor 50. Accordingly, no pulses are gated by the called line in gate circuit 223 to the called line reconstructor circuit 222. Under these circumstances the charging tube 1411 is not excited during successive connector pulses. However, the discharge tube 1412 is rendered conductive coincident with the leading edge of each connector pulse. As a consequence the condenser 1451 is discharged down to a very low level with the result that current flow through the cathode follower tube 1410 is held at a low level and the drop across the resistor 1452 is relatively small. When the call is answered at the calling substation, however, multiplexer pulses are gated to the circuit 222 to effect charging of the condenser 1451 during each such pulse. This has the effect of increasing the current flow through the cathode resistor 1452.

While the called line reconstructor circuit 222 is identical in many respects with the calling line reconstructor circuit 208, it will be understood from the foregoing description that the circuit 222 is not called upon to reconstruct dial impulses for the dial impulse integrator circuit 209, this latter function being confined solely to the reconstructor circuit 208. However, the circuit 222 is provided with a feedback path between the cathode of the output tube 1410 and the control grid of the charging tube 1411. More specifically, the voltage produced across the resistor 1452 is coupled through the resistor 1460 and the rectifier 1461 to the control grid of the charging tube 1411. With this arrangement a regenerative path is established between the cathode of the output tube 1410 and the control grid of the charging tube 1411.

In order to provide a more positive and dependable ring trip operation there is provided in the called line reconstructor circuit 222 another feedback path which functions to change the voltage necessary to cut off the charging tube 1411 in accordance with the input pulse amplitude. More specifically, a resistor 1462 is connected from the cathode of the output tube 1410 to the anode of the charging tube 1411. As the voltage at the cathode of the tube 1410 increases this increase in potential is fed back to the anode of the charging tube 1411 to increase the anode potential of this tube. The above-described feedback path operates to increase the voltage required to cut off the charging tube 1411 as the voltage at the cathode of the tube 1410 increases. During periods when the input pulses applied to the control grid of the charging tube 1411 are of low amplitude the anode voltage on this tube is relatively low and a relatively small negative voltage is required to cut off this tube completely. Accordingly, when no pulses are impressed upon the control grid of the charging tube 1411, a condition which exists until the call is answered at the called substation, there is no current flow through the charging tube 1411 to the condenser 1451 so that this condenser is held with a negative charge thereon which is almost sufficient to cut off the cathode follower tube 1410. In this connection it will be understood that the cathode of the discharge tube 1412 is operated at a negative potential with respect to the ground, as determined by the bleeder network including the resistors 1464, 1465, and 1466 so that when the charging tube 1411 is substantially cut off the condenser 1451 may be charged to a negative potential with respect to ground. It will further be understood that the above-described feedback path, including the resistor 1462, is effective only at the lowest frequencies, the condenser 1467 operating to shunt out high frequency variations at the anode of the tube 1411 so that this feedback path is not effective at audio frequencies. As will be explained more fully below, when a definite negative potential is produced at the cathode of the tube 1410 during periods corresponding to zero pulse height, i. e., before the call is answered at the calling substation, and this potential is rapidly increased when the call is answered, a more satisfactory and dependable ring trip operation is provided.

Referring now more particularly to the ring trip circuit 221, it is again pointed out that this circuit is provided for the purpose of disabling the ringback tone gate tube 1714 when the call is answered at the called substation B. When the tube 1714 is disabled the transmission of a ringback tone signal to the calling substation A is terminated and the ringing operation at the called substation B is terminated. Operating anode potential for the ring trip tube 1716 is supplied to this tube from the cut-through conductor 251 through the anode load resistor 1745, the cathode of this tube being connected to ground. Accordingly, the ring trip tube 1716 cannot operate unless and until the busy test tube 1417 fires in the manner explained above to produce a positive potential on the conductor 251. Normally, the control grid of the ring trip tube 1716 is maintained at a potential appreciably negative relative to the grounded cathode of this tube from a biasing circuit which includes the cathode resistor 1452 of the tube 1410 in the reconstructor circuit 222, the resistor 1453, the conductor 252, and the resistors 1760 and 1761, which circuit is bridged between the negative terminal of the bias potential source and ground. In conjunction with the resistor 1453 included in this biasing circuit, the condenser 1470 forms a low pass filter network which has the effect of preventing spurious pulses released by the multiplexer 11 in the time position assigned to the called line from prematurely tripping the ringing operation. The resistor 1760 and the condenser 1762 also function to keep hash developed in the ring trip tube 1716 from backing up to modulate the connector signal pulses released by the calling line out gate circuit 226 to the talking distributor 15 in the manner explained below.

As pointed out above, until such time as the call is answered at the called substation B, multiplexer pulses are not released by the multiplexer 11 over the conductor 50 to the called line in gate circuit 223 in the time position assigned to the called line. When this condition prevails the discharge tube 1412 in the circuit 222 keeps the condenser 1451 discharged to a very low level so that very little voltage is produced across the resistor 1452. As a consequence, the control grid of the ring trip tube 1716 is biased beyond cutoff to prevent this tube from firing. However, when the call is answered at the called substation the multiplexer 11 releases pulses to the connector **12*b* in the time position assigned to the called line with the result that an appreciable voltage is rapidly developed across the resistor 1452 which opposes the negative voltage impressed upon the control grid of the tube 1716 from the above traced biasing circuit. The tube 1716 is thus fired to reduce the potential at the anode thereof to a very low value. When the anode potential of the tube 1716 is decreased due to current flow through the anode resistor 1745 thereof, the control grid of the ringback tone gate tube 1714 is biased highly negative to drive this tube beyond cutoff and terminate transmission of ringback tone signals through this tube. Accordingly, the tube 1714 is rendered inoperative to repeat ringback tone signals to the calling line out gate circuit 226 and to repeat ringing pulses to the called line ringing out gate tube 1618. Thus, firing of the ring trip tube 1716 has the effect of terminating the ringing operation at the called substation and of terminating the transmission of the selected ringback tone signal to the calling substation. In this connection it will be understood that since the tube 1716 is of the thyratron type the control grid thereof loses control once the tube is fired so that the ring trip tube draws current for the duration of the call and the ringback tone gate tube 1714 remains cut off for the duration of the call. It will further be understood that since the ring trip tube 1716 is fired immediately multiplexer pulses are released by the multiplexer 11 in the time position assigned to the called line, reringing of the called substation in the event the connection involving the connector 12*b*** is released at the called substation before it is released at the calling substation is positively prevented.

Referring now more particularly to the calling line out gate circuit 226, it is again pointed out that this circuit is provided for the purpose of resampling the signal voltage stored in the reconstructor circuit 222 in the time position assigned to the calling line and of releasing pulses modulated with the reconstructor signal voltage to the talking distributor 15 in this time position. The circuit also performs the additional function of gating pulses to the talking distributor 15 which are modulated in accordance with the various supervisory tones, i. e., the dial tone, busy tone, and ringback tone, in the manner pointed out above.

To perform these functions finder gate pulses appearing on the conductor **12*d* in the time position assigned to the calling line are impressed upon the control grid of the gate tube 1416 through the condenser 1430, and commutator drive pulses appearing on the conductor 35 are impressed upon the suppressor grid of this gate tube through the condenser 1440. The gate tube 1416 functions in the exact manner explained above with reference to operation of the gate tube 1417 to gate only that commutator drive pulse of each pulse frame which occurs in the time position assigned to the calling line. Specifically, the tube 1416 will only gate a commutator drive pulse when this pulse occurs in time coincidence with one of the finder gate pulses impressed upon the control grid of the tube. The finder gate and commutator drive pulses respectively impressed upon the control and suppressor grids of the gate tube 1416 are both clamped to ground in the manner previously explained so that the drive pulses gated by this tube are of uniform amplitude. Each pulse gated by the tube 1416 is amplified and inverted through the tube 1415 and impressed as a positive pulse upon the control grid of the tube 1414. Bias for the control grid of the tube 1414 is obtained from a bleeder network including the resistors 1475 and 1476 which are connected in series from the negative terminal of the bias potential source to ground, and the control grid of the tube 1414 is normally operated beyond cutoff. However, the positive pulses impressed upon the control grid of the tube 1414 from the inverter tube 1415 are effective to raise the control grid potential of the tube 1414 to the conductive region of this tube and these pulses are repeated at the anode of the tube 1414. Normally the suppressor grid of the gate tube 1414 is biased to a value which will insure the operation of the gate tube 1414 in the middle of its class A operating range when the control grid of the tube is biased to its ground potential level. Specifically, the suppressor grid of the tube 1414 derives its bias from a biasing network which comprises the resistor 1477 and the potentiometer 1478, this potentiometer being adjustable to establish the desired class A operating bias on the suppressor grid of the tube 1414. As will be evident from the preceding explanation, the circuit 226 is operative to gate connector signal pulses modulated in accordance with the supervisory tones, i. e., the dial, busy, and ringback tones, immediately the connector is conditioned for operation. These tones are selectively impressed upon the suppressor grid of the gate tube 1414 over paths which commonly include the conductor 244. Each such signal serves to modulate the connector signal pulses released by the gate tube 1414 to the talking distributor 15 over the conductor 51 in the time position assigned to the calling line and in accordance with the frequency of the signal involved. As discussed above, signal voltages derived from the called line and reconstructed across the output resistor 1452 of the called line reconstructor circuit 222 are also utilized to modulate the connector signal pulses developed by the gating tube 1414 in the time position assigned to the calling line. Thus signal voltage developed across the resistor 1452 is coupled over the conductor 257 through the condenser 1455 and the resistor 1456 to the suppressor grid of the tube 1414 and serves to modulate the signal connector pulses developed at the anode of this tube in accordance with the varying amplitude thereof. These pulses are, of course, diverted by the talking distributor 15** to the line circuit terminating the calling line where they are detected and impressed upon the calling line for reproduction by the receiver provided at the calling substation.

As will be apparent from the foregoing explanation the connector 12*b* of the present invention utilizes the interrupted ringback tone signals produced by the code modulator circuit 27 to control the ringing operation at the called substation as well as to inform the calling subscriber that the called line is being rung. This feature of employing rectified ringback tone to provide a ringing control signal may be employed with other types of electronic connectors. For example, the ringback tone signal may be used to control the ringing operation in private line connectors as well as in the party line code ringing connector 12*b* of the present invention. Likewise, this feature may be employed in semi-selective harmonic ringing connectors of the party line type with substantially no change in the connector.

While the connector 12*b* shown in detail in Figs. 8, 9, 10, 11, 14, 15, 16, and 17 is designed to operate with a separate ringing distributor 15*a* to convey ringing information to the line circuits of the system, this connector may be employed with but slight modification in other types of connectors to effect ringing of the called substation on a party line code ringing basis. Moreover, the above-described feature of using the ringback tone itself to control the start of the ringing operation may be retained. For example, the connector 12*b* may be modified to transmit ringing information on the connector signal pulses supplied to the talking distributor 15 on a marginal basis. While reference may be had to the copending application, Serial No. 134,974, for a complete detailed description of such a marginal type ringing system, for the purposes of the present invention it may be stated that the positive sampling pulses which are impressed upon the control grid of the tube 1515 are ineffective to produce anode current flow through the tube until such time as the suppressor grid of the tube is biased to a suitable potential level. If the suppressor grid of the tube 1515 is made slightly positive with respect to ground so that the tube conducts heavily, large amplitude sampling pulses of negative polarity are delivered over the distributor input conductor 51 to the distributor 15.

In order to control the ringing facilities at the called line from the large amplitude sampling pulses delivered in the manner described above to the distributor 15, a line ringing circuit of the type shown in Fig. 27B is employed. Thus, the large amplitude sampling pulses which are delivered to the distributor 15 in the time position assigned to the called line are gated by this distributor to the line circuit associated with the called line and effect operation of the line ringing circuit 2750 included therein and terminating the called line in the exact manner previously explained with reference to the operation of the line circuit 10. The operation of ringing the called substation is thus initiated and controlled in accordance with the large amplitude sampling pulses delivered to the distributor 15 in the manner outlined above.

In order to produce the above-described positive increase in the suppressor grid potential of the tube 1515 during periods when the called substation is to be rung, and in accordance with a selected party line ringing signal, the bottom end of the suppressor grid bias potentiometer 1576 is removed from ground and connected to the cathode of the rectifier 1753 as illustrated by the dotted line connection 1585. When ringing information is transmitted on a marginal basis on the sampling pulses supplied to the distributor 15, the ringing distributor 15*a* is eliminated and the called line ringing out gate circuit 270 is also eliminated. Furthermore, the potentiometer 1754 and the resistor 1755 are not needed to supply suppressor grid bias for the called line ringing out gate tube 1618.

In considering the operation of the connector 12*b* as modified in the manner described above, it will be evident from the foregoing explanation that the operation of the connector up until the time the ringback tone gate tube 1714 is energized by the code start circuit 268 to transmit the selected ringback tone signal is the same as described in detail above. Furthermore, the application of the selected ringback tone signal to the calling line 23 by way of the calling line out gate circuit 226 remains the same. However, the selected ringback tone signal which is rectified in the rectifier 1753 is coupled over the illustrated conductor 1585 to the bottom end of the potentiometer 1576 and during the ringing pulse intervals thereof the suppressor grid potential of the tube 1515 is raised to a point somewhat positive with respect to the tube cathode. With the control grid potential of the tube 1515 at its normal pulse gating value, and the suppressor grid of the tube at a slightly positive value relative to the tube cathode, this tube conducts heavily during each sampling pulse interval so that large amplitude sampling pulses of negative polarity are delivered over the distributor input conductor 51 to the distributor 15. The large amplitude sampling pulses thus delivered to the distributor 15 in the time position assigned to the called line effect operation of the ringing facilities included in the line circuit 16 terminating the called line in the exact manner previously explained with reference to the operation of the line ringing circuit 2750 (Fig. 27B) in connection with the description of the line circuit 10. Thus the operation of ringing the called substation is performed during the ringing intervals 141 and 142 which constitute the code #2 party line ringing signal.

As explained heretofore, when the call is answered at the called substation the ring trip circuit 221 operates to provide a voltage drop across the resistor 1745 which biases the ringback tone gate tube 1714 beyond cutoff and thereby terminates the transmission of coded ringback signals through this tube. Accordingly, the potential at the cathode of the rectifier 1753 remains at ground potential and the suppressor grid of the gate tube 1515 is changed from a positive value to a slightly negative value which provides for the operation of the tube 1515 within the class A operating range of this tube. It will be understood that the arm of the potentiometer 1576 may be so adjusted that when the ring trip circuit 221 operates to bias the ringback tone gate tube 1714 beyond cutoff the negative potential impressed upon the suppressor grid of the tube 1515 through the potentiometer 1576 serves to bias the tube to the center of its class A operating range.

From the foregoing explanation it is evident that the ringback tone signal which is gated by the tube 1714 and is coded in accordance with the party line ringing signal selected in the party digit register 265 may be employed to effect party line code ringing at the called substation on either a marginal basis, wherein the connector signal pulse height is increased during the ringing signal intervals, or with a separate ringing distributor wherein a separate path is provided for the transmission of ringing information during the ringing signal intervals. It will further be understood that the ringback tone signal may be employed in private line connectors in which case the ringback tone signal which is gated by the ringback tone gate tube is interrupted at the conventional ringing rate of one second on and four seconds off.

*Talking distributor 15*

As pointed out in the general description of the system, this circuit is provided for the general purpose of distributing signals derived from the signal sample modulated connector pulses developed in the connectors of the system in the time positions of each pulse frame respectively assigned to the calling and called lines of the system to the line circuits terminating these lines. More specifically, this circuit is capable of distributing signals derived from the signal modulated connector pulses appearing in different time positions on the common distributor channel input conductor 51 to the respective line circuits under the directive control of the connectors **12*b*, 13*b*, 14*b*, etc., embodied in the system. The talking distributor 15 may be of the type described in detail in either of the above-identified copending applications, Serial No. 134,974 and Serial No. 205,641. However, it will be understood that a particular type of distributor is designed to operate with a particular type of line circuit. With a line circuit of the type shown in Figs. 20 and 21 it is necessary to use a distributor of the type shown in copending application, Serial No. 205,641, since no provision is made in the line circuits of Figs. 20 and 21 for detecting the signals which are modulated on the connector signal pulses produced on the conductor 51**, such detection being accomplished in a distributor of the type shown in copending application, Serial No. 205,641. However, it will be understood that a distributor of the type shown in copending application, Serial No. 134,974, may be employed, wherein no detection of the signal modulated connector signal pulses is performed, in which case a line circuit of the type disclosed in that application would also be employed.

*Ringing control distributor 15a*

Figure 19:
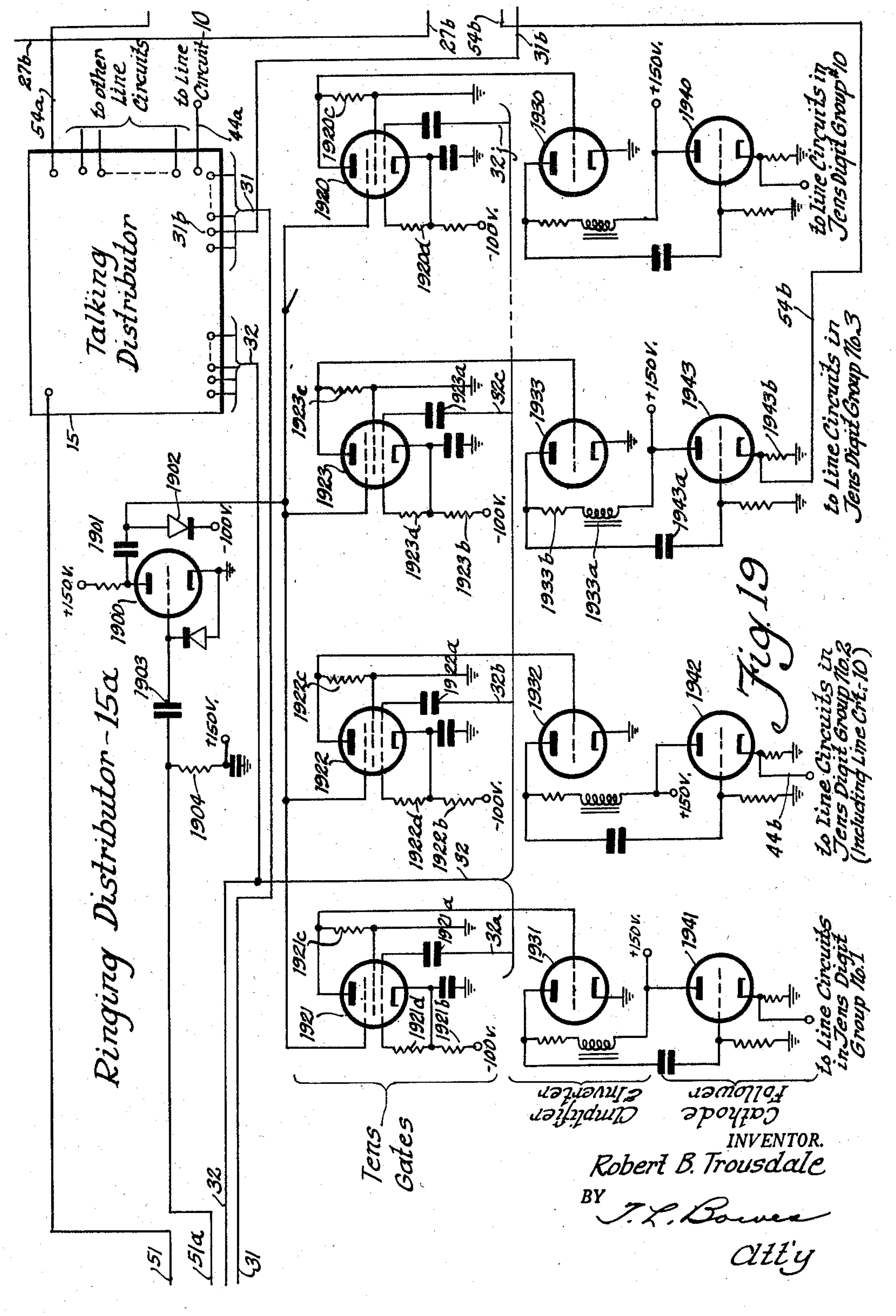

As pointed out in the general description of the system this circuit, the details of which are illustrated in Fig. 19 of the drawings, is provided for the purpose of diverting or distributing to the line circuits of the system on a tens digit basis the interrupted sampling pulses which are developed in the connectors of the system and impressed upon the common ringing distributor input conductor **51*a*. Thus, the ringing distributor 15*a* performs a tens gating function of the code modulated connector pulses appearing on the conductor 51*a*, the units gating function of these pulses being performed in the line ringing circuit of the line circuit 16 in a manner identical to that described above in connection with the line circuit 10**.

Generally considered the ringing distributor **15*a* comprises ten tens gate circuits, i. e., one for each of the ten line groups which individually include the ten lines having the same tens digit directory designation. Thus, the gate circuit individually associated with the lines of the systems assigned the tens and units directory number designations 11, 12, 13–10 comprises the first tens gate tube 1921, the tens gate circuit associated with the ten lines of the system having the directory number designations 21, 22, 23–20 includes the tens gate tube 1922, the tens gate circuit associated with the ten lines of the system having the directory number designations 31, 32, 33–30 includes the tens gate tube 1923, and the tens gate circuit associated with the ten lines of the system having the directory number designations 01, 02, 03–00 assigned thereto includes the tens gate tube 1920. Each of the tens gate tubes 1921, 1922, 1923–1920 is followed by an amplifier and inverter tube and a cathode follower output tube individually connected in tandem therewith. Thus, the tens gate tube 1921 is coupled to the amplifier and inverter tube 1931 which is in turn connected to the cathode follower output tube 1941. Similarly, the tens gate tube 1922 is coupled to the amplifier and inverter tube 1932 which is in turn coupled to the cathode follower tube 1942**.

Code modulated connector pulses impressed upon the ringing distributor input conductor **51*a* by the various connectors of the system are delivered to the tens gate tubes 1921, 1922, 1923–1920 through a master inverter tube 1900. Each of the tens gate tubes embodied in the distributor 15*a* is preferably a pentode of the 6AS6 type and triodes of the 6C4 type are preferably used as the amplifier and inverter tubes 1931, 1932, 1933, etc., the cathode follower tubes 1941, 1942, 1943, etc., and the master inverter tube 1900. The various circuit elements employed in interconnecting the identified tubes of the ringing distributor 15*a*** are described below with reference to the functions which they respectively perform in the circuit.

Operation of the ringing distributor **15*a* is under the control of the tens pulse ring circuit 21. More specifically, positive tens pulses 72*a*, 73*a*, 74*a*, etc., as shown in the pulse chart of Figs. 23 to 26, inclusive, are delivered to the control grids of the tens gate tubes 1921, 1922, 1923–1920 inclusive, over a path which includes the positive tens pulse cable 32. From this multiple conductor cable the identified positive tens pulses are impressed upon the control grids of the tens gate tubes through the coupling condensers 1921*a*, 1922*a*, 1923*a*, etc. The cathodes of the tens gate tubes are individually biased to a negative potential with respect to ground by means of the cathode resistors 1921***b*, 1922*b*, 1923*b*, etc., which are respectively connected from the cathodes of the tens gate tubes to the negative terminal of the bias potential source. Also, the anodes of the tens gate tubes are connected to ground through the illustrated anode load resistors 1921*c*, 1922*c*, 1923*c*, etc., and the screen grids of these tubes are directly connected to ground.

The suppressor grids of the tens gate tubes are excited in parallel by the code modulated connector sampling pulses repeated thereto by the master inverter tube 1900. Thus the suppressor grids of the tubes 1921, 1922, 1923, and 1920 are commonly coupled to the anode of the master inverter tube 1900 through the coupling condenser 1901. The suppressor grids of the tens gate tubes are commonly connected through the clamping rectifier 1902 to the negative terminal of the bias potential source so that normally these suppressor grids are operated at the full negative potential of this source.

The connector pulses which are code modulated in accordance with the selected party line ringing codes and are developed on the ringing distributor input conductor 51*a* in the time positions assigned to the called lines of the system are of negative polarity and are impressed upon the control grid of the master inverter tube 1900 through the coupling condenser 1903. In this connection it will be understood that the resistor 1904, which is connected from the conductor 51*a* to the positive anode potential source, forms the common anode resistor for the called line ringing out gate tubes 1618 of all of the connectors of the system. There is thus produced across the resistor 1904 all of the ringing pulse modulated connector pulses developed in the connectors of the system. The connector pulses impressed upon the control grid of the tube 1900 are amplified and inverted in this tube and are impressed upon the suppressor grids of the tens gate tubes 1921, 1922, 1923–1920 through the common coupling condenser 1901. Positive tens pulses 72*a*, 73*a*, 74*a*, etc., are successively impressed upon the inner control grids of the tens gate tubes 1921, 1922, 1923–20 over the positive tens pulse conductors 32*a*, 32*b*, 32*c*–32*j*. Normally, the control grids of the tens gate tubes 1921, 1922, 1923–1920 are at cathode potential being connected to the cathodes of these tubes through the illustrated grid resistors 1921*d*, 1922*d*, 1923*d*–1920*d*. However, the voltages built up across the coupling condensers 1921*a*, 1922*a*, 1923*a*–1920*a* as a result of the positive pulses impressed upon the positive tens pulse conductors 32*a*, 32*b*, 32*c*–32*j* serve to bias the respective tens gate tubes beyond cutoff during off pulse periods. Thus, considering the tens gating tube 1923, by way of example, each positive pulse appearing on the tens pulse conductor 32*c* charges the coupling condenser 1923*a* through the grid-to-cathode path of the tube 1923 to a relatively high voltage level. After the pulse ends the voltage impressed across this condenser is negatively applied to the control grid of the tube 1923 to bias this tube beyond cutoff. Moreover, the pulse periodicity and the time constant of the condenser discharge circuit are such that the condenser 1923*a* cannot discharge sufficiently to render the tube 1923 conductive during an off pulse period. It will be understood, therefore, that the tube 1923 is only rendered conductive during each interval when a positive tens pulse is impressed on the conductor 32*c* to overcome the bias voltage built up across the condenser 1923*a*.

Suppressor bias for the tens gate tubes 1921 through 1920 is derived from the individual cathode resistors thereof by virtue of the cathode current flow resulting from the triode action of the cathode, control grid, and screen grid of each of said gate tubes. Taking, for example, the gate tube 1923, it will be observed that the control grid is returned directly to the cathode through resistor 1923*d*, and therefore the cathode register 1923*b* does not function to bias the control grid in any way. However, due to the cathode current flow resulting from the described triode action as controlled by the applied positive tens gate pulses on the control grid, a voltage is developed across the cathode resistor 1923*d* of such a polarity as to raise the cathode potential of the tube 1923 above the negative supply potential by an amount proportional to the magnitude of said resistor. As mentioned above, the suppressor grid of the gate tube is returned by way of the clamping rectifier 1902 to the negative potential supply. By properly choosing the magnitude of the cathode resistor 1923*d*, a bias may be built up thereacross sufficient to bias the suppressor grid normally to cutoff. In this way, plate current in the gate tube 1923 may be made equal to zero under normal conditions, i. e., when no connector pulses in the time positions bracketed by the tens pulse 74*a* are transmitted to the ringing distributor 15*a*. When such pulses are transmitted, they are of sufficient magnitude after amplification and inversion by the inverter tube 1900 to bring the suppressor grid of the tube 1923 into the conductive region, thereby to cause output pulses to be forthcoming therefrom.

Referring now more particularly to the mode of operation of the ringing distributor 15*a* to repeat ringing pulse modulated connector pulses from the connector 12*b* to the line circuit 16 during the ringing intervals of the code #2 party line ringing signal assigned to the called substation B, it will be understood that the connector pulses developed in the connector 12*b* during the ringing intervals of the code #2 ringing signal occur on the distributor input conductor 51*a* in the time position 63*c* assigned to the called line 32. These pulses are negatively applied to the control grid of the master inverter tube 1900 and appear as positive pulses at the tube anode. In order to prevent cross or spurious modulation of these pulses the pulse base line is clamped to the potential of the negative terminal of the bias potential source through the action of the crystal rectifier 1902. The positive connector pulses which occur during the ringing intervals of the partly line ringing signal assigned to substation B and appear at the anode of the master inverter tube 1900 are impressed upon the suppressor grids of the ten tens gate tubes in parallel. Thus, connector pulses appearing in the time position 63*c* assigned to the called line 32 are gated by the tens gate tube 1923 and appear as negative pulses across the anode resistor 1923*c* thereof. The positive gated connector pulses appearing at the anode of the tube 1923 are directly connected to the control tube of the amplifier and inverter tube 1933, are amplified and inverted in this tube, and appear as positive pulses at the anode thereof. A peaking coil 1933*a* is included in series with the anode resistor 1933*b* of the tube 1933 to increase the high frequency response of the amplifier and inverter tube 1933 and to preserve the wave form of the connector pulses gated by the tube 1923. The positive pulses appearing at the anode of the tube 1933 are coupled through the condenser 1943*a* to the control grid of the cathode follower tube 1943 and are repeated in like phase across the cathode resistor 1943*b* of this tube. The positive connector pulses occurring in the time position 63*c* which appear at the cathode of the tube 1943 during the ringing intervals of the code #2 party line ringing signal are supplied to the line circuit 16 over the illustrated conductor 54*b*. In this connection it will be understood that these and other connector pulses occurring during the same tens pulse period are also repeated across the resistor 1943*b* and are supplied to the line circuits associated with the lines of the system having the directory number designations 31, 32, 33–30.

It is therefore necessary further to segregate or distribute the connector pulses appearing on the conductor 54*b* on a units digit basis in the line circuit 16. Since the line circuit 16 is identical in operation to the line circuit 10 it will be understood from the foregoing explanation of this latter circuit that the connector pulses which are impressed upon the conductor 54*b* are supplied to the line ringing circuit 2130 to which there is also supplied positive units pulses occurring in the second units pulse time position in each tens pulse period over the conductor 31b. Upon coincidence of the connector pulses impressed upon the conductor 54b and the units pulses appearing on the conductor 31b, the ringing control tube 2131 is fired in a manner identical to that described in detail in connection with the line circuit 10 to supply ringing current to all of the party line substations associated with the called line 32, including the called substation B. Since the connector pulses impressed upon the conductor 54b occur only during the ringing intervals of the code #2 party line ringing signal assigned to the substation B, ringing current is supplied to this substation only during the particular ringing intervals of this code, and during the off ringing intervals the tube 2131 is deionized as explained above in connection with the line circuit 10.

What is claimed as new and desired to be secured by Letters Patent of the United States is:

1. In an automatic telephone system of the type having a plurality of lines over which subscriber controlled signals are transmitted, at least some of said lines having a plurality of substations associated therewith and identifiable by different party line ringing signals, electronic means directively controllable by subscriber controlled signals transmitted over any calling one of said lines for transmitting signals in both directions between a calling one of said lines and a called one of said lines, and electronic means directively controllable by said subscriber controlled signals for selectively transmitting a particular ringing signal over the called line in accordance with the identity of the called substation associated therewith.

2. In an automatic telephone system of the type having a plurality of lines over which subscriber controlled signals are transmitted, at least some of said lines having a plurality of substations associated therewith and identifiable by different party line ringing codes, electronic means directively controllable by subscriber controlled signals transmitted over any calling one of said lines for ringing a called one of said lines in accordance with the code assigned to the called substation associated therewith, and electronic means directively controllable by said subscriber controlled signals for thereafter transmitting signals in both directions between the calling and called lines.

3. In an automatic telephone system of the type having a plurality of lines over which subscriber controlled signals are transmitted, at least some of said lines having a plurality of substations associated therewith and identifiable by different party line ringing signals, electronic means directively controllable by subscriber controlled signals transmitted over any calling one of said lines for selectively transmitting a particular ringing signal over one path to the called line in accordance with the identity of the called substation associated therewith, and electronic means directively controllable by said subscriber controlled signals for transmitting intelligence signals in both directions between the calling and called lines over a different path.

4. In an automatic telephone system of the type having a plurality of lines over which subscriber controlled signals are transmitted, at least some of said lines having a plurality of substations associated therewith and identifiable by different party line ringing signals, and electronic signal transmission means in part controlled in accordance with the transmission of a subscriber controlled call initiating signal over any calling one of said lines and in part directively controllable by subscriber controlled directive control signals transmitted over the calling line for establishing a ringing signal transmission channel for transmitting a party line ringing signal to a called one of said lines in accordance with the identity of the called substation associated therewith and for establishing two separate signal transmission channels for the transmission of intelligence signals in opposite directions between the calling and called lines of the system.

5. In an automatic telephone system of the type having a plurality of lines over which subscriber controlled signals are transmitted, at least some of said lines having a plurality of substations associated therewith which are assigned different party line ringing signals, electronic signal transmission means in part controlled in accordance with the transmission of a subscriber controlled call initiating signal over any calling one of said lines and in part directively controllable by subscriber controlled directive control signals transmitted over the calling line for transmitting a party line ringing signal to a called one of said lines in accordance with the identity of the called substation associated therewith, and electronic means for thereafter transmitting intelligence signals in opposite directions between the calling and called lines of the system.

6. In an automatic telephone system of the type having a plurality of lines over which subscriber controlled signals are transmitted, at least some of said lines having a plurality of substations associated therewith and identifiable by different party line ringing signals, means controlled in accordance with the transmission of a subscriber controlled call initiating signal over any calling one of said lines for periodically sampling signals produced on the calling line and for reconstructing the signals from said samples, and means directively controllable by subscriber controlled directive control signals transmitted over the calling line for transmitting a party line ringing signal to any called one of said lines in accordance with the identity of the called substation associated therewith and for thereafter transmitting the reconstructed signals to the called line.

7. In an automatic telephone system of the type having a plurality of lines over which subscriber controlled signals are transmitted, at least some of said lines having a plurality of substations associated therewith and identifiable by different party line ringing signals, means controlled in accordance with the transmission of a subscriber controlled call initiating signal over any calling one of said lines for periodically sampling signals produced on the calling line and for reconstructing the signals from said samples, and means directively controllable by subscriber controlled directive control signals transmitted over the calling line for transmitting a particular ringing signal to a called one of said lines in accordance with the identity of the called substation associated therewith, terminating the ringing signal when the called substation answers, and thereafter transmitting the reconstructed signals to the called line.

8. In an automatic telephone system of the type having a plurality of lines over which subscriber controlled signals are transmitted, at least some of said lines having a plurality of substations associated therewith and identifiable by different party line ringing signals, means controlled in accordance with the transmission of a subscriber controlled call initiating signal over any calling one of said lines for periodically sampling signals produced on the calling line and for reconstructing the signals from said samples, means directively controllable by subscriber controlled directive control signals transmitted over the calling line for transmitting a particular ringing signal to a called one of said lines over a given path and in accordance with the identity of the called substation associated therewith, and means for transmitting the reconstructed signals to the called line over a different path.

9. In an automatic telephone system of the type having a plurality of lines over which subscriber controlled signals are transmitted, at least some of said lines having a plurality of substations associated therewith and identifiable by different party line ringing signals, means controlled in accordance with the transmission of a subscriber controlled call initiating signal over any calling one of said lines for periodically sampling signals produced on the calling line and for reconstructing the signals from said samples, means directively controllable by subscriber controlled directive control signals transmitted over the calling line for transmitting a particular ringing signal to a called one of said lines over a given path and in accordance with the identity of the called substation associated therewith, means for terminating the ringing signal when the called substation answers, and means for thereafter transmitting the reconstructed signals to the called line over a different path.

10. In an automatic telephone system of the type having a plurality of lines over which subscriber controlled signals are transmitted, at least some of said lines having a plurality of substations associated therewith and identifiable by different party line ringing signals, signal sampling means controlled in accordance with the individual identities of a calling one of said lines and a called one of said lines for periodically sampling the signals produced on the calling and called lines, reconstructor means for separately reconstructing the signals produced on the calling and called lines from the signal samples derived from these lines, means directively controllable by subscriber controlled directive control signals transmitted over the calling line for transmitting a particular party line ringing signal to the called line in accordance with the identity of the called substation associated therewith and for transmitting the reconstructed calling line signals to the called line, and means controlled in accordance with the identity of the calling line for transmitting the reconstructed called line signals to the calling line.

11. In an automatic telephone system of the type having a plurality of lines over which subscriber controlled signals are transmitted, at least some of said lines having a plurality of substations associated therewith and identifiable by different party line ringing signals, signal sampling means controlled in accordance with the individual identities of a calling one of said lines and a called one of said lines for periodically sampling the signals produced on the calling and called lines, reconstructor means for separately reconstructing the signals produced on the calling and called lines from the signal samples derived from these lines, means directively controllable by subscriber controlled directive control signals transmitted over the calling line for transmitting a particular party line ringing signal to the called line over a given path and in accordance with the identity of the called substation associated therewith, means for transmitting the reconstructed calling line signals to the called line over a different path, and means controlled in accordance with the identity of the calling line for transmitting the reconstructed called line signals to the calling line.

12. In an automatic telephone system of the type having a plurality of lines over which subscriber controlled signals are transmitted, said lines having individually assigned thereto a time position in repetitive time position frames, at least some of said lines having a plurality of substations associated therewith which are assigned different party line ringing signals, means for sampling signals produced on one of said lines in the time position assigned to said one line, means for converting the signal samples thus obtained into corresponding signal samples occurring in the time position assigned to another of said lines, means at least in part controlled by said last-named means for transmitting to said other line the particular party line ringing signal assigned to the particular called substation associated therewith, and means for reconstructing the sampled signals from said last-named signal samples and for transmitting the reconstructed signals over said other line.

13. In an automatic telephone system of the type having a plurality of lines over which subscriber controlled signals are transmitted, said lines having individually assigned thereto a time position in repetitive time position frames, at least some of said lines having a plurality of substations associated therewith, means for sampling signals produced on one of said lines in the time position assigned to said one line, means for converting the signal samples thus obtained into corresponding signal samples occurring in the time position assigned to another of said lines, means directively controllable over said one line for transmitting a party line ringing signal to said other line over a given path, thereby to ring a particular substation associated with said other line, and means for reconstructing the sampled signals from said last-named signal samples and for transmitting the reconstructed signals to said other line over a different path.

14. In an automatic telephone system of the type having a plurality of lines over which subscriber controlled signals are transmitted, at least some of said lines having a plurality of substations associated therewith which are adapted to be selectively signaled by different party line ringing signals, signal sampling means controlled in accordance with the individual identities of a calling one of said lines and a called one of said lines for periodically sampling the signals produced on the calling and called lines, reconstructor means for separately reconstructing the signals produced on the calling and called lines from the signal samples derived from these lines, means directively controllable by subscriber controlled signals transmitted over the calling line for transmitting a particular party line ringing signal to the called line, thereby to ring the called substation associated with the called line, means controlled by the called line reconstructor means for terminating said ringing signal when the called party answers, means for thereafter transmitting the reconstructed calling line signals to the called line, and means controlled in accordance with the identity of the calling line for transmitting the reconstructed called line signals to the calling line.

15. In an automatic telephone system of the type having a plurality of lines over which subscriber controlled signals are transmitted, at least some of said lines having a plurality of substations associated therewith which are adapted to be selectively signaled by different party line ringing signals, signal sampling means controlled in accordance with the individual identities of a calling one of said lines and a called one of said lines for periodically sampling the signals produced on the calling and called lines, reconstructor means for separately reconstructing the signals produced on the calling and called lines from the signal samples derived from these lines, means directively controllable by subscriber controlled signals transmitted over the calling line for initially transmitting a particular party line ringing signal to the called line over a first path, thereby to ring the called substation associated with the called line, means controlled in accordance with the identity of the calling line for transmitting the reconstructed called line signals to the calling line, and means controlled by said called line signal reconstructor means for terminating the transmission of said ringing signal over said first path when the called substation answers and for transmitting the reconstructed calling line signals to the called line over a second path.

16. In an automatic telephone system of the type having a plurality of lines over which subscriber controlled signals are transmitted, said lines having individually assigned thereto a time position in repetitive time position frames, at least some of said lines having a plurality of substations connected thereto, means for sampling signals produced on one of said lines in the time position assigned to said one line, means responsive to subscriber controlled line selecting signals produced on said one line and carried by the signal samples produced by said last-named means for selecting another of said lines and a called substation connected to said other line, means controlled by said last-named means for thereafter transmitting to said other line a particular party line ringing signal, thereby to ring the called substation connected to said other line, means for converting the signal samples derived from said one line into corresponding signal samples occurring in the time position assigned to said other line, and means for reconstructing the sampled signals from said last-named signal samples and for transmitting the reconstructed signals over said other line.

17. In an automatic telephone system of the type having a plurality of lines over which subscriber controlled signals are transmitted, said lines having individually assigned thereto a time position in repetitive time position frames, at least some of said lines having a plurality of substations connected thereto, means for sampling signals produced on one of said lines in the time position assigned to said one line, means responsive to subscriber controlled line selecting signals produced on said one line and carried by the signal samples produced by said last-named means for selecting another of said lines and a called substation connected to said other line, means controlled by said last-named means for producing party line ringing signal samples in the time position assigned to said other line, means controlled by said last-named means for transmitting a particular ringing signal over said other line, thereby to ring the called substation connected to said other line, means for converting the signal samples derived from said one line into corresponding signal samples occurring in the time position assigned to said other line, and means for reconstructing the sampled signals from said last-named signal samples and for transmitting the reconstructed signals over said other line.

18. In an automatic telephone system of the type having a plurality of lines over which subscriber controlled signals are transmitted, said lines having individually assigned thereto a time position in repetitive time position frames, at least some of said lines having a plurality of substations connected thereto, means for sampling signals produced on one of said lines in the time position assigned to said one line, means responsive to subscriber controlled line selecting signals produced on said one line and carried by the signal samples produced by said last-named means for selecting another of said lines and a called substation connected to said other line, means controlled by said last-named means for producing a party line ringing signal uniquely identifying the selected called substation, means for sampling said ringing signal in the time postion assigned to the called line, means controlled by said ringing signal samples for ringing said called substation, means for converting the signal samples derived from said one line into corresponding signal samples occurring in the time position assigned to said other line, and means for reconstructing the sampled signals from said last-named signal samples and for transmitting the reconstructed signals over said other line.

19. In an automatic telephone system of the type having a plurality of lines over which subscriber controlled signals are transmitted, said lines having individually assigned thereto a time position in repetitive time position frames, at least some of said lines having a plurality of substations connected thereto, means for sampling signals produced on one of said lines in the time position assigned to said one line, means responsive to subscriber controlled line and substation selecting signals produced on said one line and carried by the signal samples produced by said last-named means for selecting another line and a particular substation connected to said other line, means controlled by said last-named means for transmitting a party line ringing signal to said other line coded in accordance with the identity of said particular substation, means for converting the signal samples derived from said one line into corresponding signal samples occurring in the time position assigned to said other line, and means for reconstructing the sampled signals from said last-named signal samples and for transmitting the reconstructed signals over said other line.

20. In an automatic telephone system of the type having a plurality of lines over which subscriber controlled signals are transmitted, said lines having individually assigned thereto a time position in repetitive time position frames, at least some of said lines having a plurality of substations connected thereto, means for sampling signals produced on one of said lines in the time position assigned to said one line, means responsive to subscriber controlled line and substation selecting signals produced on said one line and carried by the signal samples produced by said last-named means for selecting another line and a particular substation connected to said other line, means controlled by said last-named means for transmitting a party line ringing signal coded in accordance with the identity of said particular substation to said other line over one path, means for converting the signal samples derived from said one line into corresponding signal samples occurring in the time position assigned to said other line, and means for reconstructing the sampled signals from said last-named signal samples and for transmitting the reconstructed signals over a different path to said other line.

21. In an automatic telephone system of the type having a plurality of lines over which subscriber controlled signals are transmitted, said lines having individually assigned thereto a time position in repetitive time position frames, at least some of said lines having a plurality of substations connected thereto, means for sampling signals produced on one of said lines in the time position assigned to said one line, means responsive to subscriber controlled line and substation selecting signals produced on said one line and carried by the signal samples produced by said last-named means for selecting another of said lines and a particular substation connected to said other line, means controlled by said last-named means for producing a party line ringing signal coded in accordance with the identity of said particular substation, means for sampling said ringing signal in the time position asigned to said other line, means responsive to said ringing signal samples for transmitting a corresponding ringing signal over said other line, thereby to ring said particular substation, means for converting the signal samples derived from said one line into corresponding signal samples occurring in the time position assigned to said other line, and means for reconstructing the sampled signals from said last-named signal samples and for transmitting the reconstructed signals over said other line.

22. In an automatic telephone system of the type having a plurality of lines over which subscriber controlled signals are transmitted, said lines having individually assigned thereto a time position in repetitive time position frames, at least some of said lines having a plurality of substations connected thereto which are adapted to be selectively signaled by different party line ringing signals, signal sampling means for sampling signals produced on a calling one of said lines in the time position assigned to the calling line, line and substation selecting means responsive to subscriber controlled line and substation selecting signals produced on the calling line and carried by the signal samples produced by said signal sampling means for selecting a called one of said lines and a cyclically recurring party line ringing signal coded in accordance with the identity of a called substation associated with the called one of said lines, means for sampling said selected ringing signal in the time position assigned to the called line at the start of a code ringing cycle, means responsive to said ringing signal samples for transmitting a corresponding ringing signal over said called line, thereby to ring the called substation, means for converting the signal samples derived from said calling line into corresponding signal samples occurring in the time position assigned to the called line, means for reconstructing the sampled signals from said last-named signal samples and for transmitting the reconstructed signals over the called line, signal sampling means for sampling signals produced on the called line in the time position assigned to the called line, means controlled by said signal sample converting means for converting the signal samples derived from the called line into corresponding signal samples occurring in the time position assigned to the calling line, and signal reconstructor means for reconstructing the sampled signals from said last-named signal samples and for transmitting the reconstructed signals over the calling line.

23. In an automatic telephone system of the type having a plurality of lines over which subscriber controlled signals are transmitted, said lines having individually assigned thereto a time position in repetitive time position frames, at least some of said lines having a plurality of substations associated therewith which may be signaled by different party line ringing signals, signal sampling means for sampling signals produced on a calling one of said lines in the time position assigned to the calling line, ringing code generating means for developing during each of repetitive code cycles a plurality of differently coded party line ringing signals corresponding to the maximum number of substations which may be associated with any one of said lines, line selecting means responsive to controlled line selecting signals produced on the calling line and carried by the signal samples produced by said signal sampling means for selecting a called one of said lines, signal sample converting means controlled by said line selecting means for thereafter converting the signal samples derived from the calling line into corresponding signal samples occurring in the time position assigned to the called line and for transmitting the reconstructed signals over the called line, ringing signal selecting means responsive to code selecting signals produced on the calling line and carried by the signal samples produced by said signal sampling means for selecting that one of said coded ringing signals which may be assigned to the called substation associated with the called line, means for sampling the selected code ringing signal in the time position assigned to the called line, and means responsive to said ringing signal samples for transmitting a corresponding ringing signal over the called line.

24. In an automatic telephone system of the type having a plurality of lines over which subscriber controlled signals are transmitted, said lines having individually assigned thereto a time position in repetitive time position frames, at least some of said lines having a plurality of substations associated therewith which may be signaled by different party line ringing signals, signal sampling means for sampling signals produced on a calling one of said lines in the time position assigned to the calling line, ringing code generating means for developing during each of repetitive code cycles a plurality of differently coded party line ringing signals corresponding to the maximum number of substations which may be associated with any one of said lines, line selecting means responsive to subscriber controlled line selecting signals produced on the calling line and carried by the signal samples produced by said signal sampling means for selecting a called one of said lines, signal sample converting means controlled by said line selecting means for thereafter converting the signal samples derived from the calling line into corresponding signal samples occurring in the time position assigned to the called line and for transmitting the reconstructed signals over the called line, ringing signal selecting means responsive to code selecting signals produced on the calling line and carried by the signal samples produced by said signal sampling means for selecting that one of said coded ringing signals which may be assigned to the called substation associated with the called line, means for sampling the selected code ringing signal in the time position assigned to the called line, means for delaying the sampling of said selected code ringing signals until the start of a code cycle, and means responsive to said ringing signal samples for transmitting a corresponding ringing signal over the called line.

25. In an automatic telephone system of the type having a plurality of lines over which subscriber controlled signals are transmitted, said lines having individually assigned thereto a time position in repetitive time position frames, at least some of said lines having a plurality of substations associated therewith which may be signaled by different party line ringing signals, ringing code generating means for developing during each of repetitive code cycles a plurality of differently coded ringing signals corresponding to the maximum number of substations which may be associated with any one of said lines, a source of supervisory tone voltage, code modulator means for modulating the supervisory tone voltage from said source in accordance with each of said plurality of coded ringing signals to provide corresponding code modulated supervisory tone signals, signal sampling means for sampling signals produced on a calling one of said lines in the time position assigned to the calling line, line selecting means responsive to subscriber controlled line selecting signals produced on the calling line and carried by the signal samples produced by said signal sampling means for selecting a called one of said lines, signal sample converting means controlled by said line selecting means for thereafter converting the signal samples derived from the calling line into corresponding signal samples occurring in the time position assigned to the called line, reconstructor means for reconstructing the sampled signals from said last-named signal samples and for transmitting the reconstructed signals over the called line, ringing signal selecting means responsive to code selecting signals produced on the calling line and carried by the signal samples produced by said signal sampling means for selecting that one of said code modulated supervisory tone signals which may be assigned to the called substation associated with the called line, means for sampling the selected code supervisory tone signal in the time position assigned to the called line, and means responsive to said ringing signal samples for transmitting a corresponding ringing signal over the called line.

26. In an automatic telephone system of the type having a plurality of lines over which subscriber controlled signals are transmitted, said lines having individually assigned thereto a time position in repetitive time position frames, at least some of said lines having a plurality of substations associated therewith which may be signaled by different party line ringing signals, ringing code generating means for developing during each of repetitive code cycles a plurality of differently coded ringing signals corresponding to the maximum number of substations which may be associated with any one of said lines, a source of supervisory tone voltage, code modulator means for modulating the voltage from said source in accordance with each of said plurality of coded ringing signals to provide corresponding code modulated supervisory tone signals, signal sampling means for sampling signals produced on a calling one of said lines in the time position assigned to the calling line, line selecting means responsive to subscriber controlled line selecting signals produced on the calling line and carried by the signal samples produced by said signal sampling means for selecting a called one of said lines, signal sample converting means controlled by said line selecting means for thereafter converting the signal samples derived from the calling line into corresponding signal samples occurring in the time position assigned to the called line, reconstructor means for reconstructing the sampled signals from said last-named signal samples and for transmitting the reconstructed signals over the called line, ringing signal selecting means responsive to code selecting signals produced on the calling line and carried by the signal samples produced by said signal sampling means for selecting that one of said code modulated supervisory tone signals which may be assigned to the called substation associated with the called line, and means controlled jointly by said signal sample converting means and said party line selecting means for transmitting over the called line the coded ringing signal assigned to the called substation.

27. In an automatic telephone system of the type having a plurality of lines over which subscriber controlled signals are transmitted, said lines having individually assigned thereto a time position in repetitive time position frames, at least some of said lines having a plurality of substations associated therewith which may be signaled by different party line ringing signals, ringing code generating means for developing during each of repetitive code cycles a plurality of differently coded ringing signals corresponding to the maximum number of substations which may be associated with any one of said lines, a source of supervisory tone voltage, code modulator means for modulating the voltage from said source in accordance with each of said plurality of coded ringing signals to provide corresponding code modulated supervisory tone signals, signal sampling means for sampling signals produced on a calling one of said lines in the time position assigned to the calling line, line selecting means responsive to subscriber controlled line selecting signals produced on the calling line and carried by the signal samples produced by said signal sampling means for selecting a called one of said lines, signal sample converting means controlled by said line selecting means for thereafter converting the signal samples derived from the calling line into corresponding signal samples occurring in the time position assigned to the called line, reconstructor means for reconstructing the sampled signals from said last-named signal samples and for transmitting the reconstructed signals over the called line, ringing signal selecting means responsive to code selecting signals produced on the calling line and carried by the signal samples produced by said signal sampling means for selecting that one of said code modulated supervisory tone signals which may be assigned to the called substation associated with the called line, and ringing control means individually associated with the called line and jointly controlled by said signal sample converting means and said code selecting means for transmitting a ringing signal over the called line during the ringing intervals of said selected code ringing signal.

28. In an automatic telephone system of the type having a plurality of lines over which subscriber controlled signals are transmitted, said lines having individually assigned thereto a time position in repetitive time position frames, at least some of said lines having a plurality of substations associated therewith which may be signaled by different party line ringing signals, ringing code generating means for developing during each of repetitive code cycles a plurality of differently coded ringing signals corresponding to the maximum number of substations which may be associated with any one of said lines, a source of supervisory tone voltage, code modulator means for modulating the voltage from said source in accordance with each of said plurality of coded ringing signals to provide corresponding code modulation supervisory tone signals, signal sampling means for sampling signals produced on a calling one of said lines in the time position assigned to the calling line, line selecting means responsive to subscriber controlled line selecting signals produced on the calling line and carried by the signal samples produced by said signal sampling means for selecting a called one of said lines, signal sample converting means controlled by said line selecting means for thereafter converting the signal samples derived from the calling line into corresponding signal samples occurring in the time position assigned to the called line, reconstructor means for reconstructing the sampled signals from said last-named signal samples and for transmitting the reconstructed signals over the called line, ringing signal selecting means responsive to code selecting signals produced on the calling line and carried by the signal samples produced by said signal sampling means for selecting that one of said code modulated supervisory tone signals which may be assigned to the called substation associated with the called line, means for rectifying the selected code modulated supervisory tone signal, means controlled by said signal sample converting means for sampling said rectified code modulated supervisory tone signal in the time position assigned to the called line, and means individually associated with the called line and responsive to said code modulated signal samples for transmitting a ringing signal over the called line during the ringing intervals of said selected code modulated signal.

29. In an automatic telephone system of the type having a plurality of lines over which subscriber controlled signals are transmitted, said lines having individually assigned thereto a time position in repetitive time position frames, at least one of said lines having a plurality of substations associated therewith which may be signaled by different party line ringing signals, ringing code generating means for developing during each of repetitive code cycles a plurality of differently coded ringing signals corresponding to the maximum number of substations which may be associated with any one of said lines, signal sampling means for sampling signals produced on a calling one of said lines in the time position assigned to the calling line, line selecting means responsive to subscriber controlled line selecting signals produced on the calling line and carried by the signal samples produced by said signal sampling means for selecting a called one of said lines, signal sample converting means controlled by said line selecting means for thereafter converting the signal samples derived from the calling line into corresponding signal samples occurring in the time position assigned to the called line, reconstructor means for reconstructing the sampled signals from said last-named signal samples and for transmitting the reconstructed signals over the called line, ringing signal selecting means responsive to code selecting signals produced on the calling line and carried by the signal samples produced by said signal sampling means for selecting that one of said coded ringing signals which may be assigned to the called substation associated with the called line, means controlled by said signal sample converting means for sampling the selected coded ringing signal in the time position assigned to the called line, and means individually associated with the called line and responsive to said coded ringing signal samples for transmitting a ringing signal over the called line during the ringing intervals of said selected coded ringing signal.

30. In an automatic telephone system of the type having a plurality of lines over which subscriber controlled signals are transmitted, said lines having individually assigned thereto a time position in repetitive time position frames, at least some of said lines having a plurality of substations associated therewith which may be signaled by different party line ringing signals, ringing code generating means for developing during each of repetitive code cycles a plurality of differently coded ringing signals corresponding to the maximum number of substations which may be associated with any one of said lines, means for producing a code start signal at the beginning of each ringing code cycle, signal sampling means for sampling signals produced on a calling one of said lines in the time position assigned to the calling line, line selecting means responsive to subscriber controlled line selecting signals produced on the calling line and carried by the signal samples produced by said signal sampling means for selecting a called one of said lines, signal sample converting means controlled by said line selecting means for thereafter converting the signal samples derived from the calling line into corresponding signal samples occurring in the time position assigned to the called line, reconstructor means for reconstructing the sampled signals from said last-named signal samples and for transmitting the reconstructed signals over the called line, ringing signal selecting means responsive to party line selecting signals produced on the calling line and carried by the signal samples produced by said signal sampling means for selecting that one of said coded ringing signals which may be assigned to the called substation associated with the called line, means controlled by said signal sample converting means and responsive to said code start signal for sampling the selected coded ringing signal in the time position assigned to the called line, and means individually associated with the called line and responsive to said ringing signal samples for transmitting a ringing signal over the called line during the ringing intervals of said selected coded ringing signal.

31. In an automatic telephone system of the type having a plurality of lines over which subscriber controlled signals are transmitted, said lines having individually assigned thereto different time positions in repetitive time position frames, at least some of said lines having a plurality of substations associated therewith which may be signaled by different party line ringing signals, ringing signal generating means for developing a plurality of different ringing signals corresponding to the maximum number of substations which may be associated with any one of said lines, an electronic multiplexer for sampling signals produced on said lines in the time positions individually assigned thereto, an electronic distributor for distributing signal sample modulated pulses to said lines in the time positions individually assigned thereto, a plurality of electronic line selecting and signal transmission links adapted to be operatively associated with calling ones of said lines one at a time and each directively controllable by subscriber controlled signals transmitted over any calling line with which it is operatively associated to select a called one of said lines and to select the one of said ringing signals required to signal the called substation associated with the called line, each of said links including electronic means for delivering pulses carrying signal samples derived from the calling line to said distributor in the time position assigned to the called line and for delivering pulses carrying signal samples derived from the called line to said distributor in the time position assigned to the calling line, ringing signal distributing means independent of said electronic distributor for distributing ringing signal modulated pulses to said lines in the time positions individually assigned thereto, means included in each link for transmitting pulses to said ringing signal distributing means during the ringing intervals of a selected ringing signal in the time position assigned to the called line, and means individually associated with the called line and responsive to the pulses distributed thereto by said ringing signal distributing means for ringing the called substation.

32. In an automatic telephone system of the type having a plurality of lines over which subscriber controlled signals are transmitted, said lines having individually assigned thereto different time positions in repetitive time position frames, at least some of said lines having a plurality of substations associated therewith which may be signaled by differently coded party line ringing signals, ringing signal generating means for developing during each of repetitive code cycles a plurality of differently coded ringing signals corresponding to the maximum number of substations associated with any one of said lines and for developing a code start signal at the beginning of each ringing code cycle, an electronic multiplexer for sampling signals produced on said lines in the time positions individually assigned thereto, an electronic distributor for distributing signal sample modulated pulses to said lines in the time positions individually assigned thereto, a plurality of electronic line selecting and signal transmission links adapted to be operatively associated with calling ones of said lines one at a time and each directively controllable by subscriber controlled signals transmitted over any calling line with which it is operatively associated to select a called one of said lines and to select that one of said coded ringing signals required to signal the called substation associated with the called line, each of said links including electronic means for delivering pulses carrying signal samples derived from the calling line to said distributor in the time position assigned to the called line and for delivering pulses carrying signal samples derived from the called line to said distributor in the time position assigned to the calling line, and means included in each link and controlled in part by said code start signal for modulating the pulses delivered from the link to said distributor in the time position assigned to the called line in accordance with the selected coded ringing signal, thereby to effect ringing of the called substation.

33. In an automatic telephone system which includes a plurality of lines having individually assigned thereto different time positions in repetitive time position frames, at least some of said lines having a plurality of substations associated therewith which may be signaled by different party line ringing signals, an impulse responsive signal repeating selector provided with a gate pulse input channel, a signal pulse input channel, a busy pulse input channel, and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, the pulse flow from said signal pulse input channel through said pulse gating means being interrupted during a portion of each impulse transmitted over the calling line, second pulse gating means controlled by pulses transmitted to said selector over said gate pulse channel in the time position assigned to the calling line for gating pulses to said output channel in the same time position, an impulse integrator circuit operative to develop a control pulse in response to each interruption in pulse flow through said pulse gating means to said selector, means including a pair of digit registers successively responsive to the control pulses produced by said integrator circuit during two successive digits for producing selector pulses which occur in the time position assigned to a called one of said lines, a third impulse register responsive to the control pulses developed during a third succeeding digit to select one of a plurality of different supervisory tone signals which respectively correspond to said different ringing signals, busy test means for comparing the time position of said selector pulses with the time positions of busy pulses fed to said selector over said busy pulse input channel, thereby to determine whether the called line is idle or busy, means responsive to operation of said busy test means to indicate the called line is idle for modulating the pulses gated to said output channel by said second pulse gating means with said selected supervisory tone signal, means for rectifying said selected supervisory tone signal, and third pulse gating means jointly controlled by said busy test means, said selector pulses and said rectified supervisory tone signal for gating pulses to said output channel in the time position assigned to the called line during the signal on intervals of said selected supervisory tone signal.

34. In an automatic telephone system which includes a plurality of lines having individually assigned thereto different time positions in repetitive time position frames, at least some of said lines having a plurality of substations associated therewith which may be signaled by different party line ringing signals, an impulse responsive signal repeating selector provided with a gate pulse input channel, a signal pulse input channel, a busy pulse input channel, and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, the pulse flow from said signal input channel through said first pulse gating means being interrupted during a portion of each impulse transmitted over the calling line, second pulse gating means controlled by pulses transmitted to said selector over said gate pulse input channel in the time position assigned to the calling line for gating pulses to said output channel in the same time position, an impulse integrator circuit operative to develop a control pulse in response to each interruption in pulse flow through said first pulse gating means to said selector, means including a pair of digit registers successively responsive to the control pulses produced by said integrator circuit during two successive digits for producing selector pulses which occur in the time position assigned to a called one of said lines, a third digit register including a string of gaseous discharge tubes and means for firing the tubes in said string in sequence in accordance with the control pulses produced by said integrator circuit during a third successive digit, tone gate circuits individually controlled by said tubes and each operative to gate a different ringback tone signal when the tube controlling the circuit is fired, busy test means for comparing the time position of said selected pulses with the time positions of busy pulses fed to said selector over said busy pulse input channel, thereby to determine whether the called line is idle or busy, third pulse gating means jointly controlled by said busy test means and said selector pulses for gating pulses to said output channel in the time position assigned to the called line in the event said selector pulses do not occur coincidentally with busy pulses fed to said selector over said busy pulse channel, means responsive to operation of said busy test means to indicate that the called line is idle for modulating the pulses gated to said ouput channel by said second pulse gating means with the ringback tone signal gated by the tone gate circuit controlled by the last fired tube of said third digit register, means controlled by said last-named means for rectifying the selected ringback tone signal, and means for modulating the pulses gated to said output channel by said third pulse gating means with said rectified ringback tone signal.

35. In an automatic telephone system which includes a plurality of lines having individually assigned thereto different time positions in repetitive time position frames, at least some of said lines having a plurality of substations associated therewith which may be signaled by different party line ringing signals, an impulse responsive signal repeating selector provided with a gate pulse input channel, a signal pulse input channel, a busy pulse input channel, and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, the pulse flow from said signal input channel through said first pulse gating means being interrupted during a portion of each impulse transmitted over the calling line, second pulse gating means controlled by pulses transmitted to said selector over said gate pulse input channel in the time position assigned to the calling line for gating pulses to said output channel in the same time position, an impulse integrator circuit operative to develop a control pulse in response to each interruption in pulse flow through said first pulse gating means to said selector, means including a pair of digit registers successively responsive to the control pulses produced by said integrator circuit during two successive digits for producing selector pulses which occur in the time position assigned to a called one of said lines, a third digit register including a string of gaseous discharge tubes and means for firing the tubes in said string in sequence in accordance with the control pulses produced by said integrator circuit during a third successive digit, tone gate circuits individually controlled by said tubes and each operative to gate a different ringback tone signal when the tube controlling the circuit is fired, busy test means for comparing the time position of said selected pulses with the time positions of busy pulses fed to said selector over said busy pulse input channel, thereby to determine whether the called line is idle or busy, means responsive to operation of said busy test means to indicate that the called line is idle for modulating the pulses gated to said output channel by said second pulse gating means with the ringback tone signal gated by the tone gate circuit controlled by the last fired tube of said third digit register, means controlled by said last-named means for rectifying the selected ringback tone signal, and third pulse gating means jointly controlled by said busy test means, said selector pulses and said rectified ringback tone signal for gating pulses to said output channel in the time position assigned to the called line and during the ringback tone intervals of the selected ringback tone signal.

36. In an automatic telephone system which includes a plurality of lines having individually assigned thereto different time positions in repetitive time position frames, at least some of said lines having a plurality of substations associated therewith which may be signaled by different party line ringing signals, an impulse responsive signal repeating selector provided with a gate pulse input channel, a signal pulse input channel, a busy pulse input channel, a ringing control signal output channel, and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, the pulses gated to said selector by said first gating means being modulated in accordance with signals derived from the calling line and the pulse flow from said signal input channel through said first pulse gating means being interrupted during a portion of each impulse transmitted over the calling line, second pulse gating means controlled by pulses transmitted to said selector over said gate pulse input channel in the time position assigned to the calling line for gating pulses to said signal pulse output channel in the same time position, an impulse integrator circuit operative to develop a control pulse in response to each interruption in pulse flow through said first pulse gating means to said selector, means including a pair of digit registers successively responsive to the control pulses produced by said integrator circuit during two successive digits for producing selector pulses which occur in the time position assigned to a called one of said lines, a third digit register including a string of gaseous discharge tubes and means for firing the tubes in said string in sequence in accordance with the control pulses produced by said integrator circuit during a third successive digit, tone gate circuits individually controlled by said tubes, and each operative to gate a different ringback tone signal when the tube controlling the circuit is fired, busy test means for comparing the time position of said selector pulses with the time positions of busy pulses fed to said selector over said busy pulse input channel, thereby to determine whether the called line is idle or busy, third pulse gating means jointly controlled by said busy test means and said selector pulses for gating pulses to said signal pulse output channel in the time position assigned to the called line in the event said selector pulses do not occur coincidentally with busy pulses fed to said selector over said busy pulse channel, means responsive to operation of said busy test means to indicate that the called line is idle for modulating the pulses gated to said signal pulse output channel by said second pulse gating means with the ringback tone signal gated by the tone gate circuit controlled by the last fired tube of said third digit register, means controlled by said last-named means for rectifying the selected ringback tone signal, and fourth pulse gating means controlled by said rectified ringback tone signal for gating the pulses gated by said third pulse gating means to said ringing control signal output channel during the ringback tone intervals of the selected ringback tone signal.

37. In an automatic telephone system which includes a plurality of lines having individually assigned thereto different time positions in repetitive time position frames, at least some of said lines having a plurality of substations associated therewith which may be signaled by different party line ringing signals, an impulse responsive signal repeating selector provided with a gate pulse input channel, a signal pulse input channel, a busy pulse input channel, and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, the pulse flow from said signal input channel through said first pulse gating means being interrupted during a portion of each impulse transmitted over the calling line, second pulse gating means controlled by pulses transmitted to said selector over said gate pulse input channel in the time position assigned to the calling line for gating pulses to said output channel in the same time position, an impulse integrator circuit operative to develop a control pulse in response to each interruption in pulse flow through said first pulse gating means to said selector, means including a pair of digit registers successively responsive to the control pulses produced by said integrator circuit during two successive digits for producing selector pulses which occur in the time position assigned to a called one of said lines, a third digit register including a string of gaseous discharge tubes and means for firing the tubes in said string in sequence in accordance with the control pulses produced by said integrator circuit during a third successive digit, tone gate circuits individually controlled by said tubes and each operative to gate a different cyclically recurring ringback tone signal when the tube controlling the circuit is fired, busy test means for comparing the time position of said selected pulses with the time positions of busy pulses fed to said selector over said busy pulse input channel, thereby to determine whether the called line is idle or busy, third pulse gating means jointly controlled by said busy test means and said selector pulses for gating pulses to said output channel in the time position assigned to the called line in the event said selector pulses do not occur coincidentally with busy pulses fed to said selector over said busy pulse channel, ringback tone gate means responsive to operation of said busy test means to indicate that the called line is idle for modulating the pulses gated to said output channel by said second pulse gating means with the ringback tone signal gated by the tone gate circuit controlled by the last fired tube of said third digit register, means for delaying the operation of said ringback tone gate means until the start of a ringback tone signal cycle, means for rectifying the selected ringback tone signal gated by said ringback tone gate means, and means for modulating the pulses gated to said output channel by said third pulse gating means with said rectified ringback tone signal.

38. In an automatic telephone system which includes a plurality of lines having individually assigned thereto different time positions in repetitive time position frames, at least some of said lines having a plurality of substations associated therewith which may be signaled by different party line ringing signals, an impulse responsive signal repeating selector provided with a gate pulse input channel, a signal pulse input channel, a busy pulse input channel, and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, the pulse flow from said signal input channel through said first pulse gating means being interrupted during a portion of each impulse transmitted over the calling line, second pulse gating means controlled by pulses transmitted to said selector over said gate pulse input channel in the time positions assigned to the calling line for gating pulses to said output channel in the same time position, an impulse integrator circuit operative to develop a control pulse in response to each interruption in pulse flow through said first pulse gating means to said selector, means including a pair of digit registers successively responsive to the control pulses produced by said integrator circuit during two successive digits for producing selector pulses which occur in the time position assigned to a called one of said lines, a third digit register including a string of gaseous discharge tubes and means for firing the tubes in said string in sequence in accordance with the control pulses produced by said integrator circuit during a third successive digit, tone gate circuits individually controlled by said tubes and each operative to gate a different cyclically recurring ringback tone signal when the tube controlling the circuit is fired, busy test means for comparing the time position of said selector pulses with the time positions of busy pulses fed to said selector over said busy pulse input channel, thereby to determine whether the called line is idle or busy, third pulse gating means jointly controlled by said busy test means and said selector pulses for gating pulses to said output channel in the time position assigned to the called line in the event said selector pulses do not occur coincidentally with busy pulses fed to said selector over said busy pulse channel, ringback tone gate means responsive to operation of said busy test means to indicate that the called line is idle for modulating the pulses gated to said output channel by said second pulse gating means with the ringback tone signal gated by the tone gate circuit controlled by the last fired tube of said third digit register, means for delaying the operation of said ringback tone gate means until the start of the ringback tone signal cycle, means for rectifying the selected ringback tone signal gated by said ringback tone gate means, means for modulating the pulses gated to said output channel by said third pulse gating means with said rectified ringback tone signal, and means for disabling said ringback tone gate means when the call is answered on the called line.

39. In an automatic telephone system which includes a plurality of lines having individually assigned thereto different time positions in repetitive time position frames, at least certain of said lines having a plurality of substations associated therewith which may be selectively signaled by different party line signals, an impulse responsive selector provided with a gate pulse input channel and a signal pulse input channel and including, in combination, pulse gating means controlled by pulses transmitted to said selector over said gate pulse input channel in the time position assigned to a calling one of said lines for gating pulses to said selector from said signal pulse input channel in the same time position, the pulse flow from said signal pulse input channel through said pulse gating means being interrupted during a portion of each impulse transmitted over the calling line, and means responsive to said interruptions in pulse flow through said pulse gating means for selecting a called one of said lines and the ringing signal assigned to the called substation associated with the called line.

40. In an automatic telephone system which includes a plurality of lines having individually assigned thereto different time positions in repetitive time position frames, at least certain of said lines having a plurality of substations associated therewith which may be selectively signaled by different party line signals, an impulse responsive selector provided with a gate pulse input channel and a signal pulse input channel and including, in combination, pulse gating means controlled by pulses transmitted to said selector over said gate pulse input channel in the time position assigned to a calling one of said lines for gating pulses to said selector from said signal pulse input channel in the same time position, the pulse flow from said signal pulse input channel through said pulse gating means being interrupted during a portion of each impulse transmitted over the calling line, and means responsive to said interruptions in pulse flow through said pulse gating means for first selecting a called one of said lines and for thereafter selecting the particular ringing signal assigned to the called substation associated with the called line.

41. In an automatic telephone system which includes a plurality of lines having individually assigned thereto different time positions in repetitive time position frames, at least certain of said lines having a plurality of substations associated therewith which may be selectively signaled by different party line signals, an impulse responsive selector provided with a gate pulse input channel and a signal pulse input channel and including, in combination, pulse gating means controlled by pulses transmitted to said selector over said gate pulse input channel in the time position assigned to a calling one of said lines for gating pulses to said selector from said signal pulse input channel in the same time position, the pulse flow from said signal pulse input channel through said pulse gating means being interrupted during a portion of each impulse transmitted over the calling line, means for developing a control pulse in response to each interruption in pulse flow from said pulse input channel through said pulse gating means to said selector, and impulse register means responsive to said control pulses for selecting a called one of said lines and the ringing signal assigned to the called substation associated with the called line.

42. In an automatic telephone system which includes a plurality of lines having individually assigned thereto different time positions in repetitive time position frames, at least certain of said lines having a plurality of substations associated therewith which may be selectively signaled by different party line signals, an impulse responsive selector provided with a gate pulse input channel and a signal pulse input channel and including, in combination, pulse gating means controlled by pulses transmitted to said selector over said gate pulse input channel in the time position assigned to a calling one of said lines for gating pulses to said selector from said signal pulse input channel in the same time position, the pulse flow from said signal pulse input channel through said pulse gating means being interrupted during a portion of each impulse transmitted over the calling line, means for developing a control pulse in response to each interruption in pulse flow from said pulse input channel through said pulse gating means to said selector, first impulse register means responsive to said control pulses for selecting a called one of said lines, and second impulse register means responsive to said control pulses for selecting the ringing signal assigned to the called substation associated with the called line.

43. A three-digit impulse responsive selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in a predetermined time position, the pulse flow from said pulse input channel through said pulse gating means being interrupted during a portion of each impulse, means responsive to said interruptions in pulse flow through said pulse gating means during the first two digits for selecting one of said time positions, means controlled by said last-named means for gating pulses to said output channel in said one time position, and means responsive to said interruptions in pulse flow through said pulse gating means during the third digit for modulating the pulses gated to said output channel in said one time position in accordance with a selected ringing signal.

44. Ringing control apparatus for controlling the party line ringing components of an electronic telephone system of the time sharing type, comprising an oscillator, means for deriving code forming ring drive pulses from said oscillator, a code forming ring circuit including a string of code forming tubes connected in an endless series, pulse forming circuits individually including said tubes, means for firing the tubes of said string at the rate of one tube for each of said drive pulses, thereby sequentially to develop code forming pulses in said circuits, and means for combining predetermined ones of said code forming pulses to form a plurality of different party line ringing codes comprising a long or a shot ringing interval or different combinations of long and short ringing intervals.

45. Ringing control apparatus for controlling the party line ringing components of a signalling system of the time sharing type, comprising a code forming ring circuit including a string of code forming tubes connected in an endless series, pulse forming circuits individually including said tubes, means for sequentially firing the tubes of said string at a predetermined rate, thereby sequentially to develop code forming pulses in said circuits, a plurality of code buses, and means for impressing different predetermined ones of said code forming pulses on different ones of said code buses to form a plurality of different party line ringing codes comprising a long or a short ringing interval or different combinations of long and short ringing intervals.

46. Electronic ringing control apparatus for controlling the party line ringing components of a signaling system of the time sharing type, comprising a code forming ring circuit including a string of code forming tubes connected in an endless series, means for sequentially firing the tubes of said string at a predetermined rate, thereby sequentially to develop code forming pulses at the anodes of said tubes, a plurality of code buses, and means including a plurality of isolating resistors for connecting the anode of each of said tubes to predetermined ones of said code buses, thereby to form on said code buses a plurality of different ringing codes comprising a long or a short ringing interval or different combinations of long and short ringing intervals.

47. Electronic ringing control apparatus for controlling the party line ringing components of a signaling system of the time sharing type, comprising a code forming ring circuit including a string of code forming tubes connected in an endless series, pulse forming circuits individually including said tubes, means for sequentially firing the tubes of said string at a predetermined rate, thereby sequentially to develop code forming pulses in said circuits, a plurality of code buses, and means for impressing different predetermined ones of said code forming pulses on different ones of said code buses to form a plurality of different party line ringing codes comprising a long or a short ringing interval or different combinations of long and short ringing intervals, all of said ringing codes being completely formed during one operating cycle of said ring circuit.

48. Electronic ringing control apparatus for controlling the party line ringing components of a signaling system of the time sharing type, comprising a code forming ring circuit including a string of fifteen code forming tubes connected in an endless series, pulse forming circuits individually including said tubes, means for sequentially firing the tubes of said string at a predetermined uniform rate, thereby sequentially to develop code forming pulses in said circuits, a series of ten code buses, and means for impressing different predetermined ones of said code forming pulses on different ones of said code buses to form ten different ringing codes comprising a long or a short ringing interval or different combinations of long and short ringing intervals, each of said code forming pulses being impressed upon a maximum of three of said code buses and all of said ringing codes being completely formed during one operating cycle of said ring circuit.

49. Electronic ringing control apparatus for controlling the party line ringing components of a signaling system of the time sharing type, comprising a code forming ring circuit including a string of fifteen code forming tubes connected in an endless series, pulse forming circuits individually including said tubes, means for sequentially firing the tubes of said string at a predetermined uniform rate, thereby sequentially to develop code forming pulses in said circuits, a series of ten code buses, means for impressing different predetermined ones of said code forming pulses on each of said code buses to form ten different ringing codes comprising a long or a short ringing interval or different combinations of long and short ringing intervals, each of said code forming pulses being impressed upon a maximum of three of said code buses and all of said ringing codes being completely formed during each operating cycle of said ring circuit, and means for developing a code start pulse at the start of each operating cycle of said ring circuit.

50. Electronic ringing control apparatus for controlling the party line ringing components of a signaling system of the time sharing type, comprising a code forming ring circuit including a string of fifteen code forming tubes connected in an endless series, pulse forming circuits individually including said tubes, means for sequentially firing the tubes of said string at a predetermined uniform rate, thereby sequentially to develop code forming pulses in said circuits, a series of ten code buses, means for impressing different predetermined ones of said code forming pulses on each of said code buses to form ten different ringing codes comprising a long or a short ringing interval or different combinations of long and short ringing intervals, each of said code forming pulses being impressed upon a maximum of three of said code buses and all of said ringing codes being completed during each operating cycle of said ring circuit, means for developing a code start pulse at the start of each operating cycle of said ring circuit, and means for delaying said code start pulse relative to the leading edge of the first code forming pulse in each operating cycle of said ring circuit.

51. Electronic ringing control apparatus for controlling the party line ringing components of a signaling system of the time sharing type, comprising a code forming ring circuit including an endless chain of gas-filled code forming tubes, pulse forming circuits individually including said tubes, means for sequentially firing the tubes of said chain at a predetermined uniform rate to develop code forming pulses in said circuits, a plurality of code buses, means for connecting each of said circuits to one or more of said code buses, thereby to form a plurality of different ringing codes comprising a long or a short ringing interval or different combinations of long and short ringing intervals, an audible tone signal source, means individual to said code buses for modulating the signal from said source in accordance with the ringing code developed on the corresponding code bus, and means for producing a code start pulse at the start of each operating cycle of said ring circuit.

52. Electronic ringing control apparatus for controlling the party line ringing components of a signaling system of the time sharing type, comprising a code forming ring circuit including an endless chain of gas-filled code forming tubes, pulse forming circuits individually including said tubes, means for sequentially firing the tubes of said chain at a predetermined uniform rate, thereby sequentially to develop code forming pulses in said circuits, a plurality of code buses, means for connecting each of said circuits except one to one or more of said code buses, thereby to form a plurality of different ringing codes comprising a long or a short ringing interval or different combinations of long and short ringing intervals, and means for deriving from the pulse forming circuit including said one tube a code start pulse marking the start of an operating cycle of said ring circuit.

53. Electronic ringing control apparatus for controlling the party line ringing components of a signaling system of the time sharing type, comprising a code forming ring circuit including an endless chain of gas-filled code forming tubes, means for sequentially firing the tubes of said chain at a predetermined uniform rate, thereby sequentially to develop code forming pulses at the anodes of said tubes, a plurality of code buses, means individually connecting the anodes of said tubes to one or more of said code buses, thereby to combine predetermined ones of said code forming pulses and thus form different ringing codes comprising a long or a short ringing interval or different combinations of long and short ringing intervals, means for suppressing switching transients produced by connecting the anodes of two adjacent tubes to the same code bus, an audible tone signal source, means individual to said code buses for modulating the signal from said source in accordance with the ringing code developed on the corresponding code bus, and means for producing a code start pulse at the start of each operating cycle of said ring circuit.

54. Electronic ringing control apparatus for controlling the party line ringing components of a signaling system of the time sharing type, comprising a code forming ring circuit including an endless chain of gas-filled code forming tubes, means for sequentially firing the tubes of said chain at a predetermined uniform rate to develop code forming pulses at the anodes of said tubes, a plurality of code buses, means for connecting the anode of each of said tubes to one or more of said code buses, thereby to form a plurality of differently coded ringing control signals on said buses, an audible tone signal source, and means individual to said code buses for modulating the signal from said source in accordance with the coded ringing control signal developed on the corresponding code bus.

55. In an automatic telephone system of the type having a plurality of lines over which subscriber controlled signals are transmitted, at least some of said lines having a plurality of substations associated therewith identifiable by ringing signals having different characteristics, means responsive to initiation of a call on one of said lines for developing pulses representing said calling line and distinguishable from pulses representing others of said lines, means responsive to said calling line pulses and directively controllable by subscriber controlled signals transmitted over said calling line for setting up a telephonic connection between said calling line and any called one of said lines, and means responsive to said calling line pulses for transmitting a ringing signal over the called line having a characteristic identifying the called substation associated therewith.

56. In an automatic telephone system, a plurality of lines, at least some of said lines having a plurality of substations associated therewith identifiable by ringing signals having different characteristics, means responsive to initiation of a call on one of said lines for developing pulses representing said calling line and distinguishable from pulses representing others of said lines, means for modulating said calling line pulses with directive control impulses developed on said calling line, means responsive to directive control impulse modulation of said calling line pulses for setting up a telephonic connection between said calling line and any called one of said lines, and means responsive to directive control impulse modulation of said calling line pulses for transmitting a ringing signal over the called line having a characteristic identifying the called substation associated therewith.

57. In an automatic telephone system, a plurality of lines, at least some of said lines having a plurality of substations associated therewith identifiable by ringing signals having different characteristics, means responsive to initiation of a call on one of said lines for developing pulses representing said calling line and distinguishable from pulses representing others of said lines, means for modulating said calling line pulses with directive control impulses developed on said calling line, means responsive to directive control impulse modulation of said calling line pulses for setting up a telephonic connection between said calling line and any called one of said lines, means for developing a plurality of ringing signals having said different characteristics, means responsive to directive control impulse modulation of said calling line pulses for selecting one of said ringing signals having a characteristic identifying the called substation, and means for transmitting said selected ringing signal over the called line.

58. In an automatic telephone system, a plurality of lines, at least some of said lines having a plurality of substations associated therewith identifiable by ringing signals having different characteristics, means responsive to initiation of a call on one of said lines for developing pulses representing said calling line and distinguishable from pulses representing others of said lines, means for modulating said calling line pulses with directive control impulses developed on said calling line, said directive control impulses including impulses representing a plurality of line selecting digits and impulses identifying the called substation associated with the called line, means responsive to directive control impulse modulation of said calling line pulses with said line selecting digits for setting up a telephonic connection between said calling line and any called one of said lines, means for developing a plurality of ringing signals having said different characteristics, means responsive to modulation of said calling line pulses with said substation identifying impulses for selecting one of said ringing signals having a characteristic identifying the called substation, and means for transmitting said selected ringing signal over the called line.

59. In an automatic telephone system, a plurality of lines, at least some of said lines having a plurality of substations associated therewith identifiable by ringing signals having different characteristics, means responsive to initiation of a call on one of said lines for developing pulses representing said calling line and distinguishable from pulses representing others of said lines, means for modulating said calling line pulses with directive control impulses developed on said calling line, said directive control impulses including impulses representing a plurality of line selecting digits and impulses identifying the called substation associated with the called line, means responsive to directive control impulse modulation of said calling line pulses with said line selecting digits for setting up a telephonic connection between said calling line and any called one of said lines, means for developing a plurality of ringing signals having said different characteristics, means responsive to modulation of said calling line pulses with said substation identifying impulses for selecting one of said ringing signals having a characteristic identifying the called substation, a source of ringing current, and means controlled by said selecting ringing signal for transmitting ringing current from said source over the called line.

60. In an automatic telephone system, a plurality of lines, at least some of said lines having a plurality of substations associated therewith identifiable by ringing signals having different characteristics, means responsive to initiation of a call on one of said lines for developing pulses representing said calling line and distinguishable from pulses representing others of said lines, means for modulating said calling line pulses with directive control impulses developed on said calling line, means responsive to directive control impulse modulation of said calling line pulses for setting up a telephonic connection between said calling line and any called one of said lines, means for developing a plurality of ringing signals having differently coded ringing intervals, means responsive to directive control impulse modulation of said calling line pulses for selecting one of said ringing signals in accordance with the identity of the called substation, and means for transmitting a ringing current over the called line during the ringing intervals of said selected ringing signal.

61. In an automatic telephone system, a plurality of lines, at least some of said lines having a plurality of substations associated therewith identifiable by ringing signals having different characteristics, means responsive to initiation of a call on one of said lines for developing pulses representing said calling line and distinguishable from pulses representing others of said lines, means for modulating said calling line pulses with directive control impulses developed on said calling line, said directive control impulses including impulses representing a plurality of line selecting digits and impulses identifying the called substation associated with the called line, means for reconstructing said directive control impulses from said modulated calling line pulses, means responsive to said reconstructed line selecting digits of directive control impulses for setting up a telephonic connection between said calling line and any called one of said lines, means for developing a plurality of ringing signals having said different characteristics, means responsive to said reconstructed substation identifying impulses for selecting one of said ringing signals in accordance with the identity of the called substation, and means for transmitting a ringing current over the called line corresponding to said selected ringing signal.

62. In an automatic telephone system, a plurality of lines, at least some of said lines having a plurality of substations associated therewith identifiable by ringing signals having different characteristics, means responsive to initiation of a call on one of said lines for developing first pulses representing said calling line and distinguishable from pulses representing others of said lines, means for modulating said first pulses with directive control impulses developed on said calling line, means responsive to directive control impulse modulation of said first pulses for developing second pulses representing a called one of said lines and distinguishable from pulses representing others of said lines, means for developing a plurality of ringing signals having said different characteristics, means responsive to directive control impulse modulation of said first pulses for selecting one of said ringing signals in accordance with the identity of the called substation, means for modulating said second pulses with said selected ringing signal, means for reconstructing said selected ringing signal from said modulated second pulses, and means controlled by said reconstructed selected ringing signal for transmitting a ringing current over the called line.

63. In an automatic telephone system, a plurality of lines at least some having having a plurality of substations associated therewith, each of said substations including ringing facilities for signalling the subscriber, means responsive to initiation of a call on one of said lines for developing pulses representing said calling line and distinguishable from pulses representing others of said lines, means for modulating said calling line pulses with directive control impulses developed on said calling line, and means responsive to directive control impulse modulation of said calling line pulses for selecting any called one of said lines and selectively actuating the ringing facilities of any called one of the substations associated with the called line.

64. In an automatic telephone system, a plurality of lines, at least some of said lines having a plurality of substations associated therewith identifiable by ringing signals having different characteristics, means responsive to initiation of a call on one of said lines for developing pulses representing said calling line and distinguishable from pulses representing others of said lines, means for modulating said calling line pulses with directive control impulses developed on said calling line, and means responsive to directive control impulse modulation of said calling line pulses for selecting any called one of said lines and transmitting a ringing signal over the called line having a characteristic identifying the called substation associated therewith.

65. In an automatic telephone system, a plurality of lines, at least some of said lines having a plurality of substations associated therewith identifiable by ringing signals having different characteristics, means responsive to initiation of a call on one of said lines for developing pulses representing said calling line and distinguishable from pulses representing others of said lines, means for modulating said calling line pulses with directive control impulses developed on said calling line, means responsive to directive control impulse modulation of said calling line pulses for setting up a telephonic connection between said calling line and any called one of said lines, means for developing a plurality of ringing signals having said different characteristics, said ringing signals recurring in repetitive ringing cycles, means responsive to directive control impulse modulation of said calling line pulses for selecting one of said ringing signals having a characteristic identifying the called substation associated with the called line, means for transmitting a ringing current over the called line in accordance with said selected ringing signal, and means for delaying the transmission of ringing current over the called line until the start of one of said ringing cycles to prevent erroneous ringing of the called substation.

66. In an automatic telephone system of the type having a plurality of lines over which subscriber controlled signals are transmitted, at least some of said lines having a plurality of substations associated therewith identifiable by ringing signals having different characteristics, means responsive to initiation of a call on one of said lines for developing pulses representing said calling line and distinguishable from pulses representing others of said lines, means for developing a plurality of ringing signals having said different characteristics, means responsive to said calling line pulses and directively controlled by subscriber controlled signals transmitted over said calling line for selecting one of said ringing signals having a characteristic identifying the called substation, and means for transmitting said selected ringing signal over the called line.

67. In an automatic telephone system of the type having a plurality of lines over which subscriber controlled signals are transmitted, at least some of said lines having a plurality of substations associated therewith identifiable by ringing signals having different characteristics, means responsive to initiation of a call on one of said lines for developing pulses representing said calling line and distinguishable from pulses representing others of said lines, means for developing a plurality of ringing signals having said different characteristics, means responsive to said calling line pulses and directively controllable by subscriber controlled signals transmitted over said calling line for selecting one of said ringing signals having a characteristic identifying the called substation, a source of ringing current, and means controlled by said selected ringing signal for transmitting ringing current from said source over the called line.

68. In an automatic telephone system of the type having a plurality of lines over which subscriber controlled signals are transmitted, at least some of said lines having a plurality of substations associated therewith identifiable by ringing signals having different characteristics, means responsive to initiation of a call on one of said lines for developing pulses representing said calling line and distinguishable from pulses representing others of said lines, means for developing a plurality of ringing signals having differently coded ringing intervals, means responsive to said calling line pulses and directively controllable by subscriber controlled signals transmitted over said calling line for selecting one of said ringing signals in accordance with the identity of the called substation, and means for transmitting a ringing current over the called line during the ringing intervals of said selected ringing signal.

69. In an automatic telephone system of the type having a plurality of lines over which subscriber controlled signals are transmitted, at least some of said lines having a plurality of substations associated therewith identifiable by ringing signals having different characteristics, means responsive to initiation of a call on one of said lines for developing pulses representing said calling line and distinguishable from pulses representing others of said lines, means for developing a plurality of ringing signals having said differnet characteristics, said ringing signals recurring in repetitive ringing cycles, means responsive to said calling line pulses and directively controllable by subscriber controlled signals transmitted over said calling line for selecting one of said ringing signals having a characteristic identifying the called substation, means for transmitting a ringing current over the called line in accordance with said selected ringing signal, and means for delaying the transmission of ringing current over the called line until the start of one of said ringing cycles to prevent erroneous ringing of the called substation.

References Cited in the file of this patent

UNITED STATES PATENTS

| | | |
|---|---|---|
| 2,202,474 | Vroom | May 28, 1940 |
| 2,379,221 | Espenschied | June 26, 1945 |
| 2,379,715 | Hubbard | July 3, 1945 |
| 2,406,165 | Schroeder | Aug. 20, 1946 |
| 2,440,239 | Almquist | Apr. 27, 1948 |
| 2,462,896 | Ransom | Mar. 1, 1949 |
| 2,490,054 | Hatton | Dec. 6, 1949 |
| 2,491,263 | Herrick | Dec. 13, 1949 |
| 2,492,179 | Ransom | Dec. 27, 1949 |
| 2,506,612 | Ransom | May 9, 1950 |
| 2,513,049 | Powell | June 27, 1950 |
| 2,520,170 | Ransom | Aug. 29, 1950 |
| 2,541,932 | Melhose | Feb. 13, 1951 |
| 2,559,603 | Derjavitch | July 10, 1951 |
| 2,570,274 | Ransom | Oct. 9, 1951 |
| 2,584,987 | Deloraine | Feb. 12, 1952 |
| 2,619,548 | Lesti | Nov. 25, 1952 |
| 2,638,505 | Van Mierlo et al. | May 12, 1953 |
| 2,688,662 | Den Hertog et al. | Sept. 7, 1954 |
| 2,694,751 | Den Hertog | Nov. 16, 1954 |
| 2,706,748 | Den Hertog | Apr. 19, 1955 |
| 2,716,159 | Flowers | Aug. 23, 1955 |
| 2,736,773 | Levy | Feb. 28, 1956 |